(12) United States Patent
Grechanik et al.

(10) Patent No.: US 8,365,147 B2
(45) Date of Patent: Jan. 29, 2013

(54) TEST SCRIPT TRANSFORMATION ARCHITECTURE

(75) Inventors: Mark Grechanik, Chicago, IL (US); Qing Xie, Chicago, IL (US); Chen Fu, Downers Grove, IL (US)

(73) Assignee: Accenture Global Services Limited, Dublin (IE)

( * ) Notice: Subject to any disclaimer, the term of this patent is extended or adjusted under 35 U.S.C. 154(b) by 1138 days.

(21) Appl. No.: 12/038,665

(22) Filed: Feb. 27, 2008

(65) Prior Publication Data
US 2009/0217302 A1 Aug. 27, 2009

(51) Int. Cl.
G06F 9/44 (2006.01)
(52) U.S. Cl. ............... 717/124; 714/37; 714/46; 714/45
(58) Field of Classification Search .......... 717/101–178; 705/400; 714/26, 38; 715/234, 762, 764, 715/778
See application file for complete search history.

(56) References Cited

U.S. PATENT DOCUMENTS

| | | | |
|---|---|---|---|
| 5,781,720 A * | 7/1998 | Parker et al. .............. 714/38.11 |
| 6,216,212 B1 | 4/2001 | Challenger et al. |
| 6,549,922 B1 * | 4/2003 | Srivastava et al. ..................... 1/1 |
| 6,898,764 B2 * | 5/2005 | Kemp ........................... 715/762 |
| 6,990,654 B2 * | 1/2006 | Carroll, Jr. ..................... 717/109 |
| 7,165,240 B2 * | 1/2007 | Patterson ...................... 717/116 |
| 7,546,602 B2 | 6/2009 | Hejlsberg et al. |
| 7,562,307 B2 * | 7/2009 | Betts et al. ..................... 715/762 |
| 7,716,662 B2 | 5/2010 | Seiden |
| 2003/0052917 A1 * | 3/2003 | Dubovsky ..................... 345/764 |
| 2003/0202012 A1 | 10/2003 | Kemp |
| 2003/0236775 A1 * | 12/2003 | Patterson ........................ 707/3 |
| 2004/0002818 A1 | 1/2004 | Kulp et al. |
| 2004/0002989 A1 | 1/2004 | Kaminer |
| 2005/0166094 A1 * | 7/2005 | Blackwell et al. ............... 714/38 |
| 2005/0204298 A1 * | 9/2005 | Kemp ........................... 715/762 |
| 2005/0204343 A1 * | 9/2005 | Kisamore et al. ............. 717/124 |
| 2005/0235274 A1 | 10/2005 | Mamou et al. |
| 2006/0015847 A1 | 1/2006 | Carroll, Jr. |
| 2006/0168577 A1 | 7/2006 | Melo et al. |
| 2006/0230314 A1 * | 10/2006 | Sanjar et al. ..................... 714/26 |
| 2007/0006043 A1 * | 1/2007 | Pins ............................... 714/38 |
| 2007/0143327 A1 | 6/2007 | Rivas et al. |
| 2007/0143398 A1 | 6/2007 | Graham |
| 2007/0240116 A1 | 10/2007 | Bangel et al. |

(Continued)

OTHER PUBLICATIONS

Hierarchical GUI Test Case Generation Using Automated Planning,—Atif M. Memon, Student Member, IEEE, Martha E. Pollack, and Mary Lou Soffa, Member, IEEE—IEEE Transactions on Software Engineering, vol. 27, No. 2, Feb. 2001—http://ieeexplore.ieee.org/stamp/stamp.jsp?tp=&arnumber=908959.*

(Continued)

Primary Examiner — Lewis A Bullock, Jr.
Assistant Examiner — Francisco Aponte
(74) Attorney, Agent, or Firm — Brinks Hofer Gilson & Lione

(57) ABSTRACT

A test script transformation architecture helps generate accurate test scripts for evolving applications. Applications often have complex graphical user interfaces for which the permutations and combinations of GUI elements give rise to an enormous field of potential commands and command sequences to be tested. Furthermore, these applications change over time, rendering prior test scripts unworkable. The architecture facilitates the automatic generation of new test scripts to reliably test subsequent application versions, while greatly reducing the time, cost, and resource expenditures needed to arrive at new test scripts.

24 Claims, 56 Drawing Sheets

U.S. PATENT DOCUMENTS

| | | | |
|---|---|---|---|
| 2007/0271203 A1* | 11/2007 | Delvat | 705/400 |
| 2008/0282230 A1* | 11/2008 | Belvin et al. | 717/125 |
| 2009/0217250 A1 | 8/2009 | Grechanik et al. | |
| 2009/0217302 A1 | 8/2009 | Grechanik et al. | |

OTHER PUBLICATIONS

Compuware, The Leader in IT Value, "Accelerate Testing and Deliver High Quality Applications on Time," 2008 Compuware Corporation, 2 pages.

Grechanik et al., "Reducing Effort in Script-Based Testing," Accenture Technology Labs, Systems Integration Group, Chicago, Illinois, Nov. 11, 2007, pp. 1-22.

Hewlett-Packard Development Company, "HP Functional Testing Software, BTO Software," 2008, 1 page.

Hewlett-Packard Development Company, HP QuickTest Professional Software, data sheet, 2007, 4 pages.

IBM, "Rational Robot, Features and Benefits," "Rational Software," undated, 1 page.

IBM, "Rational Robot, Overview," "Rational Software," undated, 1 page.

Pierce, Benjamin C., "Types and Programming Languages," The MIT Press, Cambridge, Massachusetts, 2008, ISBN 0-262-16209-1, complete book.

United States Patent and Trademark Office Action dated Dec. 13, 2010 for corresponding co-pending U.S. Appl. No. 12/038,658.

Extended European Search Report dated Feb. 10, 2011 for corresponding European Patent Office Application No. 09250551.0.

Memon et al., "Regression Testing of GUIs," Proceedings of ESEC/FSE '03, Sep. 1-5, 2003, pp. 118-127, Helsinki, Finland, XP-002617924.

Memon et al., "Automating Regression Testing for Evolving GUI Software," *Journal of Software Maintenance and Evolution: Research and Practice*, vol. 17, No. 1, Jan. 1, 2005, pp. 27-64, XP002617925.

First Examiner's Report dated Jul. 4, 2011 for co-pending Canadian Patent Application No. 2,653,887.

Memon et al., "Regression Testing of GUIs," *Proceedings of ESEC/FSE'03*, Sep. 1, 2003, pp. 118-127 (10 pages).

First Office Action dated Nov. 16, 2011 for co-pending Chinese Patent Application No. 200910118535.8.

First Office Action dated Jun. 24, 2011 for co-pending Chinese Patent Application No. 200910118531.X with English translation.

United States Patent and Trademark Office Action dated Sep. 28, 2011 for co-pending U.S. Appl. No. 12/038,672.

Office Action dated Apr. 10, 2012 for co-pending U.S. Appl. No. 12/038,672.

Second Office Action dated May 3, 2012 for co-pending Chinese Patent Application No. 200910118531.X.

\* cited by examiner

2400

```
- <State SeqNumber="0" Name="State_0_3556" Alias="University Directory0"
    ProcessId="3556">
  - <GUIElement Alias="StateList">                    2402
      ...
    - <GUIElement Alias="System">
        ...
      - <GUIElement Alias="SchoolListbox">
          <UniqueID>0x3c2</UniqueID>
          <HWND>0x90b52</HWND>
          <Location x="173" y="486" width="336" height="274" />
2404      <Class>WindowsForms10.LISTBOX.app4</Class>          } 2406
          <Style>0x560100c1</Style>
          <ExStyle>0xc0000a00</ExStyle>
        - <GUIElement Alias="SchoolListbox">
            <UniqueID>0x3cb</UniqueID>
            <HWND>0x90b52</HWND>
            <Location x="175" y="488" width="332" height="270" />
            <Class>WindowsForms10.LISTBOX.app4</Class>
            <Style>0x560100c1</Style>
            <ExStyle>0xc0000a00</ExStyle>
          </GUIElement>
        </GUIElement>
        ...
      </GUIElement>
    </GUIElement>
  </State>
```

Figure 24

```xml
- <State SeqNumber="0" Name="State_0_3068" Alias="University Directory1"
    ProcessId="3068">
  - <GUIElement Alias="StateList">
      ...
    - <GUIElement Alias="System">
        ...
      - <GUIElement Alias="SchoolCombobox">
          <UniqueID>0xa8</UniqueID>
          <HWND>0x90e66</HWND>
          <Location x="248" y="653" width="299" height="24" />
          <Class>WindowsForms10.COMBOBOX.app.0.378734a</Class>
          <Style>0x560100242</Style>
          <ExStyle>0xc0000800</ExStyle>
        - <GUIElement Alias="SchoolCombobox">
            <UniqueID>0xb1</UniqueID>
            <HWND>0x90e66</HWND>
            <Location x="248" y="653" width="299" height="24" />
            <Class>WindowsForms10.COMBOBOX.app.0.378734a</Class>
            <Style>0x560100242</Style>
            <ExStyle>0xc0000800</ExStyle>
          - <GUIElement Alias="SchoolCombobox">
              <UniqueID>0xb2</UniqueID>
              <HWND>0x80e94</HWND>
              <Location x="251" y="656" width="276" height="18" />
              <Class>Edit</Class>
              <Style>0x50000380</Style>
              <ExStyle>0xc0000800</ExStyle>
              ...
            </GUIElement>
          </GUIElement>
        </GUIElement>
        ...
      </GUIElement>
    </GUIElement>
  </State>
```

Figure 25

```
...                    2606                                              2600
    <Version>0  ↙                                                         ↙
        ...
        - <GUIElement Alias="SchoolListbox">
            <UniqueID>0x3c2</UniqueID>
            <HWND>0x90b52</HWND>
            <Location x="173" y="486" width="336" height="274" />
            <Class>WindowsForms10.LISTBOX.app4</Class>
            <Style>0x560100c1</Style>
            <ExStyle>0xc0000a00</ExStyle>
            - <GUIElement Alias="SchoolListbox">
                <UniqueID>0x3cb</UniqueID>
                <HWND>0x90b52</HWND>                                      }2602
                <Location x="175" y="488" width="332" height="270" />
                <Class>WindowsForms10.LISTBOX.app4</Class>
                <Style>0x560100c1</Style>
                <ExStyle>0xc0000a00</ExStyle>
            </GUIElement>
        </GUIElement>
        ...
    </Version>   2608
    ...         ↙
    <Version>1
        ...
        - <GUIElement Alias="SchoolCombobox">
            <UniqueID>0xa8</UniqueID>
            <HWND>0x90e66</HWND>
            <Location x="248" y="653" width="299" height="24" />
            <Class>WindowsForms10.COMBOBOX.app.0.378734a</Class>
            <Style>0x560100242</Style>
            <ExStyle>0xc0000800</ExStyle>
            - <GUIElement Alias="SchoolCombobox">
                <UniqueID>0xb1</UniqueID>
                <HWND>0x90e66</HWND>
                <Location x="248" y="653" width="299" height="24" />
                <Class>WindowsForms10.COMBOBOX.app.0.378734a</Class>     }2604
                <Style>0x560100242</Style>
                <ExStyle>0xc0000800</ExStyle>
                - <GUIElement Alias="SchoolCombobox">
                    <UniqueID>0xb2</UniqueID>
                    <HWND>0x80e94</HWND>
                    <Location x="251" y="656" width="276" height="18" />
                    <Class>Edit</Class>
                    <Style>0x50000380</Style>
                    <ExStyle>0xc0000800</ExStyle>
                    ...
                </GUIElement>
            </GUIElement>
        </GUIElement>
        ...
    </Version>
    ...
```

3202 — Property 1 if $x$ is the root of $g_1$ and $y$ is the root of $g_2$, then $x \sim y$;

3204 — Property 2 if $x \sim y$ and one of $x$ or $y$ is the root node in its graph, then the other node is the root node as well;

3206 — Property 3 if $x \sim y$ and $type(x) = type(y)$, and nodes $x, y$ are not tagged as potentially deleted, and $x \xrightarrow[p]{r \atop q} x'$ in $g_1$, then there exists an edge $y \xrightarrow[k]{s \atop m} y'$ in $g_2$, with the same labels $r = s$, $r \neq \diamondsuit$ and $s \neq \diamondsuit$, and $max(r) = max(s)$ and $min(r) = min(s)$, and $type(x') = type(y')$, such that $x' \sim y'$;

3208 — Property 4 conversely, if $x \sim y$ and $type(x) = type(y)$, and nodes $x, y$ are not tagged as potentially deleted, and $y \xrightarrow[l]{k \atop m} y'$ in $g_2$, then there exists an edge $x \xrightarrow[p]{l \atop q} x'$ in $g_1$, with the same label $l, l \neq \diamondsuit$, and $p = k$ and $m = q$, and $type(x') = type(y')$, such that $x' \sim y'$

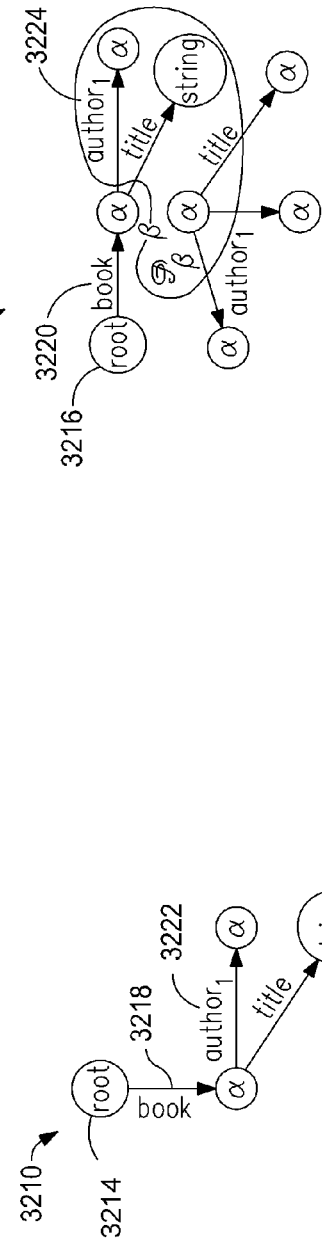

'Test script for the Current GAP GUI to open file, select a school (Acme State University), 164
'change the academic scale from 2 to 3 and save to a new file L1  Window("StateList").WinObject("Open File").Click 86,12
L2  Window("StateList").Dialog("Open").WinListView("SysListView32").Select "university.data"
L3  Window("StateList").Dialog("Open").WinButton("Open").Click
L4  Window("StateList").WinObject("StateListbox").Click 31,7
L5  Window("StateList").WinObject("Select State").Click 36,14
L6  Window("StateList").WinObject("SchoolListbox").Click 19,22
L7  Window("StateList").WinObject("Select School").Click 67,12
L8  Window("StateList").WinObject("AcadScale").Drag 18,14
L9  Window("StateList").Drop 698,471
L10 Window("StateList").WinObject("AcadScale").Type "3"
L11 Window("StateList").WinObject("Save Change").Click 108,7
L12 Window("StateList").WinObject("Save File").Click 70,16
L13 Window("StateList").Dialog("Save a Data Record").WinEdit("File name:").Set "university_revise.data"
L14 Window("StateList").Dialog("Save a Data Record").WinButton("Save").Click

'Test script for the Subsequent GAP GUI to open file, select a school (Acme State University),
'change the academic scale from 2 to 3 and save to a new file

| L1  | Window("School").Window("Window").Click 63,15 |
| L2  | Window("School").Dialog("Open").WinToolbar("ToolbarWindow32").Press "My Computer" |
| L3  | Window("School").Dialog("Open").WinListView("SysListView32").Activate "Local Disk (C:)" |
| L4  | Window("School").Dialog("Open").WinListView("SysListView32").Activate "University" |
| L5  | Window("School").Dialog("Open").WinComboBox("Files of type:").Select "All files (*.*)" |
| L6  | Window("School").Dialog("Open").WinListView("SysListView32").Select "university.data" |
| L7  | Window("School").Dialog("Open").WinButton("Open").Click |
| L8  | Window("School").WinObject("StateListbox").Click 31,10 |
| L9  | Window("School").WinObject("Select State").Click 51,12 |
| L10 | Window("School").WinObject("SchoolCombobox").Click 294,14 |
| L11 | Window("School").WinEdit("Edit").Set "Acme State University" |
| L12 | Window("School").WinEdit("Edit").Type micReturn |
| L13 | Window("School").WinObject("2").Drag 15,12 |
| L14 | Window("School").WinObject("Academics (1-5)").Drop 73,2 |
| L15 | Window("School").WinObject("2").Type "3" |
| L16 | Window("School").WinObject("menuStrip1").Click 101,15 |
| L17 | Window("School").Window("Window").Click 69,63 |
| L18 | Window("School").WinObject("menuStrip1").Click 97,12 |
| L19 | Window("School").Window("Window").Click 52,54 |
| L20 | Window("School").Dialog("Save As").WinComboBox("Save as type:").Select "All files (*.*)" |
| L21 | Window("School").Dialog("Save As").WinEdit("File name:").Set "university_revise2.data" |
| L22 | Window("School").Dialog("Save As").WinEdit("File name:").Type micReturn |

Figure 42

```
L1  <GUIElement Type="StateList">

L2  <Version>0
L3    <GUIElement Alias="StateList" Version="0">
         <ParentChildIdentifier>XYZ345</ParentChildIdentifier>
         <UniqueID>0x0</UniqueID>
          <HWND>0x170a64</HWND>
          <Location x="87" y="66" width="792" height="672" />
          <Class>WindowsForms10.Window.8.app4</Class>
L9        <Style>0x16cf0000</Style>
L10       <ExStyle>0xc0050900</ExStyle>
.........
L11   <GUIElement Alias="StateList" Version="0">
         <ParentChildIdentifier>XYZ456</ParentChildIdentifier>
          <UniqueID>0x12</UniqueID>
          <HWND>0x170a64</HWND>
          <Location x="117" y="70" width="784" height="638" />
          <Class>WindowsForms10.Window.8.app4</Class>
          <Style>0x16cf0000</Style>
          <ExStyle>0xc0050900</ExStyle>
.........
          </GUIElement>
         </GUIElement>

</Version>

L22  <Version>1

L23  <GUIElement Alias="School" Version="1">
         <ParentChildIdentifier>XYZ567</ParentChildIdentifier>
          <UniqueID>0x0</UniqueID>
          <HWND>0x80bd8</HWND>
          <Location x="116" y="88" width="915" height="594" />
          <Class>WindowsForms10.Window.8.app.0.378734a</Class>
L29       <Style>0x16cf0000</Style>
L30       <ExStyle>0xc0050900</ExStyle>
.....
L31   <GUIElement Alias="School" Version="1">
         <ParentChildIdentifier>XYZ789</ParentChildIdentifier>
          <UniqueID>0x12</UniqueID>
          <HWND>0x80bd8</HWND>
          <Location x="146" y="92" width="907" height="560" />
          <Class>WindowsForms10.Window.8.app.0.378734a</Class>
          <Style>0x16cf0000</Style>
          <ExStyle>0xc0050900</ExStyle>
.........
         </GUIElement>
        </GUIElement>
     </Version>
</GUIElement>
```

```
<GUIElement Type="SchoolListbox">
  <Version>0
L3 - <GUIElement Alias="SchoolListbox" Version="0">
       <ParentChildIdentifier>XYZ321</ParentChildIdentifier>
       <UniqueID>0x3c2</UniqueID>
       <HWND>0x90b52</HWND>
       <Location x="173" y="486" width="336" height="274" />
       <Class>WindowsForms10.LISTBOX.app4</Class>
       <Style>0x560100c1</Style>
       <ExStyle>0xc0000a00</ExStyle>
....
     </GUIElement>
  </Version>

L13   <Version>1
L14 - <GUIElement Alias="SchoolCombobox" Version="1">
        <ParentChildIdentifier>XYZ654</ParentChildIdentifier>
        <UniqueID>0xa8</UniqueID>
        <HWND>0x90e66</HWND>
        <Location x="248" y="653" width="299" height="24" />
        <Class>WindowsForms10.COMBOBOX.app.0.378734a</Class>
        <Style>0x56010242</Style>
        <ExStyle>0xc0000800</ExStyle>
...........
     </GUIElement>

</Version>
```

Figure 46

```
' Test script for the Current GAP GUI to open file, select a number of schools
' (e.g., Acme University, and State University), change the academic scale to 3 for Acme University
' and 2 for State University in the same State identified by coordinate 36, 14 at line 5, and save to a new file L1    Window("StateList").WinObject("Open File").Click 86,12
L2    Window("StateList").Dialog("Open").WinListView("SysListView32").Select "university.data"
L3    Window("StateList").Dialog("Open").WinButton("Open").Click
L4    Window("StateList").WinObject("StateListbox").Click 31,7
L5    Window("StateList").WinObject("Select State").Click 36,14
L6    Window("StateList").WinObject("SchoolListbox").Click 19,22

L7    For School_Constant = J to K

L8      Window("StateList").WinObject("Select School").Click 67, School_Constant
L9      Window("StateList").WinObject("AcadScale").Drag 18,14
L10     Window("StateList").Drop 698,471

L11     If Window("StateList").WinObject("Select School").property("value") = "Acme University" then
L12        Window("StateList").WinObject("AcadScale").Type "3"
L13     Else if Window("StateList").WinObject("Select School").property("value") = "State University" then
L14        Window("StateList").WinObject("AcadScale").Type "2"
L15     End if L16     Window("StateList").WinObject("Save Change").Click 108,7

L17   Next School_Constant

L18   Window("StateList").WinObject("Save File").Click 70,16
L19   Window("StateList").Dialog("Save a Data Record").WinEdit("File name:").Set "university_revise.data"
L20   Window("StateList").Dialog("Save a Data Record").WinButton("Save").Click
```

```
'Test script for the Subsequent GAP GUI to open file, select a number of schools
'(e.g., Acme University, and State University), change the academic scale to 3 for Acme University
'and 2 for State University and save to a new file L1   Window("School").Window("Window").Click 63,15
L2   Window("School").Dialog("Open").WinToolbar("ToolbarWindow32").Press "My Computer"
L3   Window("School").Dialog("Open").WinListView("SysListView32").Activate "Local Disk (C:)"
L4   Window("School").Dialog("Open").WinListView("SysListView32").Activate "University"
L5   Window("School").Dialog("Open").WinComboBox("Files of type:").Select "All files (*.*)"
L6   Window("School").Dialog("Open").WinListView("SysListView32").Select "university.data"
L7   Window("School").Dialog("Open").WinButton("Open").Click
L8   Window("School").WinObject("StateListbox").Click 31,10
L9   Window("School").WinObject("Select State").Click 51,12
L10  Window("School").WinObject("SchoolCombobox").Click 294,14
L11  For School_Constant = J to K
L12      If School_Constant = J then
L13          School_Name == "Acme University"
L14          Acad_Scale == "3"
L15      Elseif School_Constant = K then
L16          School_Name == "State University"
L17          Acad_Scale == "2"
L18      End if
L19      Window("School").WinEdit("Edit").Set School_Name
L20      Window("School").WinEdit("Edit").Type micReturn
L21      Window("School").WinObject("2").Drag 15,12
L22      Window("School").WinObject("Academics (1-5)").Drop 73,2
L23      Window("School").WinObject("2").Type Acad_Scale
L24      Window("School").WinObject("menuStrip1").Click 101,15
L25      Window("School").Window("Window").Click 69,63
L26  Next School_Constant
L27  Window("School").WinObject("menuStrip1").Click 97,12
L28  Window("School").Window("Window").Click 52,54
L29  Window("School").Dialog("Save As").WinComboBox("Save as type:").Select "All files (*.*)"
L30  Window("School").Dialog("Save As").WinEdit("File name:").Set "university_revise2.data"
L31  Window("School").Dialog("Save As").WinEdit("File name:").Type micReturn
```

Figure 54

TEST SCRIPT TRANSFORMATION ARCHITECTURE

CROSS REFERENCE TO RELATED APPLICATIONS

This application is related to following applications, all filed on the same day:
U.S. patent application Ser. No. 12/038,672, filed February 27, 2008;
U.S. patent application Ser. No. 12/038,676, filed February 27, 2008;
U.S. patent application Ser. No. 12/038,661, filed February 27, 2008;
U.S. patent application Ser. No. 12/038,658, filed February 27, 2008; and
U.S. patent application Ser. No. 12/038,675, filed February 27, 2008.

BACKGROUND OF THE INVENTION

1. Technical Field

This disclosure relates to analysis and generation of test scripts for testing graphical user interface applications, and in particular relates to transforming a prior test script for use with a new application version.

2. Related Art

The relentless pace of advancing technology has given rise to complex computer software applications to help automate almost every aspect of day-to-day existence. Today applications exist to assist with writing novels to filing income tax returns to analyzing historical trends in baby names. One nearly ubiquitous feature of these applications is that they employ graphical user interfaces (GUIs). Another nearly ubiquitous aspect is that the GUI applications (GAPs) require thorough testing prior to release.

Nevertheless, in the past it has been easier to implement the GUI to the application than to thoroughly test the GAP. For GAPs of any significant complexity, the permutations and combinations of GUI elements gives rise to an enormous field of potential commands and command sequences that could have bugs of any severity, from insignificant to critical failure. Exacerbating the problem is that application developers are under pressure to continually add new features, update the GUI, and release new versions of applications. As a result, even if a test script for a prior version of a GAP were adequate, it is rarely the case that the original test script can adequately test the subsequent revised application.

Manually testing large-scale enterprise GAPs is tedious, error prone, and laborious. Nontrivial GAPs contain hundreds of GUI screens that in turn contain thousands of GUI objects. In order to automate testing of GAPs, test engineers write programs using scripting languages (e.g., JavaScript and VBScript), and these testing scripts drive GAPs through different states by mimicking users who interact with these GAPs by performing actions on their GUI objects. Often test scripts simulate users of GAPs, and their statements access and manipulate GUI objects of these GAPs. For example, the statement:

VbWindow("Login").VbEdit("txtAgentsName").Set "Shawn"

locates a window whose caption is Login and that is created by a Visual Basic-based control, then it locates a text box whose name is txtAgentsName that is a GUI object whose parent is the login window. By calling the method Set with the parameter "Shawn", the value of the text box is set to "Shawn".

Commercial tools such as QTP and Rational Robot help generate test scripts by tracking pointing of a cursor at GUI objects and performing desired actions. These tools generate scripting code that can replay captured user actions. The generated code serves as a skeleton for creating scripts to automate script testing. Test engineers add code to the generated scripts so that these scripts can replay using different input values thereby exercising the functionality of the GAP.

Expanding test scripts with manually written code to automate tests makes the test script more complex, difficult to understand, maintain, and evolve. Although it is known in advance that the test scripts access and manipulate GUI elements, it is not clear how to detect operations at compile time that lead to runtime errors. Using API calls exported by testing platforms remains a primary mode of accessing and manipulating GUI objects of GAPs, and these API calls lead to various run-time errors in the test scripts. For example, test personnel may use platform API calls incorrectly in the test script source code thereby accessing GUI elements that they did not intend to access.

It is a difficult technical challenge to check test scripts for potential flaws caused by third party API calls that lead to incorrect tests and runtime errors in the test scripts. Furthermore, there are fundamental problems with using API calls to access and manipulate GUI objects. First, the API calls take names and property values of GUI objects as string input parameter variables. The values of these input parameters are often known only at runtime, making it impossible to apply sound checking algorithms. Second, testing platforms export dozens of different API calls, and high complexity of these API calls makes it difficult for programmers to understand which API calls to use and how to combine them to access and manipulate GUI objects. These problems lead to a wide range of bugs in the test scripts, many of which are difficult to detect during the inspection of the test script source code.

A further problem arises because application requirement specifications include high-level concepts that describe GAPs, specifically its GUI objects. Unfortunately, tracing GUI objects of GAPs to these high-level concepts is a difficult problem because programmers do not document these traces. Accordingly, when test personnel create GAPs, they spend considerable time to understand how to use these GAPs by reading documentation and talking to subject matter experts. This crucial knowledge is often lost after test personnel are reassigned to other tasks or quit the company.

One of the perceived benefits of existing approaches to creating test scripts is that type checking is not required since the script code is generated directly from GUIs. For example, given certain GUI objects in a GAP, a testing tool can produce corresponding statements that navigate to these objects using API calls with string parameters describing their properties. However, this perceived benefit in fact gives rise to difficult technical challenges due to semantic inconsistencies between the test script and the GAP. Suppose, for example, that during the maintenance phase the GUI of the GAP changed. The scripting interpreter is not aware of the change and it would run the generated script without producing any compile-time warnings. However, the resulting script either fails at run time or produces incorrect test results because its code attempts to access GUI objects that are either changed or do not exist anymore.

Therefore, a need exists for a test script generation architecture with supporting analysis and evaluation logic that addresses the problems noted above and other previously encountered.

SUMMARY

A test script transformation architecture generates accurate test scripts for applications with graphical user interfaces that change over time. As the applications change, prior test scripts are rendered unworkable. The architecture facilitates the automatic generation of new test scripts to reliably test subsequent application versions and may greatly reduce the time, cost, and resource expenditures needed to arrive at the new test scripts.

The test script transformation architecture ("architecture") may include a graphical user interface (GUI) type model and GUI model builder logic. The GUI model builder logic accepts as input the GUI type model, a current GAP version, and a subsequent GAP version. The GUI model builder logic generates as output a current GAP GUI model, and a subsequent GAP GUI model.

In addition, the architecture includes GUI comparator logic. The GUI comparator logic accepts as input the current GAP GUI model, the subsequent GAP GUI model, and generates as output a GUI difference model. The GUI difference model includes GUI element difference entries that identify a specific GUI element that matches between the current GAP version and the subsequent GAP version, but that differs in character between the current GAP version and the subsequent GAP version. The architecture further includes a script analyzer. Based on an abstract syntax tree representation of a current test script, the script analyzer generates a change guide, a transformed test script, or both. The change guide may include, for example, script transformation information for transforming the current test script for use against the subsequent GAP version. The transformed test script (for use against the subsequent GAP version) may include, for example, modified script entries generated from current test script entries in the current test script.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 24 shows a portion of a current GAP GUI model that provides a GAP representation as a model for analysis.
FIG. 25 shows a portion of a subsequent GAP GUI model that provides a GAP representation as a model for analysis.
FIG. 26 shows a portion of a GUI difference model.
FIG. 32 shows an example of bi-simulation properties.
FIG. 33 shows a GUI of a current GAP version.
FIG. 34 shows a GUI of a subsequent GAP version.
FIG. 37 shows a current test script.
FIG. 42 shows a transformed test script.
FIG. 45 illustrates another GUI element difference entry.
FIG. 46 show another example GUI element difference entry.
FIG. 50 shows a current test script.
FIG. 54 shows a transformed test script.

DETAILED DESCRIPTION OF THE PREFERRED EMBODIMENTS

Figure 1:
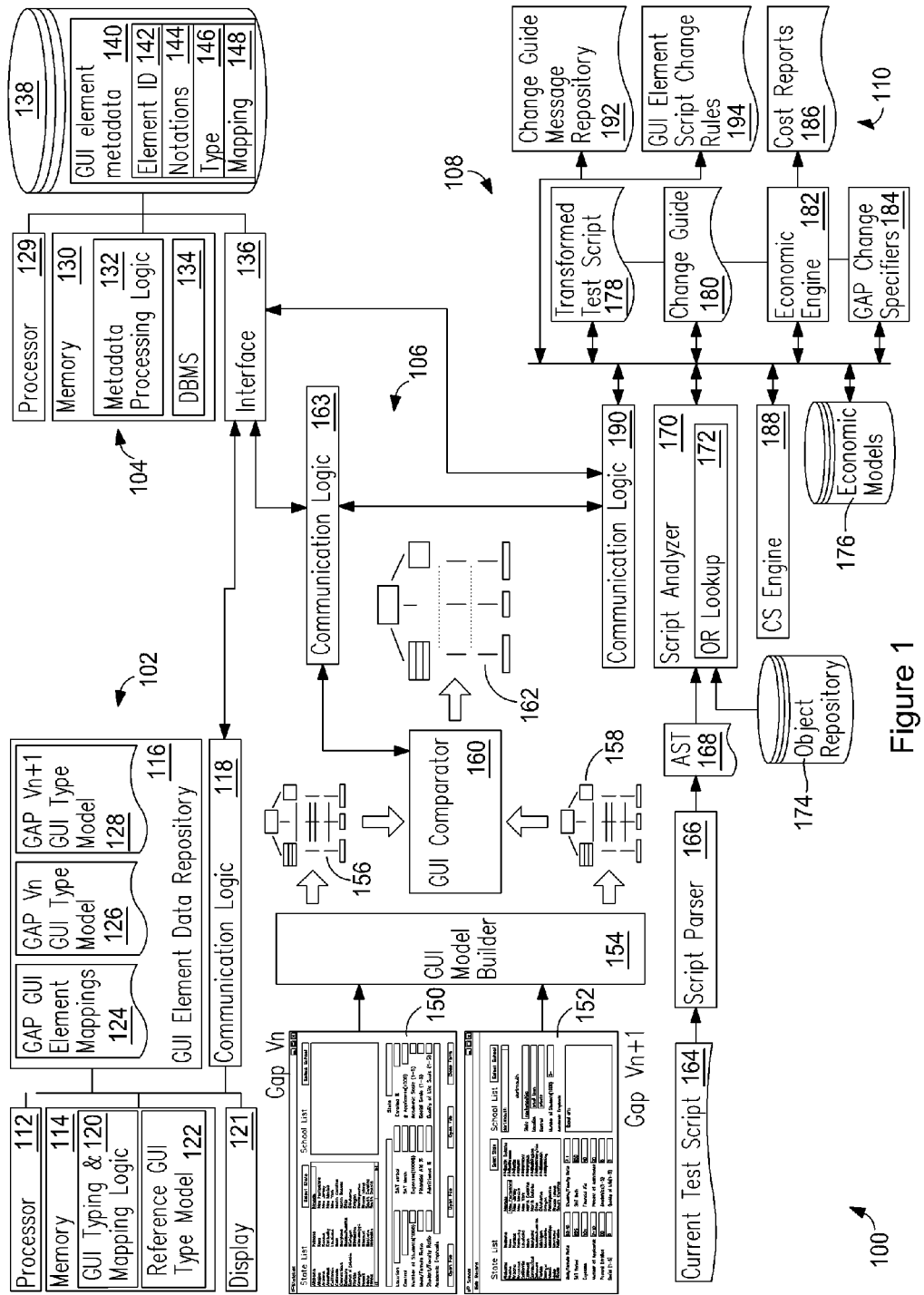
FIG. 1 shows a test script transformation architecture.

FIG. 1 shows a test script transformation architecture 100 ("architecture 100"). The architecture 100 includes several systems, including a GUI element typing and mapping system 102, metadata migration and repository system 104, and a GUI application (GAP) comparator system 106. The architecture 100 also includes a test script analysis system 108, and a test script economic analysis system 110.

The GUI element typing and mapping system 102 ("system 102"). The system 102 facilitates application of a formal type model to GUI elements in GAPs, as well as establishing relations between GUI elements from one version of a GAP to another. The system 102 includes a processor 112, a memory 114, and a GUI element data repository ("repository") 116. The system 102 exchanges information with the other systems 104, 106, 108, and 110 in the architecture 100 through the communication logic 118.

The memory 114 holds GUI typing and mapping logic 120 and a reference GUI type model 122. The repository 116 stores graphical user interface application (GAP) GUI element mappings ("mappings") 124. The repository 116 also stores a current GAP version GUI type model 126 and a subsequent GAP version GUI type model 128. The system 102 communicates GUI element type specification messages and GUI element mapping specification messages to the metadata migration and repository system 104 ("system 104").

The system 104 facilitates the perpetuation of useful metadata for GAPs, particularly as GAPs evolve between versions. The system 104 includes a processor 129, a memory 130 that holds metadata processing logic 132 and a database management system 134, and communication logic 136. The system 104 also includes a metadata repository 138. The metadata repository 138 maintains GUI element metadata 140, such as GUI element identifiers 142, GUI element notations 144, GUI element types 146, and GUI element mappings 148. The system 104 may communicate the GUI element metadata 140 to the other systems 102, 106, 108, and 110 to assist the other systems 102, 106, 108, and 110 in the execution of their logic.

The GAP comparator system 106 ("system 106") analyzes a current GAP version 150 and a subsequent GAP version 152 to determine GUI element differences between the versions 150 and 152. To that end, the system 106 may include GUI model builder logic 154 that accepts as input the current GAP version 150 and the subsequent GAP version 152. The GUI model builder logic 154 generates a GUI element model 156 of the current GAP version 150 and a GUI element model 158 of the subsequent GAP version 152. The models 156 and 158 may be tree models or other types of representations.

A GUI comparator 160 processes the representations 156 and 158. A GUI difference model 162 results. The GUI difference model 162 includes GUI element difference entries that identify a specific GUI element that matches between the current GAP version and the subsequent GAP version, but that differs in character between the current GAP version and the subsequent GAP version. For example, a difference entry may identify that a textbox in the current GAP version matches a drop down list in the subsequent GAP version, and may note the different GUI element characteristics between the two versions.

The test script analysis system 108 ("system 108") provides a test script transformation analyzer with a change guide engine. In particular, the system 108 starts with a current test script 164 and initiates execution of a script parser 166 to obtain an abstract syntax tree representation 168 ("AST 168") of the current test script 164. The current test script 164 may be suitable for testing any amount of functionality in the current GAP version 150. The system 108 helps transform the current test script 164 into a transformed test script suitable for testing any amount of functionality in the subsequent GAP version 152.

The script analyzer 170 accepts the AST 168, the GUI difference model 162, and GUI element metadata 140 through the communication logic 190. Object repository lookup logic 172 retrieves object data from the object repository 174 as an aid in analyzing the GUI difference model 162. As a result of its analysis, the script analyzer 170 generates a transformed test script 178, a change guide 180, or both. The analysis may take into consideration a change guide message repository 192 and GUI element script change rules 194. A further aspect of the system 108 is the constraint satisfaction engine 188. In conjunction with GUI element type information obtained from the systems 104 and 104, the constraint satisfaction engine determines whether script statements are compatible with the GUI element type assigned to any given GUI element.

The test script economic analysis system 110 ("system 110") provides a test script transformation analyzer with an economic cost engine. The system 110 includes an economic engine 182 that consults economic models 176 to generate cost reports 186. The economic models 176 may be predefined economic models of test script transformation cost relationships. The cost reports 186 may include test script transformation cost information, e.g., the estimated cost for transforming the current test script 164 into the transformed test script 178. The cost reports 186 may be based on an analysis of the change guide 180, specifically input GAP change specifiers 184, or other information.

Figure 2:
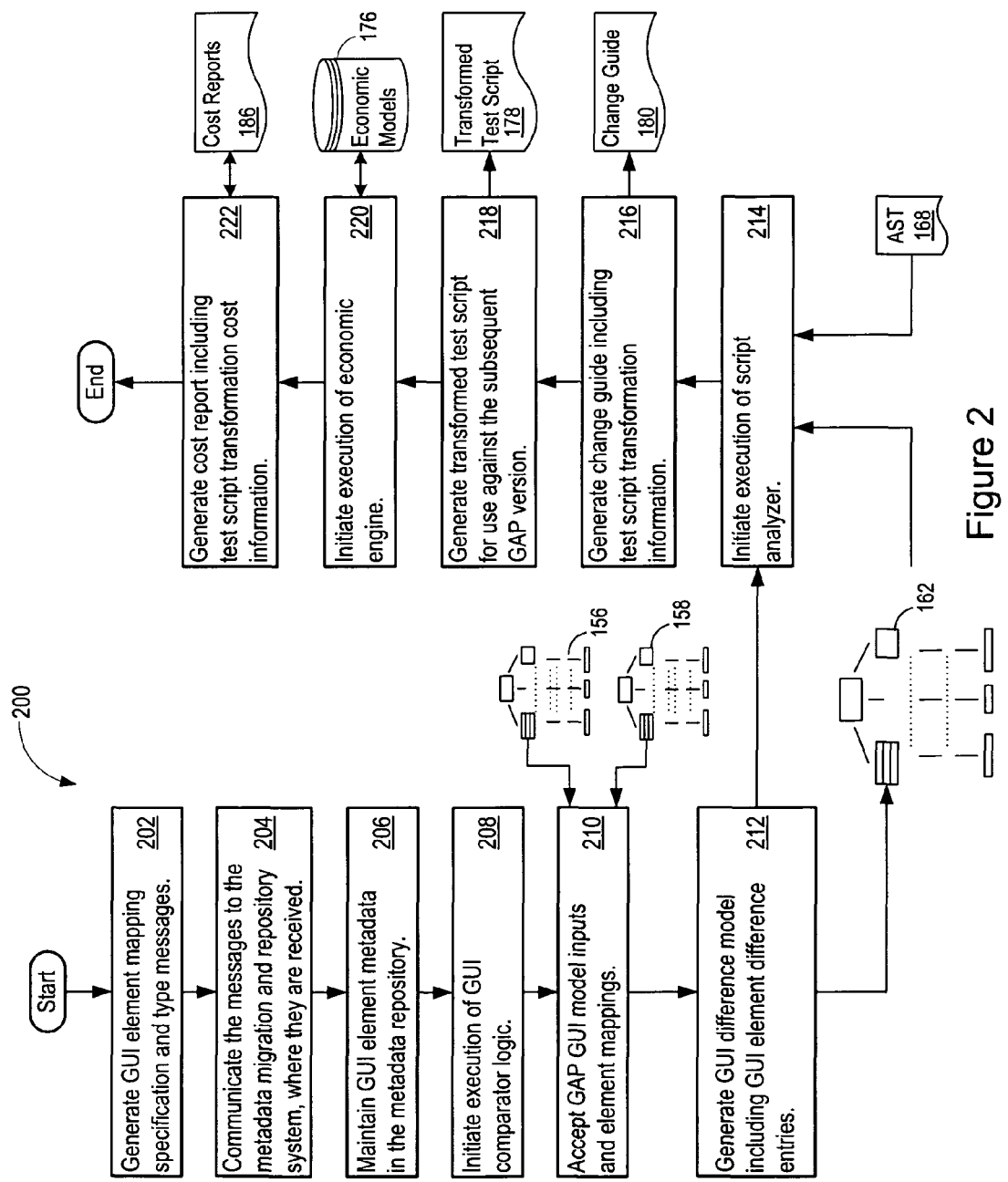
FIG. 2 shows a flow diagram of processing performed by the test script transformation architecture.

FIG. 2 show a flow diagram 200 of processing performed by the test script transformation architecture 100. The system 102 generates a GUI element mapping specification messages that may include a GUI element version mapping, and type specification messages that may include GUI element type identifiers (202). The system 102 communicates the messages to the system 104 (204), which receives the messages. The system 104 responsively maintains GUI element metadata in the metadata repository 138 (206).

The system 106 initiates execution of GUI comparator logic (208). The GUI comparator logic 160 accepts as input a current GAP GUI model 156 for the current GAP version 150 and a subsequent GAP GUI model 158 for the subsequent GAP version 152 (210). The GUI comparator logic 160 may further accept as input GUI element mappings from the systems 102 or 104. The GUI comparator logic 160 produces as output a GUI difference model 162 that includes a GUI element difference entries that identify specific GUI elements that match between the current GAP version 150 and the subsequent GAP version 152, but that differ in character between the current GAP version 150 and the subsequent GAP version 152 (212).

The test script analysis system 108 initiates execution of a script analyzer 170 (214). The script analyzer 170 accepts as input the GUI difference model 162 and the AST 168 of the current test script 164. The script analyzer 170 may generate a change guide 180 that includes script transformation information for transforming the current test script 164 for use against the subsequent GAP version 152 (216). Additionally or alternatively, the script analyzer 170 may generate a transformed test script 178 for use against the subsequent GAP version 152 (218). The transformed test script 178 includes transformed script entries generated from current test script entries in the current test script Furthermore, the economic analysis system 110 may initiate execution of an economic engine 182 operable to analyze the change guide 180 (220). The system 100 takes into consideration test script transformation cost relationships defined in the economic models 176. The result is a cost report 186 comprising test script transformation cost information (222).

FIG. 1 shows a graphical user interface (GUI) element typing and mapping system ("system") 102. The system 102 includes a processor 112, a memory 114, and a GUI element data repository ("repository") 116. The system 102 exchanges information with other systems through the communication logic 118. The communication logic 118 may be a wireline/wireless interface, interprocess communication mechanism, shared memory, Web Services interface, or any other types of communication interface.

The memory 114 holds GUI typing and mapping logic 120 and a reference GUI type model 122. As will be explained in more detail below, the GUI typing and mapping logic 120 assists the GAP designer to specify GUI element types for individual GUI elements of a GAP. The GUI typing and mapping logic 120 also assists the GAP designer to define links from GUI elements in a current GAP version to GUI elements in a subsequent GAP version. The types and mapping information may be provided to other GAP analysis systems, such as test script analysis systems and metadata repositories, through the communication logic 118.

The system 102 may operate on any particular GUI element. Examples of GUI elements include text boxes, menus, menu items, radio buttons, check boxes, and command buttons. Other examples include list boxes, combo boxes, toggle buttons, spin buttons, scroll bars, labels, tool bars, widgets, images, windows, calendar and tab strips. The reference GUI type model 122 may establish a formalized set of type names (e.g., identifiers) and qualities common to individual GUI elements that distinguish the GUI elements of the same type as members of an identifiable class. The GUI type model 122, in conjunction with specifying types for individual GUI elements, helps to provide a tractable syntactic technique for establishing that the GUI does not exhibit certain behaviors (e.g., storing an alphabetic character in a text box meant to hold a social security number), as opposed to free form adhoc annotation of GUI elements.

The repository 116 stores graphical user interface application (GAP) GUI element mappings ("mappings") 124. The repository 116 also stores a current GAP version GUI type model 126 and a subsequent GAP version GUI type model 128. The system 102 may prepare the mappings 124 in response to operator input that links GUI elements from any current GAP version to any subsequent GAP version. Thus, for example, if a textbox changes to a drop down list, the operator may document the change by explicitly linking the two GUI elements together. The system 102 responsively prepares an element version mapping and stores the element version mapping in the repository 116.

Similarly, the system 102 may build the type models 126 and 128 from operator specified assignments of GUI element types to specific GUI elements in the current GAP version and the subsequent GAP version. To that end, the system 102 may prompt the operator for a selection from a GUI element type list established by the reference GUI type model 122. Each type model 126 and 128 may include GUI element type specifiers for one or more elements in the current GAP and subsequent GAP. The system 102 may interact with the operator using the display 121, and may also accept command line, script, batch file, and other types of input.

Figure 3:
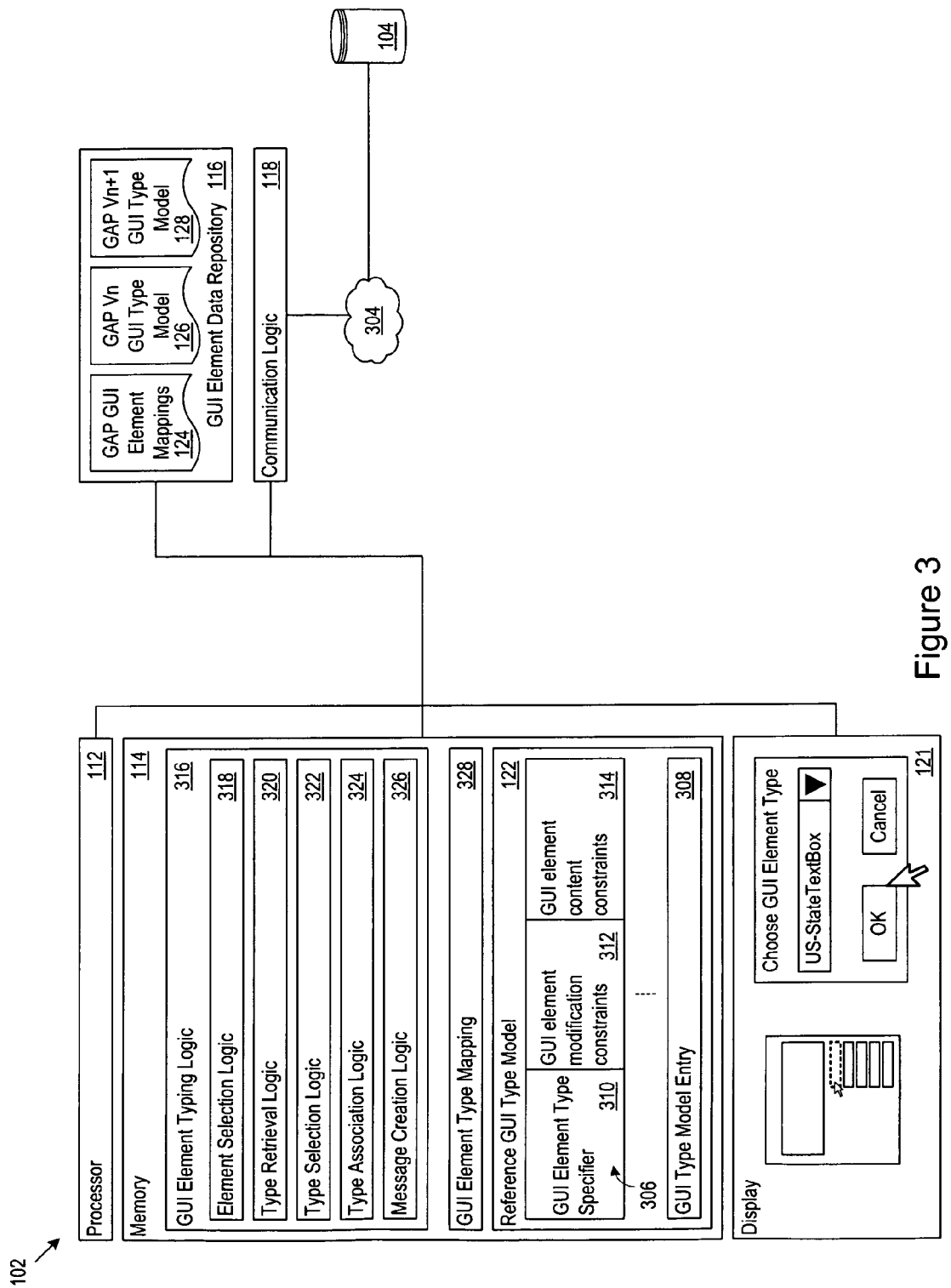
FIG. 3 shows a GUI element typing system.

FIG. 3 shows an implementation of the system 102. FIG. 3 shows that the communication logic 118 may exchange information with the metadata repository 202 through a connection of one or more networks 304. As examples, the system 102 may communicate GUI element type specification messages and GUI element mapping specification messages to the metadata repository 202.

Additional detail of the reference GUI type model 122 is shown in FIG. 3. The reference GUI type model 122 includes GUI type model entries (e.g., the GUI type model entries 306 and 308). The GUI type model entries formally define a type system for a GUI, and may provide a finite set of pre-established identifiers for tagging to GUI elements. Each GUI type model entry may specify a GUI element type specifier 310, GUI element modification constraints 312, and GUI element content constraints 314. In other implementations, the reference GUI type model 122 may include additional, different, or less information. The GUI element type specifier establishes an identifier (e.g., a unique string or number) that may be assigned to a GUI element to specify a GUI element type for the GUI element. The GUI element modification constraints 312 specify how, and if, a GUI element of the type specified may be modified. Similarly, the GUI element content and formatting constraints 314 specify what content a GUI element of the type specified may hold, and how the content, or the GUI element itself may be formatted. The constraints 312 and 314 may be expressed in many ways, such as by rules that dictate desired behavior or constraints on a GUI element of a given type.

Examples of GUI element types are given below in Table 1.

TABLE 1

| GUI Element Type Specifier | GUI Element Modification Constraints | GUI Element Content and Formatting Constraints |
| --- | --- | --- |
| SSNEntryBox | none | Nine digits, or 11 characters of the form: ###-##-#### where # is a digit and '-' is the dash symbol. |
| SSNDisplayBox | ReadOnly | Nine digits, or 11 characters of the form: ###-##-#### where # is a digit and '-' is the dash symbol. |
| StaticWindowLabel | Read Only | 0-50 Alphanumeric characters |
| 3DButton | none | Foreground Color Range: FStart-FEnd Background Color Range: BStart-BEnd |

TABLE 1-continued

| GUI Element Type Specifier | GUI Element Modification Constraints | GUI Element Content and Formatting Constraints |
|---|---|---|
| HelpTextEntryBox | none | X position range: XMin:XMax<br>Y position range: YMin:YMax<br>FontSize:<br>10 point minimum<br>16 point maximum |
| MenuWidget | X, Y location fixed | Minimum Size = SMin<br>Maximum Size = SMax |
| US-StateTextBox | none | Only the names of the States of the United States are permitted. |

In Table 1, the SSNEntryBox specifier may be attached, for example, to a GUI element (e.g., a textbox) in a GAP that is intended for entry of social security numbers. The SSNEntryBox type places no constraints on the modifications that may be performed on the textbox. However, the SSNEntryBox type constrains the content of the textbox to nine digits, or to 3 digits followed by a dash, followed by 2 digits, followed by a dash, followed by 4 digits. The SSNDisplayBox type specifies similar constraints, but also makes the GUI element read only.

The StaticWindowLabel type provides a read only label for its attached GUI element. The label may be between 0 and 50 alphanumeric characters. Because StaticWindowLabel is read only type of GUI element, the label may not be changed.

The 3DButton type limits the foreground colors that may be set for the GUI element to between FStart and FEnd. Similarly, the 3DButton type limits the background colors that may be set for the GUI element to between BStart and BEnd. The HelpTextEntryBox constrains the X and Y position of the attached GUI element, and further constrains the font sized used for the text in the GUI element to between 10 and 16 points. The MenuWidget type may be applied to a graphical button element, for example, to establish the element as a widget for a menu bar. The MenuWidget type fixes the X and Y location of the GUI element, and further establishes a minimum size of SMin and a maximum size of SMax. The US-StateTextBox limits the contents of a GUI element to only the names of the States of the United States (e.g., "Alaska, Maine, Nevada, . . . ").

The system 102 may implement any formal GUI type model 122 useful for assisting a designer to create a GAP. The GUI type model may vary depending on the type of GAP being designed, and the system may choose from multiple GUI type models 122 for the GAP under analysis, or may accept operator input to select which GUI type model is applicable. For example, the operator may specify a healthcare GUI type model when building a pharmacy GAP, and specify a video game GUI type model when building a user interface for an online role playing game. The healthcare GUI type model may include element types useful for building a healthcare related GAP, such as the SSNEntryBox type, while the video game GUI type model may include element types useful for building the user interface, such as 3DButton.

FIG. 3 also shows that the system 102 includes GUI element typing logic ("type mapping logic") 316 residing in the memory 114. The type mapping logic 316 may be included in the GUI typing and mapping logic 120, but may also be a separate module, or implemented in other ways. As described in detail below, the type mapping logic 316 may include element selection logic 318, type retrieval logic 320, and type selection logic 322. The typing logic 316 may further include type association logic 324 and message creation logic 326. The type mapping logic 316 generates GUI element type mappings (e.g., the type mapping 328).

Figure 4:
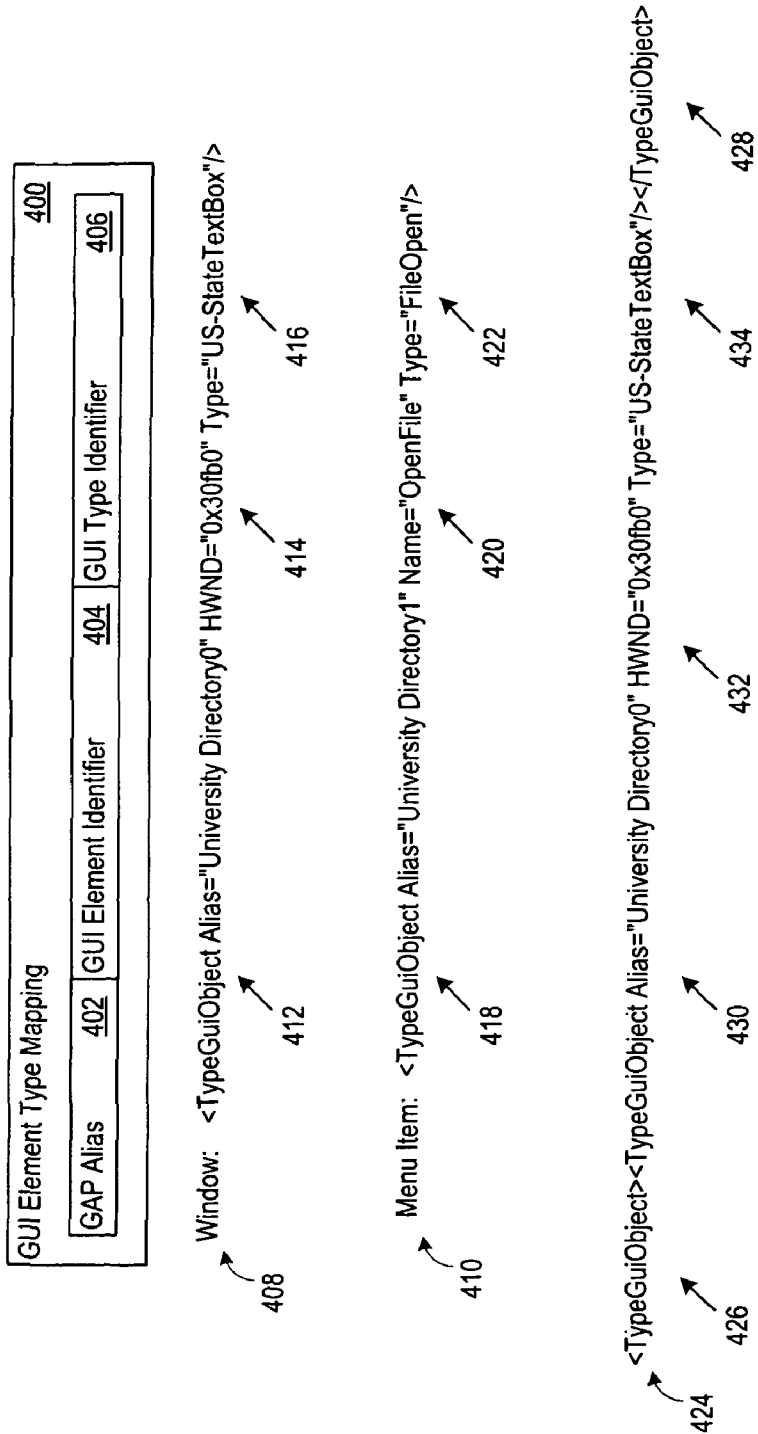
FIG. 4 shows a GUI element type mapping.

Turning briefly to FIG. 4, an example of a GUI element type mapping 400 is shown. The type mapping 400 includes a GAP alias 402, a GUI element identifier 404, and a GUI type identifier 406. Additional, fewer, or different fields may be included in the type mapping 400.

The GAP alias 402 specifies an identifier for the GAP which includes the GUI element to which a type is being applied. The GAP alias 402 may be a unique identifier that distinguishes between GAPs, including a current GAP version and a subsequent version of the same GAP. The GUI element identifier 404 provides a unique identifier for the GUI element which is being typed. The GUI type identifier 406 specifies the GUI element type being assigned to the GUI element (e.g., SSNEntryBox).

FIG. 4 also shows two examples of GUI type mappings 408 and 410. The type mapping 408 is a mapping for a Window GUI element. The GAP alias 412 is "University Directory0", signifying the current version of a university directory GAP. The GUI element being typed has the unique element identifier 414 "0x30fb0" noted by the HWND identifier and established, for example, by an accessibility layer interface as described below.

The GUI type identifier 416 for the Window GUI element is "US-StateTextBox" The type mapping 410 is a mapping for a Menu Item GUI element. The GAP alias 418 is "University Directory1", signifying the subsequent version of the university directory GAP. The GUI element being typed has the unique element identifier 420 "OpenFile" as specified by the Name field. The GUI type identifier 422 for the Window GUI element is "FileOpen".

FIG. 4 also shows an example of a GUI element type specification message 424. The GUI element type specification message 424 may include a GUI element type specification message header 426 and a GUI element type specification message terminator 428. The header 426 and terminator 428 signify that the data within the message specifies a type mapping for a GUI element. To that end, the GUI element type specification message 424 may further include a GAP alias 430, GUI element identifier 432, and a GUI type identifier 434.

Figure 5:
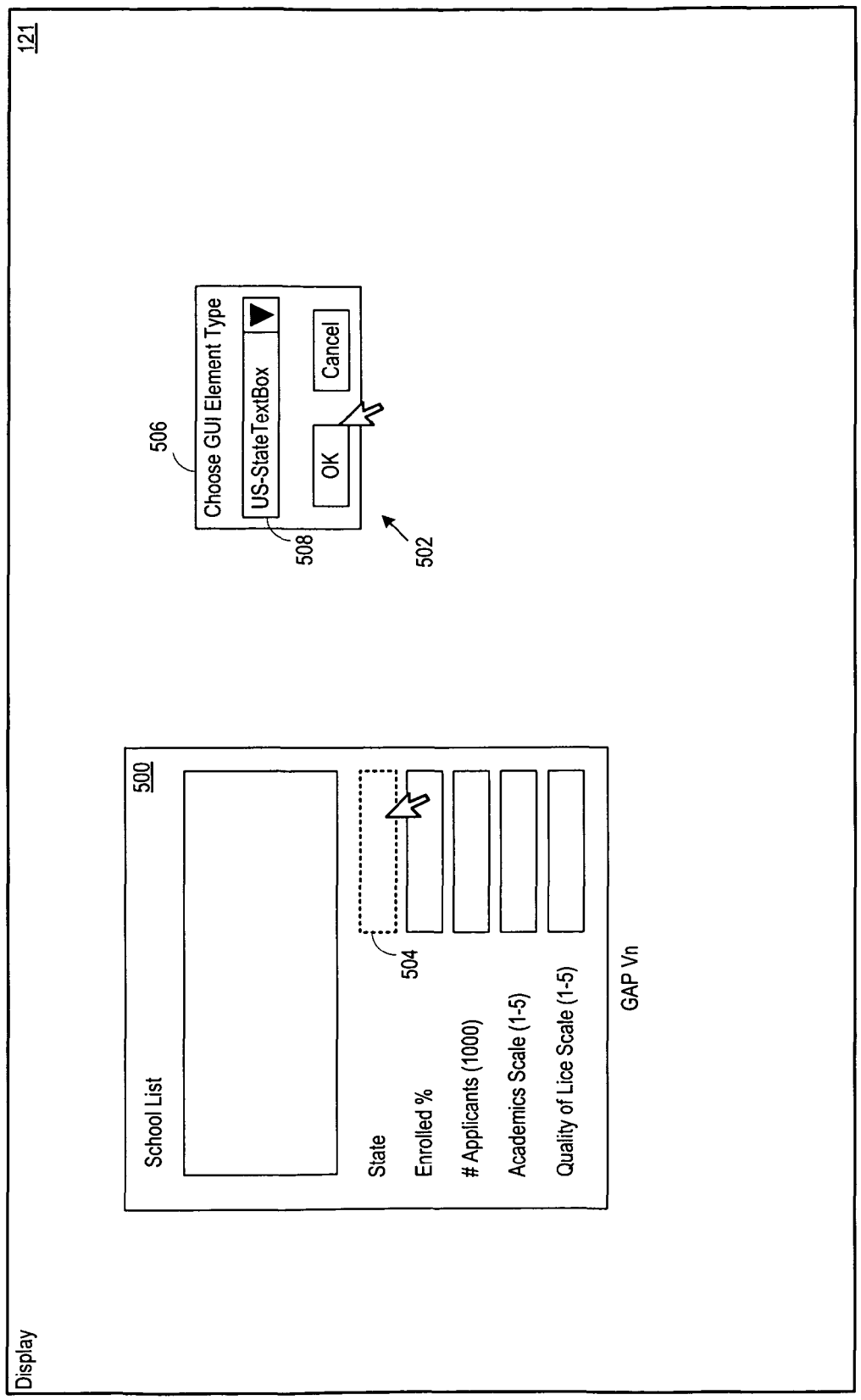
FIG. 5 shows a GUI element type mapping user interface.

FIG. 5 shows a GAP 500 and an example user interface 502 for the typing logic 316. The operator selects GUI elements using, for example, the mouse cursor. When selected, the typing logic 316 highlights the selected GUI element. In the example shown in FIG. 4, the selected GUI element is the textbox 504.

In response to selecting a GUI element, the typing logic 316 displays a type requestor 506. The type requestor 506 provides a drop down list 508 which lists the available GUI element types defined in the reference GUI type model 122. The operator selects an element type to assign to the selected GUI element 504, in this case "US-StateTextBox". Clicking the 'OK' button directs the typing logic 316 to create the mapping of the US-StateTextBox type to the textbox 504. Clicking 'Cancel' directs the typing logic 316 to take no action.

Figure 6:
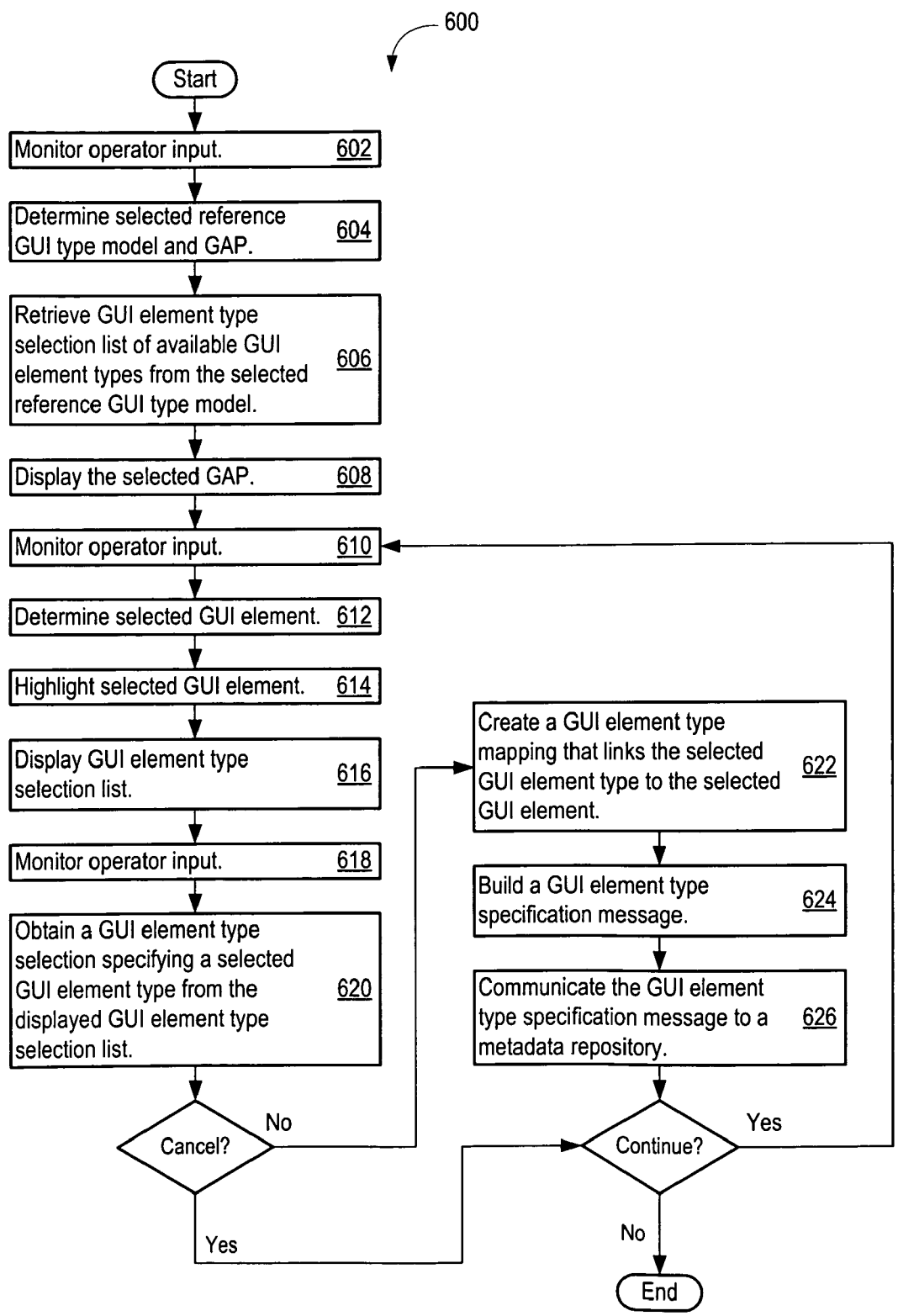
FIG. 6 shows a flow diagram for GUI element typing logic.

FIG. 6 shows a flow diagram 600 of the processing performed by the typing logic 316. The typing logic 316 monitors for operator input (602). In particular, the typing logic 316 uses the operator input to determine a selected reference GUI type model and the GAP that the operator will type (604). For example, the operator may select an applicable reference GUI type model from a list of available reference GUI type models, and may specify the executable program embodying the GAP from a list of known GAPs.

The type retrieval logic 320 retrieves a GUI element type selection list (606) from the selected reference GUI type model. Continuing the example given above in Table 1, the type retrieval logic 320 retrieves the list {SSNEntryBox, SSNDisplayBox, StaticWindowLabel, 3DButton, HelpTextEntryBox, MenuWidget, and US-StateTextBox} from the reference GUI type model. The list contains the permissible GUI element types that the operator may assign to any given GUI element.

The typing logic 316 may also display the selected GAP (608). In one implementation, the typing logic 316 initiates execution of the GAP. The element selection logic 318 then monitors for operator input (610). In particular, the element selection logic 318 monitors for mouse clicks, keyboard input, or other input to determine a selected GUI element (612). The element selection logic 318 highlights the selected GUI element (614). As examples, the element selection logic 318 may draw a border around the element, change the element color, flash the element, or otherwise highlight the selected GUI element.

The type selection logic 322 displays the GUI element type selection list (616). For example, the type selection logic 322 may display the type requestor 506. The type selection logic 322 monitors for operator input (618), such as a drop down list selection of an element type from the GUI element type selection list. In particular, the type selection logic 322 obtains a GUI element type selection that specifies a selected GUI element type from the displayed GUI element type selection list (620).

If the operator accepts the selection, the type association logic 324 creates a GUI element type mapping (622). Specifically, the type association logic 324 creates a mapping that links the selected GUI element type to the selected GUI element. To that end, the type association logic 324 may create a type mapping entry in the GUI type model corresponding to the selected GAP in the repository 124 that specifies a GAP alias field, a GUI element identifier 404 for the selected GUI element, and a GUI type identifier 406 according to the operator selected element type. FIG. 4 gives examples of GUI element type mappings.

In addition, the typing logic 316 may communicate the GUI element type mapping to external systems. To that end, the message creation logic 326 may build a GUI element type specification message (624). The type specification message may include the mapping, a type specification message header, and a type specification message terminator. The message creation logic 326 may also communicate the GUI element type specification message to the metadata repository 202 (626).

Figure 7:
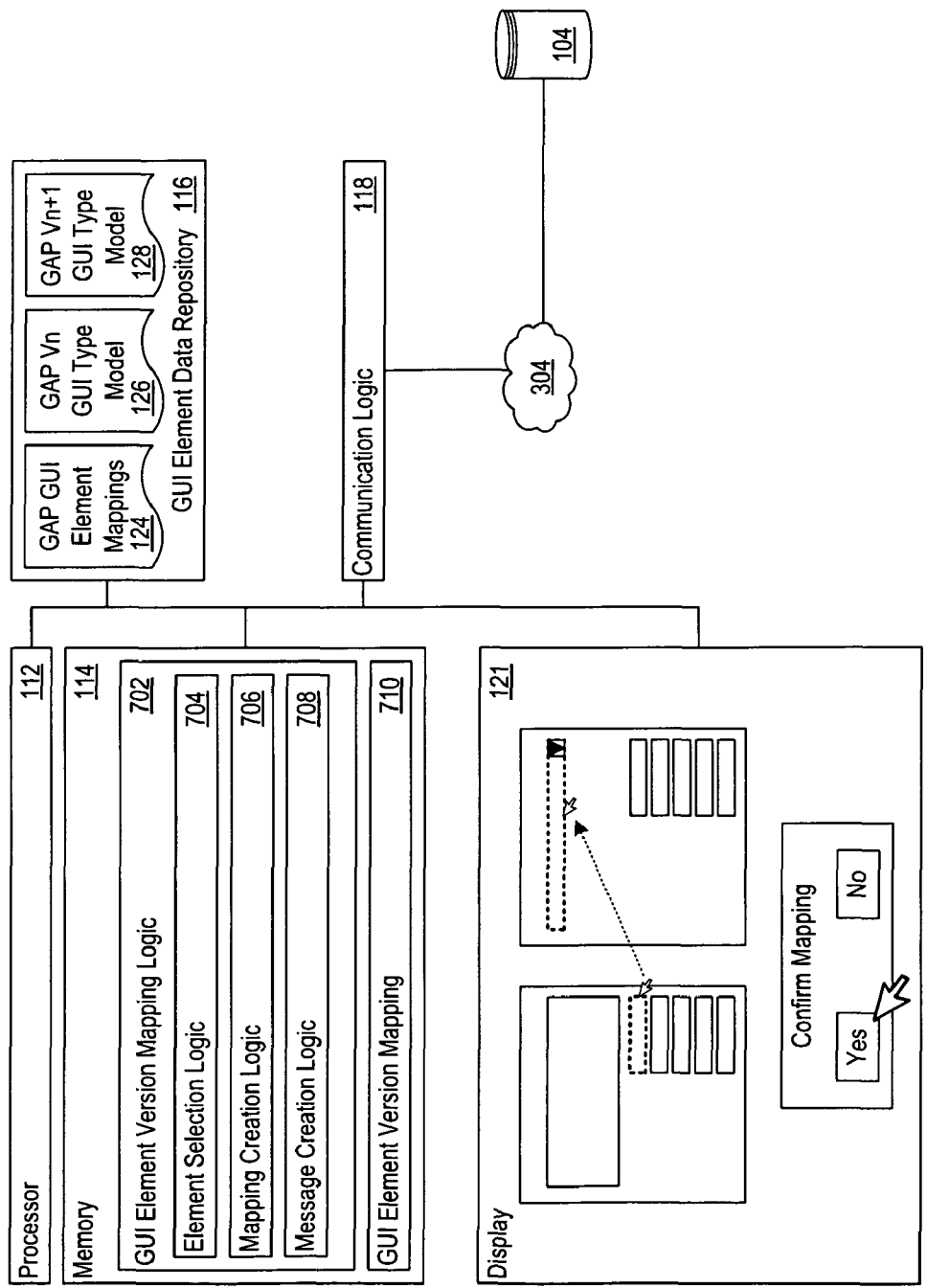
FIG. 7 shows a GUI element mapping system.

FIG. 7 shows an example of the system 102 in which GUI element version mapping logic ("version mapping logic") 702 resides in the memory 114. The version mapping logic 702 may be included in the GUI typing and mapping logic 120, but may also be a separate module, or implemented in other ways. The version mapping logic 702 may include element selection logic 704, mapping creation logic 706, and message creation logic 708. The version mapping logic 702 generates GUI element version mappings (e.g., the version mapping 710).

Figure 8:
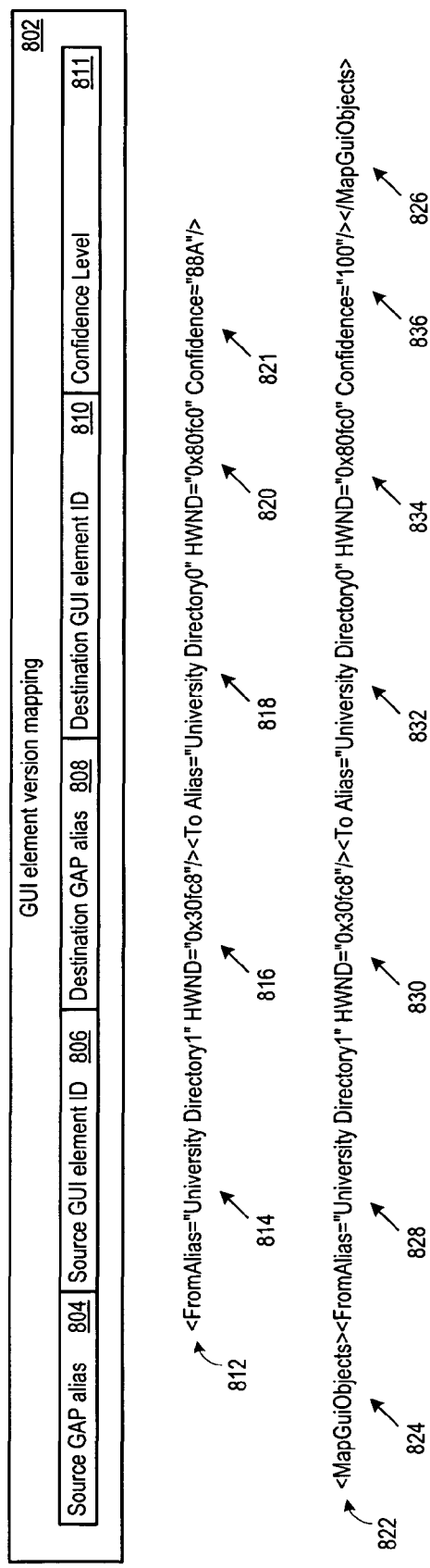
FIG. 8 shows a GUI element version mapping.

FIG. 8 shows an example of the GUI element version mapping ("version mapping") 802. The version mapping 802 includes a source GAP alias 804, a source GUI element identifier 806, a destination GAP alias 808, and a destination GUI element identifier 810. Additional, fewer, or different fields may be included in the version mapping 802.

The source GAP alias 804 specifies an identifier for a GAP (the "source GAP") that includes a first selected GUI element, while the destination GAP alias 808 specifies an identifier for a GAP (the "destination GAP") that includes a second selected GUI element that should be linked to the first selected GUI element. The GAP aliases 804 and 808 may be unique identifiers that distinguish between GAPs, such as identifiers that differentiate the current GAP version and the subsequent GAP version. The source GUI element identifier 806 provides a unique identifier for the selected GUI element in the source GAP, while the destination GUI element identifier 810 provides a unique identifier for the selected GUI element in the destination GAP.

FIG. 8 also shows a specific example of a version mapping 812. The element mapping 812 specifies a source GAP alias 814 of "University Directory1", signifying the subsequent version of a university directory GAP. The source GUI element being mapped (e.g., a combo box), has the unique element identifier 816 "0x30fc8" tagged by a "HWND" label. The element mapping 812 also specifies a destination GAP alias 818 of "University Directory0", signifying the current version of a university directory GAP. The destination GUI element being mapped (e.g., a drop down listbox), has the unique element identifier 820 "0x30fc0" tagged by the "HWND" label. Thus, the version mapping 812 establishes that a particular drop down listbox in the subsequent version of the GAP corresponds to a particular combo box in the current GAP version.

FIG. 8 also shows an example of a GUI element mapping specification message 822. The GUI element mapping specification message 822 may include a GUI element mapping specification message header 824 and a GUI element mapping specification message terminator 826. The header 824 and terminator 826 signify that the data within the message specifies an element mapping between GUI elements in different GAPs. To that end, the GUI element type specification message 822 may further include a source GAP alias 828, a source GUI element identifier 830, a destination GAP alias 832, and a destination GUI element identifier 834.

An optional extension to the GUI element version mapping 802 is the confidence level field 811. The confidence level field 811 may specify a degree of reliability for the GUI element version mapping. When the version mapping arises from the efforts of a human operator, for example, the mapping logic 702 may set the confidence level relatively high (e.g., 90-100%). When the version mapping arises from an automated analysis, the version mapping logic 702 may set the confidence level at a specified level (e.g., a predefined level for automated matching), or may set a threshold that depends on the strength of the automated analysis.

For example, the automated analysis may determine a normalized score for any given attempt to match one GUI element to another GUI element. The confidence level field 811 may then specify the normalized score. The confidence level field 811 may further specify why the confidence level is set to any particular value. Furthermore, an explanation field (e.g., a character such as "M" or "A") may be included in the confidence level field 811 to denote that the confidence level arises from Manual or Automated analysis. An example is the confidence level 821, set to "88A" to denote an automated analysis and a normalized score of 88, while the confidence level 836 shows a confidence value of 100 without specifying an explanation.

Figure 9:
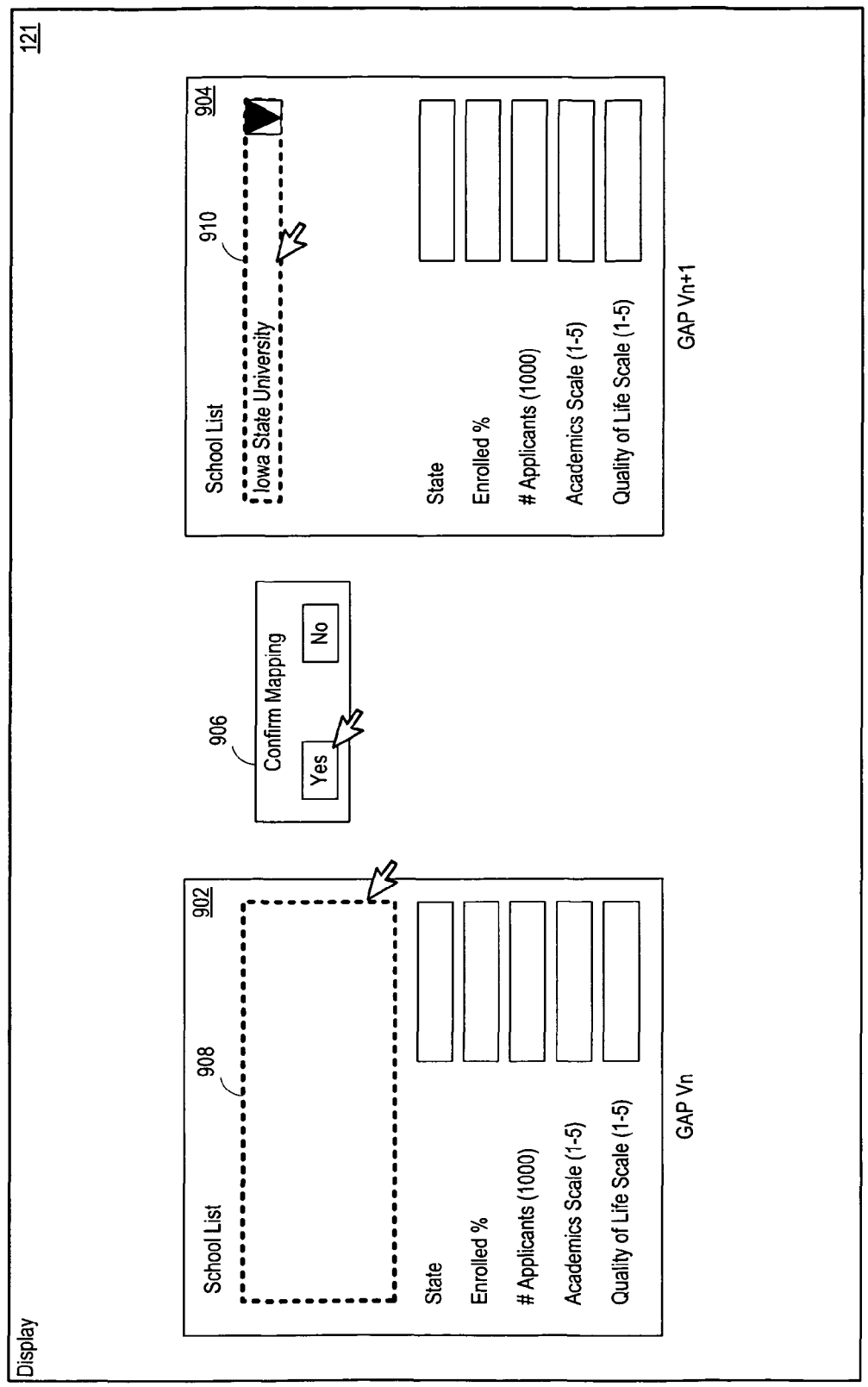
FIG. 9 shows a GUI element version mapping user interface.

FIG. 9 shows a current GAP version 902 and a subsequent GAP version 904, as well as an example mapping user interface 906 for the mapping logic 702. Both GAPs 902 and 904 are shown executing and rendering their GUIs on the display 121. The operator selects GUI elements using, for example, the mouse cursor, keyboard input, or other inputs.

Upon selection, the mapping logic 702 highlights the selected GUI elements. In the example shown in FIG. 9, the selected GUI element in the current GAP version 902 is the list box 908. The selected GUI element in the subsequent GAP version 904 is the drop down list 910. Upon selection of an element in each GAP, the mapping logic 702 displays the mapping user interface 906. Clicking the 'OK' button directs the mapping logic 702 to create the element mapping between the list box 908 and the drop down list 910. Clicking 'Cancel' directs the mapping logic 702 to take no action.

Figure 10:
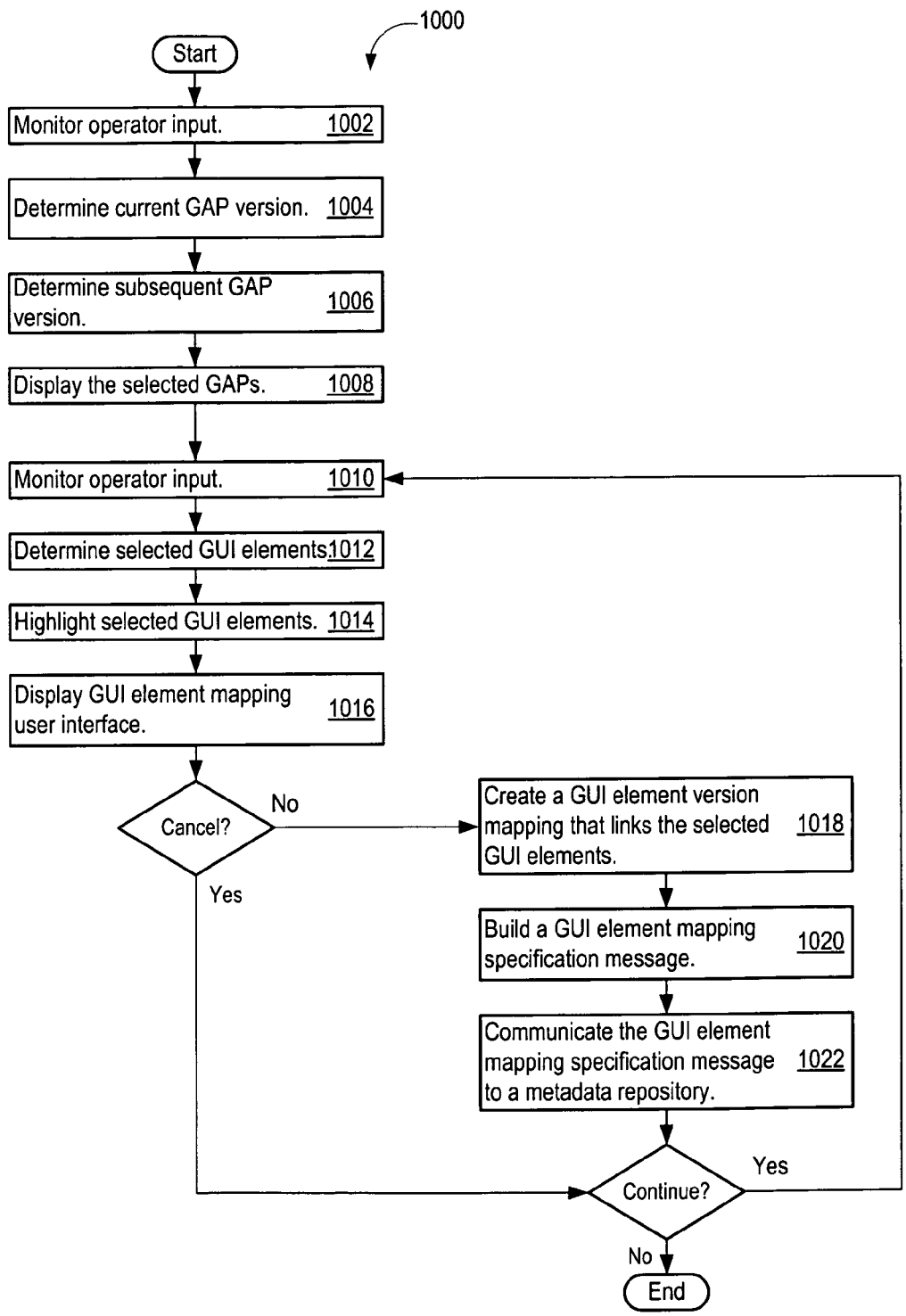
FIG. 10 shows a flow diagram for GUI element version mapping logic.

FIG. 10 shows a flow diagram 1000 of the processing performed by the mapping logic 702. The mapping logic 702 monitors for operator input (1002) in order to determine a first GAP (1004) (e.g., the current GAP version) and a second GAP (1006) (e.g., the subsequent GAP version) between which the operator will map individual GUI elements. For example, the operator may select executable program files for the GAPs from a file selection window to choose the two GAPs. The mapping logic 702 displays the GUIs for the selected GAPs (e.g., by executing the GAPs) (1008).

The element selection logic 704 then monitors for operator input (1010). In particular, the element selection logic 704 detects mouse, keyboard, and other types of input to determine when an operator has selected GUI elements in the GAPs (1012). The element selection logic 704 highlights each selected GUI element (1014). When a GUI element from each GAP has been selected, the element selection logic 704 displays a GUI element mapping user interface (1016). If the operator clicks 'Cancel', the mapping logic 702 need not take any action, but may continue to watch for additional GUI element selections.

If the operator clicks 'OK', the mapping creation logic 706 creates a GUI element version mapping that specifies that a relation exists between the selected GUI elements (1018). To that end, the mapping creation logic 706 may store a source GAP alias, a source GUI element identifier corresponding to the selected GUI element in the source GAP, a destination GAP alias, and a destination GUI element identifier corresponding to the selected GUI element in the destination GAP.

Additionally, the message creation logic 708 may build a GUI element mapping specification message (1020). To that end, the message creation logic 708 may store a GUI element mapping specification message header and a GUI element mapping specification message terminator. The header and terminator signify that the data within the message specifies a GUI element mapping between GUI elements in different GAPs. The GUI element type specification message may further include a source GAP alias, a source GUI element identifier, a destination GAP alias, and a destination GUI element identifier. The message creation logic 708 may then communication the GUI element mapping specification message to other systems, such as a metadata repository (1022).

Figure 11:
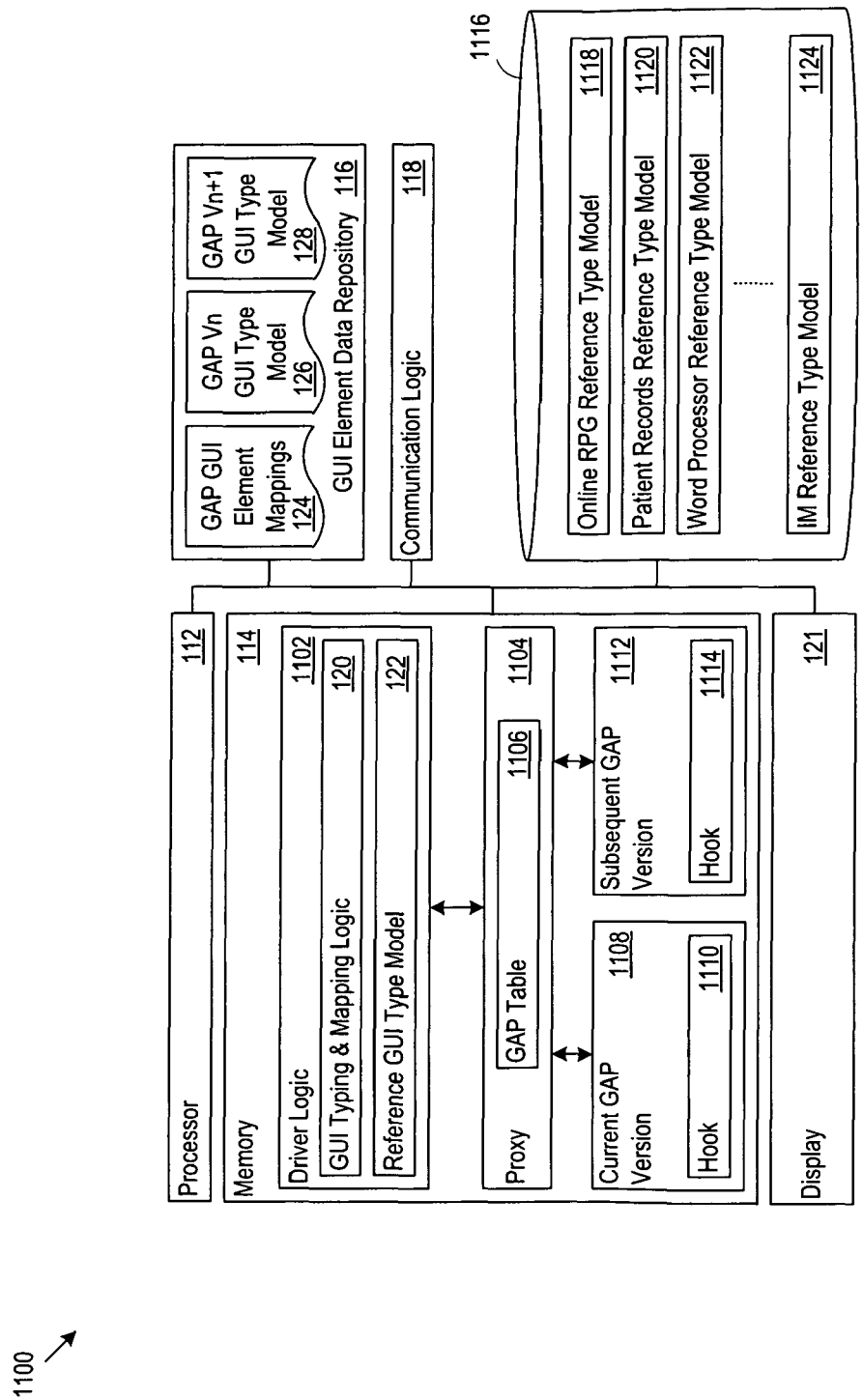
FIG. 11 shows a GUI element typing and mapping system.

FIG. 11 shows an example implementation the GUI element typing and mapping system ("system") 1100. The system 1100 includes driver logic 1102 in the memory 114 as well as a proxy 1104 that accesses a GAP table 1106. In FIG. 11, the current GAP version 1108 is shown executing with a hook 1110, and the subsequent GAP version 1112 is also shown executing with a hook 1114.

The proxy 1104 includes logic that inserts the hooks 1110 and 1114 into the process space of the GAPs 1108 and 1112. The proxy 1104 communicates with the hooks 1110 and 1114. In particular, the proxy 1104 may exchange messages with the hooks 1110 and 1114 to obtain the state of any or all of the GUI elements in the GAPs 1108 and 1112. The hooks 1110 and 1114 are programs that respond to messages from the proxy 1104, and that may interact through an accessibility layer to discover and report information about the GUI elements in the GAPs 1108 and 1112 to the proxy. The operating system generally provides the accessibility layer. The accessibility layer exposes an accessibility interface through which the proxy 1104 and hooks 1110 and 1114 may invoke methods and set and retrieve GUI element values and characteristics, and thereby select, highlight, control, modify, assign identifiers for, or otherwise interact with the GUI elements in the GAPs.

The Microsoft™ Active Accessibility (MSAA) layer is one example of a suitable accessibility layer. In this regard, the GAPs 1108 and 1112 expose the accessibility interfaces that export methods for accessing and manipulating the properties and behavior of GUI elements. For example, the GAPs 1108 and 1112 may employ the IAccessible interface to allow access and control over the GUI element using MSAA API calls. The IAccessible interface further facilitates applications to expose a tree of data nodes that make up each window in the user interface currently being interacted with. The driver logic 1102 and proxy 1104 may then include program statements to access and control the GUI element as if the GUI element was a conventional programming object. Accessibility API calls may include: perform action on object, get value from object, set value on object, navigate to object, and set property on object, and other calls.

The proxy 1104 may be a daemon program and may start prior to the driver logic 1102. The proxy 1104 may be aware of one or more GAPs. When the proxy 1104 starts, it loads the GAP table 1106, which may include a predefined set of GAP entries for which the proxy 1104 is aware. A GAP entry may take the form:

---

<Alias, <File0, Path0, Dir0, CommnadLine0>, <File1, Path1, Dir1, CommandLine1>>

--- where Alias is a unique pre-defined name for the GAP (e.g., a name generic to both the current GAP version 1108 and the subsequent GAP version 1112), File0 is the name of the executable program for the current GAP version 1108, Path0 is the absolute path to File0, Dir0 is the absolute path to the directory from which File0 should execute, and CommandLine0 specifies command line arguments for File0. File1, Path1, Dir1, and CommandLine1 provide similar parameters for the subsequent GAP version 1112.

When the driver logic 1102 starts, it connects to the Proxy locally or remotely (e.g., through a Transmission Control Protocol (TCP) port). Once connected, the driver logic 1102 requests the GAP table 1106 by sending a GAP table request message to the proxy 1104. The proxy 1104 responds by sending a GAP table response message including the GAP table 1106 to the driver logic 1102. An example message exchange is shown in Table 2:

TABLE 2

GAP table request message
<GetGapTable/>
GAP table response message
<GapTable>
  <GAP Alias = "name"
    <V_N File="gap.exe" Path="c:\path\N" CommandLine="-c1"/>
    <V_N1 File="gap.exe" Path="c:\path\N1" CommandLine="-c1"/>
  </GAP>
</GapTable>

The driver logic 1102 may then provide a list of GAPs to choose from to the operator either for typing the GAP (FIG. 5, (602), (604)) or performing GUI element mapping (FIG. 10, (1002), (1004), (1006)). The driver logic 1102 may then create a GAP load message, e.g., <LoadGap Alias="name"/> and send the GAP load message to the proxy 1104 to start any selected GAP (which will then display its user interface) (FIGS. 6 and 10, (608), (1008)). When the operator is performing element mapping, one GAP load message may cause the proxy 1104 to start multiple versions of a GAP identified together in the GAP table 1106 in the <GAP> section.

After starting the GAPs, the proxy 1104 injects hooks into the GAPs' process space. The hook connects to the proxy 1104 and sends a confirmation message (e.g., <GAP File="gap.exe" Instance="192"/>). The proxy 1104 sends a success message (e.g., <Loaded Alias="name" VN="192" VN1="193"/>) to the driver logic 1102, thereby acknowledging that the GAPs are started successfully.

The operator may request the current state of each started GAP from the driver logic 1102. In response, the driver logic 1102 sends a state request message (e.g., <GetState Alias="name"/>) to the proxy 1104. In turn, the proxy 1104 locates the connection to the corresponding hooks of the GAPs and sends a state request message (e.g., <GetState/>) to the hooks. The hooks create a GAP state (including unique identifiers for GUI elements), such as a state tree, encode it (e.g., in XML format), and send it to the proxy 1104. The proxy 1104 forwards the GAP state to the driver logic 1102. An example GAP state message sent by the proxy 1104 is shown in Table 3.

TABLE 3

GAP state message

<State SeqNumber="1" Name="name" Alias="name" ProcessID="972">
  <GUIElement Alias="name">
    <Location x="15" y="200" width="23" height="98"/>
    <Description>Action</ Description>
    <DefAction>Action</DefAction>
    <UniqueID>0xcafebabe</UniqueID>
    <Class>LISTBOX</Class>
    <Values>
      <Value SeqNumber="1">someval</Value>
      ..............
    </Values>
  </GUIElement>
  ..............
</State>

The GAP state contains information about the GUI elements composing a given screen, as well as the values of these elements and their assigned identifiers. The GAP state specifies the GAP GUI elements and the values of the GUI elements. In one implementation the GAP state is reflected in an eXtensible Markup Language (XML) structure where the element 'State' has one or more children elements 'GAP' whose children elements are in turn 'GUIElement's. For example, GUI elements may be either containers or basic. Container GUI elements contain other elements, while basic elements do not contain other elements. The XML structure reflects the containment hierarchy by allowing GUIElements to contain other GUIElements.

In the XML structure, the attribute SeqNumber may designate a unique sequence number of the state within the GAP. Since states are mapped to GUI screens, each state may be given a name which is specified by the optional attribute 'Name'. The attributes Alias and ProcessID may denote the alias of the GAP and its instance process identifier respectively. The instance process identifier may differentiate between the current GAP version and the subsequent GAP version.

The typing and mapping logic 120 may accept operator input (e.g., mouse input) through which the operator identifies a GUI object by pointing the cursor to it (FIGS. 10 and 6, (1012) and (612)). The typing and mapping logic 120 may then draw a frame around the element (FIGS. 10 and 6 (1014) and (614)). The typing and mapping logic 120 may then display a GUI element type selection list (FIG. 6, (616)) or a GUI element mapping user interface (FIG. 10, (1016)). The operator selects the appropriate type for the object (FIG. 6, (620)) or verifies whether a mapping should be created between two selected objects. In either case, the proxy 1104 sends a GUI element type mapping or a GUI element version mapping to the driver logic 1102. In turn, the driver logic 1102 may store the mappings in the repository 116, and may create and communicate a GUI element mapping specification message or a GUI element type specification message to the metadata repository 202 (FIG. 6, (626) and FIG. 10, (1022)).

FIG. 11 also shows a reference type model repository 1116. The system 1100 may draw the reference GUI type model 122 currently being applied from one of many different reference type models available in the reference type model repository 1116. The examples shown in FIG. 11 of reference type models include an online role playing game (RPG) reference type model 1118 that may be selected by the operator when designing or typing a GAP that implements online gaming functionality and a patient records reference type model 1120 that the operator may select when designing or typing a healthcare GAP. Additional examples include the word processor reference type model 1122 that the operator may selected when typing or building a word processor GAP, and a Instant Messaging (IM) reference type model 1124 that the operator may select when designing or typing an IM GAP.

Figure 12:
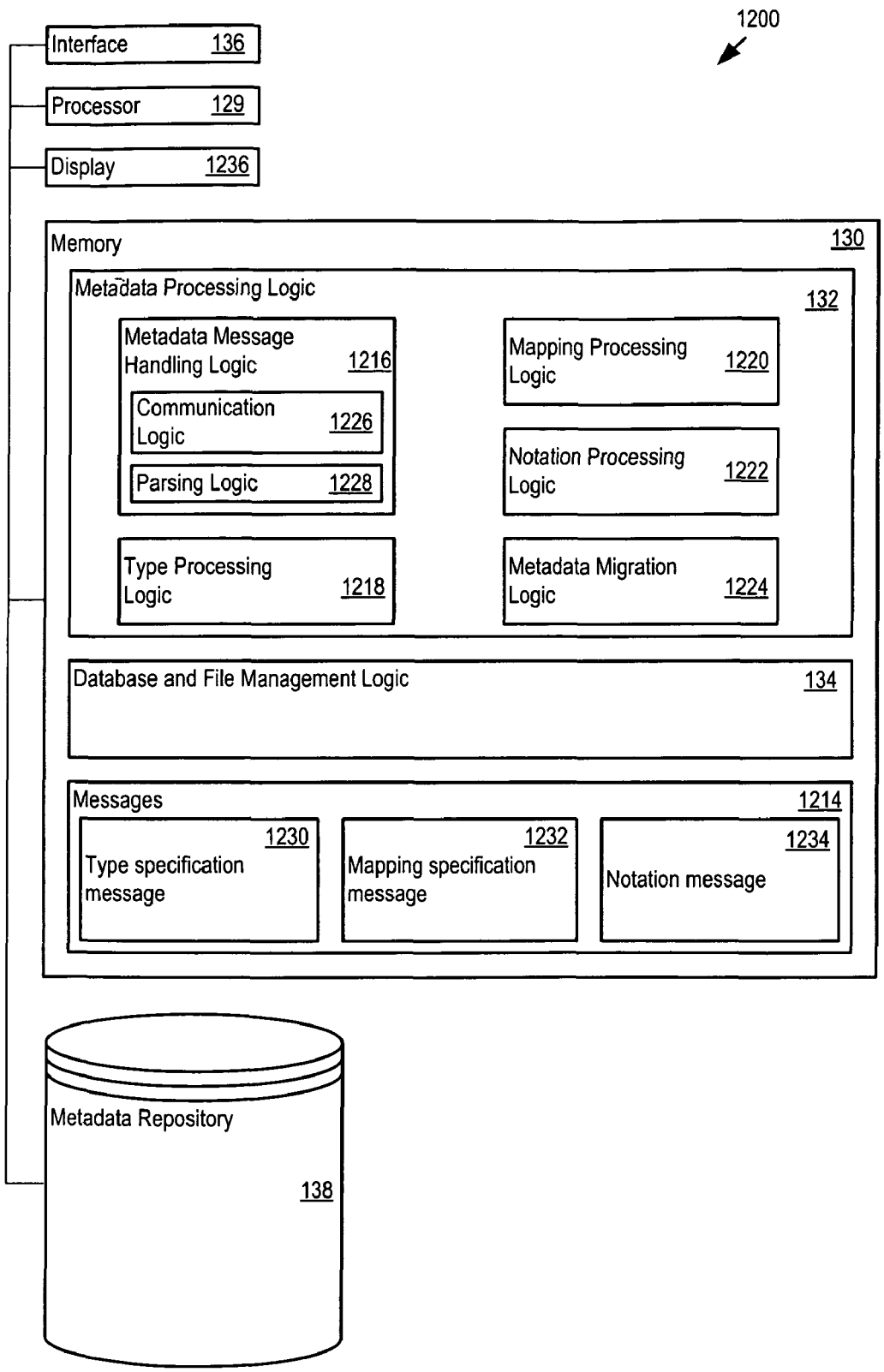
FIG. 12 shows a metadata evolution tool architecture.

FIG. 12 shows one embodiment of a metadata evolution tool architecture 1200. The architecture 1200 includes an interface 136, a processor 129, a memory 130, and a metadata repository 138. The architecture 1200 may communicate with other systems through the interface 136. For example, the architecture 1200 may receive requests for metadata information and send responses to those requests through the interface 136. Alternatively or additionally, the architecture 1200 may send instructions to the interface 136 to display a prompt at a non-local terminal and may receive responses to the prompt through the interface 136. Alternatively or additionally, the processor 129 may send instructions to display a prompt at display 1236 and may receive responses to the prompt. The processor 129 executes the logic stored in the memory 130. The metadata repository 138 receives, retrieves, and stores metadata information processed by the processor 129.

The memory 130 may include metadata processing logic 132, database and file management logic 134, and messages 1214. The metadata processing logic 132 may instruct the processor 129 to perform process flows for maintaining and migrating metadata. The database and file management logic 134 may instruct the processor 129 to perform processes relevant to data storage, retrieval, and manipulation to and from the metadata repository 138. The messages 1214 may be stored in the memory when received from the interface 136 and manipulated by the processor 129 according to instructions from the metadata processing logic 132.

The metadata processing logic 132 includes metadata message handling logic 1216, type processing logic 1218, mapping processing logic 1220, notation processing logic 1222, and metadata migration logic 1224. The metadata message handling logic 1216 may instruct the processor 129 to store messages 1214 received from the interface 136 in the memory 130 and process the messages 1214 as described below. The metadata message handling logic 1216 may include communication logic 1226 and parsing logic 1228. The communication logic 1226 may instruct the processor 129 to send and receive messages 1214 through the interface 136. The communication logic 1226 may also instruct the processor 129 to store the messages 1214 in the memory 130. Alternatively or additionally, the communication logic 1226 may send instructions to the interface 136 to display a prompt to a non-local terminal and may instruct the processor 129 to process instructions received by the interface 136 in response to the prompt. Alternatively or additionally, the communication logic 1226 may instruct the processor 129 to send instructions to the display 1236 to display a prompt, and the processor 129 may process instructions received in response to the prompt. The parsing logic 1228 may instruct the processor 129 to parse the messages 1214. For example, the parsing logic 1228 may instruct the processor 129 to extract metadata identification information from the messages.

The type processing logic 1218, mapping processing logic 1220, and notation processing logic 1222 may instruct the processor 129 to process metadata messages, such as type specification message 1230, mapping specification message 1232, and notation message 1234. For example, the type processing logic 1218, mapping processing logic 1220, or notation processing logic 1222 may instruct the processor 129 to maintain a metadata record stored in the metadata repository 138. In that regard, the processor 129 may direct reading, writing, storing, copying, updating, moving, deleting, overwriting, appending, or otherwise manipulating data stored within a metadata record in the metadata repository 138. The type processing logic 1218, mapping processing logic 1220, or notation processing logic 1222 may be performed in conjunction with processes from the database and file management logic 134. The messages 1214 include as examples type specification messages 1230, mapping specification messages 1232, and notation messages 1234, but may include other messages related to metadata. The type specification messages 1230, the mapping specification messages 1232, and the notation messages 1234 are discussed in more detail with regard to FIGS. 4, 8, and 14, respectively.

Figure 13:
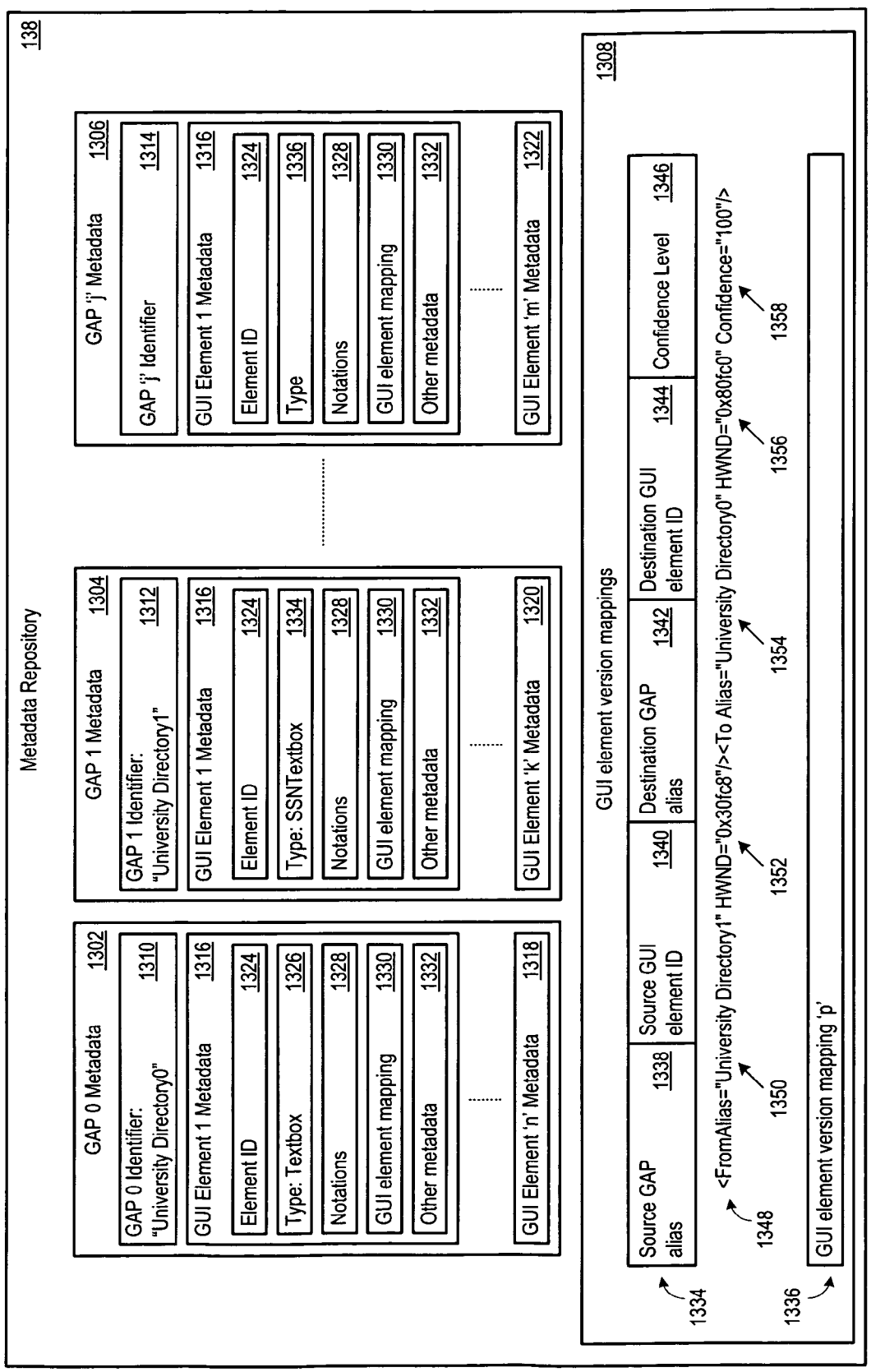
FIG. 13 shows a metadata repository architecture.

FIG. 13 shows one implementation of the metadata repository 138. The metadata repository 138 may be organized in many different ways, however. The metadata repository 138 may include a GAP 0 metadata record 1302, GAP 1 metadata record 1304 through GAP 'j' metadata record 1306, and a GUI element version mapping record 1308. The GAP metadata records 1302, 1304, and 1306 may store metadata associated with a specific GAP or GAP version. The GUI element version mapping record 1308 may store the mappings from one GUI element to another GUI element.

Each GAP metadata record may include a GAP identifier. The GAP identifiers 1310, 1312, and 1314 may serve to identify either a GAP, a version of a GAP, or both. For example, GAP 0 metadata record 1302 contains a GAP 0 identifier 1310 of "University Directory0" and GAP 1 metadata record 1304 contains a GAP 1 identifier 1312 of "University Directory1." In this case, "University Directory0" may serve to identify the whole GAP as "University Directory0." Alternatively or additionally, "University Directory0" may serve to identify the version of the GAP as version 0 (e.g., the current version) of the GAP "University Directory." The metadata repository 138 may store metadata records for multiple GAPs, as well as multiple metadata records for each of the multiple versions of each GAP.

The GAP 0 metadata record 1302 additionally may include GUI element 1 metadata record 1316 through GUI element 'n' metadata record 1318. The total number 'n' of GUI element metadata records stored within each GAP metadata record may vary depending on the complexity of the GAP. Each GUI element metadata record may correspond to a GUI element within a GAP or a version of a GAP, and each GUI element within a GAP may have a corresponding GUI element metadata record within the GAP metadata record. For example, GAP 0 metadata record 1302 contains GUI element 'n' metadata record 1318 indicating that GAP 0 may be composed of 'n' or more identifiable GUI elements. Alternatively or additionally, GUI element 'n' metadata record 1318 may indicate that GAP 0 metadata record 1302 currently contains 'n' GUI element metadata records, where 'n' may be an integer value from 0 up to the total number of GUI elements in GAP 0. Every GUI element in a GAP may not have a corresponding GUI element metadata record. Similarly, GAP 1 metadata record 1304 may contain GUI element 'k' metadata record 1320, and GAP 'j' metadata record may contain GUI element 'm' metadata record 1322.

Each of the GUI element metadata records 1316, 1318, 1320, and 1322 may include a GUI element identifier 1324, a type identifier 1326, a notation 1328, a GUI element mapping 1330, and other metadata 1332. A GUI element identifier 1324 may serve to identify a GUI element within the GAP or GAP version, using a unique number, character string, or other indicia. For example, one element ID may be "0x30fb0." A type identifier 1326 may be a classification of a GUI element that defines high level semantics, annotations and properties, permitted or restricted behaviors, and values associated with the GUI element. For example, one type identifier may be "US-StateTextBox" which may specify a type of text box GUI element that only accepts strings corresponding to the names of the states of the United States. This information may come from the knowledge of a testing engineer when he or she tries to understand the semantics of each GUI element in the GAP under test.

A notation 1328 may include text, notes, informal comments, constraints, or information derived from a technical specification that one programmer may wish to convey to another programmer about a particular GUI element. For example, a notation 1328 may include the text "State Names Only," as an informal method of conveying to another programmer that only strings corresponding to the names of states of the United States should be included. A GUI element mapping 1330 may identify a GUI element in another GAP or GAP version corresponding to the GUI element associated with the GUI element metadata record. For example, a GUI element mapping 1330 may include the values "University Directory1" and "0x30fc8" to indicate that the GUI element associated with this GUI element metadata record corresponds to GUI element 0x30fc8 in the GAP University Directory, version 1. Additionally, other metadata 1332 may be stored in association with a GUI element metadata record.

The metadata repository 138 may include any number of GUI element version mapping records, such as the record 1308. The number of GUI element version mapping records 1308 may vary according to the number of GAPs or GAP versions. For example, each GUI element version mapping record 1308 may include mappings from one specific GAP version to another specific GAP version. Alternatively or additionally, each GUI element version mapping record 1308 may include all of the mappings between all of the versions of a single GAP. The example of FIG. 13 shows that the GUI element version mapping record 1308 includes GUI element version mappings 1334 and 1336. The number of GUI element version mappings 1334 and 1336 in a GUI element version mapping record 1308 may vary according to the number of mappings made between GUI elements of different GAPs or GAP versions.

Each GUI element version mapping 1334 or 1336 may include a source GAP alias identifier 1338, a source GUI element identifier 1340, a destination GAP alias identifier 1342, a destination GUI element identifier 1344, and a confidence level value 1346. The GUI element version mapping 1348 provides an example of a GUI element version mapping using extensible markup language (XML). The GUI element version mapping 1348 includes a source GAP alias identifier 1350, a source GUI element identifier 1352, a destination GAP alias identifier 1354, a destination GUI element identifier 1356, and a confidence level value 1358. In this example, the mapping indicates a correspondence between GUI element 0x30fc8 of GAP University Directory, version 1 (e.g. a subsequent version), to GUI element 0x80fc0 of GAP University Directory, version 0 (e.g. a current version), with a confidence level of 1200. The confidence level values may use decimal values between 0 and 1, integer values between 0 and 100, or any other scale, to indicate the strength of the certainty to which the mapping between the GUI elements is a correct mapping. For example, a mapping provided by a human user may have a high or absolute confidence of 1 or 1200 percent, where a mapping provided by a mapping evaluation program using GUI element property comparison may have a lower or no confidence. Alternatively or additionally, a mapping provided by a mapping evaluation program using GUI element property comparison may have a high or absolute confidence, where a mapping provided by a human user may have a lower or no confidence.

The processor 129 uses the database and file management logic 134 to access and manipulate any of the GAP metadata records 1302, 1304, or 1306, GUI element metadata records 1316, 1318, 1320, or 1322, and/or GUI element version mapping records stored in the metadata repository 138. The access and manipulation of the data in the metadata repository 138 may include reading, writing, storing, copying, updating, moving, deleting, overwriting, appending, or any other function performed on data.

Figure 14:
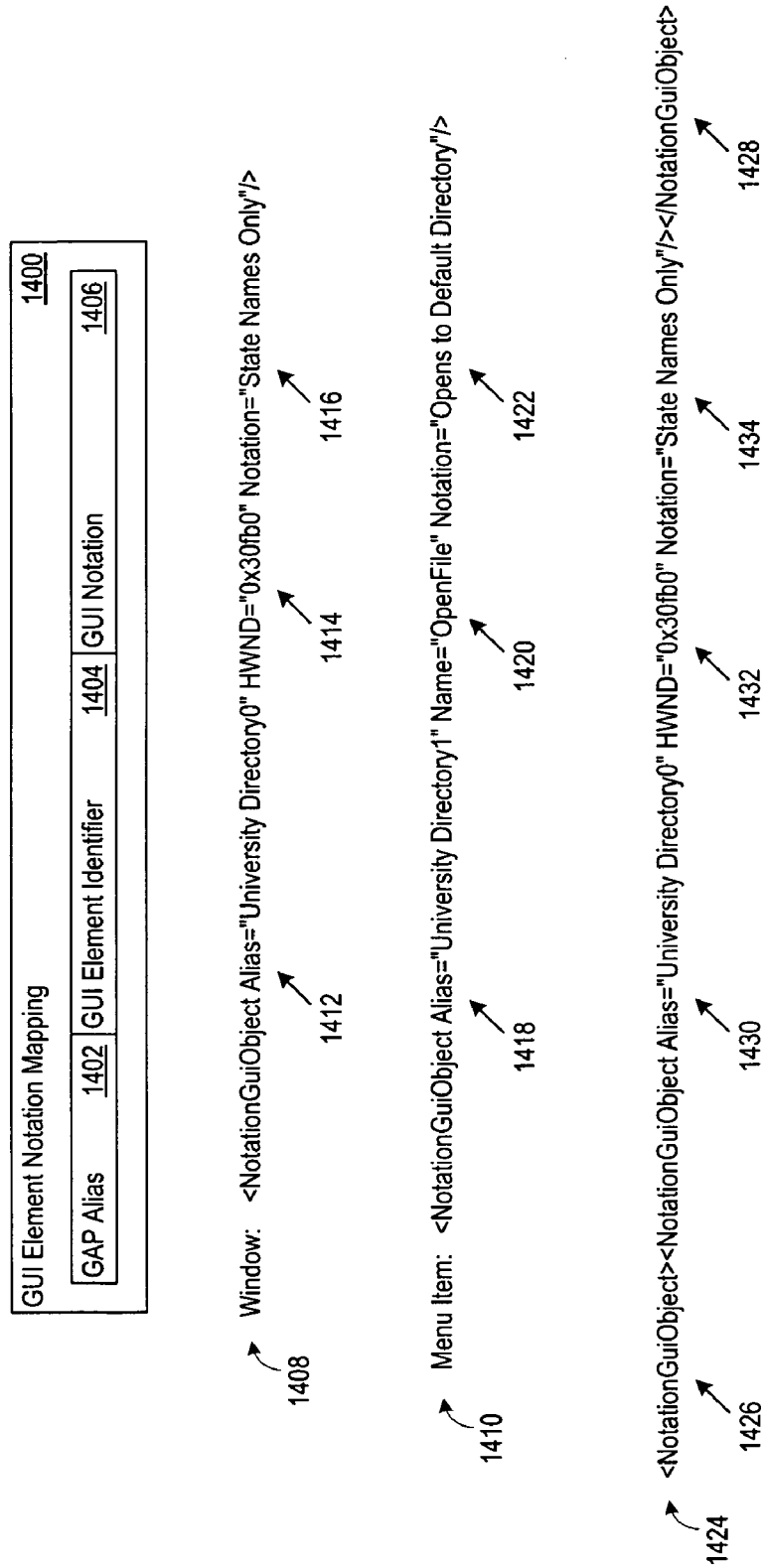
FIG. 14 shows examples of notation messages.

FIG. 14 shows an example of a GUI element notation mapping 1400 that may be a component of a GUI element notation message 1234. The notation mapping format 1400 includes a GAP alias 1402, a GUI element identifier 1404, and a GUI notation 1406. Additional, fewer, or different fields may be included in the notation mapping 1400.

The GAP alias 1402 specifies an identifier for the GAP which includes the GUI element to which a notation is being applied. The GAP alias 1402 may be a unique identifier that distinguishes between GAPs or GAP versions, including a current GAP version and a subsequent version of the same GAP. The GUI element identifier 1404 provides a unique identifier for the GUI element which is being notated. The GUI notation 1406 specifies the notation being assigned to the GUI element (e.g., the text "State names only").

FIG. 14 also shows two examples of GUI notation mappings 1408 and 1410 using an XML representation. The notation mapping 1408 is a mapping for a Window GUI element. The GAP alias 1412 is "University Directory0", signifying the current version of a university directory GAP. The GUI element being notated has the unique element identifier 1414 "0x30fb0" noted by the HWND identifier and established, for example, by an accessibility layer interface. The GUI notation 1416 for the Window GUI element is the text "State names only".

The notation mapping 1410 is a mapping for a Menu Item GUI element. The GAP alias 1418 is "University Directory1", signifying the subsequent version of the university directory GAP. The GUI element being annotated has the unique element identifier 1420 "OpenFile" as specified by the Name field. The GUI notation 1422 for the Window GUI element is the text "Opens to Default Directory" as specified by the Annotation field.

FIG. 14 also shows an example of a GUI element notation message 1424 in an XML representation. The GUI element notation message 1424 may include a GUI element notation message header 1426 ("NotationGuiObject") and a GUI element notation message terminator 1428 ("/NotationGuiObject"). The header 1426 and terminator 1428 signify that the data within the message specifies a notation for a GUI element. To that end, the GUI element notation message 1424 may further include a GAP alias 1430, GUI element identifier 1432, and a GUI notation 1434.

Figure 15:
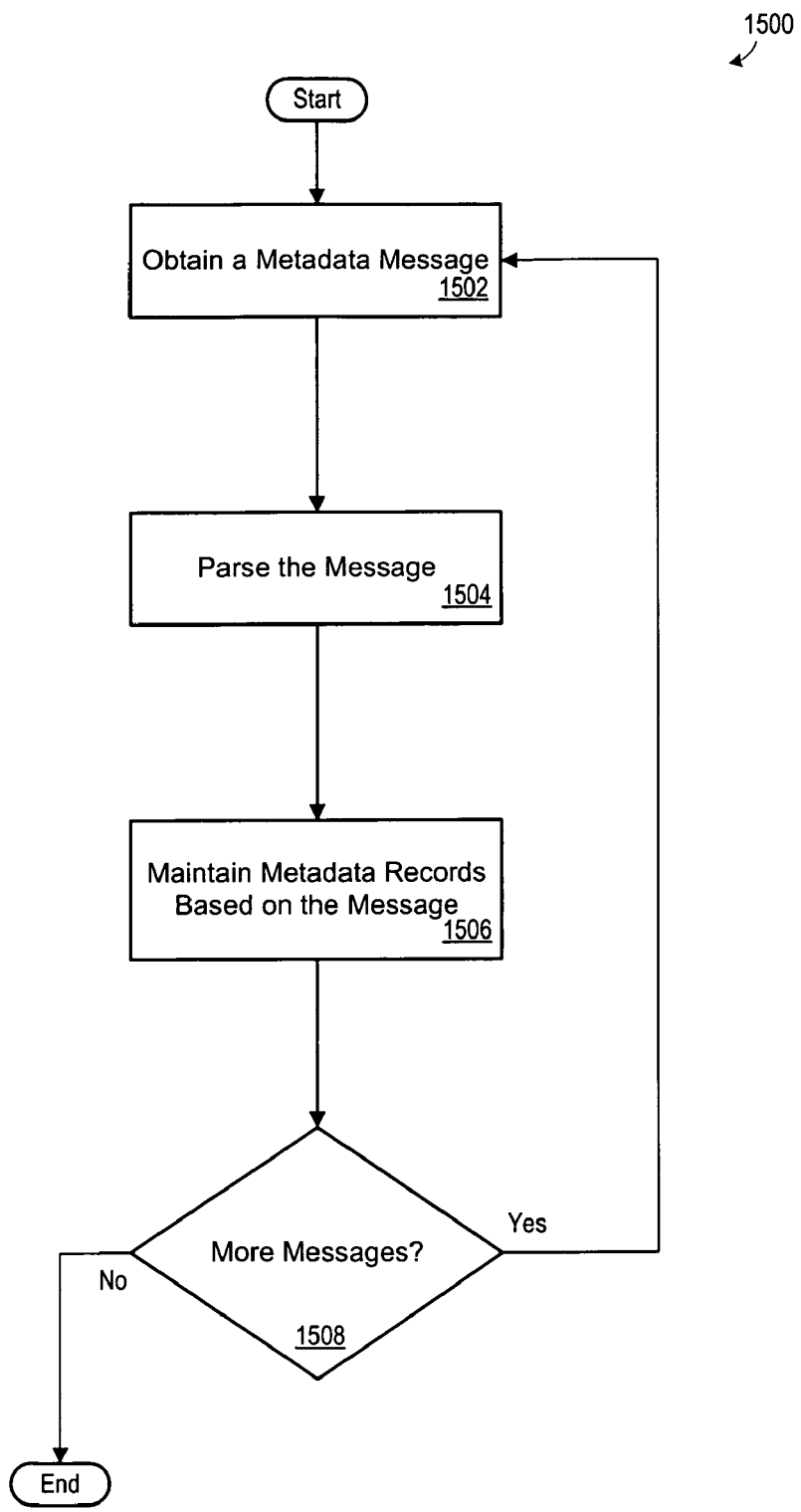
FIG. 15 shows a flow diagram of metadata processing.
Figure 16:
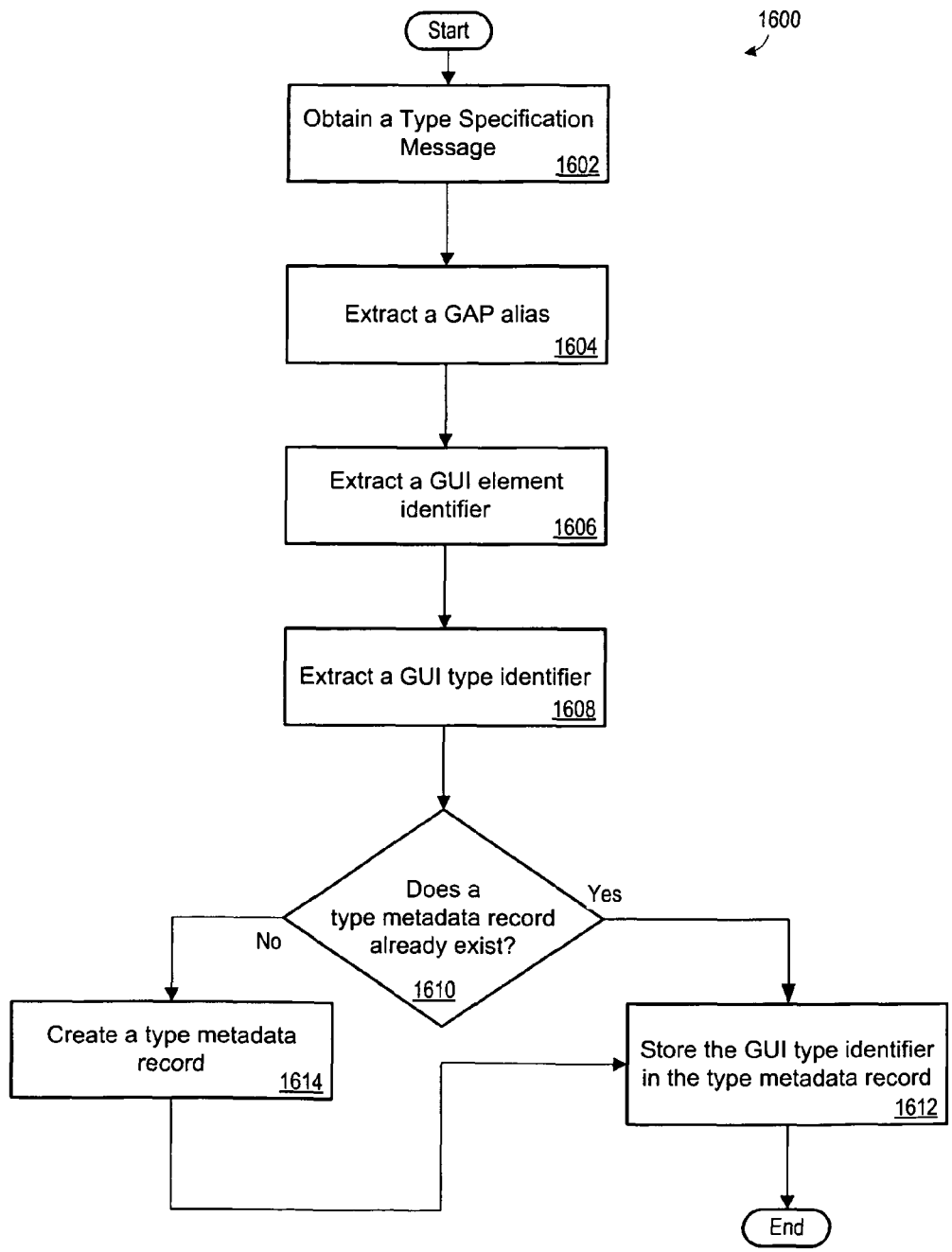
FIG. 16 shows a flow diagram of type processing.

FIG. 15 shows a flow diagram 1500 of metadata message processing that the metadata processing logic 132 may perform. The metadata processing logic 132 may obtain a metadata message (1502). For example, the metadata message may be obtained through the interface 136 and stored in the memory 130. The metadata processing logic 132 may instruct the processor 129 to then parse the metadata message (1504). For example, the metadata processing logic 132 may parse a metadata message to obtain element identification information, GAP identification information, notation data, or other metadata. The metadata processing logic 132 may then maintain metadata records based on the information extracted from the parsed metadata message (1506). Maintaining metadata records may include reading, writing, storing, copying, updating, moving, deleting, overwriting, appending, or otherwise manipulating the data within the metadata records. The metadata processing logic 132 may then check whether any more messages are available for processing (1508). If more messages are available, the metadata processing logic 132 may then cycle back and obtain the next metadata message (1502). If no more messages are available, then the metadata processing logic 132 may terminate.

FIG. 1600 shows a flow diagram 700 of type processing that may be performed by type processing logic 1218. The type processing logic 1218 may first obtain a type specification message (1602). The type specification message may be in the example format shown for the GUI element type specification message 424. The type processing logic 1218 may then extract a GAP alias from the type specification message (1604). The GAP alias may be delimited in an XML statement as illustrated by the GAP alias 430. The type processing logic 1218 may then extract a GUI element identifier from the type specification message (1606). The GUI element identifier may be delimited in an XML statement as illustrated by the GUI element identifier 432. The type processing logic 1218 may then extract a GUI type identifier from the type specification message (1608). The GUI type identifier may be delimited in an XML statement as illustrated by the GUI type identifier 434.

The type processing logic 1218 may then determine whether a type metadata record corresponding to the GAP alias and GUI element identifier already exists (1610). If a type metadata record already does exist for the GAP alias and GUI element identifier, then the type processing logic 1218 stores the GUI type identifier in the type metadata record (1612). The type processing logic 1218 may store the GUI type identifier by overwriting an already existing GUI type identifier or storing the GUI type identifier in a blank GUI type identifier field. In addition, the type processing logic 1218 may display a confirmation request prompt before overwriting an existing identifier, or may employ any other conflict resolution technique before storing or overwriting data. If a type metadata record does not already exist for the GAP alias and the GUI element identifier, then the type processing logic 1218 may create a type metadata record for the GAP alias and the GUI element identifier (1614). The type processing logic 1218 may then store the GUI type identifier in the type metadata record (1612).

Figure 17:
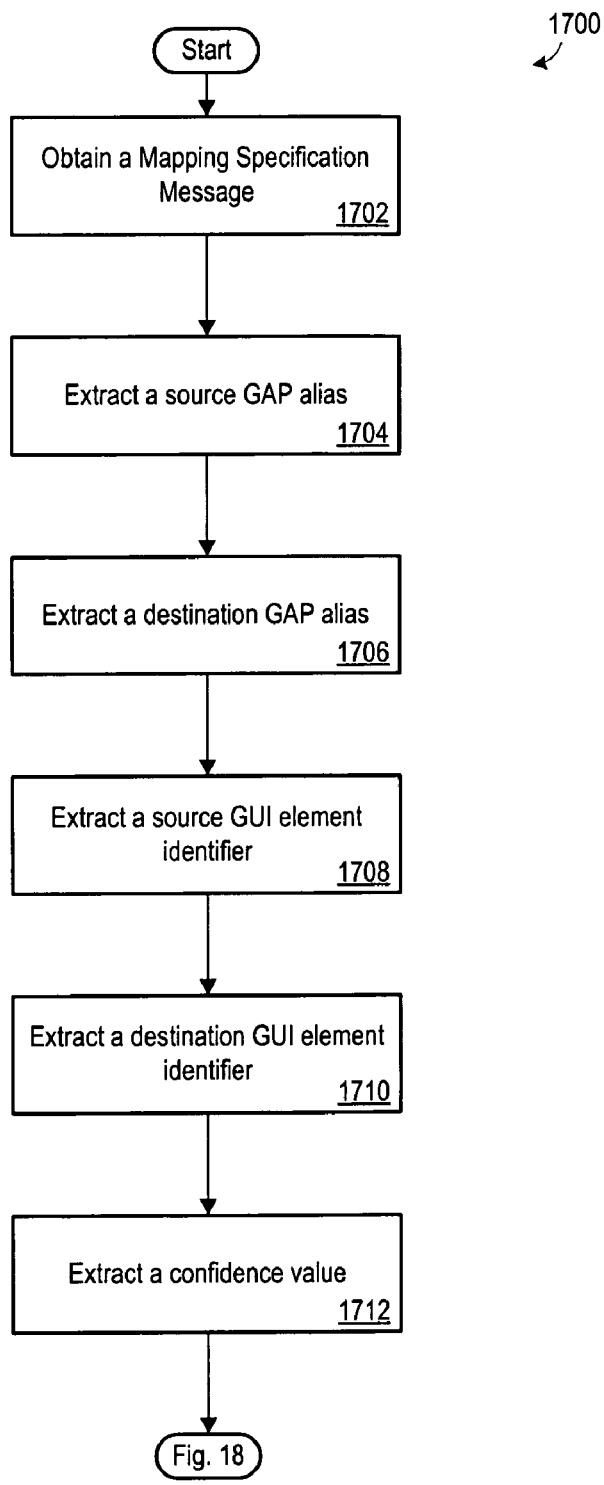
FIG. 17 shows a first part of a flow diagram of mapping processing.

FIG. 17 shows a first part of a flow diagram 800 of mapping processing that may be performed by the mapping processing logic 1220. The mapping processing logic 1220 may first obtain a mapping specification message (1702). The mapping specification message may be in the example format shown for the GUI element version mapping message 822. The mapping processing logic 1220 may then extract a source GAP alias from the mapping specification message (1704). The source GAP alias may be delimited in an XML statement as illustrated by the source GAP alias 828. The mapping processing logic 1220 may then extract a destination GAP alias from the mapping specification message (1706). The destination GAP alias may be delimited in an XML statement as illustrated by the destination GAP alias 832. The mapping processing logic 1220 may then extract a source GUI element identifier from the mapping specification message (1708). The source GUI element identifier may be delimited in an XML statement as illustrated by the source GUI element identifier 830. The mapping processing logic 1220 may then extract a destination GUI element identifier from the mapping specification message (1710). The destination GUI element identifier may be delimited in an XML statement as illustrated by the destination GUI element identifier 834. The mapping processing logic 1220 may then extract a confidence value from the mapping specification message (1712). The confidence value may be delimited in an XML statement as illustrated by the confidence value 836.

Figure 18:
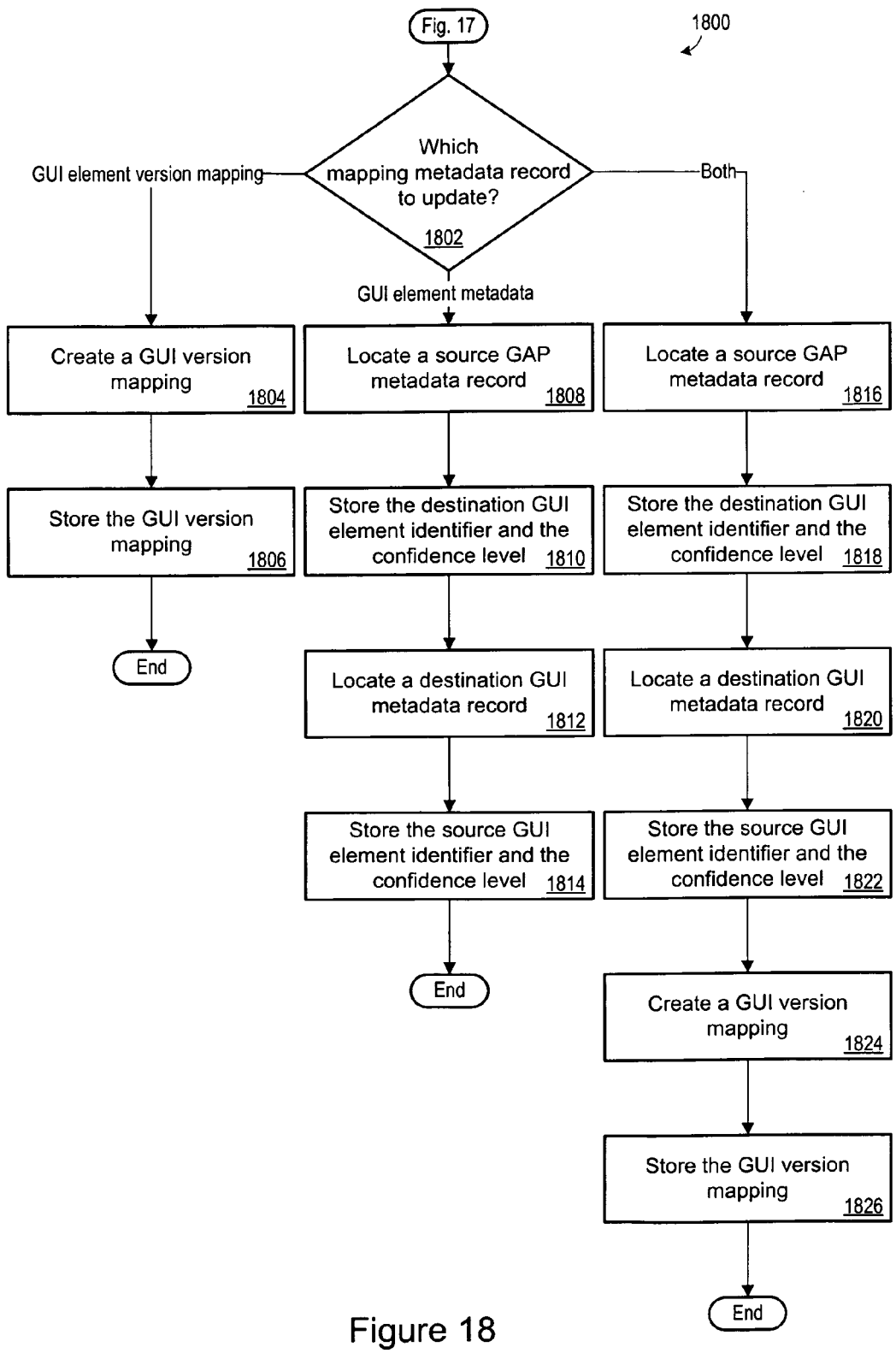
FIG. 18 shows a second part of a flow diagram of mapping processing.

FIG. 18 shows a second part of a flow diagram 1800 of mapping processing that may be performed by mapping processing logic 1220. The mapping processing logic 1220 may decide which mapping metadata record to update (1802). This decision may be based on pre-existing or default settings. Alternatively or additionally, the decision may be based on a mapping instruction received from a user in response to an instruction prompt. If the mapping instruction specifies updating the GUI element version mapping record, then the mapping processing logic 1220 may create a GUI version mapping (1804). The GUI version mapping may be delimited in an XML statement as illustrated by the version mapping 812. The mapping processing logic 1220 may then store the GUI version mapping (1806). For example, the GUI version mapping may be stored in the GUI element version mapping record 1308.

If the mapping instruction specifies updating the GUI element metadata records, then the mapping processing logic 1220 may locate a source GAP metadata record in a metadata repository (1808). The metadata repository may be the metadata repository 138. The source GAP metadata record may be in the example format shown for the GAP 0 metadata record 1302. The source GAP metadata record may be located by comparing the source GAP alias extracted from the mapping specification message (1704) with a GAP identifier, such as GAP 0 identifier 1310. The mapping processing logic 1220 may then store the destination GUI element identifier (1810). For example, the destination GUI element identifier may be stored in the GUI element mapping field 1330. Alternatively or additionally, the confidence level may be stored. For example, the confidence level may be stored in the other metadata field 1332. The mapping processing logic 1220 may then locate a destination GUI record (1812). The destination GAP metadata record may be similar to GAP 1 metadata record 1304. The destination GAP metadata record may be located by comparing the destination GAP alias extracted from the mapping specification message (1706) with a GAP identifier, such as GAP 1 identifier 1312. The mapping processing logic 1220 may then store the source GUI element identifier (1814). For example, the source GUI element identifier may be stored in the GUI element mapping field 1330. Alternatively or additionally, the confidence level may be stored. For example, the confidence level may be stored in the other metadata field 1332. The mapping processing logic 1330 may then terminate. These steps need not be performed in any particular order. Some steps may be added or removed without affecting the aims of the process.

If the mapping instruction specifies updating both the GUI element metadata records and the GUI version mapping records, then the mapping processing logic 1220 may first locate a source GAP metadata record in a metadata repository (1816). The mapping processing logic 1220 may then store the destination GUI element identifier and/or the confidence level (1818). The mapping processing logic 1220 may then locate a destination GUI metadata record (1820). The mapping processing logic 1220 may then store the source GUI element identifier and/or the confidence level (1822). The mapping processing logic 1220 may then create a GUI version mapping (1824). The mapping processing logic 1220 may then store the GUI version mapping in the GUI version mapping records (1826). The mapping processing logic 1220 may then terminate. These steps need not be performed in any particular order. Some steps may be added or removed without affecting the aims of the process.

Figure 19:
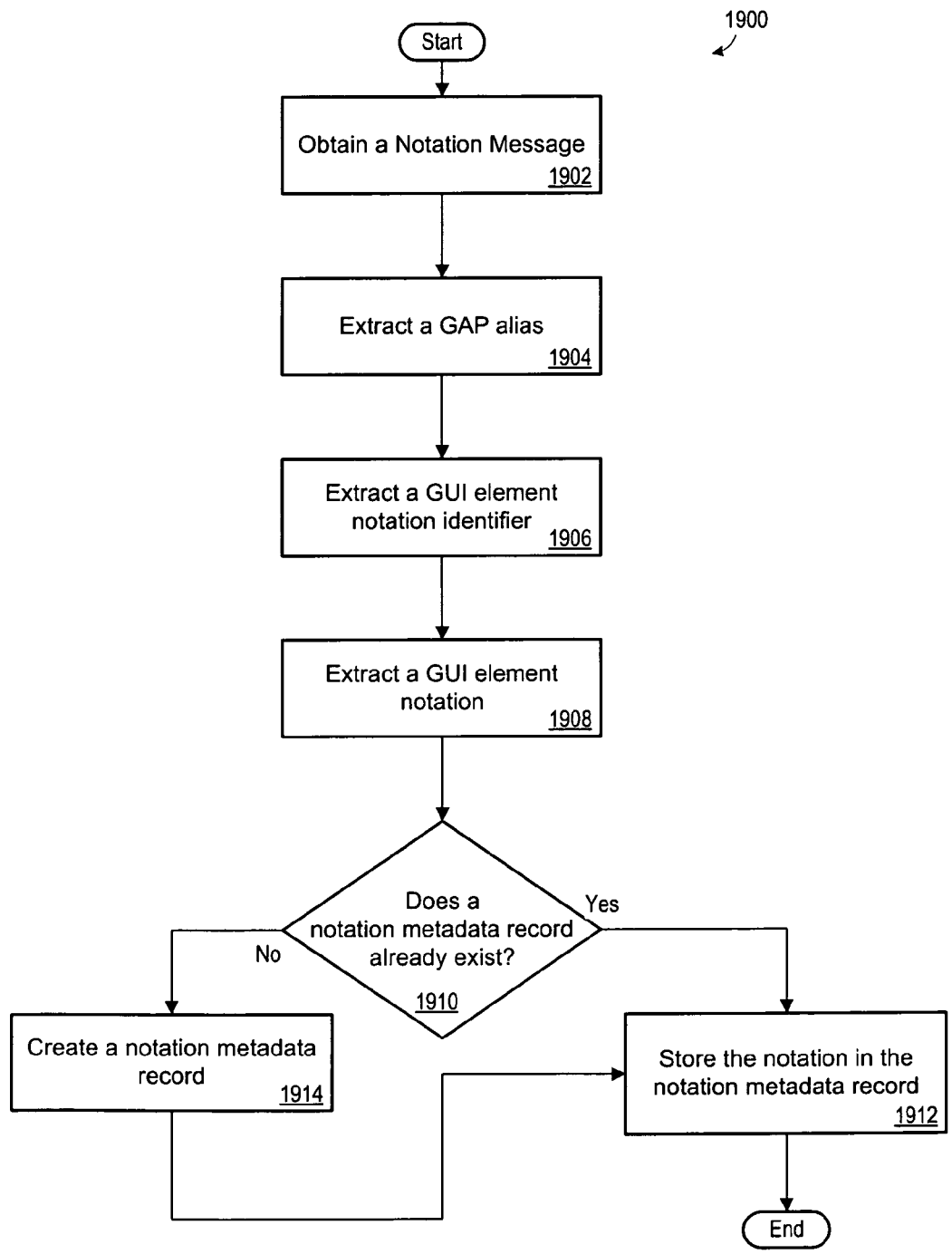
FIG. 19 shows a flow diagram of notation processing.

FIG. 19 shows a flow diagram 1900 of notation processing that may be performed by notation processing logic 1222. The notation processing logic 1222 may first obtain a notation message (1902). The notation message may be in the format shown for the GUI element notation message 1424. The notation processing logic 1222 may then extract a GAP alias from the notation message (1904). The GAP alias may be delimited in an XML statement as illustrated by the GAP alias 1430. The notation processing logic 1222 may then extract a GUI element identifier from the notation message (1906). The GUI element identifier may be delimited in an XML statement as illustrated by the GUI element identifier 1432. The notation processing logic 1222 may then extract a GUI notation from the notation message (1908). The GUI notation may be delimited in an XML statement as illustrated by the GUI notation 1434.

The notation processing logic 1222 may then determine whether there already exists a notation metadata record corresponding to the GAP alias and GUI element identifier extracted from the notation message (1910). If a notation metadata record already does exist for the GAP alias and GUI element identifier, then the notation processing logic 1222 can store the GUI notation in the notation metadata record (1912) before terminating. The notation processing logic 1222 may store the GUI notation by overwriting an already existing GUI notation, storing the GUI notation in a blank GUI notation field, displaying a prompt before overwriting an existing notation, appending the notation with an existing notation, or using any other suitable form of resolving conflicts before storing data. If a notation metadata record does not already exist for the GAP alias and the GUI element identifier, then the notation processing logic 1222 may create a notation metadata record for the GAP alias and the GUI element identifier (1914). The notation processing logic 1222 may then store the GUI notation in the notation metadata record (1912) before terminating.

Figure 20:
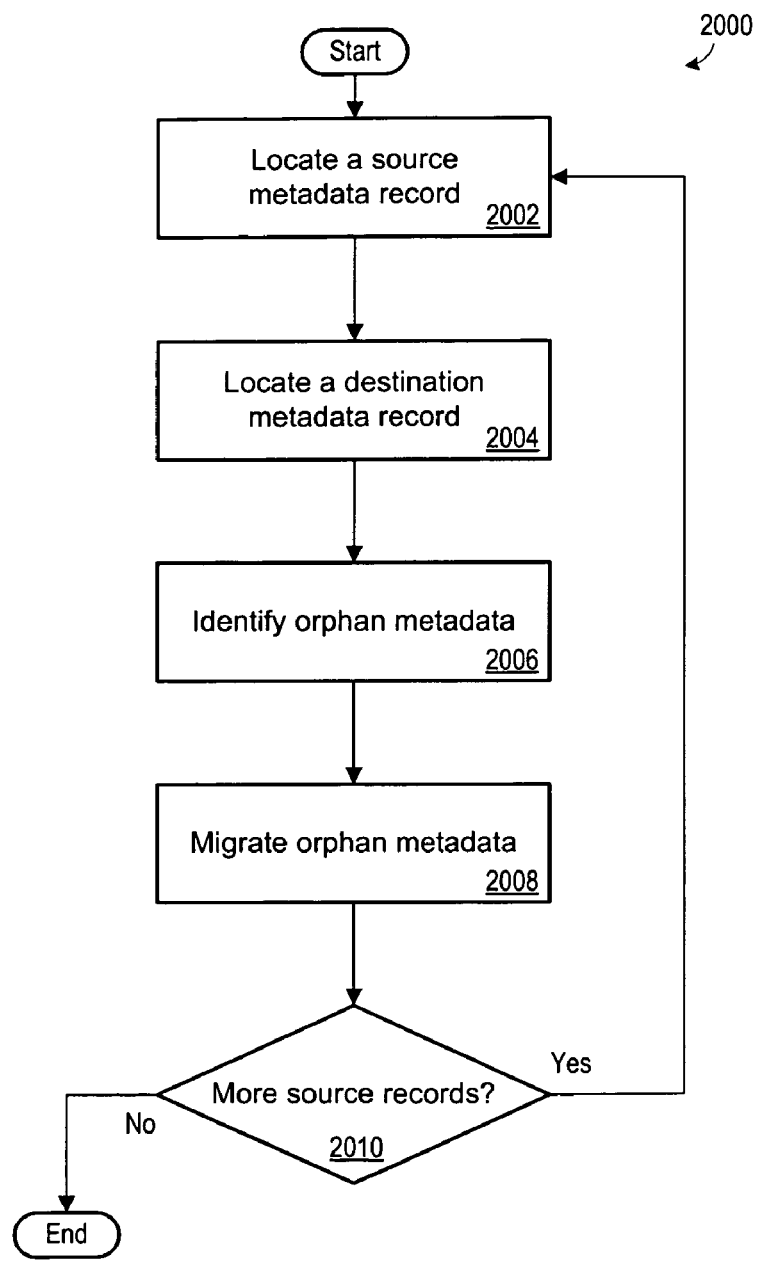
FIG. 20 shows a flow diagram of metadata migration processing.

FIG. 20 shows a flow diagram 2000 of metadata migration processing that the metadata migration logic 1224 may perform. The metadata migration logic 1224 may locate a source metadata record (2002). The metadata migration logic 1224 may then locate a destination metadata record (2004). The metadata migration logic 1224 may then identify orphan metadata (2006). Orphan metadata may include metadata stored in a GUI element metadata record where the metadata is not also stored in another GUI element metadata record to which the first GUI element metadata record is mapped. Alternatively or additionally, orphan metadata may include metadata associated with a GUI element where the GUI element does not have a mapping to another GUI element. The metadata migrating logic 1224 may then migrate any orphan metadata (2008). The migration may occur automatically. Alternatively or additionally, the migration may occur after the display of a prompting message. If more source messages are available (2010), the metadata migrating logic 1224 may then cycle back and obtain the next source record (2002). If no more source records are available (2010), then the metadata migration logic 1224 may cease.

Figure 21:
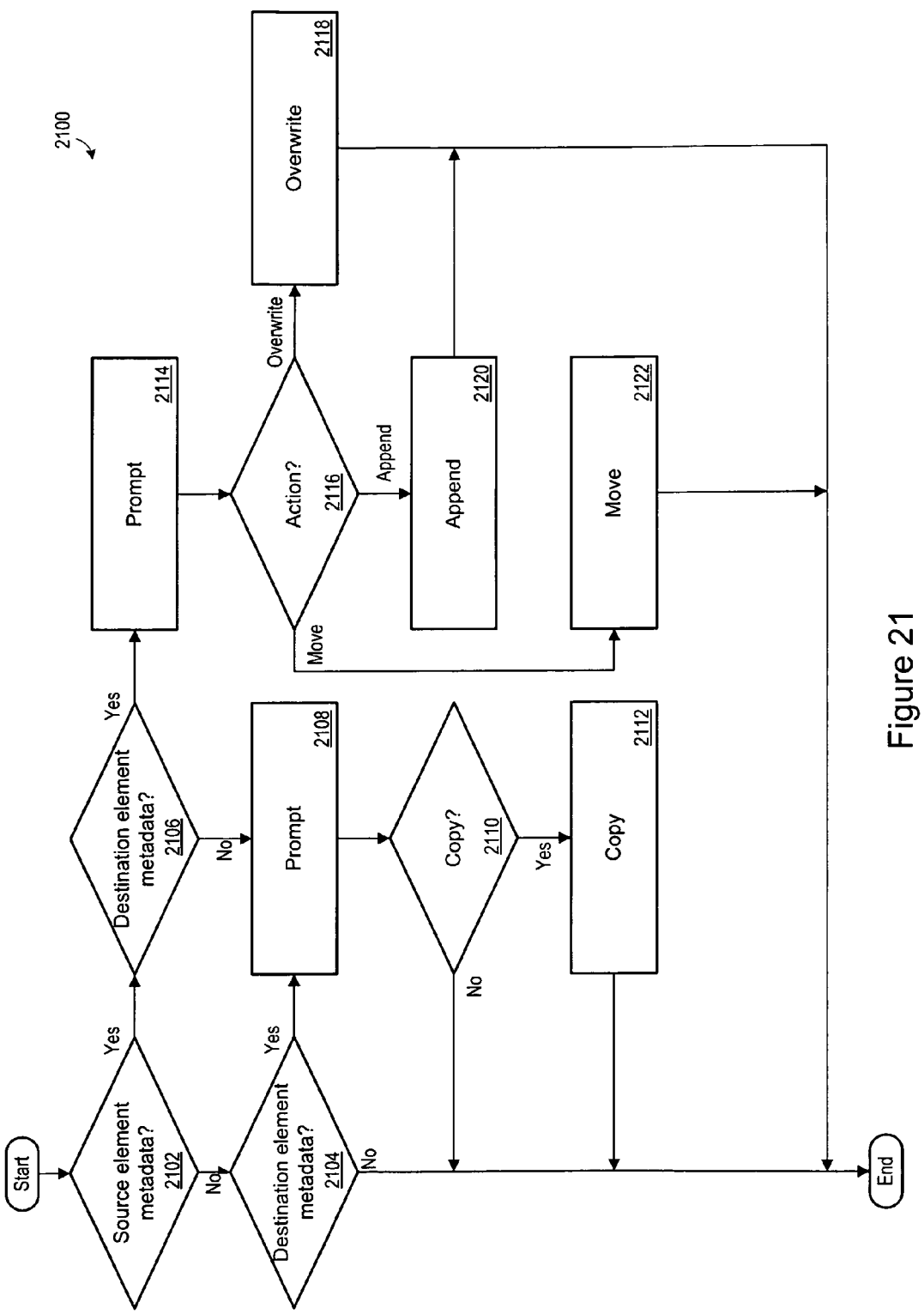
FIG. 21 shows a flow diagram of metadata migration processing.

FIG. 21 shows a flow diagram 2100 of metadata migration processing that may be performed by metadata migration logic 1224. The metadata migration logic 1224 may, for example, execute the processing during a mapping process, such as mapping processes 800 and 1800. This metadata migration processing may assist in moving all of the existing metadata or any overlooked metadata from one GAP to another or one GAP version to another.

The metadata migration logic 1224 may first determine whether the source GUI element has metadata associated with it (2102). For example, the metadata migration logic 1224 may use a source GAP alias and a source GUI element identifier to locate a source GUI element metadata record. Then the metadata migration logic 1224 may search within that source GUI element metadata record for any relevant metadata fields, such as a type field 1326, notation field 1328, or other metadata field 1332. If the metadata migration logic 1224 determines that the source GUI element does not have relevant metadata associated with it, the metadata migration logic 1224 may then determine whether the destination GUI element has metadata associated with it (2104). This determination may be performed in a manner similar to determining whether the source GUI element had metadata associated with it (2102). If the metadata migration logic 1224 determines that the destination GUI element does not have relevant metadata associated with it, the logic may terminate.

If the metadata migration logic 1224 determines that a source GUI element has metadata associated with it, the metadata migration logic 1224 determines whether a destination GUI element has metadata associated with it (2106). This determination may be performed in a manner similar to determining whether the source GUI element had metadata associated with it (2102). If the metadata migration logic 1224 determines that the destination GUI element does not have metadata associated with it, the metadata migration logic 1224 may provide a prompt for further processing instructions (2108). The prompt may ask for instructions on whether to copy metadata from the GUI element with the metadata to the GUI element record without the metadata (2110). If the response to the prompt is 'no', then the logic may terminate. If the response to the prompt is 'yes', then the logic may perform the copy process (2112) before terminating. A similar process occurs where a source GUI element does not have metadata, but a destination GUI element does.

If the metadata migration logic 1224 determines that both a source GUI element and a destination GUI element each have metadata associated with them, the metadata migration logic 1224 may provide a prompt for further processing instructions (2114). For example, the prompt may include options for Overwriting one of the sets of metadata with the other, Appending one set of metadata with the other (or optionally, append each set of metadata to the other), or Moving one set of metadata to a completely different GUI element metadata record (2116). If the response to the prompt includes Overwriting one of the sets of metadata with the other, then the metadata migration logic 1224 may perform the overwrite process (2118) before terminating. If the response to the prompt includes Appending one set of metadata to the other, then the metadata migration logic 1224 may perform the appending process (2120) before terminating. If the response to the prompt includes Moving one set of metadata, the metadata migration logic 1224 may perform the move process (2122) before terminating. Alternatively or additionally, the metadata migration logic 1224 may perform the move process (2122) and then provide another prompt for a continued action, such as copying one set of metadata into the metadata record vacated by the move process, similar to the copy prompt (2110).

Figure 22:
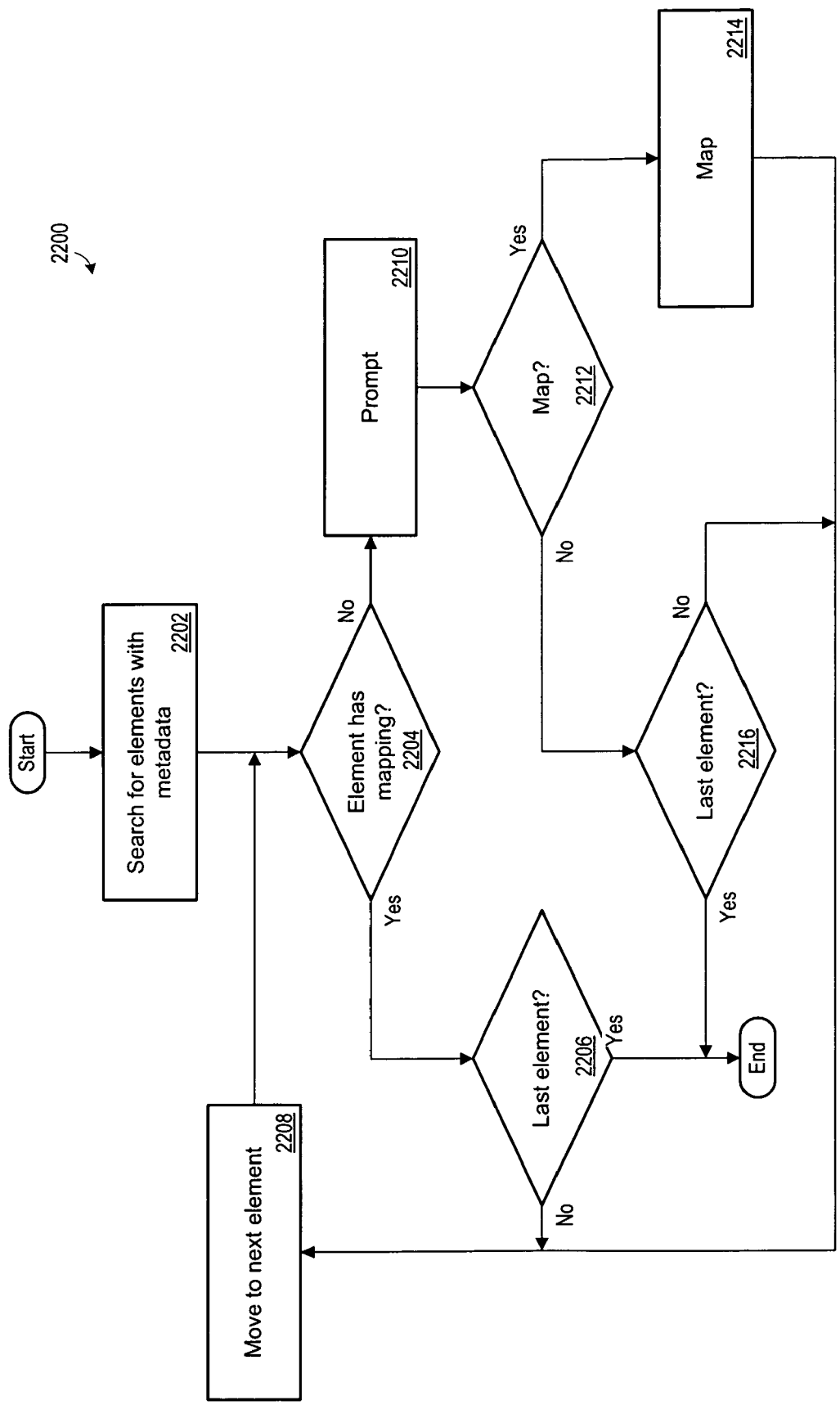
FIG. 22 shows a flow diagram of metadata migration processing.

FIG. 22 shows a flow diagram 2200 of metadata migration processing that may be performed by metadata migration logic 1224. The metadata migration logic 1224 may first search for GUI elements that have metadata associated with them (2202). For example, this search may be performed by accessing a GAP or GAP version metadata record and accessing each GUI element metadata record stored with that record. Alternatively or additionally, the metadata migration logic 1224 may look up a list of GAPs or GAP versions along with associated GUI element identifiers and access the GUI element metadata records for each of the GUI element identifiers individually. Alternatively or additionally, the metadata migration logic 1224 may perform a depth-first, breadth-first, or other search technique to access all the GUI element metadata records within a metadata repository. Once the metadata migration logic 1224 has acquired a GUI element, it may determine whether the GUI element has appropriate metadata in a manner similar to determining whether the source GUI element had metadata associated with it (2102).

Once the metadata migration logic 1224 has identified a GUI element with metadata associated with it, the metadata logic 1224 may determine whether the GUI element has a mapping associated with it (2204). For example, this determination may include looking at a GUI element mapping field 1330 within the GUI element metadata record. Alternatively or additionally, the determination may have been made by another logic process with the result from the metadata migration logic 1224 passed along with the identification of the GUI element.

If the metadata migration logic 1224 determines that the GUI element has a an associated mapping, the metadata migration logic 1224 may assume that another metadata migration logic process, such as the logic process 2100, has already migrated any relevant metadata, and thus next determine whether that GUI element was the last element that needed to be checked for metadata migration (2206). This determination may include looking at the next GAP or GAP version and associated GUI element identifier in a list. Alternatively or additionally, the determination may include looking at the next GUI element metadata record brought up in a depth-first, breadth-first, or other appropriate search algorithm. If the metadata migration logic 1224 determines that the GUI element was the last GUI element to process, then the metadata migration logic 1224 may terminate.

If the metadata migration logic 1224 determines that the GUI element was not the last GUI element to be processed, the metadata migration logic 1224 may move to the next GUI element (2208). This move may include accessing the next GAP or GAP version and associated GUI element identifier in a list. Alternatively or additionally, the move may include accessing the next GUI element metadata record brought up in a depth-first, breadth-first, or other appropriate search algorithm. After the move, the metadata migration logic 1224 may cycle back and determine whether the new GUI element has a mapping associated with it (2204).

If the metadata migration logic 1224 determines that a GUI element does not have a mapping associated with it, then the metadata migration logic 1224 may provide a prompt for further instructions (2210). The prompt may request further instructions as to whether to map the GUI element to another GUI element (2212). If the response to the prompt includes a 'yes', then the metadata migration logic 1224 may activate a mapping processing logic 1220 and terminate (2214). Alternatively or additionally, the metadata migration logic 1224 may activate a mapping processing logic 1220 and a metadata migration processing 2100 before terminating.

If the response to the prompt 1312 includes a 'no', then the metadata migration logic 1224 may determine whether that GUI element was the last element that needed to be checked for metadata migration (2216), similar to the check 2206. If the metadata migration logic 1224 determines that the GUI element was the last GUI element to process, then the metadata migration logic 1224 may terminate. If the metadata migration logic 1224 determines that the GUI element was not the last GUI element to be processed, the metadata migration logic 1224 may move to the next GUI element (2208).

FIG. 1 shows a graphical user interface (GUI) application comparator system ("system") 106. The system 106 may include a GUI model builder 154 and a GUI comparator 160. The GUI model builder 154 may accept a GUI application (GAP) version 'n' ("GAP Vn") 150 and create a GAP Vn GUI model 156. The GUI model builder 154 may also accept a GAP version 'n+1' ("GAP Vn+1") 152 and create a GAP Vn+1 GUI model 158. The GUI comparator 160 may accept the GAP Vn GUI model 156 and the GAP Vn+1 GUI model 158, as well as information received through the communication logic 163, to create a GUI difference model 162. The GUI difference model 162 may be sent to other systems through the communication logic 163. The GAP GUI models 156 and 158 may have a flat, tree, hierarchical, nested, or other type of structure. The GAP Vn 150 may be a current version of a particular GAP, while the GAP Vn+1 152 may be a subsequent version of the GAP. The GAP Vn GUI model 156 may provide a representation of the GUI structure of the current GAP version, while the GAP Vn+1 GUI model 158 may provide a representation of the GUI structure of the subsequent GAP version.

Figure 23:
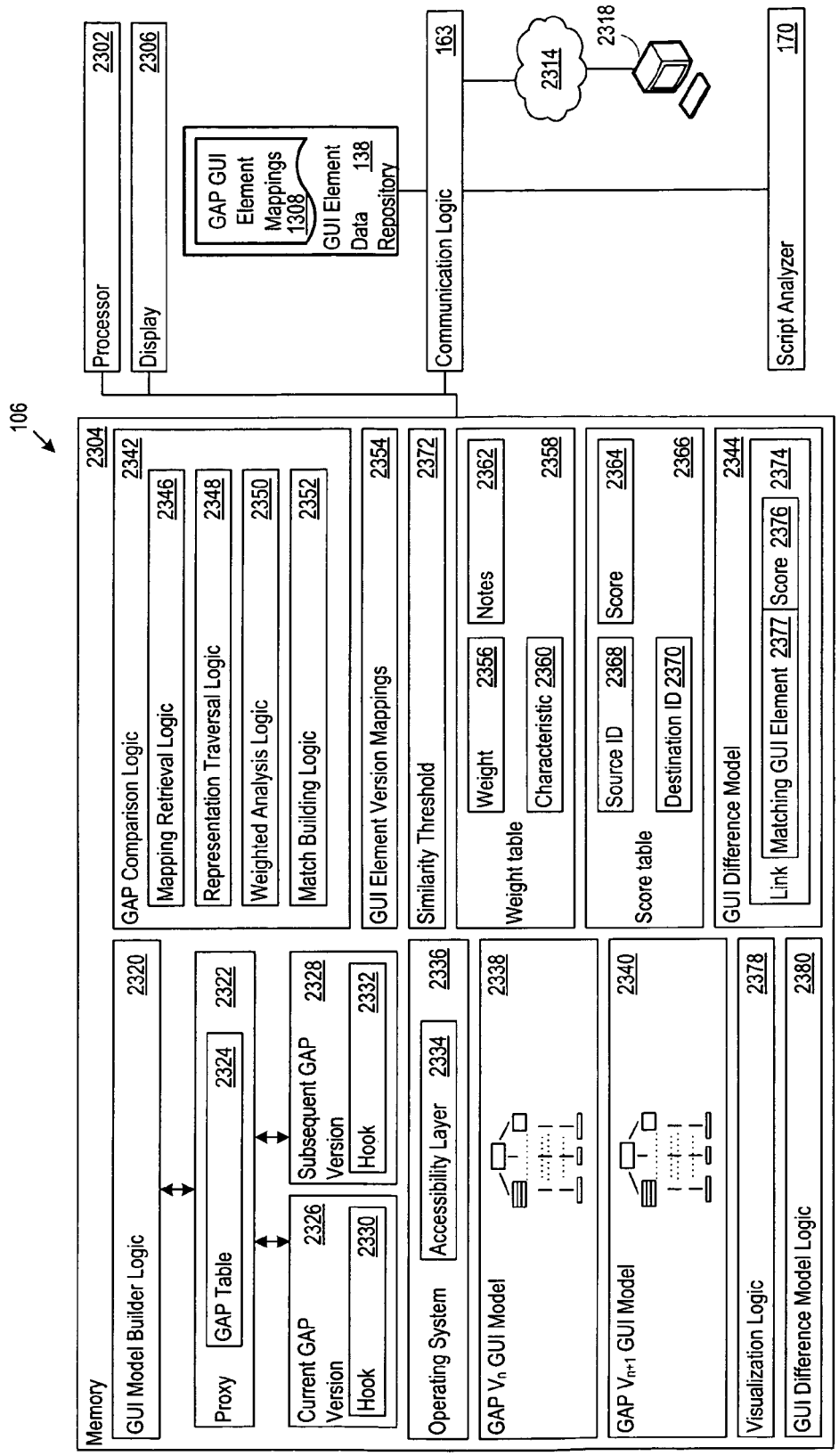
FIG. 23 shows a GAP comparator system.

FIG. 23 shows an implementation of the GUI application comparator system 106. The system 106 may include a processor 2302, a memory 2304, and a display 2306. The system 106 may exchange information with other systems, such as a GUI element data repository ("repository") 138, a script analyzer 170, and a network 2314 through a communication logic 163. The communication logic 163 may be a wired/wireless interface, inter-process communication mechanism, shared memory, web services interface, or any other types of communication interface. The repository 138 may include GAP GUI element mappings 1308. The network 2314 may connect to local or remote terminals 2318 for local or remote operator interaction with the system 106, to other processes running on other machines, or to other entities that interact with the system 106.

The memory 2304 may include GUI model builder logic 2320. The GUI model builder logic 2320 may communicate with a proxy 2322. The proxy 2322 may be stored in the memory 2304 and access a GAP table 2324. The proxy 2322 may communicate with GAPs, such as a current GAP version 2326 and a subsequent GAP version 2328. The current GAP version 2326 and subsequent GAP version 2328 may already reside in the memory 2304. Alternatively or additionally, the system 106 may request and receive the current GAP version 2326 and the subsequent GAP version 2328 through the communication logic 163, whereupon the current GAP version 2326 and the subsequent GAP version may be stored in the memory 2304.

The proxy 2322 may include logic that inserts the hooks 2330 and 2332 into a process space of the GAPs 2326 and 2328. The proxy 2322 may communicate with the hooks 2330 and 2332. In particular, the proxy 2322 may exchange messages with the hooks 2330 and 2332 to obtain the state of any or all of the GUI elements in the GAPs 2326 and 2328. The hooks 2330 and 2332 may be programs that respond to messages from the proxy 2322 and may interact through an accessibility layer 2334 of an operating system 2336 to discover and report information about the GUI elements in the GAPs 2326 and 2328 to the proxy. The accessibility layer 2334 may expose an accessibility interface through which the proxy 2322 and hooks 2330 and 2332 may invoke methods and set and retrieve GUI element values and characteristics, and thereby select, highlight, control, modify, assign identifiers for, or otherwise interact with the GUI elements in the GAPs.

The Microsoft™ Active Accessibility (MSAA) layer is one example of a suitable accessibility layer. In this regard, the GAPs 2326 and 2328 expose the accessibility interfaces that export methods for accessing and manipulating the properties and behavior of GUI elements. For example, the GAPs 2326 and 2328 may employ the IAccessible interface to allow access and control over the GUI element using MSAA application programming interface (API) calls. The IAccessible interface further facilitates applications to expose a tree of data nodes that make up each window in the user interface currently being interacted with. The GUI model builder logic 2320 and proxy 2322 may then include program statements to access and control the GUI element as if the GUI element was a conventional programming object. Accessibility API calls may include: perform actions on objects, get values from objects, set values on objects, navigate to objects, and set properties on objects, and other calls.

The proxy 2322 may be a daemon program and may start prior to the GUI model builder logic 2320. The proxy 2322 may be aware of one or more GAPs. When the proxy 2322 starts, it may load the GAP table 2324, which may include a predefined set of GAP entries for which the proxy 2322 is aware. A GAP entry may take the form:

<Alias, <File0, Path0, Dir0, CommandLine0>, <File1, Path1, Dir1, CommandLine1>> where Alias may be a unique pre-defined name for the GAP (e.g., a name generic to both the current GAP version 2326 and the subsequent GAP version 2328), File0 may be the name of the executable program for the current GAP version 2326, Path0 may be the absolute path to File0, Dir0 may be the absolute path to the directory from which File0 should execute, and CommandLine0 may specify command line arguments for File0. File1, Path1, Dir1, and CommandLine1 provide similar parameters for the subsequent GAP version 2328.

When the GUI model builder logic 2320 starts, it may connect to the proxy 2322. Once connected, the GUI model builder logic 2320 may request the GAP table 2324 by sending a GAP table request message to the proxy 2322. The proxy 2322 may respond by sending a GAP table response message including the GAP table 2324 to the GUI model builder logic 2320. An example message exchange is shown in Table 4:

TABLE 4

GAP table request message
<GetGapTable/>
GAP table response message
<GapTable>
<GAP Alias = "name"
    <V_N File="gap.exe" Path="c:\path\N" CommandLine="-c1"/>
    <V_N1 File="gap.exe" Path="c:\path\N1" CommandLine="-c1"/>
</GAP>
</GapTable>

The GUI model builder logic 2320 may then provide a list of GAPs from which an operator may choose. The operator may access the system 106 either locally through the display 2306 or remotely, e.g. through the terminal 2318. The GUI model builder logic 2320 may then create a GAP load message, e.g., <LoadGap Alias="name"/> and send the GAP load message to the proxy 2322 to start any selected GAP (which may then display its user interface). One GAP load message may cause the proxy 2322 to start multiple versions of a GAP identified together in the GAP table 2324 in the <GAP> section.

After starting the GAPs, the proxy 2322 may inject hooks into the GAPs' process space. The hook may connect to the proxy 2322 and send a confirmation message (e.g., <GAP File="gap.exe" Instance="192"/>). The proxy 2322 may send a success message (e.g., <Loaded Alias="name" VN="192" VN1="193"/>) to the GUI model builder logic 2320, thereby acknowledging that the GAPs are started successfully.

The GUI model builder logic 2320 may request the current state of each started GAP. In that regard, the GUI model builder logic 2320 may send a state request message (e.g., <GetState Alias="name"/>) to the proxy 2322. In turn, the proxy 2322 may locate the connection to the corresponding hooks of the GAPs and send a state request message (e.g., <GetState/>) to the hooks. The hooks may create a GAP state (including unique identifiers for GUI elements), such as a state tree, encode it (e.g., in XML format), and send it to the proxy 2322. The proxy 2322 may forward the GAP state to the GUI model builder logic 2320. An example GAP state message sent by the proxy 2322 is shown in Table 5.

TABLE 5

GAP state message

<State SeqNumber="1" Name="name" Alias="name" ProcessID="972">
    <GUIElement Alias="name">
        <Location x="15" y="200" width="23" height="98"/>
        <Description>Action</ Description>
        <DefAction>Action</DefAction>
        <UniqueID>0xcafebabe</UniqueID>
        <Class>LISTBOX</Class>
        <Values>
            <Value SeqNumber="1">someval</Value>
            ..........................
        </Values>
    </GUIElement>
    ...............
</State>

The GAP state contains information about the GUI elements composing a given screen, as well as the values of these elements and their assigned identifiers. The GAP state specifies the GAP GUI elements and the values of the GUI elements. In one implementation the GAP state is reflected in an eXtensible Markup Language (XML) structure where the element 'State' has one or more children elements 'GAP' whose children elements are in turn 'GUIElement's. For example, GUI elements may be either containers or basic. Container GUI elements contain other elements, while basic elements do not contain other elements. The XML structure reflects the containment hierarchy by allowing GUIElements to contain other GUIElements.

In the XML structure, the attribute SeqNumber may designate a unique sequence number of the state within the GAP. Since states are mapped to GUI screens, each state may be given a name which is specified by the optional attribute 'Name'. The attributes Alias and ProcessID may denote the alias of the GAP and its instance process identifier respectively. The instance process identifier may differentiate between the current GAP version and the subsequent GAP version.

The GUI model builder logic 2320 may construct GAP GUI models based on the GAP state messages received from the proxy 2322. For example, the GUI model builder logic 2320 may construct a GAP Vn GUI model 2338 from GAP state messages regarding the current GAP version 2326. Similarly, the GUI model builder logic 2320 may construct a GAP Vn+1 GUI model 2340 from GAP state messages regarding the subsequent GAP version 2328.

The processor 2302 may invoke GAP comparison logic 2342 stored in the memory 2304. The GAP comparison logic 2342 may compare two GAP GUI models, such as GAP GUI models 2338 and 2340, and produce a GUI difference model 2344. The GAP comparison logic 2342 may include mapping retrieval logic 2346, representation traversal logic 2348, weighted analysis logic 2350, and match building logic 2352.

The mapping retrieval logic 2346 may request particular GAP GUI element mappings from the GAP GUI element mappings 1308 in a GUI element data repository 138 and store the particular GAP GUI element mappings in the memory 2304 as GUI element version mappings 2354.

The representation traversal logic 2348 may traverse a GAP GUI model, such as GAP Vn GUI model 2338. For example, the representation traversal logic 2348 may determine the next node to visit in either of the GAP GUI models 2338 and 2340. Alternatively or additionally, the representation traversal logic 2348 may traverse all or parts of a GUI difference model, such as GUI difference model 2344. The next node to visit may be determined, as examples, in depth-first or breadth-first fashion.

The weighted analysis logic 2350 may use GUI characteristic weights 2356 obtained from a weight table 2358 to determine a similarity value between a GUI element within a first GAP GUI model, such as the GAP Vn GUI model 2338, and each GUI element within a second GAP GUI model, such as the GAP Vn+1 GUI model 2340. Different GUI characteristic weights 2356 may be assigned to the similarities or differences between different GUI element characteristics 2360 or properties that may be present or absent between the GUI elements in the two GAP GUI models. The GUI element characteristics 2360 may include GUI element characteristics such as size, XY position, color, window position, font type, font size, border style, background color, foreground color, Read-only/Read-Write, or any other GUI element characteristic. Alternatively or additionally, the GUI element characteristics 2360 may include an accessibility layer Role, Class, Style, Extended Style, number of Children, Level within a tree or hierarchy, Name of the GUI element, or other accessibility layer-assigned properties. The weight table may also include notes 2362 associated with the weights 2356 assigned to the GUI characteristics 2360 that may explain the rationale behind each weight value.

The weighted analysis logic 2350 may store a score 2364 in a score table 2366 based on each similarity value generated by the weighted analysis logic 2350. Each score 2364 in the score table 2366 may correspond with a source identifier 2368 and a destination identifier 2370. The source identifier 2368 and destination identifier 2370 may be a unique value or combination of values (e.g., including GAP aliases) identifying the GAPs and GUI elements that the weighted analysis logic 2350 compared to calculate each score 2364.

The match building logic 2352 may compare the similarity values generated by the weighted analysis logic 2350 and/or the scores 2364 stored in the score table 2366 against a similarity threshold 2372. This comparison may determine whether two GUI elements are sufficiently similar to be considered a match from the current GAP version to the subsequent GAP version. The match building logic 2352 may create a link between matching GUI elements in the GUI difference model 2344. The link may be stored in the GUI element representation within the GUI difference model 2344 as a GUI element link 2374 with an optional corresponding matching score 2376. The GUI element link may comprise an identifier of a second GUI element 2377. The identifier may be the source identifier 2368, the destination identifier 2370, or both.

In operation, the GAP comparison logic 2342 may obtain the GAP GUI models 2338 and 2340 by retrieving them from the memory 2304, by calling the GUI model builder logic 2320, or in another manner. The GAP comparison logic 2342 may create a base GUI difference model as a root node from which the GAP GUI models 2338 and 2340 descend in different branches from the root. The GAP comparison logic 2342 may then determine the next node to visit in each of the GAP GUI models using the representation traversal logic 2348.

The GAP comparison logic 2342 may initiate execution of the mapping retrieval logic 2346 to obtain GUI element version mappings available from external sources, such as the metadata repository 138. The GAP comparison logic 2342 may request all available GUI element version mappings, or may specifically request GUI element version mappings for the next node in the current GAP GUI model. If a GUI element version mapping is available for the next node in the current GAP GUI model, the GAP comparison logic 2342 may forgo execution of the weighted analysis logic 2350. Instead, the GAP comparison logic 2342 may employ the match building logic to write a GUI element link into the base GUI difference model. As another alternative, when a GUI element version mapping is available, the GAP comparison logic 2342 may create a corresponding entry in the score table 2366 based on the information available in the GUI element version mapping.

However, the GUI comparison logic 2342 need not forgo the weighted analysis when a GUI element version mapping exists. Instead, the GAP comparison logic 2342 may decide whether to proceed with the weighted mapping based on the confidence level provided in the GUI element version mapping. For example, when the confidence level exceeds a confidence threshold, the GAP comparison logic 2342 may forgo execution of the weighted analysis. As another example, when the confidence level specifies manual mapping, the GAP comparison logic 2342 may forgo execution of the weighted analysis.

The GAP comparison logic 2342 uses the weighed analysis logic 2350 to determine similarity values between each GUI element in the current GAP GUI model 2338 and each element in the subsequent GAP GUI model 2340. The weighted analysis logic 2350 is described in more detail below. The weighted analysis logic records the similarity values in the weight table 2358 as scores. The scores may be the similarity values, normalized similarity values, or based in some other way on the similarity values.

Having determined the similarity values, the GAP comparison logic 2342 may use the match building logic 2352 to determine whether GUI elements match between GAP versions. To that end, the match building logic 2352 may compare the scores in the score table against the similarity threshold 2372. GUI elements with scores that exceed the similarity threshold 2372 may be considered matches under the assumption that the higher the similarity score, the more likely they refer to corresponding GUI elements. The match building logic 2352 may create GUI element links in the base GUI difference model when matches are determined.

FIG. 24 shows an example of a portion 2400 of a current GAP GUI model. The portion 2400 uses an XML representation, but any other representation may be used instead. The portion 2400 includes a GAP alias 2402 ("University Directory0"), a GUI element identifier 2404 ("0x90b52"), and GUI characteristics 2406. The GUI characteristics 2406 include a location with an x value of "173", a y value of "486", a width value of "336", and a height value of "274". Further GUI characteristics 2406 include a class value of "WindowsForms10.LISTBOX.app4", a style value of "0x560100c1", and an extended style value of "0xc0000a00".

FIG. 25 shows an example of a corresponding portion 2500 of a subsequent GAP GUI model using an XML representation. The corresponding portion 2500 includes a GAP alias 2502 ("University Directory1"), a GUI element identifier 2504 ("0x90e66"), and GUI characteristics 2506. The GUI characteristics 2506 include a location with an x value of "248", a y value of "653", a width value of "299", and a height value of "24". Further GUI characteristics 2506 include a class value of "WindowsForms10.COMBOBOX.app.0.378734a", a style value of "0x560100242", and an extended style value of "0xc0000800".

The GUI element with identifier 2504 is a modified version of the GUI element with identifier 2404. In other words, when the programmer designed the subsequent GAP version, the programmer modified the GUI element with identifier 2404 to obtain the GUI element with identifier 2504. In particular, FIGS. 24 and 25 show that the following changes have been made: the style changed from "0x560100c1" to "0x560100242" and the extended style changed from "0xc0000a00" to "0xc0000800". These differences in GUI element characteristics are not readily discernible to test script writers. However, other changes may be discernable to a programmer, such as the class change from "WindowsForms10.LISTBOX.app4" to "WindowsForms10.COMBOBOX.app.0.378734a".

FIG. 26 shows an example of a difference portion 2600 of a GUI difference model. The difference portion 2600 may include a current version section 2602 including GUI element information drawn from the current GAP GUI model (e.g., parts of portion 2400) and a corresponding subsequent version section 2604 including GUI element information drawn from the subsequent GAP GUI model (e.g., parts of corresponding portion 2500). The sections 2602 and 2604 may be separated by a first version element 2606 and a second version element 2608. In this example, the first version element 2606 has a value of "0", while the second version element 2608 has a value of "1". The "0" version element value may indicate that the section originated from a current GAP GUI model, where the "1" version element value may indicate that the section originated from a subsequent GAP GUI model.

The GUI difference model 2344 may be in a flat configuration, where the GUI difference model 2344 includes a single section 2602 and a single corresponding section 2604. Alternatively or additionally, the GUI difference model 2344 may be in a tree, hierarchical, or nested configuration, where the GUI difference model 2344 includes multiple sections 2602 and multiple corresponding sections 2604. In the tree, hierarchical, or nested configuration, similar GUI elements may be represented by a single node. Alternatively or additionally, similar GUI elements may be represented in separate nodes. The GUI difference model 2344 may include all of the GUI elements of both of the GAP GUI models. Alternatively, the GUI difference model 2344 may include only the elements of the second GAP GUI model and the corresponding portions of the first GAP GUI model. The GUI difference model 2344 may be formed based on a bi-simulation algorithm as described in more detail below.

The GAP comparison logic 2342 may create the difference portion 2600 in the format presented in FIG. 26 when it combines the source GAP GUI model with the destination GAP GUI model under a root node. Alternatively or additionally, the GAP comparison logic 2342 may create the difference portion 2600 after the mapping retrieval logic 2346 obtains a relevant mapping between the GUI element represented in the current version section 2602 and the subsequent version section 2604. Alternatively or additionally, the GAP comparison logic 2342 may create the difference portion 2600 after the match building logic 2352 creates a link between the current version section 2602 and subsequent version section 2604.

Figure 27:
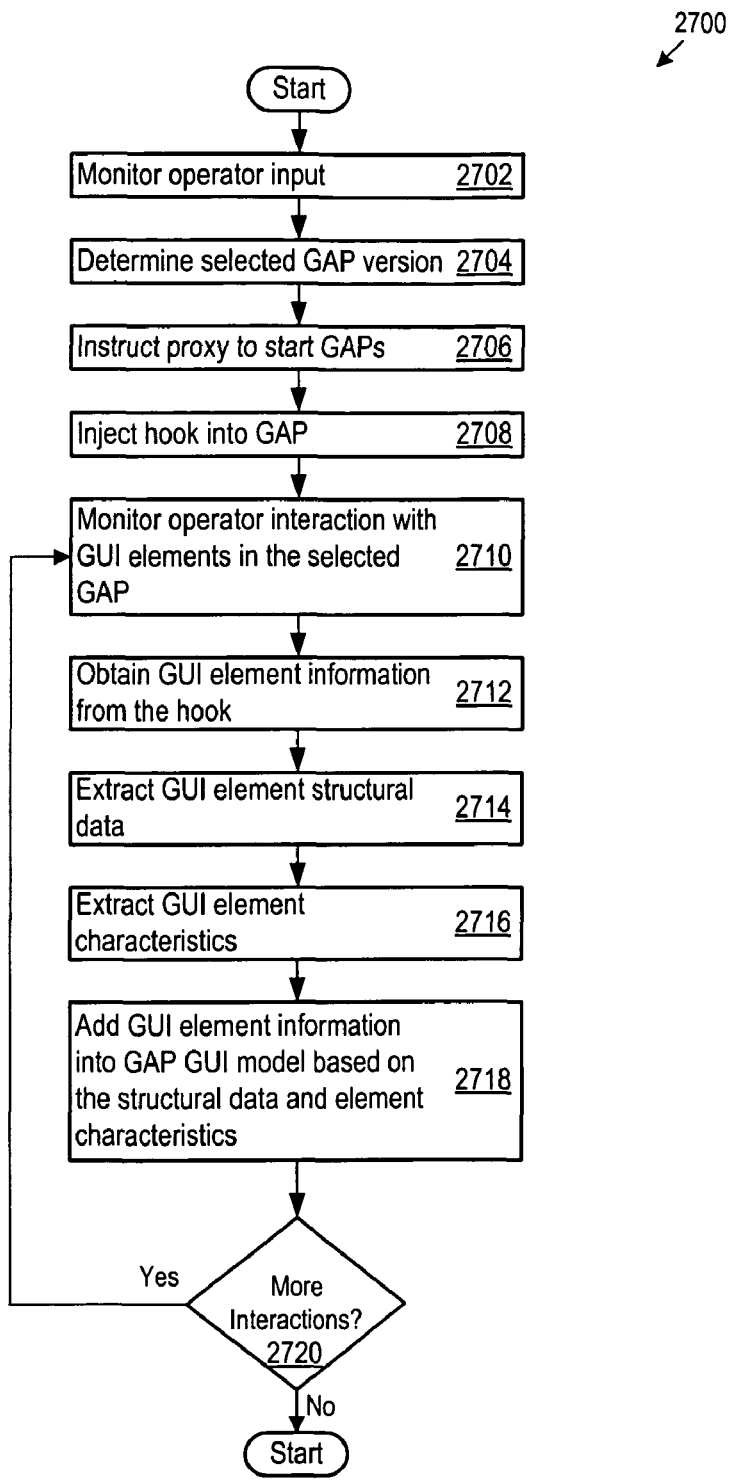
FIG. 27 shows a flow diagram for GUI model builder logic.

FIG. 27 shows a flow diagram 2700 for the GUI model builder logic 2320. The GUI model builder logic 2320 may display a list of GAPs to choose from to the operator. As noted above, the list of GAPs may be established in the GAP table 2324. The GUI model builder logic 2320 monitors for operator input (2702) to select a GAP. The GUI model builder logic 2320 thereby determines a selected GAP version (2704).

The GUI model builder logic 2320 may then create a GAP load message, e.g., <LoadGap Alias="name"/> and send the GAP load message to the proxy 2322 to start the selected GAP version, which may then display its GUI (2706). After starting the GAP, the proxy 2322 may inject a hook into the GAP's process space (2708). The hook may connect to the proxy 2322 and send a confirmation message (e.g., <GAP File="gap.exe" Instance="192"/>). The proxy 2322 may send a success message (e.g., <Loaded Alias="name" VN="192" VN1="193"/>) to the GUI model builder logic 2320, thereby acknowledging that the GAP is started successfully.

The accessibility layer, proxy, hook, and GUI model builder logic 2320 monitor operator interaction with GUI elements in the selected GAP version (2710). The GUI model builder logic 2320 may send a state request message (e.g., <GetState Alias="name"/>) to the proxy 2322 to obtain GUI element information from the hook (2712). In turn, the proxy 2322 may locate the connection to the corresponding hook in the selected GAP version and send a state request message (e.g., <GetState/>) to the hook. The hook may create a GAP state (including unique identifiers for GUI elements), such as a state tree, encode it (e.g., in XML format), and send it to the proxy 2322. The proxy 2322 may forward the GAP state to the GUI model builder logic 2320. The GUI element information may be returned to the GUI model builder logic 2320 one screen at a time, one GUI element at a time, an entire application at a time, or at some other discrete segmentation of the GAP.

The purpose of monitoring operating interaction with the GAP is to allow the GUI model builder logic 2320 to record the structures of the screens and operator actions on the GAPs. The GUI model builder logic 2320 intercepts operator events using the accessibility layer. Through these events, the GUI model builder logic 2320 records the sequence of screens that the operator navigates through, as well as the actions that the operator performs on GUI elements. When recording the sequence of screens, the GUI model builder logic 2320 obtains information about the structure of the GAP and the properties of the individual GUI elements using the accessibility-enabled interfaces. Accordingly, the GUI model builder logic 2320 extracts GUI element structural data (2714) and GUI element characteristics (2716) from the information returned by the accessibility layer. The GUI model builder logic 2320 uses the GUI element structural data and GUI element characteristics to add GUI element information into a GAP GUI model (2718), e.g., on an element by element, screen by screen, or other incremental basis. The GUI model builder logic 2320 may continue to build the GAP GUI model until the operator stops interacting with the selected GAP (2720).

The GAP GUI model that results may be a full or partial capture of the entire GAP GUI structure. Thus, when the operator is interested in comparing specific pieces of a GUI between two GAPs, the operator may exercise only those pieces of interest. The GUI model builder logic 2320 captures the specific pieces in a GAP GUI model specific to the pieces that the operator exercised, rather than every aspect of every GUI element in the entire selected GAP. The operator may run both the current GAP version 2326 and subsequent GAP version 2328 with the GUI model builder logic 2320 to create the GAP Vn GUI model 2338 and the GAP Vn+1 GUI model 2340, respectively.

Figure 28:
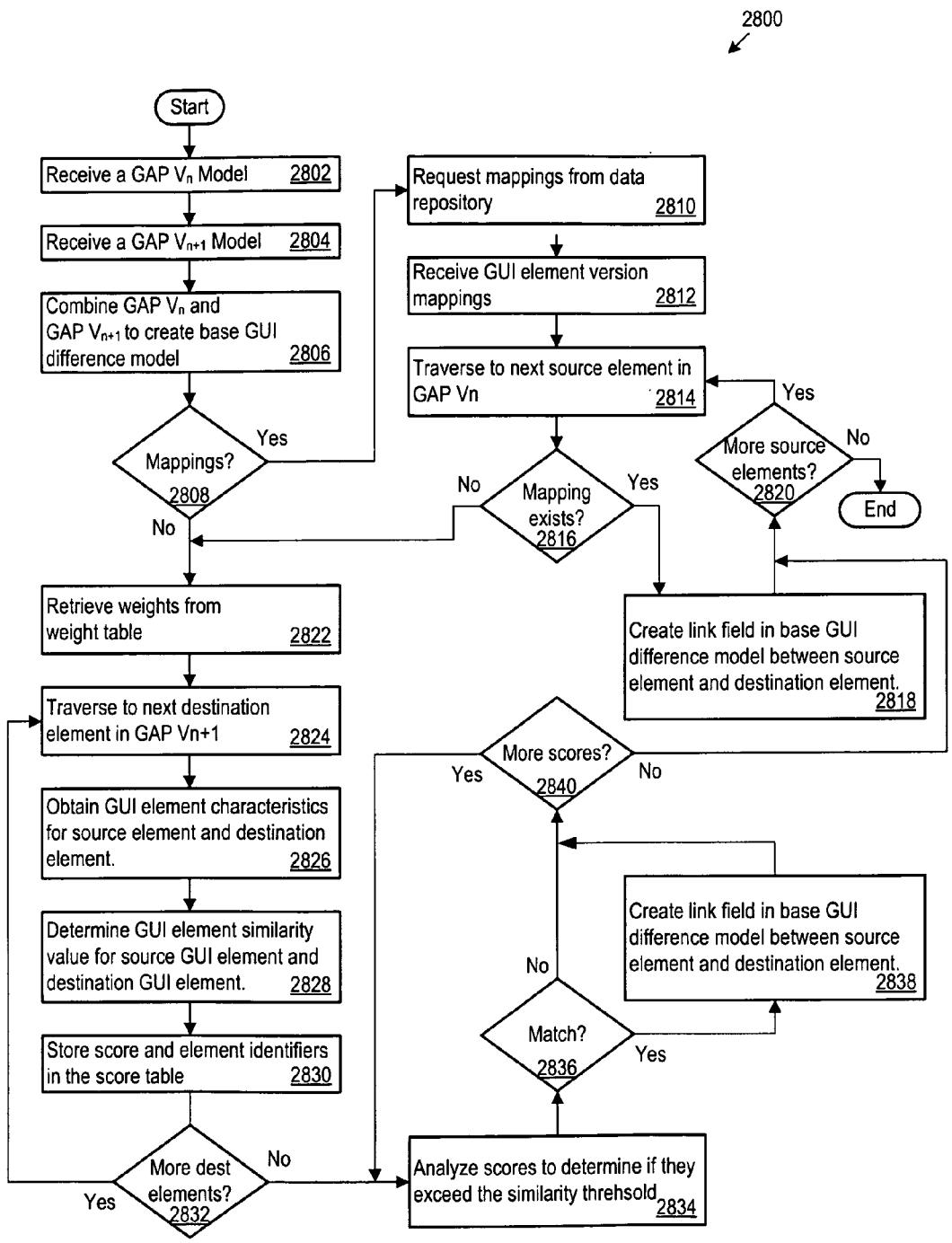
FIG. 28 shows a flow diagram for GAP comparison logic.

FIG. 28 shows a flow diagram 2800 for a GAP comparison logic, such as GAP comparison logic 2342. The GAP comparison logic 2342 may receive a first GAP GUI model (2802). For example, the GAP comparison logic 2342 may access the GAP Vn GUI model 2338 stored in the memory 2304. The GAP comparison logic 2342 may receive a second GAP GUI model (2804). For example, the GAP comparison logic 2342 may access the GAP Vn+1 GUI model 2340 stored in the memory 2304. Alternatively or additionally, the GAP comparison logic 2342 may request and receive a first and second GAP GUI model from the communication logic 163.

The GAP comparison logic 2342 may then combine the first GAP GUI model and the second GAP GUI model to create a base GUI difference model (2806). The first and second GAP GUI models may be combined in a flat configuration. Alternatively or additionally, the first and second GAP GUI models may be combined in a tree, hierarchical, or nested configuration.

The GAP comparison logic 2342 may then invoke the mapping retrieval logic 2346. The mapping retrieval logic 2346 may determine whether GUI element version mappings are available for the first GAP GUI model and the second GAP GUI model (2808). This determination may be performed by querying a local source, such as the memory 2304, for the GUI element version mappings. Alternatively or additionally, the mapping retrieval logic 2346 may query a GUI element data repository 138 via the communication logic 163.

If the mapping retrieval logic 2346 determines that GUI element version mappings are available, then the mapping retrieval logic 2346 may request those GUI element version mappings (2810). The request may be made to a local source, such as the memory 2304. Alternatively or additionally, the request may be made to a GUI element data repository 138 via the communication logic 163. The request may be for specific mappings, such as for GUI element version mappings relevant for the next node. Alternatively, the request may be for all available GUI element version mappings. The mapping retrieval logic 2346 may receive the GUI element version mappings in response to the request (2812).

Alternatively or additionally, the determination of whether GUI element version mappings are available, the request, and the response may be combined into fewer actions. For example, the mapping retrieval logic 2346 may just request the mappings. A response of GUI element version mappings may confirm that the mappings are available, while a negative or null response may confirm that the mappings are not available.

The mapping retrieval logic 2346 may then return, and the GAP comparison logic 2342 may then invoke the representation traversal logic 2348. The representation traversal logic 2348 may traverse to the next GUI element, i.e. a source GUI element, from the first GAP GUI model (2814). In the case where the base GUI difference model is newly created, the traversal may be to the first GUI element. The traversal may be performed based on the first GAP GUI model. Alternatively or additionally, the traversal may be performed based on the representation of the first GAP GUI model within the base GUI difference model. The next node to visit may be determined, as examples, in depth-first or breadth-first fashion.

The GAP comparison logic 2342 may then determine whether a GUI version mapping exists for the GUI element (2816). The GAP comparison logic 2342 may search within the retrieved GUI element version mappings to determine whether the mapping exists. If a mapping exists, then the GAP comparison logic 2342 may create a link field in the base GUI difference model (2818). The link field may include a GUI element identifier, such as a source GUI element identifier or a destination GUI element identifier. The link field may also include a GAP alias. The GAP comparison logic 2342 may create a link field for just the source GUI element.

Alternatively or additionally, the GAP comparison logic may create a link field for the destination GUI element.

The representation traversal logic 2348 may then determine whether more source GUI elements are available (2820). If more source GUI elements have not yet been traversed, then the representation traversal logic 2348 cycles back and traverses to the next available source GUI element (2814). If no source GUI elements are available, the GAP comparison logic 2342 may terminate.

If either no GUI element version mappings exist or the mappings exist, but no mappings exist for the source GUI element, then the GAP comparison logic 2342 may invoke the weighted analysis logic 2350. The weighted analysis logic 2350 may retrieve weights from a weight table (2822). For example, the weighted analysis logic 2350 may retrieve the weights from a weight table in the memory 2304. Alternatively or additionally, the weighted analysis logic 2350 may request and receive a weight table from the communication logic 163.

The representation traversal logic 2348 may then traverse to the next GUI element, i.e. a destination GUI element, in the second GAP GUI model (2824). In the case where no previous traversals in the second GAP GUI model have been made for a given source GUI element, then the representation traversal logic 2348 may traverse to the first GUI element in the second GAP GUI model. The traversal may be performed based on the second GAP GUI model. Alternatively or additionally, the traversal may be performed based on the representation of the second GAP GUI model within the base GUI difference model. The traversal may be performed using a depth-first, breadth-first, or other traversal technique.

The weighted analysis logic 2350 may then obtain GUI element characteristics for the source GUI element and the destination GUI element (2826). The GUI element characteristics may include GUI element characteristics such as size, XY position, color, window position, font type, font size, border style, background color, foreground color, Read-only/Read-Write, or any other GUI element characteristic. Alternatively or additionally, the GUI element characteristics may include an accessibility layer Role, HWND, Class, Style, Extended Style, number of Children, Level within a tree or hierarchy, Name of the GUI element, or other accessibility layer-assigned properties. These GUI element characteristics may be obtained from the first and second GAP GUI model. Alternatively or additionally, the GUI element characteristics may be obtained from the base GUI difference model.

The weighed analysis logic 2350 may then determine a GUI element similarity value for the source GUI element and the destination GUI element (2828). The similarity value may be determined according to the following formula:

$$V_s = \sum_{i=1}^{N} W_i \cdot P_i$$

where $V_s$ is the similarity value, N is the number of characteristics or properties against which the similarity is being measured, $P_i$ is a value assigned to the differences between each property or characteristic, and $W_i$ is the corresponding weight for each property $P_i$. As one example:

$$V_s = W_R \cdot \text{Role}$$

where Role may be either 0 or 1 depending on whether the Role characteristics between the two GUI elements are different or the same, respectively, and $W_R$ may be the corresponding weight for the Role. The weight for the Role may be assigned a value indicative of the importance of the Role matching between GUI elements. For example, the weight of the Role may be very large in relation to the weight for other characteristics.

As another example:

$$V_s = W_R \cdot \text{Role} + W_c \cdot \text{Class}$$

where Class may be a count of how many terms in the Class property match, divided by the total number of terms in the Class property, and $W_c$ may be the corresponding weight for the Class. For example, a Class characteristic for a GUI element may be "WindowsForms10.LISTBOX.app4". If the Class characteristic for a corresponding GUI element is "WindowsForms10.COMBOBOX.app.0.378734a", then because the characteristics only match to a single place out of three or five places, the Class value may be either "⅓" or "⅕".

The GAP comparison logic 2342 may then store in a score table a score based on the similarity value (2830). Alternatively or additionally, the GAP comparison logic 2342 may store the GUI element identifiers for the source GUI element and the destination GUI element along with the score in the score table. The score table may reside in the memory 2304.

The GAP comparison logic 2342 may then determine whether the representation traversal logic 2348 has completed traversing the second GAP GUI model (2832). If the representation traversal logic 2348 still has more destination GUI elements to traverse, then the representation traversal logic 2348 cycles back to traversing to the next destination element (2824). If the representation traversal logic 2348 has completed traversing the destination GUI elements, the GAP comparison logic 2342 may invoke the match building logic 2352.

The match building logic 2352 may analyze either the similarity values determined by the weighted analysis logic 2350 or the scores stored in the score table (2834). The match building logic 2352 may compare the values or scores against a similarity threshold to determine whether values or scores meet and/or exceed the similarity threshold. Alternatively or additionally, the values or scores may be compared against a difference threshold to determine whether the values or scores are at and/or below a difference threshold.

The match building logic 2352 may determine whether the GUI elements match (2836). This determination may occur when the values or scores exceed the similarity threshold. Alternatively or additionally, this determination may occur when the values or scores are not below a difference threshold.

If a match exists, then the GAP comparison logic 2342 may create a link field in the base GUI difference model (2838). The link field may include a GUI element identifier, such as a source GUI element identifier or a destination GUI element identifier. The link field may also include a GAP alias. The GAP comparison logic 2342 may create a link field for just the source GUI element. Alternatively or additionally, the GAP comparison logic may create a link field for the destination GUI element.

After the GAP comparison logic 2342 creates a link field, or if no match exists, then the match building logic 2352 may determine whether more scores or similarity values need to be analyzed (2840). This determination may depend on whether the score table still includes scores that have not been analyzed. If the GAP comparison logic 2342 determines that more scores need to be analyzed, the match building logic 2352 cycles back to analyzing the next score in the score table (2834). If no unanalyzed scores exist in the score table, the match building logic 2352 may return, and the GAP comparison logic 2342 may cycle back to determining whether any more source GUI elements remain (2820). Alternatively or additionally, the GAP comparison logic 2342 may communicate any link fields created by the match building logic 2352 to the GUI element data repository for storage as a GAP GUI element version mapping. The communication may use a GUI element version mapping message format as described in FIG. 6.

In another implementation, the GAP comparison logic 2342 may execute a schema comparison to determine differences between the current GAP GUI and the subsequent GAP GUI. Given a schema representation (e.g., an XML schema representation) of the current GAP GUI and the subsequent GAP GUI, the GAP comparison logic 2342 may compare the respective schemas. If these schemas are "equal", then the current GAP version and subsequent GAP version are the same. Otherwise, the current GAP version and the subsequent GAP version are different, and the GAP comparison logic 2342 finds the differences.

For example, the XML schemas may be recorded in the XML format and each schema may have the root specified with the <schema> element. Data elements may be specified with the <element> and with the <attribute> tags. Each data element may be defined by its name and its type. Elements may be either of simple or complex types. Complex element types support nested elements while simple types are attributes and elements of basic types.

Extending the example, elements may have two kinds of constraints. First, values of elements may be constrained. The second kind of constraints specifies bounds on the number of times that a specific element may occur as a child of an element. These bounds are specified with the minOccurs and maxOccurs attributes of the <element> tag to represent the minimum and maximum number of occurrences. Elements may be grouped in a sequence if they are children of the same parent element. Attributes of the same element may also be grouped in a sequence. Each element or attribute in a sequence may be assigned a unique positive integer sequence number. This number may be used to access elements or attributes instead of using their names.

Schemas may be represented using graphs. Let T be finite sets of type names and F of element and attribute names (labels), and distinct symbols $\alpha \in F$ and $\beta \in T$. Schemas graphs are directed graphs $G=(V, E, L)$ such that:

1) $V \subset \overline{T}$, the nodes are type names or $\beta$ if the type name of data is not known;

2) $L \subset \overline{F}$, edges are labeled by element or attribute names or a if the name is not known;

3) $E \subset L \times V \times V$, edges are cross-products of labels and nodes. If <l, vk, vm>$\in$E, then vk->(l)->vm. Nodes vm are called children of the node vk. If an element has no children, then its corresponding node in a schema graph has an empty collection of children nodes;

4) Bounds for elements are specified with subscripts and superscripts to labels designating these elements. Subscripts are used to specify bounds defined by the minOccurs attribute, and superscripts designate the bounds specified by the maxOccurs attribute;

5) Each graph has the special node labeled root $\in$V, where root represents a collection of the root elements. An empty schema has a single root node and no edges;

6) The XML tag <complexType> specifies that an element is a complex type, and it is not represented in the graph.

A path in a schema graph may be a sequence of labels PG=<l1, l2, . . . ln>, where vk->(ln)->vm for vm in V and $1 \leq u \leq n$. The symbol $\beta$ may be used instead of a label in a path if an element is navigated by its sequence number. Function type:v->s returns the type s$\in$T of the node v$\in$V. Function max:label(u, l)->u returns the upper bound u, or ∞ if the upper bound is not specified, and function min:label(u, l)->l returns the lower bound l, or zero if the lower bound is not specified.

Once GAPs are modeled using XML schemas, these schemas can be compared using simulation to compute changes between the corresponding GAPs. That is, if the schema of the new GAP is the same as the schema of the previous release of the GAP, or the types of its GUI objects are subsumed by the types of the corresponding GUI object of the previous GAP, then these schemas may be considered identical. Otherwise, the GAP comparison logic 2342 may issue a warning and GUI objects with the associated modification types are reported.

To that end, the GAP comparison logic 2342 may implement a bi-simulation technique to compare schemas. FIG. 32 shows an example of the bi-simulation properties 3200 that the GAP comparison logic 2342 may employ, including a first bi-simulation property 3202, a second bi-simulation property 3204, a third bi-simulation property 3206, and a fourth bi-simulation property 3208.

The bi-simulation may be a binary relation between the nodes of two graphs g1, g2∈G, written as xy, x, y∈V, satisfying the bi-simulation properties 3202-3208.

The GAP comparison logic 2342 may consider two finite graphs g1, g2∈G equal if there exists a bi-simulation from g1 to g2. A graph is bi-similar to its infinite unfolding. The GAP comparison logic 2342 may compute the bi-simulation of two graphs starts with selecting the root nodes and applying the bi-simulation properties 3202-3208. The GAP comparison logic 2342 search for a relation (x, y) between nodes x and y in a graph that fails to satisfy the bi-simulation properties 3202-3208. When such a relation (x, y) is found, then the GAP comparison logic 2342 determines that the graphs are not equal and the bi-simulation may stop.

For example, consider the current schema 3210 and the subsequent schema 3212 in FIG. 32. The GAP comparison logic 2342 applies bi-simulation to determine whether two schemas 3210 and 3212 are equivalent. The schema 3210 describes XML data that models a current GUI screen, and the schema 3212 models a modified version of the current GUI screen. The comparator logic 2342 may determine that If the schema 3212 is equivalent to the schema 3210, then the GUI screens are the same.

The GUI comparison logic 2342 selects the root nodes 3214 and 3216 in both schemas 3210 and 3212 that satisfy the first bi-simulation property 3202 and the second bi-simulation property 3204. The GAP comparison logic 2342 may then select the relation root(book)->α 3218 from the schema 3210 and check to see that the third bi-simulation property 3206 holds for the relation root(root)->α 3220 in the schema 3212.

Since it does, the GAP comparison logic 2342 determines whether the fourth bi-simulation property 3208 holds for both relations. Since it does, the GAP comparison logic 2342 proceeds to the relation α->(author1)->α 3222 for the schema 3210 and the relation α->(author1)->α 3224 for the schema 3212. The GAP comparison logic 2342 determines that the third bi-simulation property 3206 and the fourth bi-simulation property 3208 are violated. In particular, the GAP comparison logic 2342 determines that the offending relation 'author' is tagged as potentially deleted in the schema 3212, a difference from the schema 3210. Thus, the schemas 3210 and 3212 are not equal.

Figure 29:
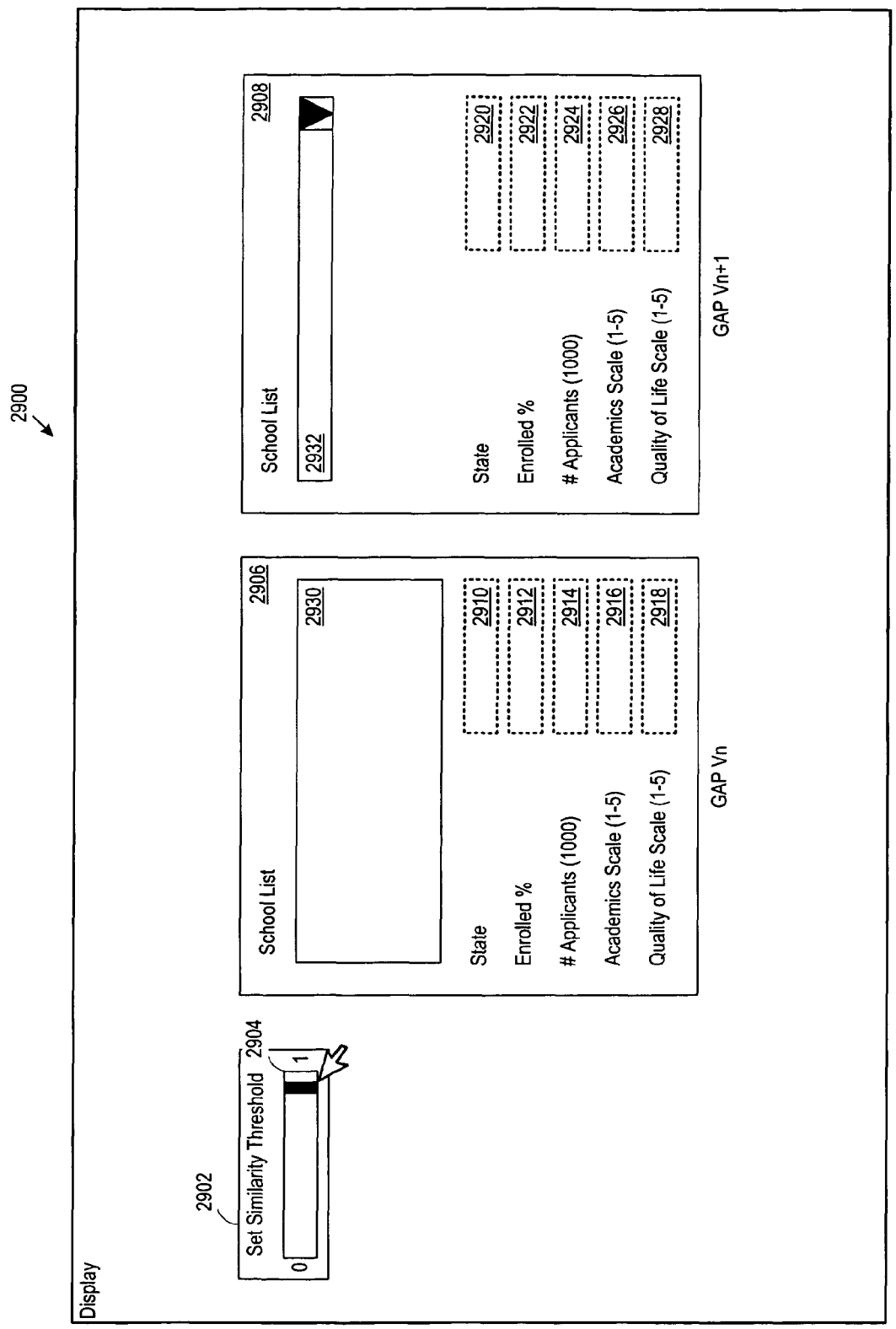
FIG. 29 shows a display and a GUI comparator threshold interface.

FIG. 29 shows a display 2900 and a GUI comparator threshold interface 2902. The GUI difference model logic 2380 may display the interface 2902 in response to operator input. For example, the operator may select an option configuration item from a menu generated by the GUI difference model logic 2380. In response, the GUI difference model logic 2380 displays the interface 2902. The display may be provided locally, e.g. via display 2306, or remotely, e.g. via terminal 2318.

In the example shown in FIG. 29, the interface 2902 includes a slider 2904 that selects a value between 0 and 1. Any other interface or value range may be provided to the operator. The GUI difference model logic 2380 may set the difference threshold based on the value of the slider 2904. The value 0 represents that essentially no or limited similarity is needed to find a match between GUI elements. The value 1 represents that very close or exact similarity is needed to find a match between GUI elements. Such similarity may be found in manual mappings, for example, as specified in a high confidence level field 811 (e.g., "100 M") as received from the metadata repository. However, a very high level of confidence may also be obtained through the automated weighting analysis described above, and the GUI difference model logic 2380 may, in some implementations, accept a manual version mapping as correct regardless of the associated confidence level.

FIG. 29 also shows a portion 2906 of the current GAP version 2326 and a portion 2908 of the subsequent GAP version 2328. In addition to allowing the operator to set the difference threshold using the interface 2902, the GUI difference model logic 2380 may further include visualization logic 2378. The visualization logic 2378 may display elements in the current GAP version and the subsequent GAP version that match, as determined by the weighted comparison analysis, the similarity threshold, and the version mappings. Matching GUI elements may be highlighted with a border of a particular pattern or color, or in other manners, and different borders, colors, or other features may be used for each match.

In FIG. 29, the visualization logic 2378 highlights matching GUI elements based on the similarity threshold set through the interface 2902. The similarity threshold is relatively high. In the example shown in FIG. 29, the visualization logic 2378 highlights the textbox elements 2910, 2912, 2914, 2916, and 2918 in the portion 2906 of the current GAP version 2326, that match, respectively, to the textbox elements 2920, 2922, 2924, 2926, and 2928 in the portion 2908 of the subsequent GAP version 2328. The textbox elements 2910-2928 have little or no changes in their characteristics between the subsequent GAP versions. The textbox element 2930 and the combo box element 2932 remain un-highlighted, however, because their characteristics differ to a greater extent, and the weighted comparison analysis does not determine a GUI element similarity value that exceeds the similarity threshold.

Figure 30:
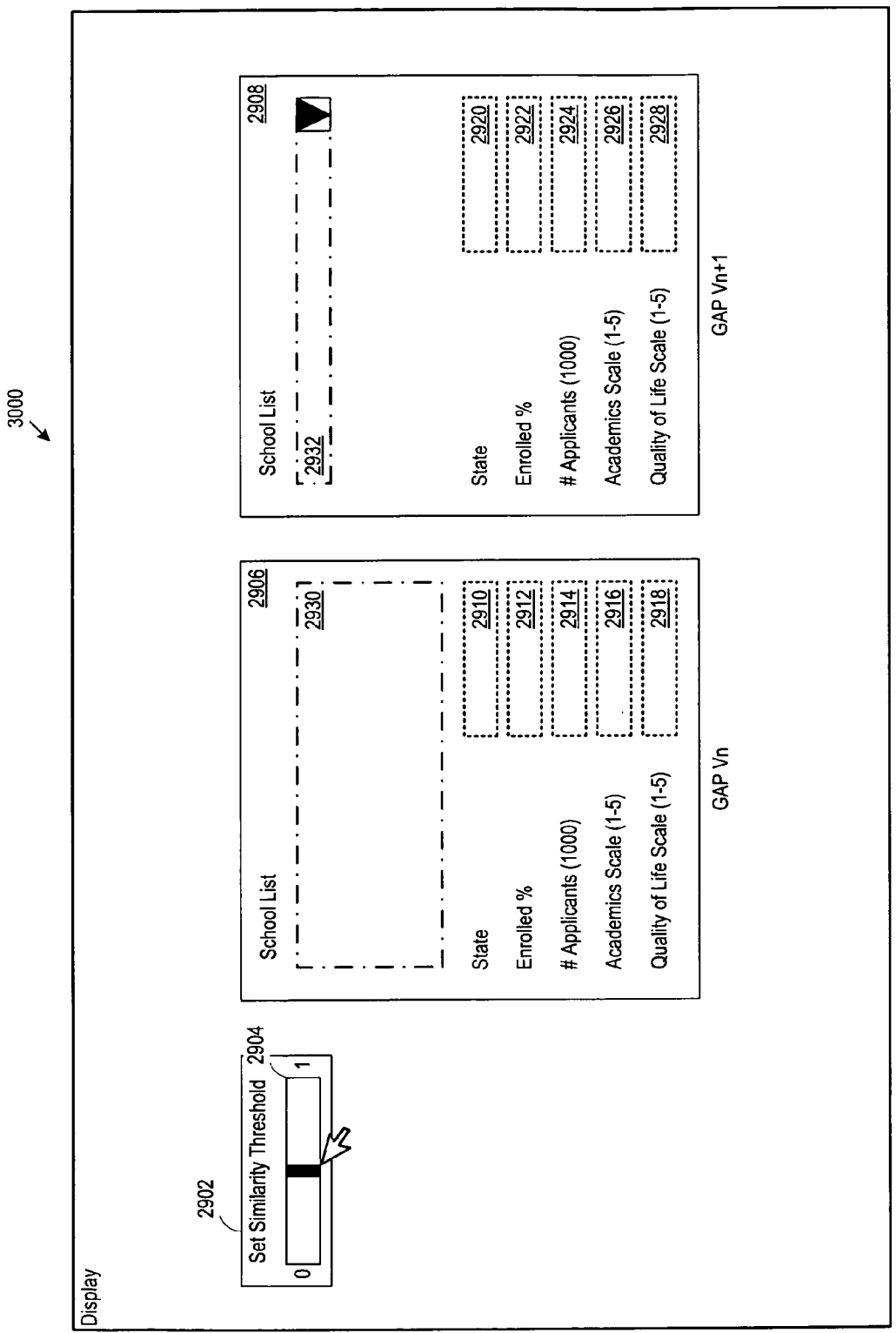
FIG. 30 shows GUI element highlighting responsive to the comparator threshold slider.

In FIG. 30, the display 3000 shows that the slider 2904 has been adjusted to a lower similarity threshold. The visualization logic 2378 highlights the matching GUI elements based on the lower similarity threshold set through the interface 2902. In the example shown in FIG. 30, the visualization logic 2378 highlights, as before, the textbox elements 2910, 2912, 2914, 2916, and 2918 in the portion 2906 of the current GAP version 2326, that match, respectively, to the textbox elements 2920, 2922, 2924, 2926, and 2928 in the portion 2908 of the subsequent GAP version 2328.

However, the visualization logic 2378 also highlights the textbox element 2930 and the combo box element 2932. Although the characteristics of the textbox element 2930 and the combo box element 2932 differ to a certain extent, the weighted comparison analysis does obtain a GUI element similarity value that exceeds the similarity threshold. Accordingly, the visualization logic 2378 highlights the elements 2930 and 2932.

Figure 31:
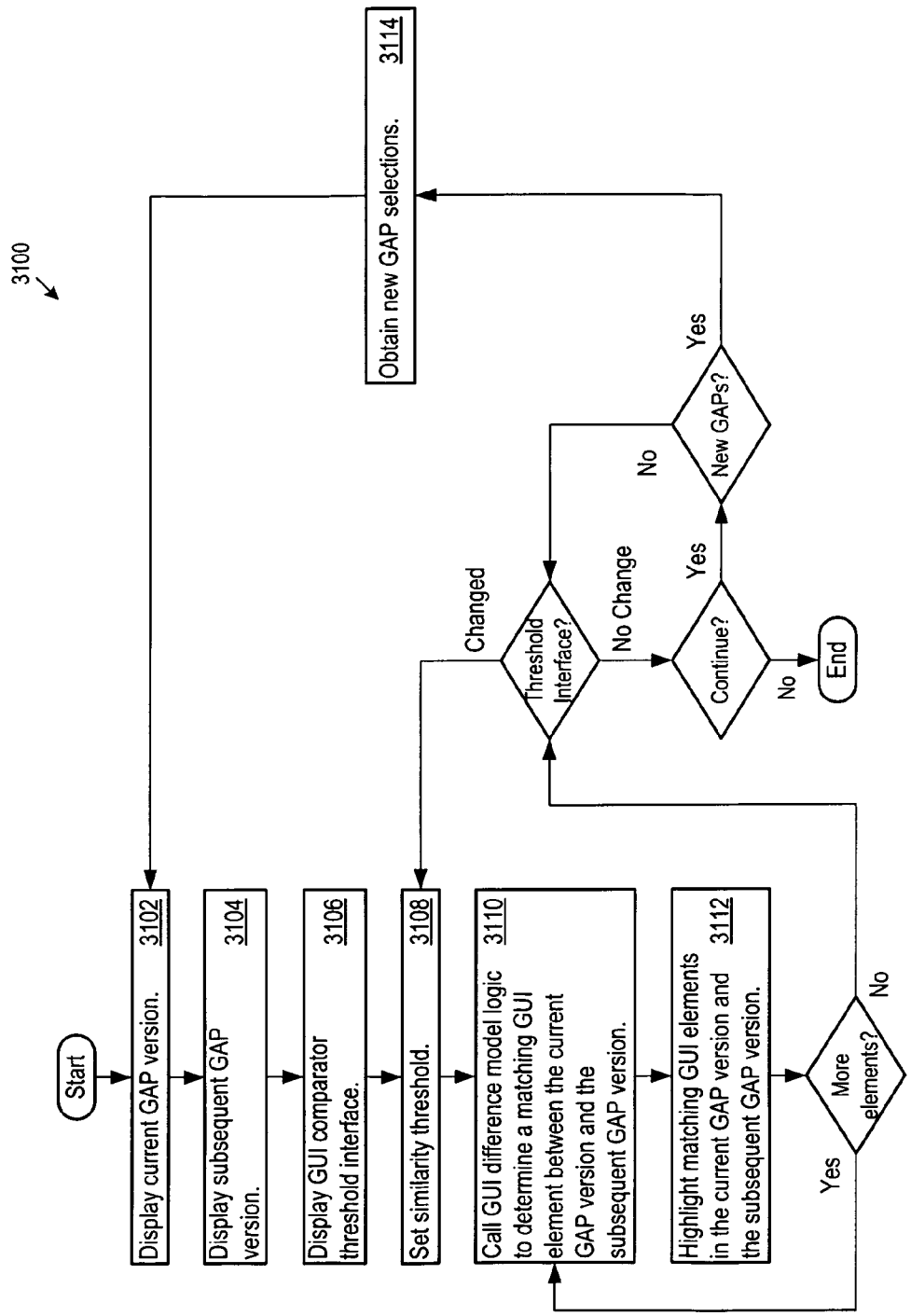
FIG. 31 shows a flow diagram for visualization logic.

FIG. 31 shows a flow diagram 3100 for visualization logic 2378. The visualization logic 2378 may display the current GAP version 2326 (3102) and the subsequent GAP version 2328 (3104). For example, the visualization logic 2378 may issue one or more GAP load messages to the proxy 2322 to start the current GAP version 2326 and the subsequent GAP version 2328.

The visualization logic 2378 also may display a GUI comparator threshold interface 2902 (3106). The visualization logic 2378 may set the similarity threshold based on the value chosen through the GUI comparator threshold interface 2902 (3108). Given the similarity threshold, the visualization logic 2378 may call the GUI difference model logic to determine a matching GUI element between the current GAP version 2326 and the subsequent GAP version 2328 (3110). Alternatively, the visualization logic 2378 may execute a comparison analysis (e.g., the weighted comparison analysis described above) to determine one or more GUI elements in the subsequent GAP version 2328 that match any particular element in the current GAP version. The visualization logic 2378 may accept an element selection from the operator that specifies one or more particular GUI elements of interest in either GAP version, and find the matching GUI elements in the other GAP version. Alternatively, the visualization logic 2378 may consider each GUI element in the current GAP version 2326 and find the matching GUI elements in the subsequent GAP version 2328.

The visualization logic 2378 highlights matching GUI elements in the current GAP version 2326 and in the subsequent GAP version 2328 (3112). To that end, the visualization logic 2378 may issue commands to the proxy to highlight any particular GUI elements. If there are more GUI elements to consider, the visualization logic 2378 attempts to find additional matches.

At any time, the visualization logic 2378 may check to determine whether the GUI comparator threshold interface 2902 has changed (e.g., the operator changed the slider position to select a new threshold value). The visualization logic 2378 may also check, at any time, whether the operator desired to review different GAPs. If so, the visualization logic 2378 obtains new GAP selections (3114). The visualization logic then displays the GAPs and the GUI comparator threshold interface and proceeds as noted above.

FIG. 1 shows a script analyzer with change guide architecture (SAA) 108. Although detailed descriptions of the features of the SAA 108 will be provided further below, a brief introduction of the SAA 108 will first be presented. The SAA 108 receives a GUI difference model 162 that specifies GUI element differences between a current GAP version 150 and a subsequent GAP version 152. The GUI difference model 162 may be represented as an XML schema. In another implementation, the current and subsequent GAP tree models, as well as the GUI difference model 162 are implemented as relational models stored in a database. The SAA 108 employs an interface 190 to receive inputs and communicate with various components, including a GUI element metadata repository 138. The GUI element metadata repository 138 may provide detailed information regarding the GUI elements represented in the GUI difference model 162, the current GAP 150 and the subsequent GAP 152. In one implementation, the SAA 108 includes a script parser 166 that parses a current test script 164 to obtain an intermediate representation of the current test script 164. The intermediate representation may be an abstract syntax tree (AST) 168 or other representation of the current test script 164. The SAA 108 employs a script analyzer 170 that analyzes the AST 168 and invokes an object repository lookup 172 against an object repository 174 to locate the properties of GUI elements identified by the AST 168. The script analyzer 170 uses the GUI element metadata repository 138, object repository 174, a constraint satisfaction engine 188, and GUI element script change rules 194 to locate valid GUI element difference entries, discussed further below. In one implementation, the script analyzer 170 uses a GUI class rules logic to further the analysis, discussed in further detail below. The script analyzer 170 outputs a transformed test script 178, a change guide 180 and GAP change specifiers 184 based on analysis performed on the GUI difference model 162 and AST 168.

Figure 33:
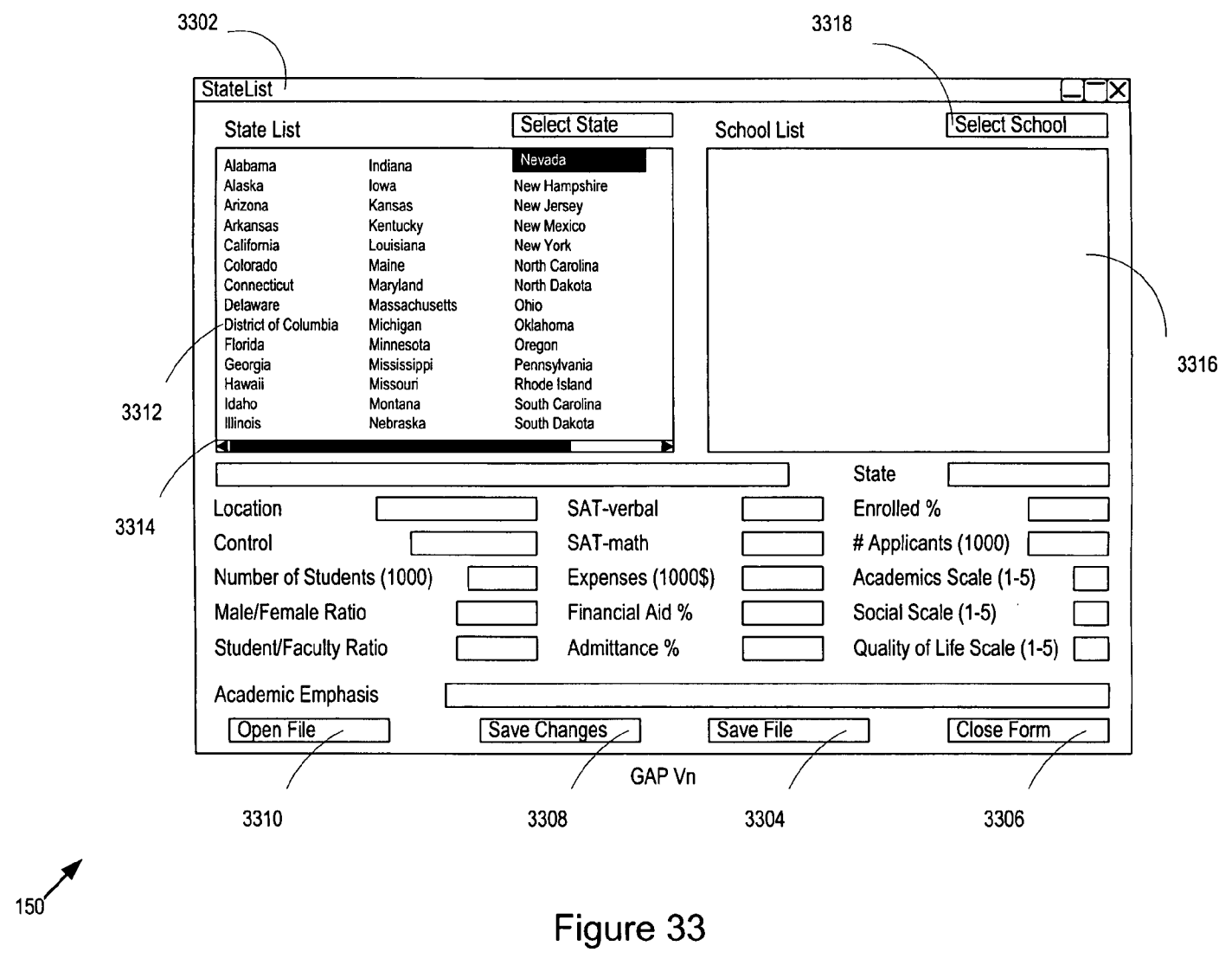

FIG. 33 shows a GUI of a current GAP version 150. Table 6 shows a current GAP tree model representation of the GUI of the current GAP version 150. The current GAP tree model shown in Table 6 specifies the GUI elements and attributes of the GUI elements of the current GAP version 150. Table 6 illustrates that the current GAP tree model supports GUI elements that include nested GUI elements. For example, StateList window 3302, shown in FIG. 33, corresponds to GUI Element Alias StateList at line 11 (L11) of Table 6 and nested GUI elements SaveFile, Exit, SaveChange, FileOpen, the listbox School, shown at lines 18-21 and 59 of Table 6, correspond, respectively, to Save File 3304, Close Form 3306, Save Change 3308, Open File 3310 and the listbox School 3316 of FIG. 33. In one implementation, the GUI difference model 162 results from a comparison of the current GAP tree model as shown in Table 6 and a subsequent GAP tree model illustrated below in Table 8.

A GAP, the GUI elements of the GAP and the values of the GUI elements define states for the GAP. The current and subsequent GAP tree models capture the states of the current and subsequent GAP versions (e.g., 150 and 152), respectively. In one implementation, GAP states are identified by sequent numbers and alias, as well as other attributes. For example, line 1 of Table 6 illustrates a 'state' that has a SeqNumber with a value of 0. The SeqNumber represents a unique sequence number of the current GAP version. The state is given the name State_0_3556. The attributes Alias and ProcessId represent the alias of the current GAP version 150 and the instance process identifier for the current GAP version 150, respectively. Recall that Table 6 and Table 8 illustrate that the current and subsequent GAP tree models support GUI elements that include nested GUI elements. Although multiple GUI elements may use an identical Alias (e.g., StateList as illustrated in Table 6 at lines 2 and 11) the GUI elements are further distinguished by the UniqueID attribute (e.g., 0x0 and 0x12 as shown at lines 3 and 12 of Table 6).

TABLE 6

Current GAP tree model

- <State SeqNumber="0" Name="State_0_3556"
Alias="University Directory0" ProcessId="3556">
  - <GUIElement Alias="StateList">
    <UniqueID>0x0</UniqueID>
    <HWND>0x170a64</HWND>
    <Location x="87" y="66" width="792" height="672" />
    <Class>WindowsForms10.Window.8.app4</Class>
    <Style>0x16cf0000</Style>
    <ExStyle>0xc0050900</ExStyle>
    + <GUIElement Alias="System">
    + <GUIElement Alias="NAMELESS">
L11 - <GUIElement Alias="StateList">
    <UniqueID>0x12</UniqueID> fs
    <HWND>0x170a64</HWND>

TABLE 6-continued

Current GAP tree model

```
          <Location x="117" y="70" width="784" height="638" />
          <Class>WindowsForms10.Window.8.app4</Class>
          <Style>0x16cf0000</Style>
          <ExStyle>0xc0050900</ExStyle>
L18 +     <GUIElement Alias="SaveFile">
L19 +     <GUIElement Alias="Exit">
L20 +     <GUIElement Alias="SaveChange">
L21 +     <GUIElement Alias="FileOpen">
        +   <GUIElement Alias="Location">
        +   <GUIElement Alias="AcademicEmph">
        +   <GUIElement Alias="QolScale">
        +   <GUIElement Alias="SocialScale">
        +   <GUIElement Alias="AcadScale">
        +   <GUIElement Alias="EnrolledPerc">
        +   <GUIElement Alias="AdmittancePerc">
        +   <GUIElement Alias="NumApps">
        +   <GUIElement Alias="FinancialAid">
        +   <GUIElement Alias="Expense">
        +   <GUIElement Alias="SATMath">
        +   <GUIElement Alias="SATVerbal">
        +   <GUIElement Alias="SFRatio">
        +   <GUIElement Alias="MFRatio">
        +   <GUIElement Alias="NumStudents">
        +   <GUIElement Alias="Control">
        +   <GUIElement Alias="State">
        +   <GUIElement Alias="School">
        +   <GUIElement Alias="Location">
        +   <GUIElement Alias="Academic Emphasis">
        +   <GUIElement Alias="Quality of Life Scale (1-5)">
        +   <GUIElement Alias="Social Scale (1-5)">
        +   <GUIElement Alias="Academics Scale (1-5)">
        +   <GUIElement Alias="Enrolled %">
        +   <GUIElement Alias="Admittance %">
        +   <GUIElement Alias="# Applicants (1000)">
        +   <GUIElement Alias="Financial Aid %">
        +   <GUIElement Alias="Expenses (1000$)">
        +   <GUIElement Alias="SAT:math">
        +   <GUIElement Alias="Student/Faculty Ratio">
        +   <GUIElement Alias="SAT:verbal">
        +   <GUIElement Alias="Male/Female Ratio">
        +   <GUIElement Alias="Number of Students (1000)">
        +   <GUIElement Alias="Control">
        +   <GUIElement Alias="State">
        +   <GUIElement Alias="SelectSchoolBtn">
        +   <GUIElement Alias="School List">
L59 +     <GUIElement Alias="SchoolListbox">
        +   <GUIElement Alias="SelectStateBtn">
        +   <GUIElement Alias="State List">
L62 +     <GUIElement Alias="StateListbox">
          </GUIElement>
        </GUIElement>
      </State>
```

The StateListBox GUI element shown in Table 6 at line 62 corresponds to the State listbox 3312 shown in FIG. 33. FIG. 33 shows a horizontal navigation bar 3314 as a feature of the State listbox 3312. Table 7 shows some of the attributes of State listbox 3312 that may be reflected in the GUI difference model 162 as a result of a comparison between the current GAP tree model and the subsequent GAP tree model shown in Table 8.

TABLE 7

Current GAP StateListbox GUI element schema

```
- <GUIElement Alias="StateListbox">
    <UniqueID>0x407</UniqueID>
    <HWND>0x90b58</HWND>
    <Location x="173" y="86" width="368" height="274" />
    <Class>WindowsForms10.LISTBOX.app4</Class>
    <Style>0x56110ac1</Style>
    <ExStyle>0xc0000a00</ExStyle>
- <GUIElement Alias="StateListbox">
```

TABLE 7-continued

Current GAP StateListbox GUI element schema

```
    <UniqueID>0x410</UniqueID>
    <HWND>0x90b58</HWND>
    <Location x="175" y="88" width="364" height="253" />
    <Class>WindowsForms10.LISTBOX.app4</Class>
    <Style>0x56110ac1</Style>
    <ExStyle>0xc0000a00</ExStyle>
-   <Values>
      <Value SeqNumber="0">Alabama</Value>
      <Value SeqNumber="1">Alaska</Value>
      <Value SeqNumber="2">Arizona</Value>
      <Value SeqNumber="3">Arkansas</Value>
      <Value SeqNumber="4">California</Value>
      <Value SeqNumber="5">Colorado</Value>
      <Value SeqNumber="6">Connecticut</Value>
      <Value SeqNumber="7">Delaware</Value>
      <Value SeqNumber="8">District of Columbia</Value>
      <Value SeqNumber="9">Florida</Value>
      <Value SeqNumber="10">Georgia</Value>
      <Value SeqNumber="11">Hawaii</Value>
      <Value SeqNumber="12">Idaho</Value>
      <Value SeqNumber="13">Illinois</Value>
      <Value SeqNumber="14">Indiana</Value>
      <Value SeqNumber="15">Iowa</Value>
      <Value SeqNumber="16">Kansas</Value>
      <Value SeqNumber="17">Kentucky</Value>
      <Value SeqNumber="18">Louisiana</Value>
      <Value SeqNumber="19">Maine</Value>
      <Value SeqNumber="20">Maryland</Value>
      <Value SeqNumber="21">Massachusetts</Value>
      <Value SeqNumber="22">Michigan</Value>
      <Value SeqNumber="23">Minnesota</Value>
      <Value SeqNumber="24">Mississippi</Value>
      <Value SeqNumber="25">Missouri</Value>
      <Value SeqNumber="26">Montana</Value>
      <Value SeqNumber="27">Nebraska</Value>
      <Value SeqNumber="28">Nevada</Value>
      <Value SeqNumber="29">New Hampshire</Value>
      <Value SeqNumber="30">New Jersey</Value>
      <Value SeqNumber="31">New Mexico</Value>
      <Value SeqNumber="32">New York</Value>
      <Value SeqNumber="33">North Carolina</Value>
      <Value SeqNumber="34">North Dakota</Value>
      <Value SeqNumber="35">Ohio</Value>
      <Value SeqNumber="36">Oklahoma</Value>
      <Value SeqNumber="37">Oregon</Value>
      <Value SeqNumber="38">Pennsylvania</Value>
      <Value SeqNumber="39">Rhode Island</Value>
      <Value SeqNumber="40">South Carolina</Value>
      <Value SeqNumber="41">South Dakota</Value>
      <Value SeqNumber="42">Tennessee</Value>
      <Value SeqNumber="43">Texas</Value>
      <Value SeqNumber="44">Utah</Value>
      <Value SeqNumber="45">Vermont</Value>
      <Value SeqNumber="46">Virginia</Value>
      <Value SeqNumber="47">Washington</Value>
      <Value SeqNumber="48">West Virginia</Value>
      <Value SeqNumber="49">Wisconsin</Value>
      <Value SeqNumber="50">Wyoming</Value>
    </Values>
  </GUIElement>
+ <GUIElement Alias="Horizontal">
</GUIElement>
```

Figure 34:
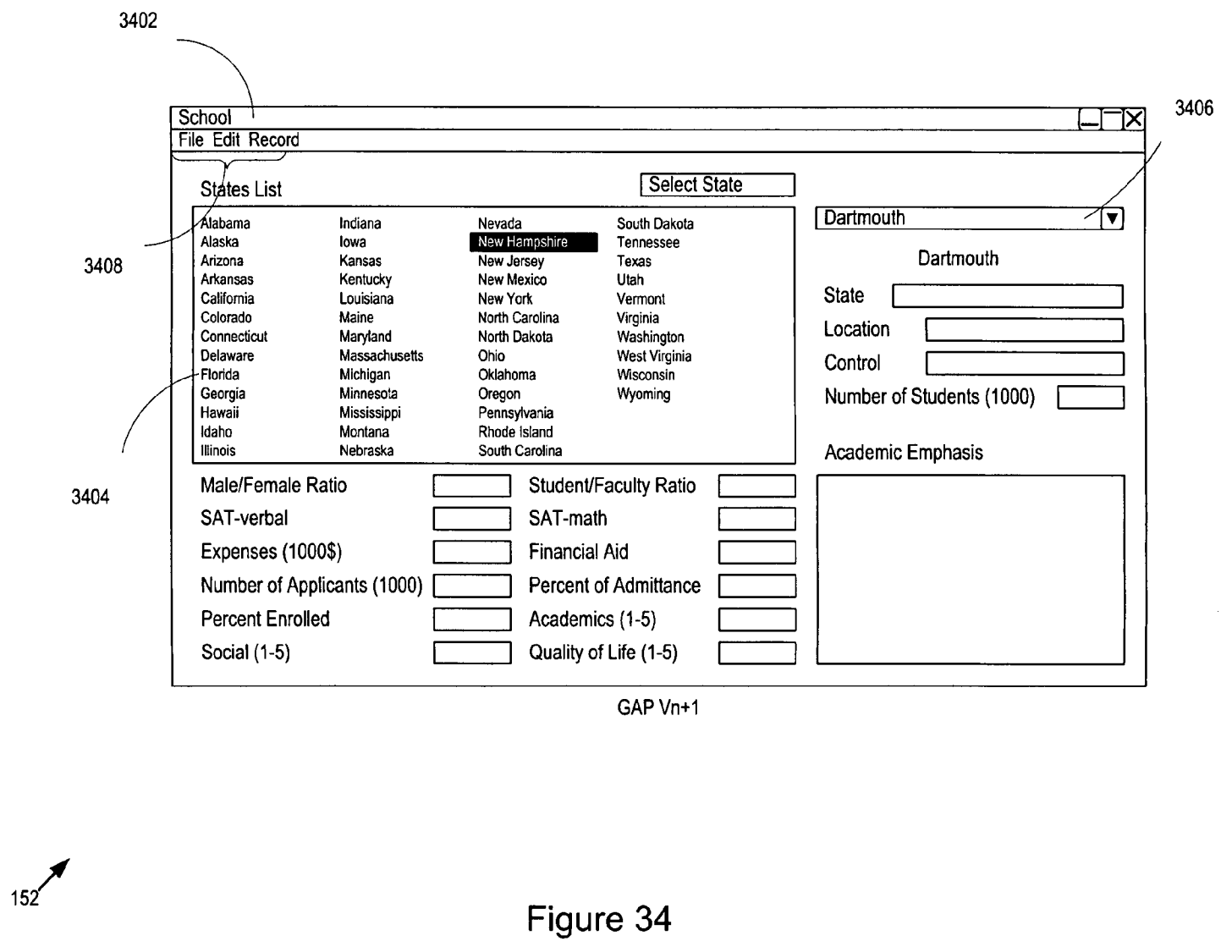

FIG. 34 shows the GUI of a subsequent GAP version 152. Table 8 illustrates a subsequent GAP tree model representation of the subsequent GAP version 152. The subsequent GAP tree model shown in Table 8 includes the GUI elements and the attributes of the GUI elements. For example, the window GUI object School 3402 shown in FIG. 34 corresponds to GUI Element Alias "School" shown at line 11 (L11) of Table 8 and nested GUI elements StateListBox and School-Combobox shown at lines 23 and 24 of Table 8 correspond, respectively, to State listbox 3404 and School combobox 3406 of FIG. 34. In one implementation, the GUI difference model 162 results from a comparison between the current GAP tree model as shown in Table 6 and a subsequent GAP tree model as shown in Table 8.

TABLE 8

Subsequent GAP tree model

```
- <State SeqNumber="0" Name="State_0_3068"
  Alias="University Directory1" ProcessId="3068">
    - <GUIElement Alias="School">
        <UniqueID>0x0</UniqueID>
        <HWND>0x80b8</HWND>
        <Location x="116" y="88" width="915" height="594" />
        <Class>WindowsForms10.Window.8.app.0.378734a</Class>
        <Style>0x16cf0000</Style>
        <ExStyle>0xc0050900</ExStyle>
        + <GUIElement Alias="System">
        + <GUIElement Alias="NAMELESS">
L11 - <GUIElement Alias="School">
        <UniqueID>0x12</UniqueID>
        <HWND>0x80b8</HWND>
        <Location x="146" y="92" width="907" height="560" />
        <Class>WindowsForms10.Window.8.app.0.378734a</Class>
        <Style>0x16cf0000</Style>
        <ExStyle>0xc0050900</ExStyle>
L18 + <GUIElement Alias="menuStrip1">
        + <GUIElement Alias="States List">
        + <GUIElement Alias="School List">
        + <GUIElement Alias="SelectStateIButton">
        + <GUIElement Alias="SelectSchoolButton">
L23 + <GUIElement Alias="StateListbox">
L24 + <GUIElement Alias="SchoolCombobox">
        + <GUIElement Alias="School">
        + <GUIElement Alias="state">
        + <GUIElement Alias="State">
        + <GUIElement Alias="location">
        + <GUIElement Alias="Location">
        + <GUIElement Alias="control">
        + <GUIElement Alias="Control">
        + <GUIElement Alias="Number of Students (1000)">
        + <GUIElement Alias="NumStudents">
        + <GUIElement Alias="Male/Female Ratio">
        + <GUIElement Alias="GenderRatio">
        + <GUIElement Alias="Student/Faculty Ratio">
        + <GUIElement Alias="SFRatio">
        + <GUIElement Alias="SAT Verbal">
        + <GUIElement Alias="SATVerbal">
        + <GUIElement Alias="SAT Math">
        + <GUIElement Alias="SATMath">
        + <GUIElement Alias="Number of Applicants">
        + <GUIElement Alias="NumApps">
        + <GUIElement Alias="Percent of Admittance">
        + <GUIElement Alias="PercAdmit">
        + <GUIElement Alias="Percent Enrolled">
        + <GUIElement Alias="Percent Enrolled">
        + <GUIElement Alias="Academics (1-5)">
        + <GUIElement Alias="Academics">
        + <GUIElement Alias="Social (1-5)">
        + <GUIElement Alias="Social">
        + <GUIElement Alias="Quality of Life (1-5)">
        + <GUIElement Alias="QoLife">
        + <GUIElement Alias="Academic Emphasis">
        + <GUIElement Alias="AcadEmphasis">
        + <GUIElement Alias="Expenses">
        + <GUIElement Alias="Expense">
        + <GUIElement Alias="Financial Aid">
        + <GUIElement Alias="FinancialAid">
    </GUIElement>
  </GUIElement>
</State>
```

The subsequent GAP menuStrip1 GUI element schema shown in Table 8 at line 18 corresponds to the WinObject GUI object 'menu strip' 3408 shown in FIG. 34. The subsequent GAP menuStrip1 GUI element schema shown in Table 9 illustrates the full entry at line 18 in Table 8 and indicates that the menu strip 3408 includes a nested GUI element File menu that includes nest GUI elements OpenFile, SaveFile, SaveAs, and Exit, shown at lines 15 of Table 9, and 22-25, respectively.

TABLE 9

Subsequent GAP menuStrip1 GUI element schema

```
- <GUIElement Alias="menuStrip1">
    <UniqueID>0x13</UniqueID>
    <HWND>0xa0e62</HWND>
    <Location x="146" y="92" width="907" height="24" />
    <Class>WindowsForms10.Window.8.app.0.378734a</Class>
    <Style>0x56000000</Style>
    <ExStyle>0xc0010800</ExStyle>
    - <GUIElement Alias="menuStrip1">
        <UniqueID>0x1c</UniqueID>
        <HWND>0xa0e62</HWND>
        <Location x="146" y="92" width="907" height="24" />
        <Class>WindowsForms10.Window.8.app.0.378734a</Class>
        <Style>0x56000000</Style>
        <ExStyle>0xc0010800</ExStyle>
L15 - <GUIElement Alias="FileMenu">
        <UniqueID>0x1d</UniqueID>
        <HWND>0xa0e62</HWND>
        <Location x="148" y="98" width="35" height="20" />
        <Class>WindowsForms10.Window.8.app.0.378734a</Class>
        <Style>0x56000000</Style>
        <ExStyle>0xc0010800</ExStyle>
L22   + <GUIElement Alias="OpenFile">
L23   + <GUIElement Alias="SaveFile">
L24   + <GUIElement Alias="SaveAsFile">
L25   + <GUIElement Alias="Exit">
    </GUIElement>
  </GUIElement>
</GUIElement>
```

Figure 35:
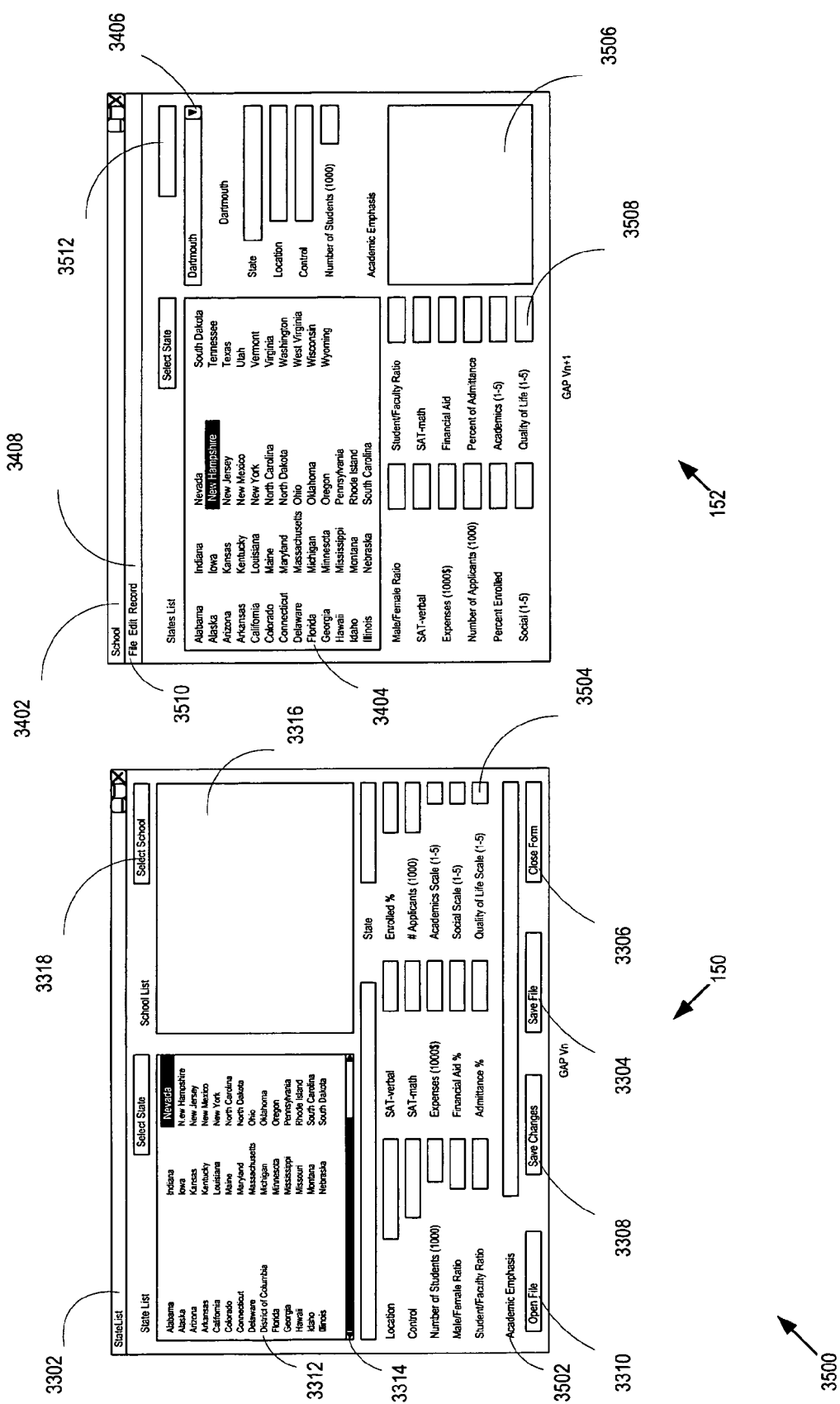
FIG. 35 illustrates a current and a subsequent GAP comparison.

FIG. 35 illustrates a side by side view 3500 of the current and subsequent GAP that helps illustrate GUI element similarities, as well as differences, between successive GAP versions. In the view 3500, there are several GUI objects that have the same desired functionality between successive GAP versions, although aspects of the GUI object may appear different between successive GAP versions.

For example, referring to FIG. 35, differences between the current GAP version 150 and subsequent GAP version 152 include that the window StateList 3302, listbox State 3312, field Academic Emphasis 3502, and field Quality of Life Scale (1-5) 3504 in the current GAP version 150 are respectively represented by window School 3402, listbox State 3404, field Academic Emphasis 3506, and field Quality of Life (1-5) 3508 in the subsequent GAP version 152. In another example, consider the Save File 3304, Close Form 3306, Save Change 3308 and Open File 3310 GUI objects implemented in the current GAP version 150 that have been implemented in the subsequent GAP version 152 as child GUI objects of the File 3510, which is a child GUI object of the menu strip 3408 GUI object.

It can be challenging to locate differences between GUI elements of GAPs. For example, it is not readily evident that the listbox School 3316 and the combobox School 3406 are meant to have the same or similar functionality between successive GAP versions. As another example, the WinObject "Select School" 3318 in the current GAP version 150 has been removed at location 3512 from the subsequent GAP version 152. The GUI difference model 162 include GUI element difference entries that list characteristics of GUI elements, for those GUI elements that match between the current GAP version and the subsequent GAP version, but that differ in character between the current GAP version and the subsequent GAP version. The GUI element difference entries will guide the script analysis as described in more detail below.

Figure 36:
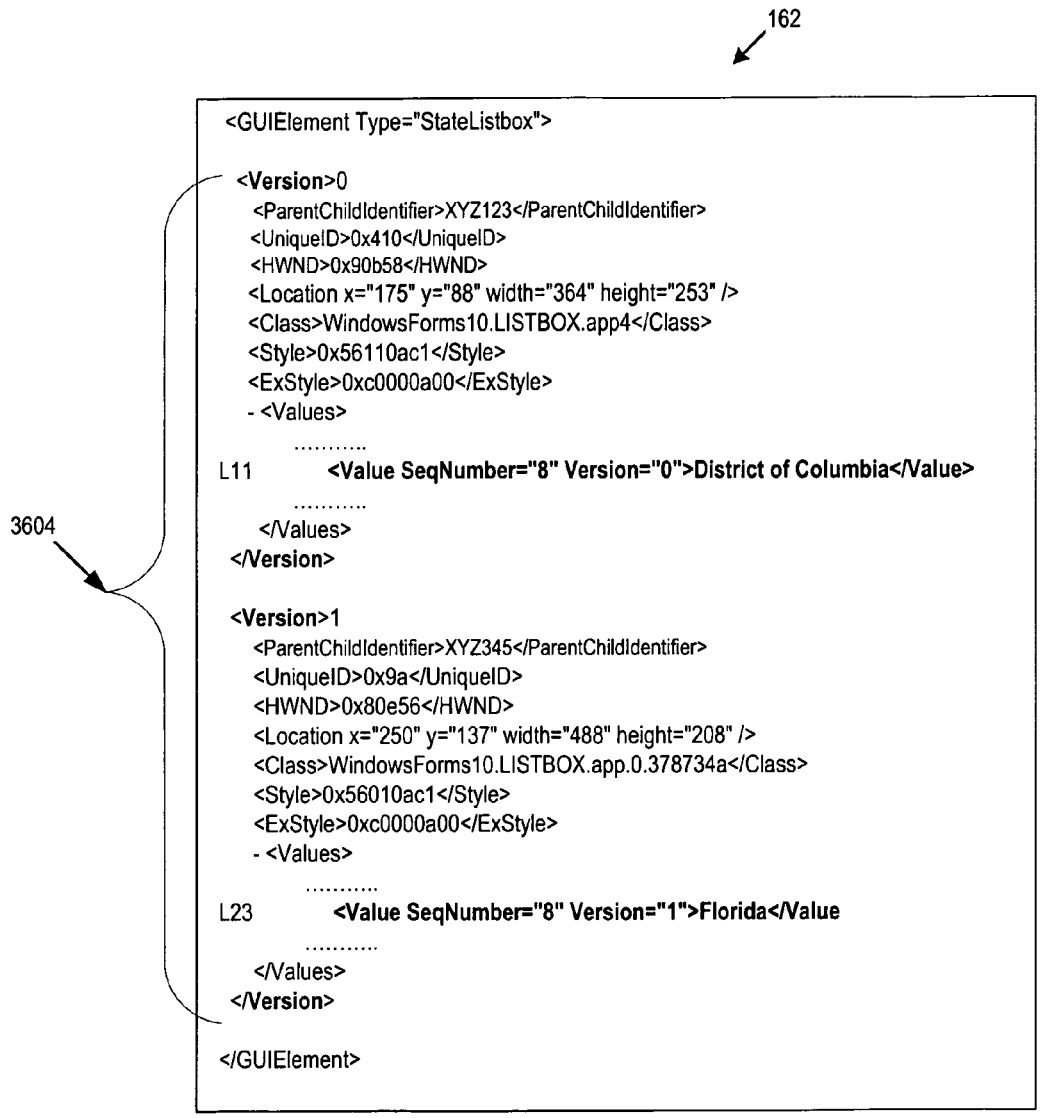
FIG. 36 illustrates a GUI element difference entry.

FIG. 36 shows an exemplary GUI element different entry 3604. FIG. 36 illustrates a GUI difference model 162 obtained by comparing a current GAP tree model as shown in Table 6 and a subsequent GAP tree model as shown in Table 8. In one implementation, the GUI difference model 162 is implemented as an XML schema that specifies each GUI element difference between successive GAP versions with a corresponding GUI element difference entry. In another implementation, the GUI difference model 162 nests GUI element difference entries to indicate parent and child GUI elements, and the level at which a GUI element difference entry is nested indicates how far the corresponding GUI element is away from a parent GUI element (root) in a navigation path.

In one implementation, the GUI difference model 162 omits a GUI element difference entry for GUI objects that have been deleted between successive GAP versions. Each GUI element difference entry representing a GUI object that has been modified or added between successive GAP versions includes a tag 'Version' that has a value of, as examples, either 0 or 1. In other words, a GUI element difference entry that does not include a Version tag indicates that the GUI object has not been modified between successive GAP versions. The Version values of 0 and 1 indicate whether the children elements of the Version represent the properties of the GUI object in the current GAP version 150 or the subsequent GAP version 152, respectively. For example, the GUI difference entry 3604 shown in FIG. 36 indicates at line 11 that the listbox StateListbox value for SeqNumber="8" implemented in the current GAP version 150 is "District of Columbia", while the value in the subsequent GAP version 152 is "Florida" as indicated at line 23. In one implementation, the GUI difference entry 3604 includes a ParentChildIdentifier element at line 3 that identifies the relationship between two GUI objects in a given GAP version, so that GUI class and inheritance constraints can be validated (discussed in detail further below).

Referring briefly to FIG. 45, the GUI difference entry 4504 indicates at line 1 that the window StateList in the current GAP version 150 corresponds to the window School in the subsequent GAP version 152 indicated at line 22 by the Version value equal to 0 and 1, respectively. The StateList and School GUI objects are of the WindowsForm10.Window.8 class, as shown at lines 8 and 28. The sub-class identifier for the StateList and School GUI object distinguish the GUI objects (e.g., app4 and app.0.0378734a, respectively). The GUI difference entry 4504 indicates that the Location element of the StateList and School windows are different, as shown at lines 7 and 27, respectively. However, the GUI difference entry 4504 also indicates that the Style and ExStyle elements are identical, as shown at lines 9-10 and 29-30, respectively.

Referring briefly to FIG. 46, the GUI difference entry 4604 indicates at line 3 that the listbox SchoolListbox in the current GAP version 150 corresponds to the combobox SchoolCombobox in the subsequent GAP version 152 indicated at line 13. The GUI difference entry 4604 indicates that the Location element of the SchoolListbox and SchoolCombobox are different, as shown at lines 7 and 18, respectively. The GUI difference entry 4604 also indicates that the Class, Style and ExStyle elements are different, as shown at lines 8-10 and 19-21, respectively. In particular, one or more of the properties of a WindowsForms10.LISTBOX and a WindowsForms10.COMBOBOX are different, incompatible with the properties of the other class, and child GUI elements of GUI objects of these two classes may have one or more incompatible properties.

FIG. 37 shows a current test script 164 for the current GAP. The current test script 164 includes navigation statements (e.g., L1 and L6) that navigate to GUI objects, perform read, write, or other actions (functions) on GUI objects, and the arguments of these functions. For example, line 1 of the current test script 164 navigates to a window StateList, locates 'Open File' identified as a child GUI object of the window StateList, and performs an action 'Click' on the 'Open File' GUI object at XY coordinates 86, 12. Through the series of navigation and action statements, the current test script 164 opens a file 'university.data' as indicated by lines 2-3. The current test script 164 selects a school 'Acme State University' as a result of the navigation and action statements at lines 4-7 based on the coordinates 67, 12 in WinObject "Select School". The current test script 164 changes the academic scale to '3' as a result of the statements at lines 8-10, and saves the change to a new file 'university_revise.data' as a result of the statements at lines 11-14.

Figure 38:
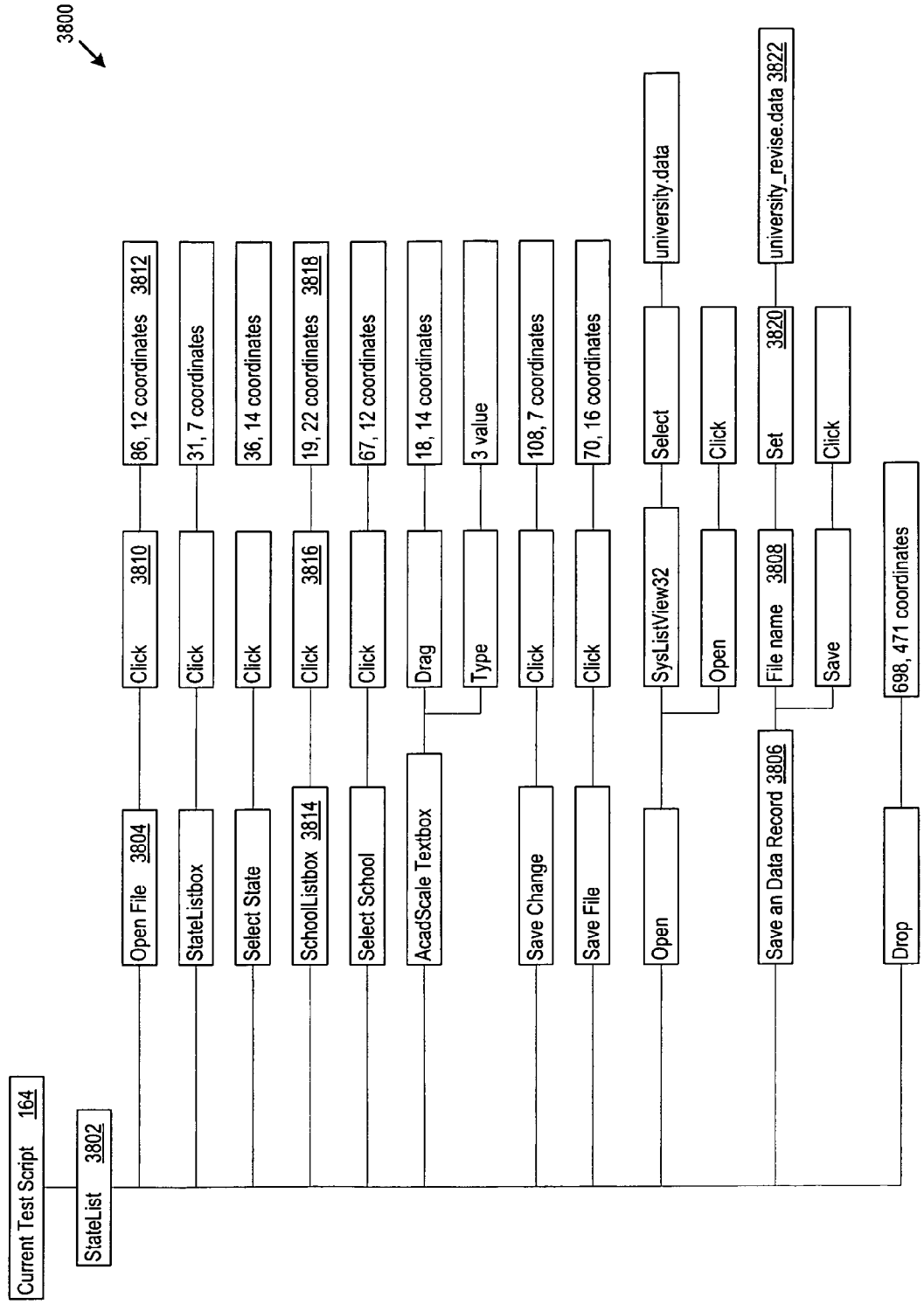
FIG. 38 shows a current test script representation.

FIG. 38 illustrates a current test script representation 3800 that the script parser 166 produces as an intermediate representation of the current test script 164. In one implementation, the SAA 108 implements the current test script representation as an abstract syntax tree (AST) 168. The current test script representation 3800 represents a vector (e.g., the current test script 164) whose elements are vectors that represent navigation statements of the current test script 164. In other words, the current test script representation 3800 represents the navigation statements as test script statement vectors that navigate to GUI objects and perform actions on those GUI objects. Table 10 illustrates a grammar the script parser 166 may use to produce the current test script representation 3800. The terminals func, action and var represent the names of platform-specific functions that navigate to GUI objects (e.g., Window, VbEdit, and WinObject), perform read, write, or other actions (functions) on GUI objects, and the arguments of these functions, respectively.

TABLE 10

Script Parser Grammar navstmt ::= func(arg) | navstmt . Navstmt | navstmt action arg
fullnavstmt ::= var = navstmt | navstmt action arg
arg ::= expr | "," arg |

The script parser 166 represents the test script statement vectors as an ordered sequence of nodes that contain function names and the arguments of those functions that navigate to GUI objects. The nodes of a test script statement vector include a source node and a destination. For example, the script parser 166 may represent the test script statement vector corresponding to line 1 of the current test script 164 as source node StateList 3802 and a destination node 'Open File' 3804. The nodes of a test script statement vector may also include intermediate nodes positioned between a source node and a destination node. For example, the script parser 166 may represent the test script statement vector corresponding to line 13 of the current test script 164 as source node StateList 3802, intermediate node 'Save a Data Record' 3806 and destination node 'File name' 3808. In one implementation, the script analyzer 170 uses the test script statement vectors to analyze plausible navigation paths to GUI objects identified in the GUI difference model 162 by GUI element difference entries, described in further detail below. The script analyzer 170 may use the test script statement vectors to also analyze plausible GUI objects identified in the object repository 174, also discussed in further detail below.

The script parser 166 evaluates arguments of navigation and action functions as expressions, variables and constants. The arguments express the physical properties of GUI objects to which the test script statement vectors navigate and values used to perform actions on those GUI objects. For example, the '86,12' coordinates 3812 identify the location for a pointing device to perform an action 'Click' 3810 on the 'Open File' 3804 GUI object, which is a child GUI Object of the window StateList 3802. The script analyzer 170 uses the names of the GUI objects (e.g., StateList 3802 and 'Open File' 3804) navigated to by the test script statement vectors to locate the corresponding physical properties of the GUI objects stored in an Object Repository (OR) 174.

In one implementation, the script analyzer 170 uses the OR Lookup logic 172 to return from the object repository 174 the physical properties of the GUI objects navigated to by a test script statement vector. In one implementation, the OR Lookup logic 172 is divided into two sub-functions: 1) lookup logic adapted to locate and retrieve the physical properties of the GUI objects navigated to by the test script statement vector (e.g., 3802-3804, 3802-3806-3808, and 3802-3814); and 2) locator logic that finds and returns a GUI element difference entry (node) in the GUI difference model 162 that corresponds to the GUI object with the given physical properties. The OR Lookup logic 172 may include path traversal logic, discussed in further detail below, to identify possible navigation paths of the test script statement vector between a source node GUI object and destination node GUI object to which a test script statement vector navigates.

Table 11 illustrates one implementation of an object repository 174, in the form of an XML schema. The object repository 174 includes a GUI object entry for each GUI Object of the current GAP version 150 identified in the current test script 164. The object repository 174 may be generated by a script writing tool, such as Quick Test Pro (QTP), Rational Robot, and Compuware Test Partner. The script analyzer 170 may query the object repository 174 to identify the physical properties of the GUI objects navigated to by the test script statement vectors represented by the current test script representation 3800. Physical properties of a GUI object may indicate whether the GUI object is hidden, read-only, a number and default values, as shown in Table 12.

For example, the script analyzer 170 analyzes the GUI objects 3802-3814 in the test script statement vector. The '19,22' coordinate 3818 identifies the location for a pointing device to perform an action 'Click' 3812 on the GUI object SchooListbox 3814, which is a child GUI Object of the window StateList 3802. The script analyzer 170 invokes the OR Lookup logic 172 to locate the physical properties of the GUI objects 3802 and 3814. The OR Lookup logic 172 locates the physical properties of the window StateList 3802 and the WinObject SchoolListbox 3814, as shown in Table 11 at lines 3 and 12. The script analyzer 170 uses the physical properties retrieved from the object repository 174 to locate corresponding GUI difference entries (e.g., 4504 and 4604) in the GUI difference model 162. The GUI difference entries 4504 and 4604 indicate that the window StateList 3802 and the WinObject SchoolListbox 3814 in the current GAP version 150 correspond to the window School 3402 and the WinObject SchoolCombobox 3406 in the subsequent GAP version 152, respectively. In one implementation, the script analyzer 170 employs the OR Lookup logic 172 to traverse the GUI difference model 162 using the physical properties of the GUI objects navigated to by the test script statement vector. The OR Lookup 172 function returns a GUI element difference entry (e.g., 3604, 4504 and 4604) from the GUI difference model 162 that represents the GUI object navigated to by the test script statement vector (e.g., 3802-3804-3810-3812, 3802-3806-3808-3820-3822, and 3802-3814-3826-3818).

TABLE 11

| Object Repository |
|---|
| – <XYZRep:ObjectRepository<br>    xmlns:XYZRep=<br>    "http://www.vendorXYZ.com/XYZ/ObjectRepository"><br>– <XYZRep:Objects><br>L3 – <XYZRep:Object Class="Window" Name="StateList"><br>+ <XYZRep:Properties><br>+ <XYZRep:BasicIdentification><br>+ <XYZRep:CustomReplay><br>L7 – <XYZRep:ChildObjects><br>    + <XYZRep:Object Class="WinObject" Name="Open File"><br>    + <XYZRep:Object Class="WinObject" Name="StateListbox"><br>    + <XYZRep:Object Class="WinObject" Name="Select State"><br>    + <XYZRep:Object Class="WinObject" Name="Select School"><br>    + <XYZRep:Object Class="WinObject" Name="SchoolListbox"><br>  </XYZRep:ChildObjects><br>  </XYZRep:Object><br>  </XYZRep:Objects><br>  <XYZRep:Parameters /><br>  <XYZRep:Metadata /><br>  </XYZRep:ObjectRepository> |

Table 12 illustrates the physical properties that may be located in the object repository for the GUI object entry corresponding to the SchoolListbox 3814.

TABLE 12

| GUI object entry WinObject ("SchoolListbox") |
|---|
| – <XYZRep:Object Class="WinObject" Name="SchoolListbox"><br>L2 – <XYZRep:Properties><br>  – <XYZRep:Property Name="y" Hidden="0" ReadOnly="0" Type="NUMBER"><br>    <XYZRep:Value RegularExpression="0">86</XYZRep:Value><br>    </XYZRep:Property><br>  – <XYZRep:Property Name="x" Hidden="0" ReadOnly="0" Type="NUMBER"><br>    <XYZRep:Value RegularExpression="0">420</XYZRep:Value><br>    </XYZRep:Property><br>  – <XYZRep:Property Name="windowstyle" Hidden="0" ReadOnly="0" Type="NUMBER"><br>    <XYZRep:Value RegularExpression="0">1442906305</XYZRep:Value><br>    </XYZRep:Property><br>  – <XYZRep:Property Name="windowextendedstyle" Hidden="0" ReadOnly="0" Type="NUMBER"><br>    <XYZRep:Value RegularExpression="0">512</XYZRep:Value><br>    </XYZRep:Property><br>  – <XYZRep:Property Name="window id" Hidden="0" ReadOnly="0" Type="NUMBER"><br>    <XYZRep:Value RegularExpression="0">1182924</XYZRep:Value><br>    </XYZRep:Property><br>  – <XYZRep:Property Name="width" Hidden="0" ReadOnly="0" Type="NUMBER"><br>    <XYZRep:Value RegularExpression="0">336</XYZRep:Value><br>    </XYZRep:Property> |

TABLE 12-continued

GUI object entry WinObject ("SchoolListbox")

```
    - <XYZRep:Property Name="visible" Hidden="0" ReadOnly="0" Type="BOOL">
        <XYZRep:Value RegularExpression="0">-1</XYZRep:Value>
      </XYZRep:Property>
    - <XYZRep:Property Name="regexpwndclass" Hidden="0" ReadOnly="0" Type="STRING">
        <XYZRep:Value RegularExpression="0">WindowsForms10.LISTBOX.app4</XYZRep:Value>
      </XYZRep:Property>
    - <XYZRep:Property Name="object class" Hidden="0" ReadOnly="0" Type="STRING">
        <XYZRep:Value RegularExpression="0">WindowsForms10.LISTBOX.app4</XYZRep:Value>
      </XYZRep:Property>
    - <XYZRep:Property Name="nativeclass" Hidden="0" ReadOnly="0" Type="STRING">
        <XYZRep:Value RegularExpression="0">WindowsForms10.LISTBOX.app4</XYZRep:Value>
      </XYZRep:Property>
    - <XYZRep:Property Name="height" Hidden="0" ReadOnly="0" Type="NUMBER">
        <XYZRep:Value RegularExpression="0">260</XYZRep:Value>
      </XYZRep:Property>
    - <XYZRep:Property Name="enabled" Hidden="0" ReadOnly="0" Type="BOOL">
        <XYZRep:Value RegularExpression="0">-1</XYZRep:Value>
      </XYZRep:Property>
L39 </XYZRep:Properties>
    - <XYZRep:BasicIdentification>
        <XYZRep:PropertyRef>y</XYZRep:PropertyRef>
        <XYZRep:PropertyRef>x</XYZRep:PropertyRef>
        <XYZRep:PropertyRef>windowstyle</XYZRep:PropertyRef>
        <XYZRep:PropertyRef>windowextendedstyle</XYZRep:PropertyRef>
        <XYZRep:PropertyRef>width</XYZRep:PropertyRef>
        <XYZRep:PropertyRef>visible</XYZRep:PropertyRef>
        <XYZRep:PropertyRef>regexpwndclass</XYZRep:PropertyRef>
        <XYZRep:PropertyRef>object class</XYZRep:PropertyRef>
        <XYZRep:PropertyRef>nativeclass</XYZRep:PropertyRef>
        <XYZRep:PropertyRef>height</XYZRep:PropertyRef>
        <XYZRep:PropertyRef>enabled</XYZRep:PropertyRef>
      </XYZRep:BasicIdentification>
    - <XYZRep:CustomReplay>
        <XYZRep:Behavior Name="simclass"
            Type="STRING">WindowsForms10.LISTBOX.app4</XYZRep:Behavior>
      </XYZRep:CustomReplay>
    - <XYZRep:Comments>
        <XYZRep:Comment Name="miccommentproperty" />
      </XYZRep:Comments>
      <XYZRep:ChildObjects />
      </XYZRep:Object>
```

Figure 39:
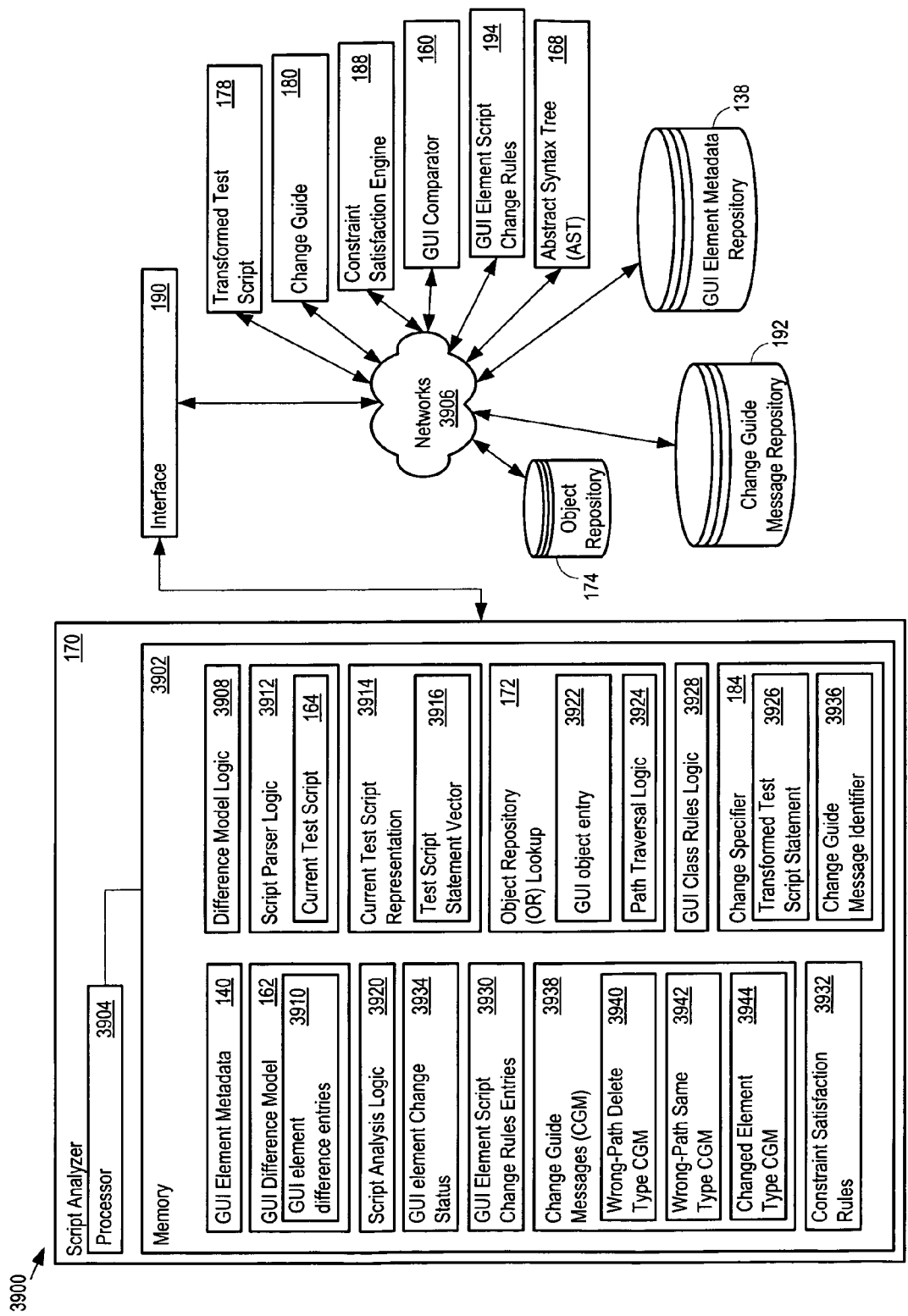
FIG. 39 shows an example script analyzer system.

FIG. 39 shows an example script analyzer system (SAS) 3900 that may implement the script analyzer 170. The SAS 3900 includes a memory 3902 coupled to a processor 3904, and an interface 190. In one implementation, the interface 190 communicates with the GUI element metadata repository 138 and a GUI comparator 160 to receive GUI element metadata 140 and the GUI difference model 162, respectively. The interface 190 is connected to a network 3906 (e.g., the Internet) in communication with various other systems and resources. In another implementation, the memory 3902 includes the GUI element metadata 140, and GUI difference model logic 3908 that produces the GUI difference model 162 and the GUI element difference entries 3910. The memory 3902 also includes script parser logic 3912 that receives the current test script 164 and produces the AST 168, processes the AST 168 as a current test script representation 3914, and produces the test script statement vectors 3916 (e.g., 3802-3804-3810-3812, 3802-3806-3808-3820-3822, and 3802-3814-3826-3818).

The memory 3902 further includes script analysis logic 3920 that receives the GUI difference model 162, and the current test script representation 3914 for the current test script 164, including a test script statement vector 3916. In one implementation, the script analysis logic 3920 invokes the OR Lookup logic 172 to locate, in the object repository 174, a GUI object entry 3922 matching the test script statement vector 3916. In one implementation, the script analyzer 170 invokes the OR Lookup logic 172 to locate, in various external sources, a GUI object entry 3922 matching the test script statement vector 3916. When the test script statement vector 3916 (e.g., 3802-3804-3810-3812, 3802-3806-3808-3820-3822, and 3802-3814-3826-3818) employs constants to identify GUI object names, rather than expressions whose values can only be determined at runtime, the OR Lookup 172 function may use the GUI object name and properties of the GUI object to efficiently locate the correct GUI object entry 3922 and locate, in the GUI difference model 162, a GUI element difference entry 3910 matching the GUI object entry 3922.

For example, the test script statement vector represented by 3802-3804-3810-3812 identifies the window GUI object StateList 3302 and the listbox GUI object SchoolListbox 3316, shown in the current test script 164 navigation statement shown at line 6 of FIG. 37:

Window("StateList").WinObject("SchoolListbox").Click 19,22.

The OR Lookup 172 function locates the GUI object entry 3922 for each GUI object 3302 and 3316, using the known names of the GUI objects, StateList and SchoolListbox, respectively. The OR Lookup 172 function locates the corresponding GUI element difference entries 4504 and 4604, in the GUI difference model 162. The script analysis logic 3920 outputs a transformed test script statement 3926 that corresponds to 3402 and 3406:

Window("School").WinObject("SchoolCombobox").Click 294,14.

The GUI class rule logic 3928 may use the GUI object names to locate the properties used to validate that the transformed test script statement 3928 does not violate GUI element script change rules 194 and constraints. In one implementation, the script analyzer 170 uses the GUI class rules logic 3928 in conjunction with the constraint satisfaction engine 188 to determine violations of GUI element script change rules 194 and constraints.

For example, when the transformed test script statement 3926 accesses GUI objects that do not exist in the subsequent GAP version 152, and/or the transformed test script statement 3926 attempts to set a value of a GUI object that is not compatible with the GUI class of that GUI object, then the transformed test script statement 3926 violates constraints imposed on the GUI object. The constraint satisfaction engine 188 validates the transformed test script statement 3926 to help verify that incorrect operations will be identified in the transformed test script statement 3926 for a programmer to resolve. In one implementation, the constraint satisfaction engine 188 receives a compatibility inquiry message (e.g., from an external system such as the GUI element metadata repository 138) that specifies two GUI element types. The CSE 188 analyzes the two types and returns a compatibility verification message that indicates whether the two types are compatible. In the event the GUI object change violates a constraint satisfaction rule 3932 then the compatibility verification message provides detailed information regarding the violation.

The constraint satisfaction engine 188 and the GUI class rules logic 3928 may infer GUI class information regarding GUI objects that are present in a navigation path of test script statement vectors 3916 and transformed test script statements 3926, and whose presence is not explicitly defined. In one implementation, the constraint satisfaction engine 188 and/or GUI class rules logic 3928 use a combination of compile time type validation and GUI class inference validation, in order to validate the correctness of test script statement vectors 3916 and transformed test script statements 3926. For example, when the test script statement vector 3916 employs expressions that identify GUI objects whose values can only be determined at runtime, the OR Lookup 172 function may use path traversal logic 3924 to identify the possible corresponding GUI object entries 3922 and GUI element difference entries 3910 in the object repository 174 and GUI difference model 162, respectively. The GUI class rules logic 3928 and constraint satisfaction engine 188 then identify the valid GUI object entries 3922 that may substitute for the expressions and GUI element difference entries 3910 that satisfy valid test script statement vectors 3916 and transformed test script statements 3926. Similarly, when the transformed test script statement 3928 employs expressions that identify GUI objects whose values can only be determined at runtime, the OR Lookup 172 function uses path traversal logic 3924 to identify all possible corresponding GUI element difference entries 3910 that identify GUI objects that may substitute for the expressions, and the GUI class rules logic 3928 and constraint satisfaction engine 188 validate each GUI object substitution for the expressions used to form the transformed test script statement 3928.

For example, consider the transformed test script statement 3928: VBWindow("s").VBWindow(e1).VBWindow(e2).VBWindow("d"), where the source node GUI object is named "s", the destination node GUI object is named "d", but expressions e1 and e2 compute values of intermediate nodes in the navigation path at runtime. The traversal logic 3924 determines intermediate nodes (GUI objects) that may be included in the possible navigation paths identified by the source node "s" and destination node "d". The path traversal logic 3924 analyzes the GUI difference model 162 to identify possible constant substitutions for e1 and e2, for example, "a" and "f", so that the transformed test script statement 3928 formed by the substitute GUI objects in the navigation path expression "s.a.f.d" can be validated by the GUI class rules logic 3928 and/or constraint satisfaction engine 188. By identifying the possible navigation paths leading to the destination node d starting with the source node s the GUI class rules logic 3928 and constraint satisfaction engine 188 can conclude whether the transformed test script statement 3928 is valid. In the event the traversal logic 3924 does not identify at least one navigation path, then the transformed test script statement 3928 is invalid. Alternatively, in the event the traversal logic 3924 identifies navigation paths leading from s to d by traversing two objects (e.g., e1 and e2), then the transformed test script statement 3928 may be valid provided that expressions e1 and e2 evaluate to the names of the nodes in the discovered navigation paths. The traversal logic 3924 infers the possible names computed by expressions e1 and e2 at compile time.

Figure 47:
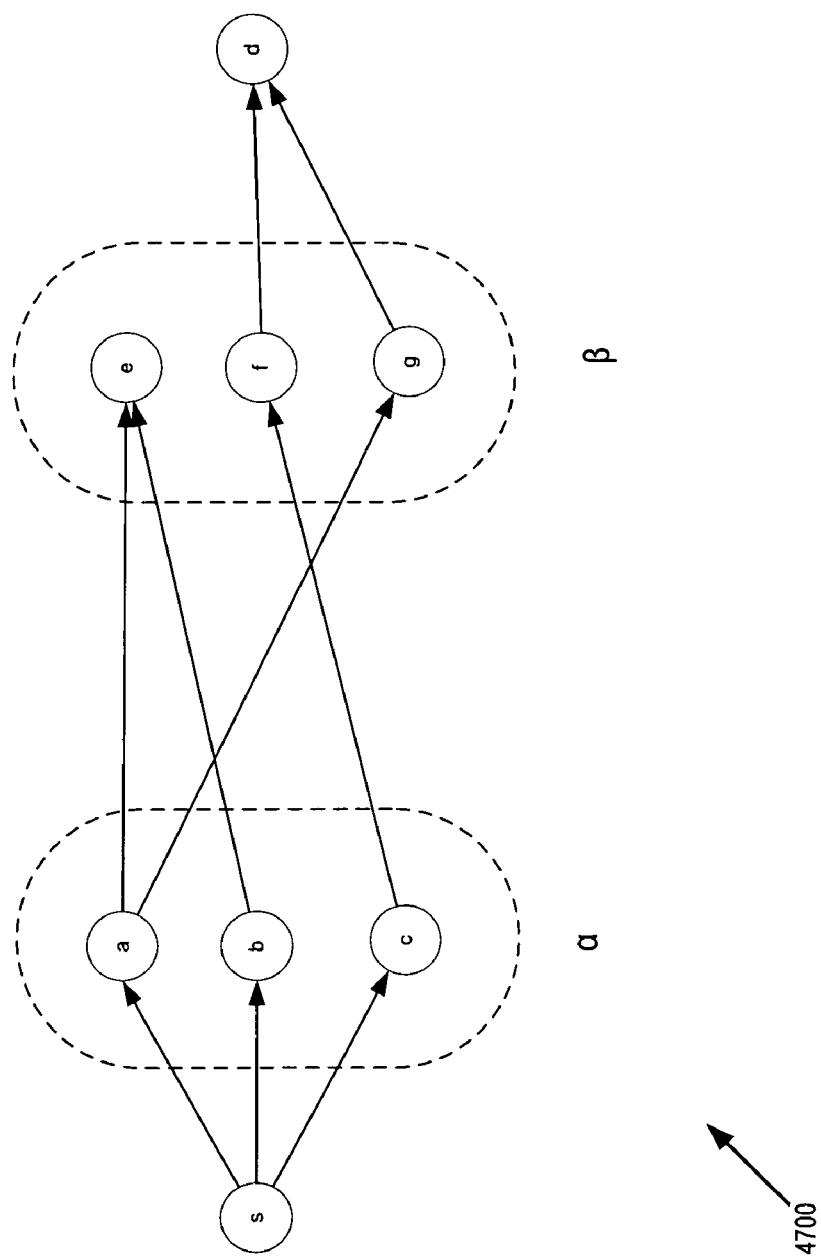
FIG. 47 illustrates navigation paths from a source to a destination object.

A formal description of the traversal logic 3924 is provided with reference to FIG. 47. Expressions e1 and e2 may be replaced with the object name variables $\alpha$ and $\beta$ correspondingly, and the original expression is converted into traversal strategy $S=s \rightarrow \alpha \rightarrow \beta \rightarrow d$. The function 'first(s)' computes a set of edges that can be traversed from node s. These edges lead to a set of objects designated by the variable $\alpha$. Function 'first(s)' may be computed using a graph reachability algorithm, included in the path traversal logic 3924, and the path traversal logic 3924 returns edges that may navigate to the destination node. According to FIG. 47, $\alpha=\{a, b, c\}$. Then for each element of $\alpha$, function 'first' may be computed. As a result, $\beta=\{e, f, g\}$ are obtained, where 'first(a)'=$\{e, g\}$, 'first(b)'=$\{e\}$, and 'first(c)'=$\{f\}$, and 'first(e)'=$\{\emptyset\}$, 'first(f)'=$\{d\}$, and 'first(g)'=$\{d\}$. From the computed node values the path traversal logic 3924 forms a work-list W that includes a set of all computed paths, W=$\{$(s, a, e), (s, a, g, d), (s, b, e), (s, c, f, d)$\}$. The path traversal logic 3924 analyzes each navigation path of W to determine whether the navigation path contains nodes s and d. Navigation paths identified by the path traversal logic 3924 to include nodes s and d, as source and destination nodes, are considered as valid navigation paths. In the event no navigation paths are identified by the traversal logic 3924, then the transformed test script statement 3928 is invalid because the target GUI element cannot be reached starting from the specified beginning GUI element. The traversal logic 3924 similarly validates test script statement vectors 3916.

Referring again to FIG. 47, an example of an invalid expression is VBWindow("s").VBWindow(e1).VBWindow(e2).VBWindow(e3).VBWindow("d"). All navigation paths between nodes s and d have at most two objects. Therefore, no matter what values are computed at runtime for expressions e1, e2, and e3 the expressions cannot represent objects in a valid navigation path between the source and the destination objects. Another example of an invalid expression is VBWindow("s").VBWindow("b").VBWindow(e1).VBWindow("d"), because no value for the expression e1 exists that makes the navigation path valid (i.e. that forms a complete path from 's' to 'd').

The constraint satisfaction engine 188 and the GUI class rules logic 3928 may infer GUI class information regarding GUI objects that are present in the navigation path of test script statement vectors 3916 and transformed test script statements 3926. One feature of the SAA 108 is to maintain the compatibility of operations on GUI objects between successive test scripts. When a transformed test script statement 3926 attempts to access GUI objects that do not exist in a subsequent GAP version 152 and/or attempts to set a value of a GUI object that is not compatible with the type of the GUI object, the transformed test script statement 3926 violates GUI element script change rules entries 3930 and/or constraints satisfaction rules 3932 imposed on the GUI object. The constraint satisfaction engine 188 and the GUI class rules logic 3928 type check each potential transformed test script statement 3926 before including the vector in the transformed test script 178, so that invalid operations may be identified and corresponding change guide messages 3938 may be output.

The constraint satisfaction engine 188 and the GUI class rules logic 3928 use inheritance and sub-typing relations between classes of GUI objects. The concept of class includes hierarchical containments (e.g., GUI scopes and system hierarchies). The object repository 174 and the GUI difference model 162 include GUI class information (e.g., annotating the classes of GUI objects) for each GUI object entry 3922 and GUI element difference entry 3910. For example, referring to line 1 of Table 12, the SchoolListBox is a WinObject class with properties listed at lines 3-39. In another example, referring to FIGS. 36, 45 and 46, at line 1 of each GUI difference entry (e.g., 3604, 4504 and 4604) the GUIElement Type is indicated. The class of each GUI object is indicated as shown in FIGS. 36, 45 and 46 at lines 7, 8 and 8, respectively. The class of a GUI object indicates that the GUI object includes particular attributes, properties and/or traits in common with other GUI objects of the same class that may be extended to and/or inherited by child GUI objects. For example, FIG. 36 at line 7 indicates that the StateListbox GUI object is of a WindowsForms10.ListBox.app4 class that includes values, as indicated at line 11 of FIG. 36. In other words, one property of GUI objects of WindowsForms10.ListBox.app4 is that these GUI objects are expected to have values. Class is a concept that a GUI framework uses to classify GUI objects. For example, class ListBox defines shape, functionality, and the rules of interactivity for GUI objects of this class. Assigning classes to GUI objects facilitates the constraint satisfaction engine 188 and the GUI class rules logic 3928 to trace changes between successive GAP versions (e.g., 150 and 152) and perform extended checking on the correctness of operations on GUI objects.

Referring again to FIG. 39, in one implementation, the GUI class rules logic 3928 and constraint satisfaction engine 188 determine whether a GUI object has changed and sets the GUI element change status 3934. For example, the GUI element change status 3934 may use a numerical indicator of 0, 1, and 2, respectively, to indicate that a GUI object was not changed, changed with, and changed without violations of GUI element script change rules 194 and/or constraint satisfaction rules 3932. The script analysis logic 3920 may use the GUI element change status 3934, GUI element script change rule entries 3930 and constraint satisfaction rules 3932 to search the change guide message repository 192 and identify the appropriate change specifier 184 and change guide message identifiers 3936. The GUI element script change rules 3930 may indicate whether an element of a GUI object can be changed in a particular way. For example, the GUI element script change rules 3930 may indicate that an element of a particular GUI object cannot be changed from a read-only to editable. In another example, a change to the class of a GUI object may result in a child GUI object violating a GUI element script change rule 3920, because one or more attributes of the child GUI object conflict with class change of the parent GUI element. In addition, a button may be replaced with a menu items, and actions that are correct for accessing and manipulating buttons will not work for menus.

In another implementation, the GUI element change status 3934 is a message that provides a detail description of the change. The GUI element change status 3934 may also indicate with a numerical indicator (e.g., −1) that the GUI object has been deleted from the subsequent GAP version 152. When a GUI object has been deleted from the subsequent GAP version 152 and a transformed test script statement 3926 includes a reference to the GUI object, the script analysis logic 3920 outputs a change guide message 3938 that indicates that the GUI object has been deleted.

In one implementation, the script analysis logic 3920 outputs a change specifier 184 that includes a transformed test script statement 3926 that violates a GUI element script change rule 194 and/or constraint satisfaction rule 3932, so that a programmer may evaluate whether to modify the transformed test script statement 3926 and/or the subsequent GAP version 152 to obtain a desired result and/or meet a desired requirement that otherwise may not have been apparent. In another implementation, the script analysis logic 3920 prohibits the output of transformed test script statements 3926 that violate certain GUI element script change rules 194 and constraint satisfaction rules 3932. Each of the GUI element script change rules 194 and constraint satisfaction rules 3932 may include indicators that indicate the level or severity of violation and whether the script analysis logic 3920 may output a transformed test script statement 3926, even though a violation has occurred. Regardless of whether the script analysis logic 3920 outputs a transformed test script statement 3926, the script analysis logic 3920 may output a change guide 180 that includes change guide messages 3938 corresponding to each of the violations.

For each corresponding GUI element change status 3934 that indicates a change in violation of GUI element script change rules 194 and/or constraint satisfaction rules 3932, the script analysis logic 3920 outputs a set of change guide message identifiers 3936 and corresponding change guide messages 3938. The change guide messages 3938 may include wrong-path delete type (WP-1) 3940, wrong-path same (WP-2) type 3942 and changed element (CE-1 and CE-2) type 3944. The change guide 180 and the change guide messages 3938, including 3940, 3942 and 3944, are described in further detail below.

Figure 40:
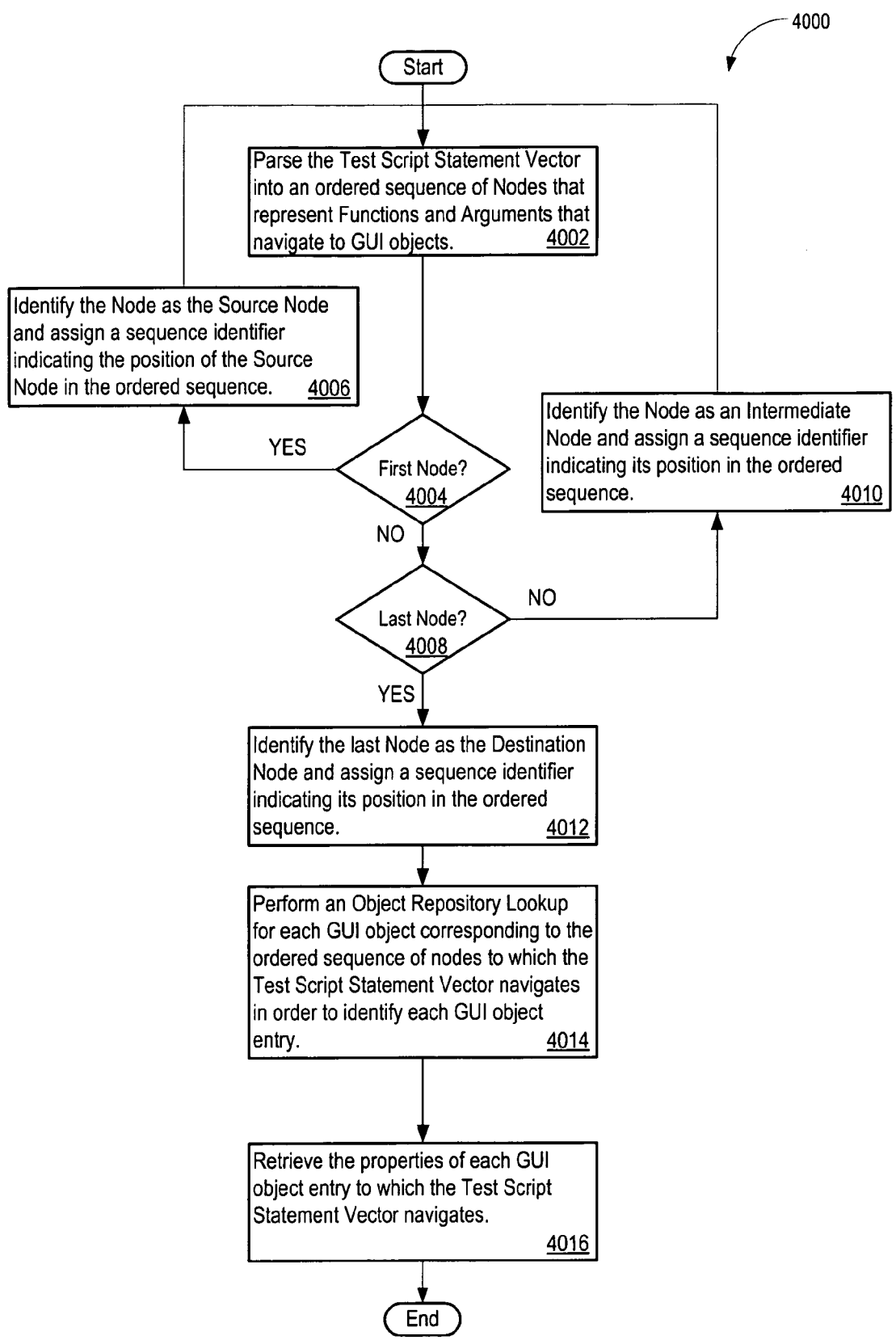
FIG. 40 shows a flow diagram for retrieving the properties of a GUI object entry from an object repository (OR).

FIG. 40 shows a flow diagram 900 for retrieving the properties of a GUI object entry 3922 from an object repository (OR) 174. The script parser logic 3912 parses the test script statement vector 3916 into an ordered sequence of nodes that represent functions and arguments that navigate to GUI objects (4002). The script parser logic 3912 evaluates the first node of the ordered sequence of nodes (4004), and identifies the first node as the source node and assigns a sequence identifier indicating the position of the source node in the ordered sequence (4006). The script parser logic 3912 evaluates the next node of the order sequence of nodes to determine whether the next node is the last node (4008), and identifies the next node as an intermediate node when the next node is not the last node (4010). The intermediate node is assigned a sequence identifier indicating the position of the intermediate node in the ordered sequence. The script parser logic 3912 may identify all intermediate nodes between the source node and the destination node.

The script parser logic 3912 identifies the last node in the ordered sequence as the destination node and assigns a sequence identifier to the destination node that indicates the position of the destination node in the ordered sequence (4012). The OR Lookup 172 performs an object repository lookup for each GUI object corresponding to the ordered sequence of nodes to which the test script statement vector navigates so that each GUI object entry 3922 is identified (4014). In one implementation, the ordered sequence of nodes is used by the path traversal logic 3924, GUI class rules logic 3928 and/or constraint satisfaction engine 188 to validate the statements of the current test script 164. In one implementation, the script analyzer 170 uses the ordered sequence of nodes to infer GUI class and inheritance (subclass) information for GUI objects. Where at least one of the source, destination and/or the intermediate nodes are expressions that can only be identified at run-time, the path traversal logic may identify possible GUI object entries 3922, and the GUI class rules logic 3928 and/or constraint satisfaction engine 188 determine the GUI object entries 3922 that satisfy the test script statement vector 3916 without violating the GUI class rules logic 3928 and the constraint satisfaction rules 3932. The OR Lookup 172 retrieves the properties of the GUI object entries 3922 to which the test script statement vector navigates (4016).

Figure 41:
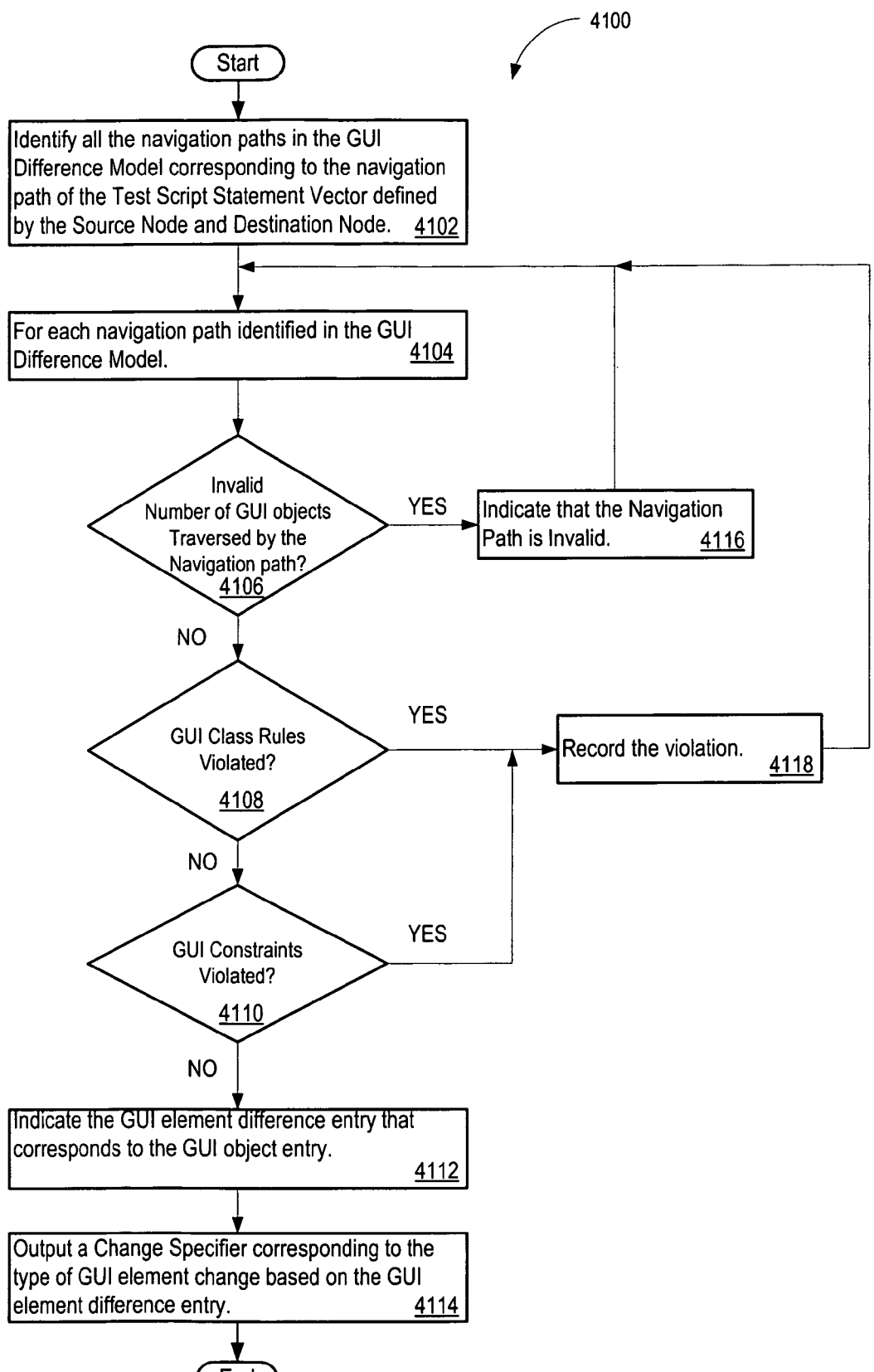
FIG. 41 shows a flow diagram for identifying a GUI difference entry corresponding to a GUI object entry.

FIG. 41 shows a flow diagram 4100 for identifying a GUI difference entry 3910 corresponding to a GUI object entry 3922. The OR Lookup 172 receives the properties of the GUI objects corresponding to the source, destination and all intermediate nodes of the test script statement vector 3916. In one implementation, the OR Lookup 172 employs the path traversal logic 3924 to identify possible GUI difference entries 3910 corresponding to the navigation paths identified by a source node and a destination node to which a test script statement vector navigates (4102). Where at least one of the GUI element difference entries 3910 is an expression that can only be identified at run-time, the path traversal logic 3924 identifies one or more possible GUI difference entries 3910 that form a navigation path between the source node and the destination node (4104). The path traversal logic 3924 determines whether the GUI difference entries 3910 form a valid navigation path between corresponding source and destination nodes GUI difference entries 3910 (4106). The GUI class rules logic 3928 and/or the constraint satisfaction engine 188 determine whether the GUI difference entries 3910 that form the navigation path violate GUI class rules logic 3928 (4108) and constraint satisfaction rules 3932 (4110).

The GUI class rules logic 3928 and/or constraint satisfaction engine 188 indicate the GUI element difference entries 3910 that correspond to each of the GUI object entries 3922 forming a valid navigation path (4112). The script analysis logic 3920 determines the output change specifier based on the type of GUI element change (e.g., GUI element change status 3934) indicated by the GUI class rules logic 3928 and constraint satisfaction engine 188 results, based on the GUI element difference entry 3910 (4114).

When the path traversal logic 3924 identifies a navigation path that traverses an invalid number of GUI element difference entries 3910 between corresponding source and destination node GUI difference entries 3910, the path traversal logic 3924 indicates that the navigation path is invalid (4116). In one implementation, invalid navigation paths are not analyzed by the GUI class rules logic 3928 and constraint satisfaction engine 188, and a transformed test script statement 3926 is not output as a result. In one implementation, the path traversal logic 3924 outputs a warning message identifying the invalid navigation paths. In another implementation, the change guide includes a warning message indicating the invalid navigation paths. The change guide 180 may include various warning messages that reflect any number of conditions identified during processing by the script analyzer 170. The change guide 180 may include warning and/or informational messages corresponding to conditions encountered by script analyzer 170 and/or any of the logic of the script analyzer 170 (e.g., the script parser logic 3912, script analysis logic 3920, OR Lookup logic 172, path traversal logic 3924, and GUI class rules logic 3928) and/or the constraint satisfaction engine 188. The script analysis logic 3920 may output a change guide 180 with change guide messages 3938 (e.g., 3940, 3942 and 3944) corresponding to the recorded GUI class rules logic 3928 and constraint satisfaction rules 3932 violations (4118).

FIG. 42 shows a transformed test script 178 for the subsequent GAP version 152. The transformed test script 178 may include statements automatically transformed by the script analysis logic 3920. The transformed test script 178 may also include statements manually entered after review of the change guide 180. In the example shown in FIG. 42, the script analysis logic 3920 outputs the transformed test script 178 with the transformed test script statements at lines 1, 6-11, 14-19, and 21-22, while a script writer has manually entered lines 2-4. The script analysis logic 3920 determines the transformed test script statements 3926 to output to the transformed test script 178 based on the GUI class rules logic 3928 and GUI element script change rules 194. The complexity of the GUI class rules logic 3928 and GUI element script change rules 194, and the richness of the GUI difference model 162 and GUI element metadata may be specified at any level of complexity to drive how much of the transformed test script 178 the script analysis logic 3920 outputs without programmer input.

For example, the script analysis logic 3920 transforms lines 1-3 of the current test script 164, shown in FIG. 37, into transformed test script statements 3926 lines 1, 5-7, shown in FIG. 42. A programmer may input lines 2-4 of the transformed test script 178, because those lines include new GUI objects (e.g., "ToolbarWindow32" and values "My Computer") for which the GUI difference model 162 may not include information that identifies a corresponding GUI object in the current GAP version 150. In one implementation, the GUI difference model 162 and the GUI element metadata provide the GUI class, GUI typing and mapping information necessary for the script analysis logic 39203920 to infer lines 2-4 of the transformed test script 178, given that the "university.data" in line 6 represents a destination in a path traversal from which the intermediate test script statements may be determined. In another example, the GUI difference model 162 and/or the GUI element metadata include GUI class and mapping information that the script analyzer 170 uses to transform line 11 of the current test script 164 that refers to WinObject "Save File" into transformed test script statements 3926 lines 16-17 that refer to a "Save File" child GUI object of the WinObject "menuStrip1".

Figure 43:
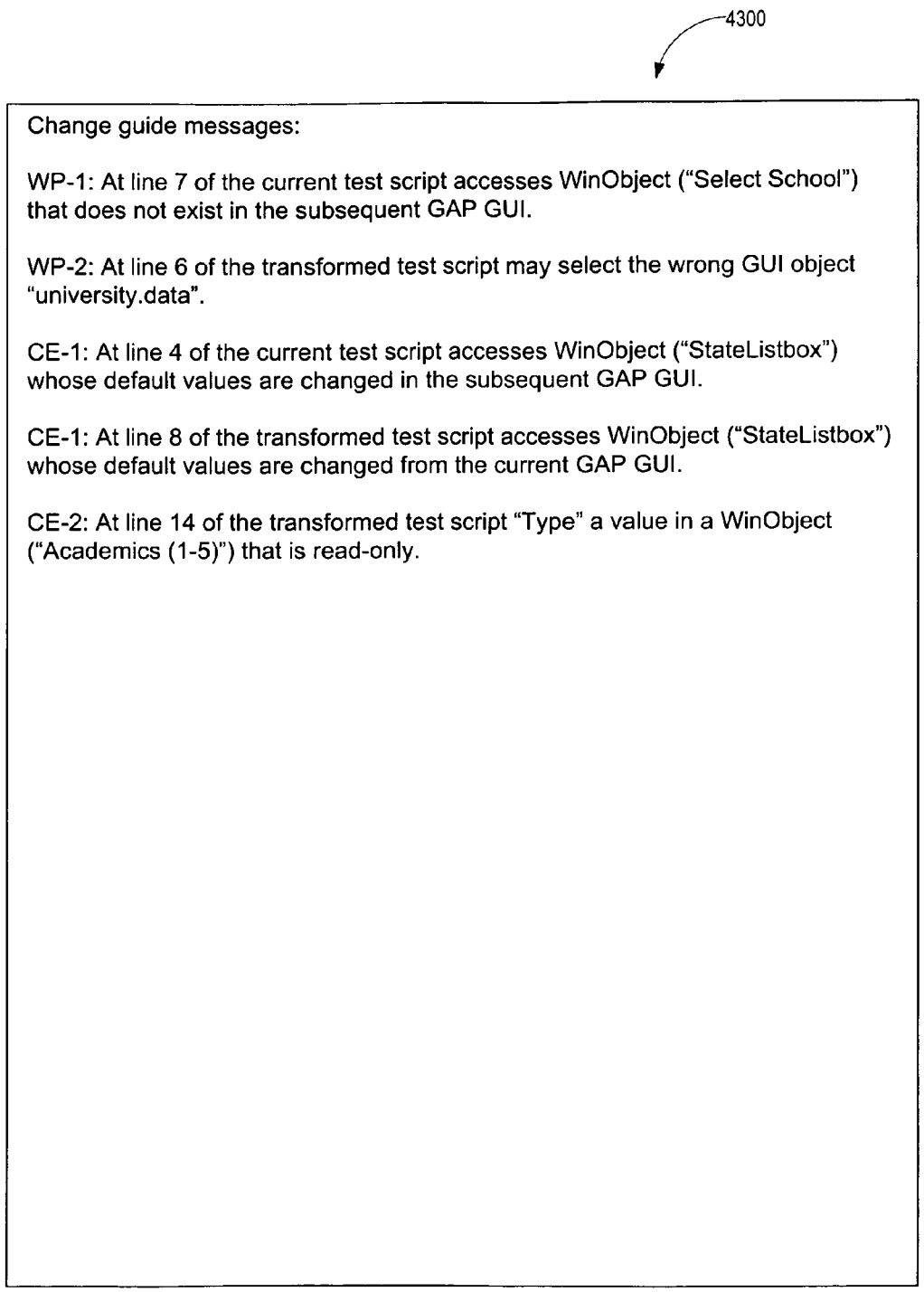
FIG. 43 shows a change guide.

FIG. 43 shows a change guide 180 that the script analyzer 180 may output. In one implementation, the script analysis logic 3920 outputs a change specifier 184 that indicates whether the transformed test script statement 3928 violates a GUI element script change rule 194 based on analysis performed by the GUI class rules logic 3928 and/or the constraint satisfaction engine 188. The script analyzer 170 outputs change specifiers 184 that may also include transformed test script statements 3926. The script analyzer 170 determines the modifications to GUI objects and the transformed test script statements 3928 that are affected by the modifications to the GUI objects to which the transformed test script statements 3928 refer. In one implementation, the script analysis logic 184 determines the GUI objects referred to in the current test script 164 that are deleted in the subsequent GAP version 152. The script analyzer 170 outputs change specifiers 184 that may include change guide messages 3938, transformed test script statements 3926, and/or both. In one implementation, the script analyzer 170 outputs change specifiers 184 that include change guide message identifiers 3930, transformed test script statements 3926, and/or both.

Some of the types of changes to GUI objects between successive releases of GAPs that the script analyzer 170 may identify in a change guide message 3938 include: (A) a new GUI object added to a subsequent GAP version 152; (B) a GUI object is deleted from a subsequent GAP version 152; (C) the values of one or more attributes of a GUI object are modified; (D) the values of a GUI object are different; and (E) the type of a GUI object is different. GUI object changes of types A and B occur when GUI objects are added and removed correspondingly from current GAP version 150 and subsequent GAP version 152. For example, adding the WinObject menustrip1 3408 to the subsequent GAP version 152 is a type A change, while removing the WinObject "Select School" 3304 is a type B GUI object change. Referring to FIG. 4, notice that the "Select School" has been removed at 412.

An example of a type C change is the change of the window name from StateList 3302 to School 3402. Adding or removing values from GUI objects such as list and combo boxes are examples of modifications of the type D change. For example, the listbox StateListbox 3312 in current GAP version 150 is identified in the subsequent GAP version 152 as StateListbox 3404, and referring to the GUI difference entry 3604 the values for SeqNumber="8" are "District of Columbia" and "Florida" for successive GAP versions, respectively. Changing the "type" of a GUI object may include replacing a class of the window that is used to represent the object and/or changing the high-level concept that describes the values that the GUI object takes. For example, changing the type of the static label to a read-only combo box is a modification of the type E. Another example of a type E change includes the change of the listbox "SchooListbox" 3316 to a combobox "SchoolCombobox" 3406.

The script analyzer 170 classifies the types of changes that the GUI class rules logic 3928 and/or the constraint satisfaction engine 188 identify, including: Wrong-Path type 1 (WP-1) errors that occur when a script accesses GUI objects that may be deleted in the subsequent GAP version 152 (e.g., see "Select School" 3318 and 412 as shown in FIG. 4). WP type 2 (WP-2) errors occur in scripts that read or write to the wrong GUI objects. WP-2 errors occur when transformed test script statements 3926 navigate to wrong GUI objects and read the values of the wrong GUI object and/or invoke methods on the wrong GUI object.

For example, consider the statement in lines 2 and 6 of the current test script 164 and transformed test script 178, respectively:

---

Window("StateList").Dialog("Open").-
WinListView("SysListView32").Select
"university.data".

---

The statement selects "university.data" from a WinListView "SysListView32". However, lines 2-4 of the transformed test script 178 may navigate to and invoke the Select method on the wrong GUI object "university.data", because the GUI objects referenced in lines 2-4 of the transformed test script 178 are new GUI objects that are not referenced in the current test script 164. Thus, when the properties of existing GUI objects are modified and/or other GUI objects are added into a subsequent GAP version 152, the result of interference of these operations is that the transformed test script statement 3926 may access and read values of objects that are different from those as originally intended.

Changed-Element (CE) errors occur when statements attempt to access GUI objects whose types, properties, or default values are changed in the subsequent GAP version 152 (CE-1). For example, the GUI difference entry 3604 indicates that there are different values for SeqNumber="8" are "District of Columbia" and "Florida" for successive GAP versions, and the script analysis logic 3920 may consequently issue a change guide message 3944 indicating that a CE-1 type error has occurred.

The script analysis logic 3920 may issues a change guide message 3944 corresponding to a CE-2 type error, when a transformed test script statement 3926 attempts an operation on a GUI object that does not take into consideration new constraints imposed on the elements, for example, attempting to write data to a read-only text box. Referring to the GUI element difference entry shown in Table 13, the WinObject "AcadScale" referred to in the current test script 164 at line 8 is an editable object that has been transformed into the WinObject "Academics (1-5)" in the subsequent GAP version 152 where the object is read-only. In one implementation, the script analysis logic 3920 outputs a change guide message 3944 to indicate a CE-2 type change has occurred.

TABLE 13

GUI Element Difference entry for AcadScale

```
<GUIElement Type = "AcadScale Textbox">
  <Version> 0
    - <GUIElement Alias="AcadScale">
      <UniqueID>0xcb</UniqueID>
      <HWND>0x1a0b3c</HWND>
      <Location x="573" y="790" width="32" height="23" />
      <Class>WindowsForms10.EDIT.app4</Class>
      <Style>0x560100c0</Style>
      <ExStyle>0xc0000a00</ExStyle>
    - <GUIElement Alias="AcadScale">
      <UniqueID>0x4</UniqueID>
      <HWND>0x1a0b3c</HWND>
      <Location x="575" y="792" width="28" height="19" />
      <Class>WindowsForms10.EDIT.app4</Class>
      <Style>0x560100c0</Style>
      <ExStyle>0xc0000a00</ExStyle>
      - <Values>
        <Value SeqNumber="3" />
      </Values>
    </GUIElement>
   </GUIElement>
  </Version>
  <Version> 1
    - <GUIElement Alias="Academics (1-5)">
      <UniqueID>0x2ff</UniqueID>
      <HWND>0x70d0e</HWND>
      <Location x="597" y="388" width="111" height="17" />
      <Class>WindowsForms10.STATIC.app.0.378734a</Class>
      <Style>0x5600000d</Style>
      <ExStyle>0xc0000800</ExStyle>
    - <GUIElement Alias="Academics (1-5)">
      <UniqueID>0x308</UniqueID>
      <HWND>0x70d0e</HWND>
      <Location x="597" y="388" width="111" height="17" />
```

TABLE 13-continued

GUI Element Difference entry for AcadScale

```
<Class>WindowsForms10.STATIC.app.0.378734a</Class>
  <Style>0x5600000d</Style>
    <ExStyle>0xc0000800</ExStyle>
    - <Values>
      <Value SeqNumber="3">Academics (1-5)</Value>
    </Values>
    </GUIElement>
    </GUIElement>
  </Version>
</GUIElement>
```

Knowing the modification type for a GUI object facilitates the script analysis logic 3920 to determine the appropriate change guide message 3938 and transformed test script statements 3926 to output. For example, when a transformed test script statement 3926 attempts to set values in a text box object, although the type of the object has changed to a read-only combo box, the script analysis logic 3920 outputs change guide messages 3944 that suggests how to modify the transformed test script statement 3926 to select values in the combo box using appropriate interfaces.

Figure 44:
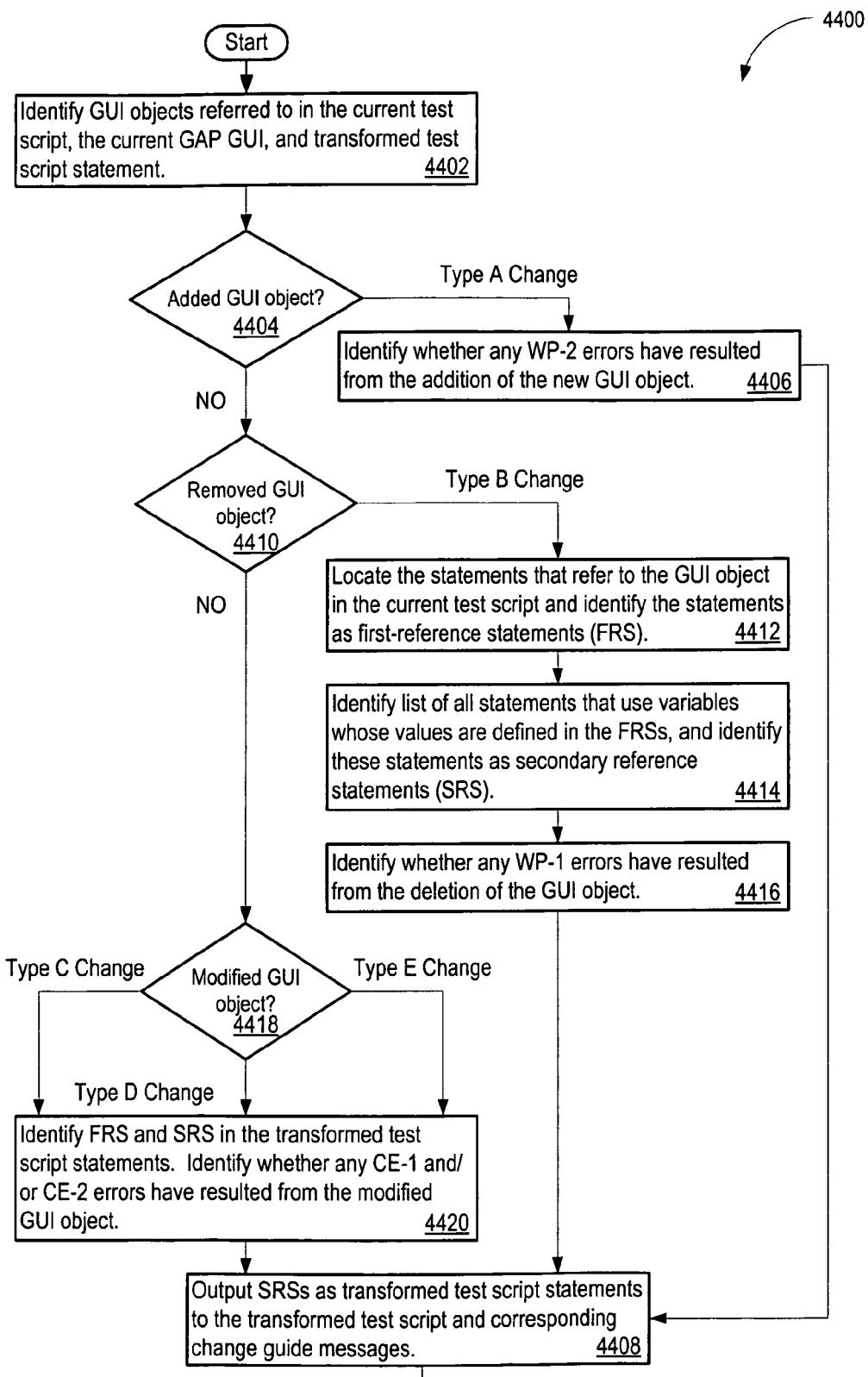
FIG. 44 shows a flow diagram for outputting transformed test script statements.

FIG. 44 shows a flow diagram for outputting transformed test script statements 3926. The script analysis logic 3920 reviews the GUI element change status 3934 of each GUI object referred to in the current test script 178, the current GAP version 150 and/or the transformed test script statement 3926 (4402). The script analysis logic 3920 determines whether the GUI objects of the transformed test script statement have been added to the subsequent GAP version 152 (4404). The GUI class rules logic 3928 and/or constraint satisfaction engine 188 may analyze the added GUI objects to determine whether a WP-2 error has occurred as a result of the transformed test script statements 3926 navigating to wrong GUI objects (e.g., two GUI objects incorrectly using identical aliases) and read the values of the wrong GUI object and/or invoke methods on the wrong GUI object (4406). The transformed test script statement 3926 is include in the transformed test script 178 and corresponding change guide messages 3938 are output (4408).

When the script analysis logic 3920 determines that GUI objects have been removed from a current GAP version 150 (4410). The script analysis logic 3920 locates the statements that reference these removed objects in the current test script 178. The script analyzer 170 refers to these statements as first-reference statements (FRS) (4412). The variables used in these statements are obtained, and the statements that use the variables whose values are defined in the FRSs are referred to as secondary reference statements (SRS) (4414). The GUI class rules logic 3928 and/or constraint satisfaction engine 188 may analyze the GUI objects to determine whether WP-1 errors have occurred based on the script statements attempting to access GUI objects that have been deleted in a subsequent GAP version 152 (4416). When a statement of the current test script 178 refers to a variable whose value points to a removed GUI object, the statement of the current test script 3926 is considered an SRS. In one implementation, the script analyzer 170 outputs the identified SRSs as transformed test script statements 3926 and corresponding change guide messages 3938, so that test personnel can review and decide how to modify the SRSs (4408).

When the values of one or more attributes of a GUI object are modified, a type C modification is performed (4418). FRSs and SRSs are identified in transformed test script statements 3926 for the GUI object with the modified attributes and change guide messages 3938 are output. When the values of GUI objects are added or removed, modifications of the type D occur (4418). After locating FRSs that reference GUI objects whose values have been changed, SRSs are found and the script analyzer determines the impact due to the SRSs. When the type of a GUI object is modified then a modification of the type E occurs that involves locating FRSs, checking the new types of the GUI object, invoking corresponding type sub-sumption rules (e.g., rules the GUI class rules logic 3928 may apply) (4418). The GUI class rules logic 3928 and/or constraint satisfaction engine 188 may analyze the modified GUI objects to determine whether CE-1 and CE-1 errors have occurred as a result of the transformed test script statement 3926 attempting to access GUI objects whose types, properties, or default values are changed in a subsequent GAP version 152, and/or attempting an operation on a GUI object that does not take into consideration new constraints imposed on the elements of the GUI object (4420). In one implementation, the script analyzer 170 outputs the identified SRSs as transformed test script statements 3926 and corresponding change guide messages 3938, so that test personnel can review and decide how to modify the SRSs (4408).

Figure 48:
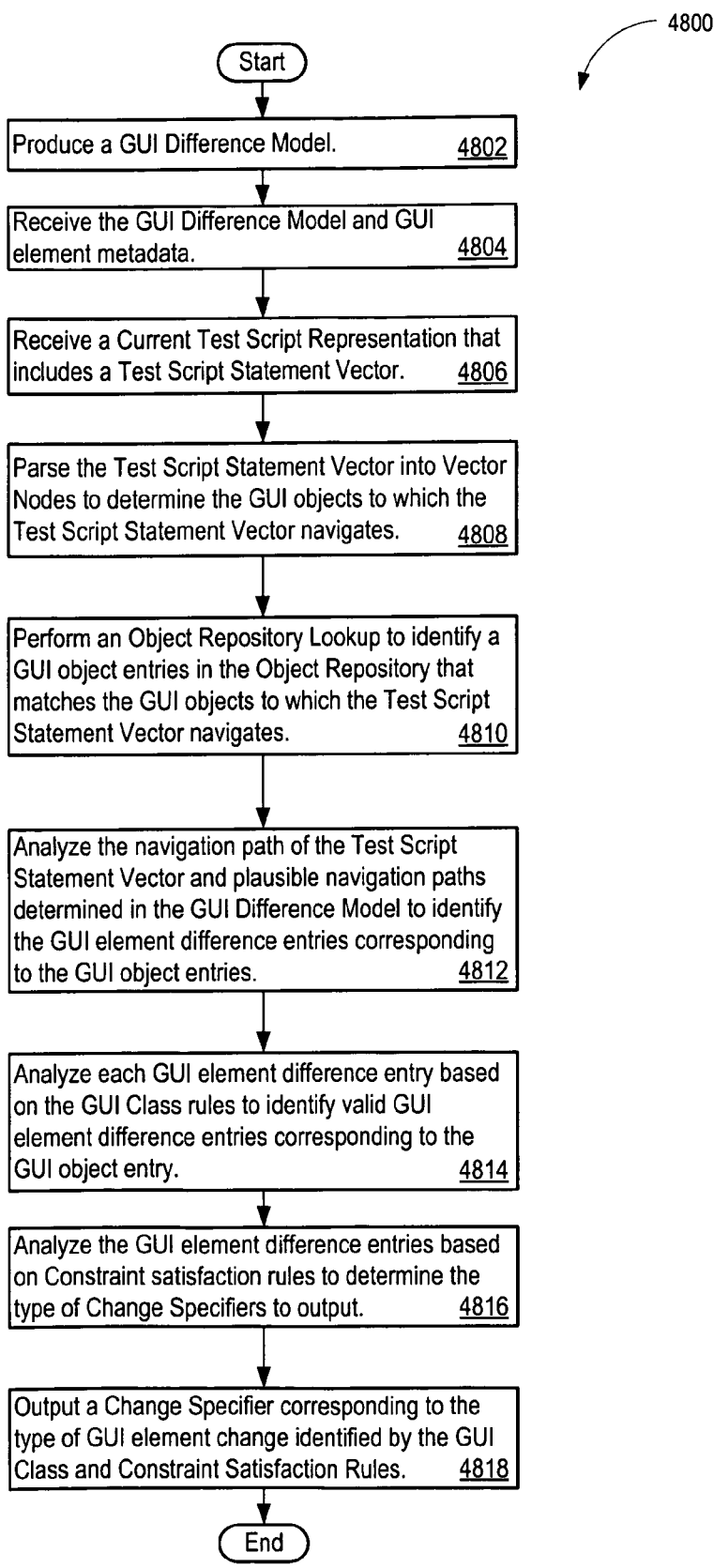
FIG. 48 shows a flow diagram for outputting a GAP change specifier.

FIG. 48 shows a flow diagram for outputting a GAP change specifier 184. A GUI difference model 162 is produced (4802) and the script analyzer 170 receives the GUI difference model 162 and GUI element metadata 140 (4804). The script analyzer 170 receives a current test script representation 3914 that includes a test script statement vector 3916 (4806). The script parser logic 3912 parses the test script statement vector 3916 into vector nodes to determine the GUI objects to which the test script statement vector 3916 navigates (4808). The script parser logic 3914 invokes the OR Lookup 172 for each GUI object identified by the test script statement vector 3916 to retrieve the properties of the GUI objects from the object repository 174 (4810). The path traversal logic 3924 analyzes the navigation path of the GUI element difference entries 3910 that correspond to the GUI objects identified by the test script statement vector 3916 (4812). The GUI class rules logic 3928 analyzes the GUI element difference entries 3910 based on the GUI class rules logic 3928 and GUI element script change rules 3930 to identify valid GUI element difference entries 3910 to which the navigation path corresponds (4814). The constraint satisfaction engine 188 analyzes the GUI element difference entries 3910 based on the constraint satisfaction rules 3932 to determine the type of change specifier to output, including whether to output a transformed test script statement 3926, a change guide message 3938, or both (4816). The script analysis logic 3920 outputs a change specifier corresponding to the type of GUI element change identified by the GUI class logic 3928 and constraint satisfaction rules 3932 (4818).

In one implementation, the SAA 108 uses adaptive programming including class and object graphs and an abstraction that treats all objects uniformly. The traversal logic 3924, constraint satisfaction engine 188 and the GUI class rules logic 3928 may distinguish complex and simple types of GUI objects. Complex types contain fields while simple types do not. Let T be finite sets of type names and F of field names or labels, and two distinct symbols this ∈F and ◊ ∈F. Type graphs are directed graphs G=(V, E, L) such that:

V ⊂ T, the nodes are type names;

L ⊆ F, edges are labeled by field names, or "◊" where fields do not have names. Edges that are labeled by "◊" are called aggregation edges, and edges that are labeled by field names reference edges. The difference between aggregation and reference edges becomes clear with the following example. Fields of classes in object-oriented languages designate instances of some classes, and these fields have names that are used to reference the fields. Each field of a class is defined by the name of the field and the name of the class (type) that this field is an instance of. The name of a field is the label of the corresponding reference edge in the type graph.

When a class designates a GUI object $o_k$ and the other class designates a GUI object $o_n$ that is contained in the object $o_k$, the type graph has two nodes, one for the object $o_k$ and the other for the object $o_n$ that the object $o_k$ contains. The names of the corresponding classes serve as their types. The relation between two nameless objects is represented using the edge labeled with the "◇" in the type graph.

$E \subset L \times V \times V$, edges are cross-products of labels and nodes; for each $v \in V$, the labels of all outgoing edges with the exception of "◇" are distinct;

for each $v \in V$, where v represents a concrete type, $$v \xrightarrow{this} v \in E.$$

An object graph is a labeled directed graph $O=(V', E', L')$ that is an instance of a type graph $G=(V, E, L)$ under a given function Class that maps objects to their classes, if the following conditions are satisfied:

for all objects $o \in V'$, o is an instance of the concrete type given by function Class(o);

for each object $o \in V'$, the labels of its outgoing reference edges are exactly those of the set of labels of references of Class(o) including edges and their labels inherited from parent classes;

for each edge $$o \xrightarrow{e} o' \in E',$$

Class(o) has a reference edge $$v \xrightarrow{e} \mu$$

such that v is a parent type of Class(o) and u is a parent type of Class(o').

An object graph is a model of the objects, represented in GAPs, and their references to each other. A collection of fields in an object graph is a set of edges labeled by field names. A collection of aggregated objects in an object graph is a set of edges labeled by "◇". A path in a type graph $G=(V, E, L)$ is a sequence of nodes and labels $p_G=(v_0 e_1, v_1 e_2, \ldots e_n v_n)$, where $v_i \in V$ and $$v_i \xrightarrow{ei+1} v_i+1$$

for $0 \leq i \leq n$. A concrete path is defined as an alternating sequence of type names and labels designating reference edges. In general a concrete path $p_c$ is a subset of the corresponding type path $p_G$, i.e. $p_c \subset p_G$.

An object graph has the special object $o_r \in V'$, $o_r$ is a collection of root objects $o_r \subset V'$ in the object graph O given by function root: $O \rightarrow o_r$. This object has type Class($o_r$)=root and its relation with objects in its collection is expressed via $o_r \rightarrow \diamond \rightarrow o' \in E'$.

Given an object o of some type the traversal logic 3924, constraint satisfaction engine 188 and the GUI class rules logic 3928 work together to identify one or more reachable objects that satisfy certain criteria. The task performed is equivalent to determining whether test script statement vectors 3916 and/or transformed test script statements 3926 that describe navigation paths are valid. Navigation paths specified in transformed test script statements 3926 can be thought of as specification of constraints for the object reach-ability problem. Finding reachable objects is done via traversals. The traversal of an edge labeled e corresponds to retrieving the value of the e field. Every edge in the object graph is an image of a has-part edge in the type graph: there is an edge $e(o_1, o_2)$ in O only when there exist types $v_1$ and $v_2$ such that object $o_1$ is of type $v_1$, $v_1$ has an e-part of type $v_2$, and $o_2$ is of type $v_2$.

The first node of a path p is called the source of p and the last node is called the destination of p. A traversal of an object graph O started with an object $v_i$ and guided by paths from a set of paths p is done by performing depth-first search on O with p used to prune the search. The resulting traversal history is a depth-first traversal of the object graph along object paths agreeing with the given concrete path set.

The problem of identifying all reachable objects from a given object o that satisfy certain criteria is formalized as follows. For each pair of classes c and c', a set of edges e may be identified by computing FIRST(c, c') iff it is possible for an object of type c to reach an object of type c' by a path beginning with an edge e. More precisely, FIRST(c, c')=e∈E, such that there exists an object graph O of C and objects o and o' such that: 1) Class(o)=c; 2) Class(o')=c'; and 3) o e*o'.

The last condition, o e*o' indicates that there is (∃) a path from o to o' in the object graph, consisting of an edge labeled e, followed by any sequence of edges in the graph. The lack of information about the actual graph is represented by the existential operator ∃.

The task of static checking of test scripts (e.g., transformed test scripts 178) is greatly simplified when the names of foreign components names are defined as string constants. When the names of GUI objects are specified using expressions, the values of these expressions may not be determined until run-time. Type graphs facilitate the script analyzer system 3900 to infer types of expressions and variables that hold the names of GUI objects. The script analyzer system 3900 applies concepts based on the Traversal Graph Analysis (TGA) defined in adaptive programming to infer types of expressions and variables.

An adaptive strategy $S=(R, \pi, \delta)$ represents paths in an object graph, where $R=\{s, d\}$, where s and d are the source and destination GUI objects of a path in an object graph, and $R \subset O$, where O is the set of objects in a type graph, $\pi=\{e, \alpha\}$, where e is a set of fields and $\alpha$ is a set of variables that designate a set of some edges $\alpha \subset e$, and $\delta=\{\rightarrow, \rightharpoonup\}$ is a set of transition edges representing objects and attributes respectively. Each element in a strategy S is either the name of some object or a variable designating an object and/or attributes.

The expression $\pi(o, o')$ designates a set of objects $\{o'\}$, such that each object o' of the set is a part of the object o expressed by some edge $e \in \pi$ such that $e(o, o')$. For example, test script statements may be considered strategies that define strategy graph edges $a \rightarrow b$ and $a \rightharpoonup b$ for test script statements Window("a").VBWindow("b") and Window("a").VBWindow("b").property("ReadOnly"), respectively. Thus, a strategy is an abstraction of test script statements (e.g., transformed test script statements 3926), as well as an abstraction of a set of paths in a type graph.

For example, a type graph of an organizational structure of a company may include: a CEO as a root type of some GUI object that contains the GUI object stock of type integer and aggregates type CTO. CTO is a type that has GUI objects salary of type Check and boss of type CEO. Type Check has in turn fields amount of type float and issuer of type CEO. A strategy CEO→α1→α2→ amount for the test script statement:

Window("CEO").Window(strexp1).Window(strexp2).property("amount") for the type graph described above designates strategy S, where s=CEO, d=amount, α1 is a variable designating objects computed via string expression strexp1, and α2 is a variable designating attribute object computed via string expression strexp2. Computing π(CEO, o') the type {CTO} is obtained, and computing π(CTO, o') the types {CEO,check} are obtained.

Each node in a strategy is assigned a distinct sequence number, and nodes are expressed as pairs (i, π). Given functions Δi: N×N→δ and Δπ: π×π→δ and two sequential natural numbers k and k+1, the function Δi computes the tran-sition edge between nodes that are assigned these numbers in S, and Ø if there is no transition edge. Correspondingly, given two nodes $\pi_q$ and $\pi_r$ in some type graph, function Δπ computes the transition edge between nodes, and Ø if there is no transition edge.

When the values of string expressions in test scripts statements cannot be computed until run-time, the string expressions may be inferred. The path traversal logic 3924, constraint satisfaction engine 188 and the GUI class rules logic 3928 work together to analyze transformed test script statements, using type graphs by transforming transformed test script statements 3926 into an adaptive strategy with variables replacing string expressions. The constraint satisfaction engine 188 and/or the GUI class rules logic 3928 computes possible values for each variable and generates traversal paths for each strategy. Where no path is identified between the source and the destination objects, then a type GUI element script change rule entry 3930, change guide message 3938 and change specifier 184 may be reported. Where at least one path is identified, then a corresponding change guide message 3938 and change specifier 184 are generated, since values of expressions that compute names of objects may not be in the computed paths. In one implementation, the path traversal logic 3924, constraint satisfaction engine 188 and the GUI class rules logic 3928 may be similarly applied to validate test script statements in the current test script 164.

The path traversal logic 3924 identifies one or more possible paths, while the constraint satisfaction engine 188 and the GUI class rules logic 3928 validate paths for the expressions and statements. The constraint satisfaction engine 188 and the GUI class rules logic 3928 compute the set of edges e for each pair of classes c and c', by computing FIRST(c, c') where an object of type c exists that can reach an object of type c' by a path beginning with an edge e. Recall from above that FIRST(c, c')=e∈E, such that there exists an object graph O of C and objects and o' such that: 1) Class(o)=c; 2) Class (o')=c'; and 3) o e*o'.

The last condition, o e*o' says that there is (∃) a path from o to o' in the object graph, consisting of an edge labeled e, followed by any sequence of edges in the graph. In one implementation, the method FIRST is implemented using two sets of logic: path traversal logic 3924 and GUI class rules logic 3928. Table 14 illustrates the path traversal logic 3924 and GUI class rules logic 3928.

The path traversal logic 3924 takes the set R of source and destination components in S and set π as input parameters. The path traversal logic 3924 outputs a tree of valid paths in a type graph that satisfy a given strategy. Some of the input components may not make it into the path tree because they do not start any valid paths.

In one implementation, the path traversal logic 3924 invokes the GUI class rules logic 3928, which in turn recursively calls itself. The GUI class rules logic 3928 uses three parameters: a component o that is a potential current node in the path, sequence number i of the node in the strategy S, and the transition edge δ between nodes in S that are assigned two sequential natural numbers i and i+1. The goal of the GUI class rules logic 3928 is to color the potential current node o in the path as either red or blue. Where colored red object o is considered a dead end on the path in the type graph that does not lead to the designated destination nodes. Otherwise, the node is colored blue and this color is propagated up to the source nodes which are subsequently included in the path tree.

The GUI class rules logic 3928 completes when the sequence number i is equal to or the greater of the number of nodes in the strategy, |π|, and/or where there is no transition edge from the current node. When the GUI class rules logic 3928 completes, the GUI class rules logic 3928 colors the current node blue. In the calling procedure the color of the node is checked, and where the node is blue, then node is attached to its parent node in the path tree.

In one implementation, the constraint satisfaction engine 188 and the GUI class rules logic 3928 work together to compute the set of edges e for each pair of classes c and c', where an object of type c is identified that can reach an object of type c' by a path beginning with an edge e. The logic is applied individually to each transformed test script statement 3926 in which foreign GAP objects are specified using string expressions whose values are not known before the transformed test script 178 is executed. The constraint satisfaction engine 188 and the GUI class rules logic 3928 work together to infer possible names of foreign objects that string expressions may evaluate to at runtime.

TABLE 14

Path Traversal and GUI class rules logic

```
Path Traversal Logic (R ∈ S, π ∈ S)
for all s ∈ R do
    GUI class rules logic (s, 0, Δi(0,1))
    if color(s) = red then
        remove s from R
    end if
end for
GUI class rules logic (o ∈ O, i ∈ N, ∂ ∈ δ)
if i ≧ |π| or ∂ = Ø then
    color(o)↦ blue
else
    for all o' ∈ πi(o, o') do
        if Δπ(o,o') = ∂ then
            GUI class rules logic (o', i + 1, Δi(i, i + 1))
            if color(o') = blue then
                AddChildToTree(o, o')
            end if
        end if
    end for
    if children(o) = Ø then
        color(o)↦ red
    else
        color(o)↦ blue
    end if
end if
```

Often the same string expressions are used in different statements in the same scripting scope. The same expressions compute the same values, where the expressions are located in the same scope, provided that the values of the variables used in these expressions are not changed. Using program analysis techniques the path traversal logic 3924, constraint satisfaction engine 188 and GUI class rules logic 3928 work together to detect expressions at compile time whose variables are not changed at run-time. The path traversal logic 3924 identifies one or more possible names of foreign GUI objects that may be substituted for string expressions in test script statements. While the constraint satisfaction engine 188 and the GUI class rules logic 3928 identifies from among the possible names of foreign GUI objects, those GUI objects that do not violate constraint satisfaction rules 3932 and/or GUI element script change rules 194. Given the same expression used in different test script statements in the same script scope, and provided that the values of the variables used in these expressions are not changed by other expressions executed between these statements, the constraint satisfaction engine 188 and/or the GUI class rules logic 3928 identify a set of names of foreign GUI objects computed by these string expressions. This set of GUI objects is obtained by taking the intersection of the sets of names computed by the path traversal logic 3924.

For example, consider the strategy graph S1 CEO→α1→α2→ amount for the type graph discussed above for the transformed test script statement 3926 expression: Window("CEO").Window(strexp1).Window(strexp2).property ("amount"). The constraint satisfaction engine 188 and/or the GUI class rules logic 3928 computes values for type scheme variables α1={CTO} and α2={boss, salary}.

Suppose a different strategy graph S2 exists, where Programmer→α2→bonus for y["Programmer"][strexp2].attribute("bonus") for some other type graph. Notice that the string expression variable strexp2 is the same in both statements, and because of that the string expression variable strexp2 is designated by the same type scheme variables in both the strategy graphs. Suppose that by applying the path traversal logic 3924 that values for type scheme variable α2={salary} are computed. In one implementation, in order to determine the value of variable α2 that satisfies both S1 and S2, the GUI class rules logic 3928 identifies the intersection of the sets of values of α2 computed for these two strategies. The resulting set α2={salary} is the result of pruning the navigation paths.

This example illustrates the idea of pruning navigation paths using context-sensitive dataflow analysis that may be used by the constraint satisfaction engine 188 and/or the GUI class rules logic 3928. By determining definitions and uses of a variable that designate names of GUI objects in a given scope, sets of values are computed for each transformed test script statement in which a variable is used. Then the intersection of these sets is taken to determine common values that this variable can take in the scope considered.

The script analyzer system 3900 provides modularization integrity as a mechanism for ensuring maintainability of transformed test scripts 178. Modularization integrity specifies that each statement in a transformed test scripts 178 may only communicate directly with the objects that belong to GUIs for which the transformed test scripts 178 is created. Compositions of transformed test scripts 178 in which GUI objects are accessed by calling functions exported by transformed test scripts 178 should not violate modularization integrity. The script analyzer system 3900 ensures the modularization integrity of transformed test scripts 178 by analyzing compositions of transformed test script statements 3924 to build the transitive relations between the current test script 164 and the transformed test script 178.

For example, a statement Func("y", "z"), found in a suite of related test scripts, navigates to the field z of foreign GUI object y in some test scripts that export function Func. Thus, the some test scripts in the suite of related test scripts may violate the modularization integrity by implicitly interoperating the test scripts via the function Func even though this communication may be prohibited by the constraints of a given test suite. In one implementation, the script analyzer system 3900 encodes modularization constraints when defining test scripts using the keyword constraints as part of a global comment in each test script. These constraints define GAPs and their GUI screens as well as other test scripts with which a given test script may communicate. An example is a statement that specifies a constraint is constraints screen ("Q") test_scripts("P, S"). This constraint effectively prohibits a given test script from communicating with other GAPs, GUI screens, and test scripts, except the screen Q and test scripts P and S, explicitly or implicitly. In one implementation, the constraint satisfaction engine 188 ensures that such constraints are not violated by maintaining constraint satisfaction rules 3932 imposed on test scripts and GAPs, and the constraint satisfaction engine 188 issues change guide messages 3938 when these constraints are violated.

The time complexity of the path traversal logic 3924, constraint satisfaction engine 188 and GUI class rules logic 3928 is exponential to the size of the type graph for each transformed test script 178. Because the path traversal logic 3924, constraint satisfaction engine 188 and GUI class rules logic 3928 involve the search of one or more nodes and edges in the type graph that contains cycles for each node in the strategy, the time complexity is $O((V+E)^{max(|\pi|)})$ where V is the number of nodes, E is the number of edges in the type graph, and max($|\pi|$) is the maximum number of nodes in strategies. The operations of storing successors in the table of variables take $O(1)$. In general, the number of nodes max($|\pi|$) in strategies is much smaller than the number of nodes in type graphs. All graph nodes may not need to be explored for each node in a strategy. The theoretical limit on computational complexity of the path traversal logic 3924, constraint satisfaction engine 188 and GUI class rules logic 3928 is exponential. However, experimental evaluation shown that in practice the running time of is small for large schemas because typically path expressions are short.

Figure 49:
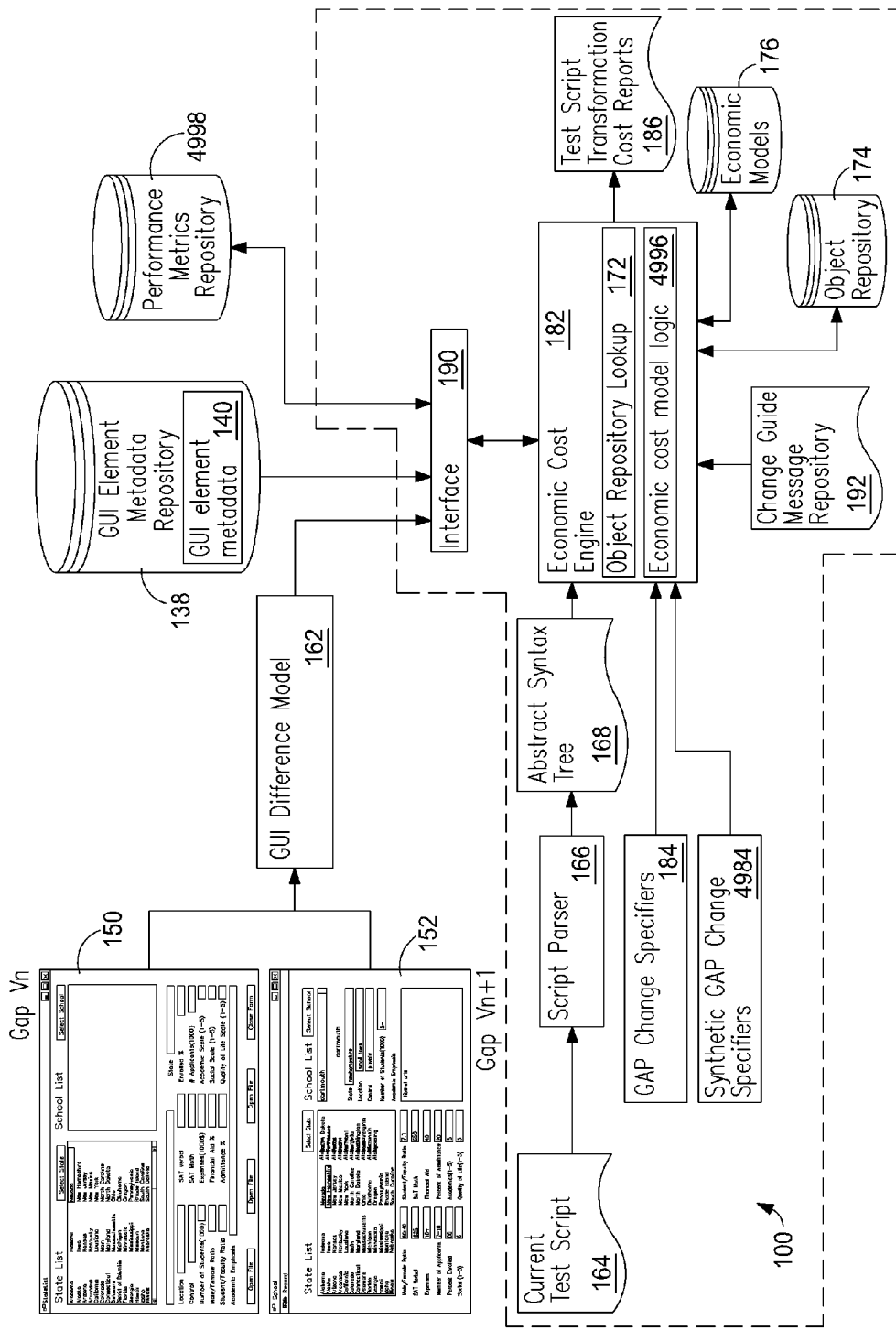
FIG. 49 shows a test script transformation analyzer with economic cost engine architecture.

FIG. 49 shows a test script transformation analyzer with economic cost engine ("economic cost engine architecture") 110. Although detailed descriptions of the features of the economic cost engine architecture 110 will be provided further below, a brief introduction of the economic cost engine architecture 110 will first be presented. In one implementation, the economic cost engine architecture 110 receives a GUI difference model 162 that specifies GUI element differences between a current GAP version 150 and a subsequent GAP version 152. The GUI difference model 162 may be represented as an XML schema. The GUI element difference model 162 may include current and subsequent GAP tree models corresponding to the current GAP version 150 and subsequent GAP version 152. In one implementation, the economic cost engine 182 receives the current GAP tree model from the GUI element difference model 162. In another implementation, the current and subsequent GAP tree models, as well as the GUI difference model 162 are implemented as relational models stored in a database. The economic cost engine architecture 110 employs an interface 190 to receive inputs and communicate with various components, including a GUI element metadata repository 138. The GUI element metadata repository 138 may provide detailed information regarding the GUI elements represented in the GUI difference model 162, the current GAP 150 and the subsequent GAP 152.

The economic cost engine architecture 110 includes a script parser 166 that parses a current test script 164 to obtain an intermediate representation of the current test script 164.

The intermediate representation may be an abstract syntax tree (AST) 168 or other representation of the current test script 164. In one implementation, the economic cost engine architecture 110 employs an economic cost engine 182 that analyzes the AST 168 and the GUI difference model 162. The economic cost engine 182 may invoke object repository (OR) lookup logic 172 to search an object repository 174 and the GUI difference model 162 to locate, in the GUI difference model 162, the GUI elements identified by the AST 168. The economic cost engine 182 includes economic cost model logic 4996 that uses the GUI elements identified by the AST 168 and GUI difference model 162 to generate synthetic GAP change specifiers 4984 that are used to search an economic models 176 repository for corresponding GUI element change cost rule. In one implementation, the economic cost model logic 4996 uses GAP change specifiers 184 and synthetic GAP change specifiers 4984 to search an economic models 176 repository for corresponding GUI element change cost rule. The economic cost engine 182 applies each GUI element change cost rule to obtain corresponding GUI transformation costs from which a test script transformation cost report 186 is generated, discussed further below. The economic cost engine 182 may also use historical testing metrics from a performance metrics repository 4998 and cost reports repository 5288 to facilitate obtaining the GUI transformation costs, discussed below.

The economic cost engine 182 may generate test script transformation cost reports 186 based on different combinations of available information, including: 1) GAP change specifiers 184 and/or synthetic GAP change specifiers 4984; 2) GAP change specifiers and a current test script 164; 3) GAP change specifiers 184, a current test script 164 and a current GAP version 150 (e.g., a current GAP tree model); 4) a current test script 164 and a GUI difference model 162 with GUI element difference entries; and 5) GAP change specifiers 184, a current test script 164, and a GUI difference model 162. Other combinations of the same or different information may also be employed. The various combinations of available information are used by the economic cost engine 182 to analyze received and/or generate synthetic GAP change specifiers 4984 that are used by the economic cost model logic 4996 to locate and retrieve GUI transformation costs and generate test script transformation cost reports.

The accuracy of the GUI transformation costs may depend in part on how narrow the variance is between the actual costs and the costs indicated by the GUI transformation costs. A large variance corresponds to a lower accuracy, while a narrow variance corresponds to a higher accuracy. In other words, the accuracy of the GUI transformation costs may correspond to the predictability and/or confidence that the actual costs will reflect the GUI transformation costs. In one implementation, the accuracy of the GUI transformation costs varies due to the granularity of the information received by the economic cost engine 182. For example, the GUI transformation costs generated as a result of the economic cost engine 182 receiving GAP change specifiers 184, a current test script 164, and a GUI difference model 162 may have a higher level of accuracy than the GUI transformation costs generated based solely on GAP change specifiers 184. The economic cost engine 182 may employ various economic models that compensate for the lack of granularity of information provided to the economic cost engine 182, discussed in further detail below.

In one implementation, the economic cost engine 182 receives GAP change specifiers 184, a current test script 164 and a current GAP version 150, and generates a GUI difference model 162. In other words, the economic cost engine 182 may generate the test script transformation cost report 186 based on the AST 168, the current GAP version 150 and GAP change specifiers 184, discussed further below, without relying on an actual subsequent GAP version 152. For example, the economic cost engine 182 analyzes the GAP change specifiers 184 and the current GAP version 150 (e.g., a current GAP tree model received from the GUI difference model 162), and generates synthetic GAP change specifiers 4984. In another implementation, the economic cost engine 182 generates the test script transformation cost report 186 based on the GAP change specifiers 184, without analyzing either the GUI difference model 162 and/or the AST 168. The economic cost engine 182 may generate the test script transformation cost reports 186 with change guide messages retrieved from a change guide message repository 192. The change guide messages may provide information regarding the various changes corresponding to the GAP change specifiers 184, GUI element change cost rules and/or GUI difference entries.

FIG. 34 shows a GUI of a subsequent GAP version 152. In one implementation, the GUI difference model 162 results from a comparison between the current GAP tree model as shown in Table 6 and a subsequent GAP tree model as shown in Table 8. In another implementation, the economic cost engine 182 analyzes the current GAP tree model using GAP change specifiers 184 to determine GAP changes that may produce the subsequent GAP tree model, from which the economic cost engine 182 generates synthetic GAP change specifiers 4984. For example, prior to actually building the subsequent GAP version 152, a programmer may identify various proposed changes to a current GAP version 150 using the GAP change specifiers 184. The economic cost engine 182 analyzes the GAP change specifiers 184 and current GAP tree model to generate synthetic GAP change specifiers 4984 that correspond to a proposed subsequent GAP tree model. In one implementation, the economic cost engine 182 includes GAP change specifier logic that generates synthetic GAP change specifiers 4984 using the current GAP tree model and the received GAP change specifiers 184. In one implementation, the economic cost engine architecture 110 generates the synthetic GAP change specifiers 4984 as a result of recording various proposed changes identified by the programmer during an interactive session with the current GAP version 150.

FIG. 50 shows a current test script 5000 for the current GAP GUI. The current test script 5000 includes navigation statements (e.g., L1 and L6) that navigate to GUI objects, perform read, write, or other actions (functions) on GUI objects, and the arguments of these functions. For example, line 1 of the current test script 5000 navigates to a window StateList, locates 'Open File' identified as a child GUI object of the window StateList, and performs an action 'Click' on the 'Open File' GUI object at XY coordinates 86, 12. Through the series of navigation and action statements, the current test script 5000 opens a file 'university.data' as indicated by lines 2-3. A 'State' is selected from the StateListbox and a SchoolListbox is activated, based on lines 4-6. The current test script 5000 successively selects from the SchoolListbox the schools 'Acme University' and 'State University' located in the 'State' by using a 'For Next Loop', as a result of the navigation and action statements at lines 7-17 based on the coordinates 67, School_Constant in WinObject "Select School" at line 8. The current test script 5000 uses conditional branching at lines 11-15 to change the academic scale to '3' for 'Acme University' and to '2' for 'State University', and saves the individual changes as a result of line 16. The current test script 5000 saves all the changes to a new file 'university_revise.data' as a result of the statements at lines 18-20.

Figure 51:
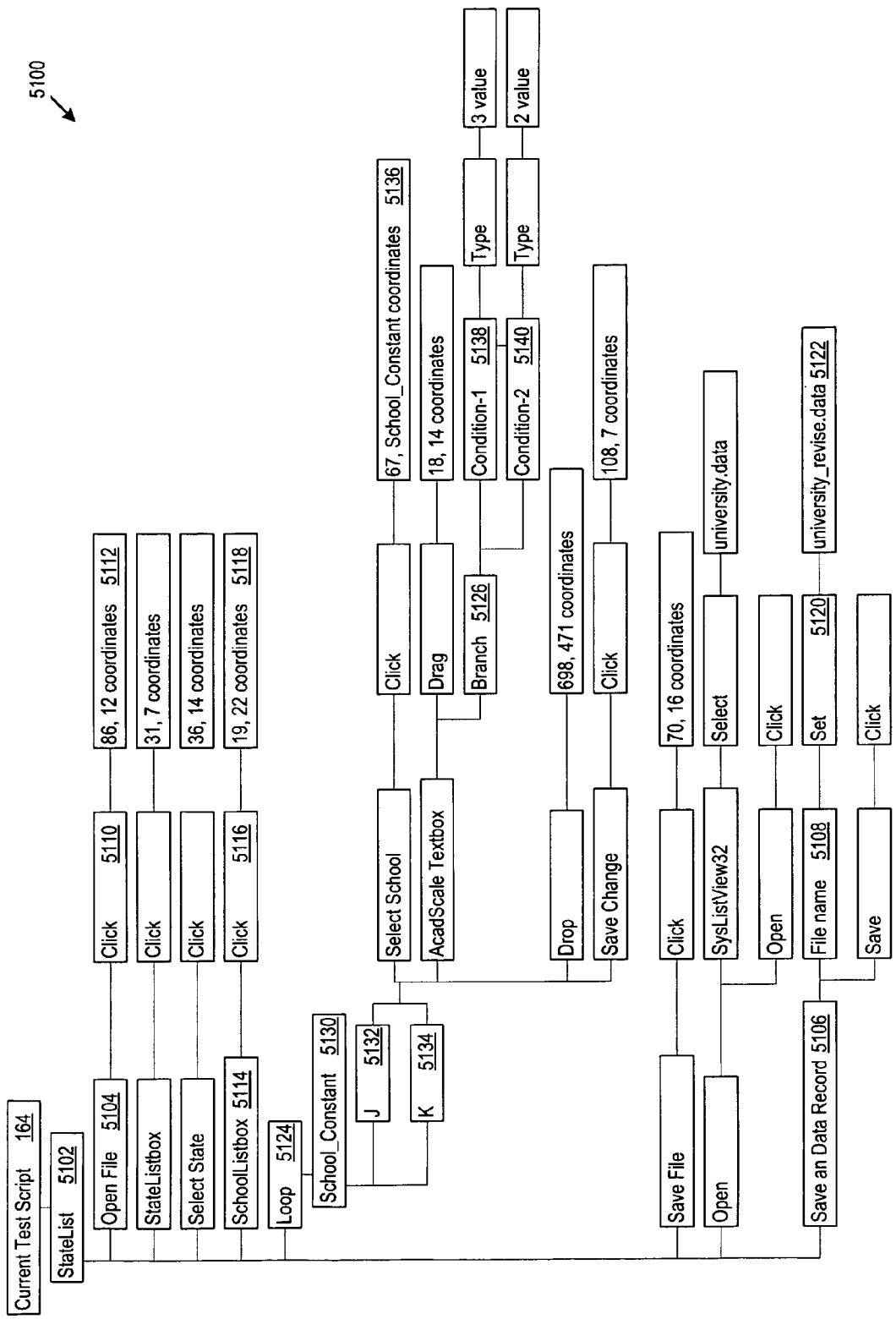
FIG. 51 shows a current test script representation.

FIG. 51 illustrates a current test script representation 5100 that the script parser 166 produces as an intermediate representation of the current test script 5000. In one implementation, the economic cost engine architecture 110 implements the current test script representation as an abstract syntax tree (AST) 168. The current test script representation 5100 represents a vector (e.g., the current test script 5000) whose elements are vectors that represent navigation statements of the current test script 5000. In other words, the current test script representation 5100 represents the navigation statements as test script statement vectors that navigate to GUI objects and perform actions on those GUI objects.

The script parser 166 represents the test script statement vectors as an ordered sequence of nodes that contain function names and the arguments of those functions that navigate to GUI objects. The nodes of a test script statement vector include a source node and a destination. For example, the script parser 166 may represent the test script statement vector corresponding to line 1 of the current test script 5000 as source node StateList 5102 and a destination node 'Open File' 5104. The nodes of a test script statement vector may also include intermediate nodes positioned between a source node and a destination node. For example, the script parser 166 may represent the test script statement vector corresponding to line 19 of the current test script 5000 as source node StateList 5102, intermediate node 'Save a Data Record' 5106 and destination node 'File name' 5108. The test script statement vector corresponding to line 19 of the current test script 5000 may be further expressed as (5102-5106-5108-5120-5122), including the method 'Set' 5120 and value 'university_revise.data' 5122.

The test script statement vectors may include looping and conditional branching nodes (e.g., loop 5124 and branch 5126, respectively). In one implementation, the loop 5124 node is followed by a loop variable (e.g., school_constant 5130) for which a range of values, from a lower to an upper bound (e.g., J 5132 and K 5134), are evaluated and used in expressions within the scope of the loop 5124 (e.g., 67, school_constant coordinates 5136). The branch 5126 may be followed by one or more conditions (e.g., condition-1 5138 and condition-2 5140). The economic cost engine 182 may use the loop 5124 and branch 5126 nodes, and range values and conditions (e.g., J 5132, K 5134, condition-1 5138 and condition-2 5140) to recursively evaluate the current test script representation 5100.

In one implementation, the GAP change specifiers 184 includes a model specifier (discussed in further detail below) that identifies the GUI element change cost rule to use to obtain a GUI transformation cost corresponding to a loop 5124. The GUI element change cost rule for a loop 5124 may result in the economic cost model logic 4996 obtaining a GUI transformation cost that represents a multiplier equal to the number of values in the range from a lower to an upper bound (e.g., J 5132 and K 5134) that is applied to the GUI transformation costs for the test script statements within the scope of the loop 5124 (e.g., lines 8-16 in FIG. 50). For example, the GUI transformation cost corresponding to loop 5124, based on the lower to the upper bound (e.g., J 5132 and K 5134), may equal 10 and the GUI transformation costs corresponding to the test script statements within the scope of the loop 5124 (e.g., lines 8-16 in FIG. 50) may equal 500, resulting in a total GUI transformation cost of 5,000 for the test script statements including loop 5124 (e.g., lines 7-17). In another example, the GUI transformation cost obtained by applying the GUI element change cost rule for a loop 5124 may represent a single weighted valued (e.g., 50) that the economic cost model logic 4996 adds to the GUI transformation costs corresponding to the test script statements within the scope of loop 5124 so that the total GUI transformation cost of 550 results for the test script statements including loop 5124 (e.g., lines 7-17).

The GUI element change cost rule for a branch 5126 may result in obtaining a GUI transformation cost that is based on the number of conditions (e.g., condition-1 5138 and condition-2 5140) within the scope of the branch 5126, and the GUI transformation costs for the branch 5126 and the test script statements within the scope of the branch 5126 are added to obtain the total GUI transformation costs.

In another implementation, the GUI transformation cost corresponding to the branch 5126 is a multiplier that is applied to the GUI transformation costs corresponding to the test script statements within the scope of the branch 5126. For example, two conditions (e.g., condition-1 5138 and condition-2 5140) exist within the scope of the branch 5126, corresponding to a GUI transformation costs of 2 for the branch 5126 and the GUI transformation costs of the lines within the scope of the branch 5126 are 100 resulting in a total GUI transformation cost of 200 for the test script statements including branch 5126 (e.g., lines 11-15).

The script parser 166 evaluates arguments of navigation and action functions as expressions, variables and constants. The arguments express the physical properties of GUI objects to which the test script statement vectors navigate and values used to perform actions on those GUI objects. For example, the '86,12' coordinates 5112 identify the location for a pointing device to perform an action 'Click' 5110 on the 'Open File' 5104 GUI object, which is a child GUI Object of the window StateList 5102. The economic cost engine 182 uses the names of the GUI objects (e.g., StateList 5102 and 'Open File' 5104) navigated to by the test script statement vectors to locate the corresponding physical properties of the GUI objects stored in an object repository 174, identify corresponding GUI difference entries and generate synthetic GAP change specifiers 4984.

In one implementation, the economic cost engine 182 uses the OR lookup logic 172 to locate, in the object repository 174, the physical properties of the GUI objects navigated to by a test script statement vector, and locate, in the GUI difference model 162, corresponding GUI difference entries. The economic cost engine 182 generates synthetic GAP change specifiers 4984 and invokes the economic cost model logic 4996 to locate corresponding GUI element change cost rules in the economic models 176 repository using GAP change specifiers 184 and synthetic GAP change specifiers 4984. In one implementation, the OR lookup logic 172 is divided into two sub-functions: 1) lookup logic adapted to locate and retrieve the physical properties of the GUI objects navigated to by the test script statement vector (e.g., 5102-5104, 5102-5106-5108, and 5102-5114); and 2) locator logic that finds and returns a GUI element difference entry (node) in the GUI difference model 162 that corresponds to the GUI object with the given physical properties. The economic cost model logic 4996 generates synthetic GAP change specifiers 4984 that are used to locate applicable GUI element change cost rules, based on the lookup logic and locator logic results from the OR lookup logic 172. The OR lookup logic 172 may include path traversal logic, discussed in further detail below, to identify possible navigation paths of a test script statement vector between a source node GUI object and destination node GUI object to which a test script statement vector navigates.

The economic cost engine 182 may query the object repository 174 to identify the physical properties of the GUI objects navigated to by the test script statement vectors represented by the current test script representation 5100. Physical properties of a GUI object may indicate whether the GUI object is hidden, read-only, a number and default values, as shown in Table 12.

For example, the economic cost engine 182 analyzes the GUI objects 5102-5114 in the test script statement vector. The '19,22' coordinate 5118 identifies the location for a pointing device to perform an action 'Click' 5116 on the GUI object SchoolListbox 5114, which is a child GUI Object of the window StateList 5102. The economic cost engine 182 invokes the OR lookup logic 172 to locate the physical properties of the GUI objects 5102 and 5114. The OR lookup logic 172 locates the physical properties of the window StateList 5102 and the WinObject SchoolListbox 5114, as shown in Table 11 at lines 3 and 12. The economic cost engine 182 uses the physical properties retrieved from the object repository 174 to locate corresponding GUI difference entries (e.g., 4504 and 4604) in the GUI difference model 162. The GUI difference entries 4504 and 4604 indicate that the window StateList 5102 and the WinObject SchoolListbox 5114 in the current GAP version 150 correspond to the window School 3402 and the WinObject SchoolCombobox 3406 in the subsequent GAP version 152, respectively. In one implementation, the economic cost engine 182 employs the OR lookup logic 172 to traverse the GUI difference model 162 using the physical properties of the GUI objects navigated to by the test script statement vector. The OR lookup logic 172 function returns a GUI element difference entry (e.g., 3604, 4504 and 4604) from the GUI difference model 162 that represents the GUI object navigated to by the test script statement vector (e.g., 5102-5104-5110-5112, 5102-5106-5108-5120-5122, and 5102-5114-5126-5118), and the economic cost model logic 4996 generates corresponding synthetic GAP change specifiers 4984. Table 12 illustrates the physical properties that may be located in the object repository for the GUI object entry corresponding to the SchoolListbox 5114.

Figure 52:
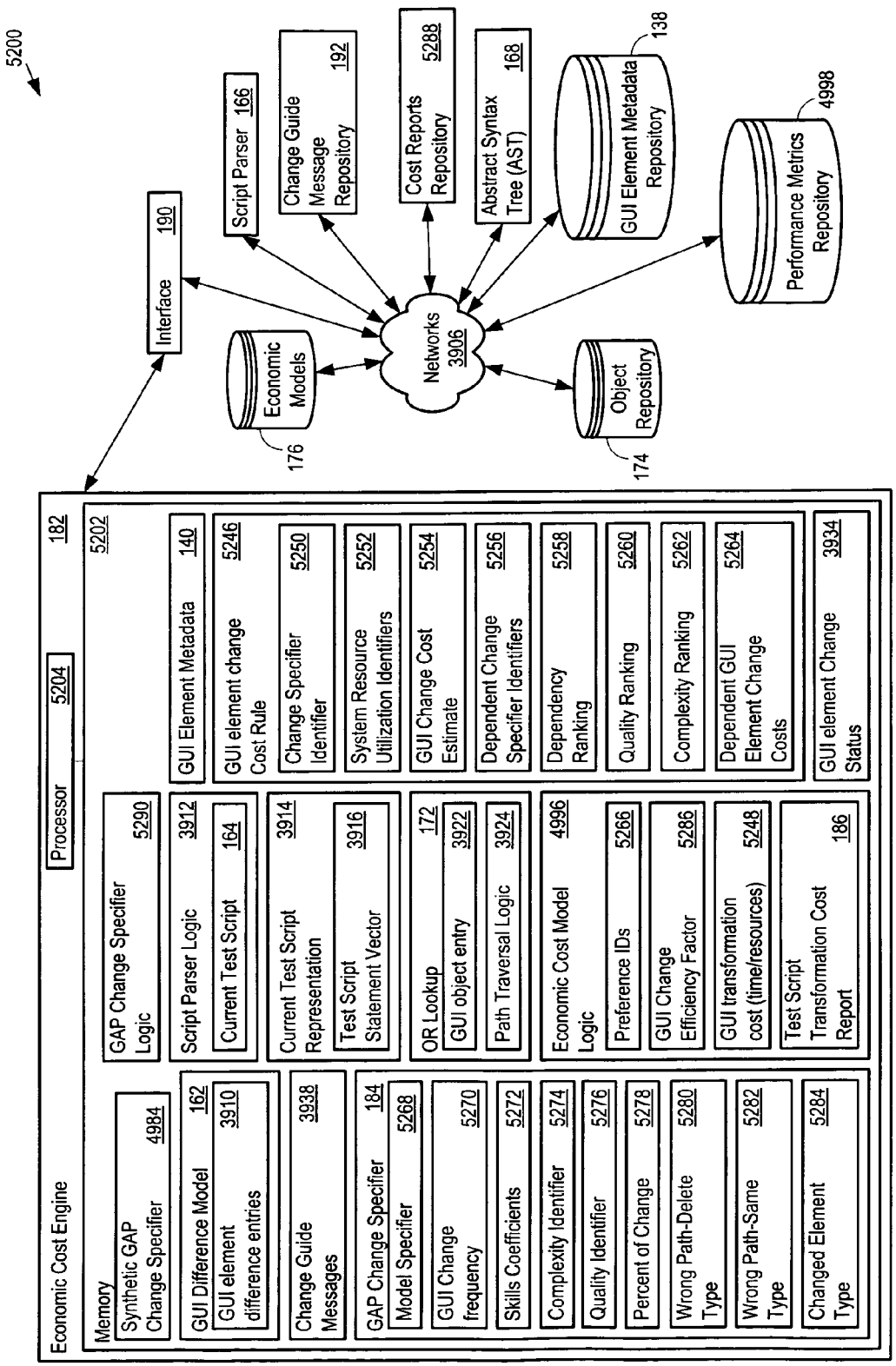
FIG. 52 shows an example economic cost engine system.

FIG. 52 shows an example economic cost engine system 5200 that may implement the economic cost engine 182. The economic cost engine 182 includes a memory 5202 coupled to a processor 5204, and an interface 190. In one implementation, the interface 190 communicates with the GUI element metadata repository 138 and the GUI difference model 162 to receive GUI element metadata 140 and GUI difference entries 3910, respectively. The interface 190 is connected to a network 3906 (e.g., the Internet) in communication with various other systems and resources. In another implementation, the memory 5202 includes the GUI element metadata 140, and GAP change specifier logic 5290 that produces the GUI difference model 162 and the GUI element difference entries 3910. The memory 5202 also includes script parser logic 3912 that receives the current test script 164 and produces the AST 168, processes the AST 168 as a current test script representation 3914, and produces the test script statement vectors 3916 (e.g., 5102-5104-5110-5112, 5102-5106-5108-5120-5122, and 5102-5114-5126-5118).

The memory 5202 further includes economic cost model logic 4996 that, in one implementation, invokes the OR lookup logic 172 to locate, in the object repository 174, a GUI object entry 3922 referred to by the test script statement vector 3916. In another implementation, the economic cost engine 182 invokes the OR lookup logic 172 to locate, in various external sources, a GUI object entry 3922 matching the test script statement vector 3916. When the test script statement vector 3916 (e.g., 5102-5104-5110-5112, 5102-5106-5108-5120-5122, and 5102-5114-5126-5118) employs constants to identify GUI object names, rather than expressions whose values can only be determined at runtime, the OR lookup logic 172 function may use the GUI object name and properties of the GUI object to efficiently locate the correct GUI object entry 3922 and locate, in the GUI difference model 162, a GUI element difference entry 3910 matching the GUI object entry 3922.

For example, the test script statement vector represented by 5102-5104-5110-5112 identifies the window GUI object StateList 3302 and the listbox GUI object SchoolListbox 3316, shown in the current test script 164 navigation statement shown at line 6 of FIG. 50:

Window("StateList").WinObject("SchoolListbox").Click 19,22.

The OR lookup logic 172 locates each GUI object entry 3922 for GUI objects 3302 and 3316, using the known names of the GUI objects, StateList and SchoolListbox, respectively. The OR lookup logic 172 locates the corresponding GUI element difference entries 4504 and 4604, in the GUI difference model 162. In one implementation, the economic cost model logic 4996 analyzes the GUI element difference entries 4504 and 4604 and generates one or more corresponding synthetic GAP change specifiers 4984. Using the GAP change specifiers 184, the economic cost model logic 4996 locates, in the economic models 176 repository, one or more corresponding GUI element change cost rules 5246 and applies the cost rules to obtain GUI transformation costs 5248. The GUI transformation costs 5248 may include costs corresponding to changing the current test script 164 and testing the subsequent GAP version 152. In other words, the economic cost model logic 4996 determines the costs to generate a transformed test script statement that corresponds to GUI objects School 3402 and SchoolCombobox 3406 and the costs to test the subsequent GAP version 152 using the transformed test script statement:

Window("School").WinObject("SchoolCombobox").Click 294,14.

Each GUI element change cost rule 5246 may include various attributes, including: a change specifier identifier 5250, system resource utilization identifiers 5252, a GUI change cost estimate 5254 that indicates the estimated time and/or resources needed to test a corresponding GUI element change, dependent change specifier identifiers 5256, dependency ranking 5258, quality ranking 5260, complexity ranking 5262, and dependent GUI element change costs 5264. Each economic model, residing in the economic models 176 repository and/or external to the economic models 176 repository that is available to the economic cost model logic 4996 through the interface 190, may include more, fewer, or different GUI element change cost rule 5246 attributes.

The economic cost model logic 4996 uses GAP change specifiers 184 and synthetic GAP change specifiers 4984 to locate applicable GUI element change cost rules 5246, in the economic models 176 repository, corresponding to change specifier identifiers 5250. The system resource utilization identifiers 5252 indicate the resources used to test a particular GUI element change. In one implementation, the system resource utilization identifiers 5252 have values from 1 to 10 that identify the amount of a test environment's processing and infrastructure capacity needed to test a corresponding GAP change. For example, a system resource utilization identifier 5252 with a value of 3, corresponding to the test environment's processing capacity, may indicate that one-third of the available processing capacity is needed to test a corresponding GAP change. A system resource utilization identifier 5252 with a value of 10, corresponding to the test environment's processing capacity, may indicate that most of the available computing resources (e.g., processing capacity) will be needed to test a corresponding GAP change.

In another implementation, the system resource utilization identifiers 5252 provide descriptions of the resources needed to test a corresponding GAP change. For example, the system resource utilization identifiers 5252 may itemize the skills of testers, system components (e.g., input and output devices, and network bandwidth) and the priority settings to be assigned to system processes used to test a corresponding GUI element change. In one implementation, the system resource utilization identifiers 5252 provide a combination of discrete values that indicate the test environment's processing capacity and the itemized descriptions of the various resources needed to test the corresponding GUI element change.

The economic cost model logic 4996 may locate other applicable GUI element change cost rules 5246 that depend from a particular GUI element change cost rule 5246 identified by a change specifier identifier 5250, using dependent change specifier identifiers 5256. The dependent change specifier identifiers 5265 may identify one or more corresponding GUI element change cost rules 5246 that depend from the GUI element change corresponding to the change specifier identifier 5250. For example, a change in the class of a parent GUI object from a listbox to a combobox (e.g., SchoolListbox 3316 and SchoolCombobox 3406) may impose GUI element changes to children GUI objects of the parent GUI object, so that a change specifier identifier 5250 corresponding to a particular GAP change specifier 184 and/or synthetic GAP change specifier 4984 identifies one or more dependent change specifiers identifiers 5256.

In one implementation, the dependency ranking 5258 is a value from 0 to 10 that indicates the level of dependency a GAP may have on a particular GUI element. The dependency ranking 5258 may correspond to the visibility and scope of a GUI element. For example, the change of the window Statelist 3302 in the current GAP 150 to School 3402 in the subsequent GAP 152, as shown in FIG. 14, may correspond to a dependency ranking 5258 of 10, while the change of a value in the StateListbox 3312 to a value in the StateListbox 3404, as shown in FIG. 5, may correspond to a dependency ranking 5258 of 4. The economic cost model logic 4996 uses the dependency ranking 5258 to facilitate obtaining the GUI transformation costs 5248. In one implementation, the economic cost model logic 4996 uses the dependency ranking 5258 to determine how and/or whether to use the GUI change efficiency factor 5286, discussed in further detail below.

In one implementation, the quality ranking 5260 is a value from 1 to 10 that indicates the contribution to the quality of the subsequent GAP version 152 made by the GUI element change. For example, a particular GUI element change that enforces integrity checking on a GUI element corresponding to a high dependency ranking 5258 value may correspond to a quality ranking 5260 of 10. In another example, a GUI element change that is unperceivable and/or corresponds to a low dependency ranking 5258 value may correspond to a quality ranking 5260 of 0. In one implementation, the economic cost model logic 4996 uses a user selectable quality preference identifier to generate the test script transformation cost report 186 with GUI transformation costs 5248 corresponding to quality rankings 5260 meeting or exceeding the quality preference identifier, so that test plans may be evaluated based on quality factors.

In one implementation, the complexity ranking 5262 is a value from 1 to 10 that indicates the difficulty level of testing the corresponding GUI element change, where a complexity level of 10 is a high level of complexity and a level of 0 is a low level of complexity. In another implementation, the complexity ranking 5262 indicates the contribution to the level of complexity of the subsequent GAP version 152 made by the GUI element change. For example, a particular GUI element change that enforces integrity checking on a GUI element corresponding to a high dependency ranking 5258 value may correspond to a complexity ranking 5262 of 10. In another example, a GUI element change that is unperceivable and/or corresponds to a low dependency ranking 5258 value may correspond to a complexity ranking 5262 of 0. In one implementation, the economic cost model logic 4996 uses a user selectable complexity preference identifier to generate the test script transformation cost report 186 with GUI transformation costs 5248 to complexity rankings 5262 meeting or exceeding the complexity preference identifier, so that test plans may be evaluated based on complexity.

The dependent GUI element change costs 5264 may represent an aggregated GUI transformation cost 5248 corresponding to the dependent change specifier identifiers 5256. In one implementation, the economic cost model logic 4996 uses the dependent GUI element change costs 5264, rather than retrieving each GUI element change cost rule 5246 corresponding to the one or more dependent change specifier identifiers 5256, to generate the test script transformation cost report 186.

In one implementation, the economic cost model logic 4996 uses user selectable preference identifiers 5266 to locate GUI element change cost rules 5246 based on discrete values and/or ranges of values for one or more of the system resource utilization identifiers 5252, GUI change cost estimate 5254, dependency ranking 5258, quality ranking 5260, complexity ranking 5262 and dependent GUI element change costs 5264. The preference identifiers 5266 identify the GUI transformation costs 5248 used to generate the test script transformation cost report 186, based on one or more of the change specifier identifier 5250, a system resource utilization identifier 5252, a GUI change cost estimate 5254 that indicates the estimated time and/or resources (e.g., money and labor) to test a corresponding GUI element change, dependent change specifier identifiers 5256, dependency ranking 5258, quality ranking 5260, complexity ranking 5262, and dependent GUI element change costs 5264.

The GUI transformation cost 5248 may include a time component and resource component. The time component of the GUI transformation cost 5248 may indicate the elapsed time needed to change a test script statement and/or test a corresponding GUI element change. The resource component of the GUI transformation cost 5248 may indicate the money, areas of skill and/or system infrastructure (e.g., human and technological units) needed to change a test script statement and/or test a corresponding GUI element change.

Recall that the economic cost engine 182 may generate test script transformation cost reports 186 based on multiple combinations of available information, including: 1) GAP change specifiers 184; 2) GAP change specifiers 184 and a current test script 164; 3) GAP change specifiers 184, a current test script 164 and a current GAP version 150 (e.g., a current GAP tree model); 4) a current test script 164, and a GUI difference model 162 with GUI element difference entries; and 5) GAP change specifiers 184, a current test script 164, and a GUI difference model 162. The various combinations of available information are used by the economic cost engine 182 to analyze received GAP change specifiers 184 and/or generated synthetic GAP change specifiers 4984 that are used by the economic cost model logic 4996 to locate and retrieve GUI transformation costs 5248 and generate test script transformation cost reports 186.

In one implementation, the economic cost engine 182 receives GAP change specifiers 184 that the economic cost engine 182 uses to locate and retrieve GUI element change cost rules 5248 from the economic models 176 repository. The received GAP change specifiers 184 may have resulted from prior analysis of a current GAP version 150, a current test script 164 and/or a GUI difference model 162. In one implementation, the economic cost engine 182 may receive GAP change specifiers 184 and a current test script 164. The script parser logic 3912 produces the test script statement vectors 3916 based on the current test script 164. The economic cost model logic 4996 analyzes the test script statement vectors 3916 to generate synthetic GAP change specifiers 4984. The economic cost model logic 4996 uses the received GAP change specifiers 184 and generated synthetic GAP change specifiers 4984 to locate and retrieve GUI element change cost rules 5248 from the economic models 176 repository. In one implementation, the received GAP change specifiers 184 and generated synthetic GAP change specifiers 4984 are indistinguishable as to their origin such that the economic cost model logic 4996 processes the received GAP change specifiers 184 and generated synthetic GAP change specifiers 4984 uniformly, regardless of their origin.

In another implementation, the economic cost engine 182 receives GAP change specifiers 184, a current test script 164 and a current GAP version 150. The economic cost engine 182 analyzes the GAP change specifiers 184 and the current GAP version 150 (e.g., current GAP tree model) to generate synthetic GAP change specifiers 4984. The economic cost engine 182 analyzes the test script statement vectors 3916 corresponding to the current test script 164 and the GUI difference model 162 to generate synthetic GAP change specifiers 4984. The economic cost model logic 4996 uses the received GAP change specifiers 184 and generated synthetic GAP change specifiers 4984 to locate and retrieve GUI element change cost rules 5248 from the economic models 176 repository and generate the test script transformation cost report 186.

In one implementation, the economic cost engine 182 receives a current test script 164 and a GUI difference model 162, without GAP change specifiers 184. The economic cost engine 182 analyzes the test script statement vectors 3916 corresponding to the current test script 164 and the GUI difference model 162 to generate synthetic GAP change specifiers 4984.

In one implementation, the economic cost engine 182 receives GAP change specifiers 184, a current test script 164, a GUI difference model 162 corresponding to the GAP version 150 and a subsequent GAP version 152. The economic cost engine 182 analyzes the test script statement vectors 3916 corresponding to the current test script 164 and the GUI difference model 162 to generate synthetic GAP change specifiers 4984. The economic cost engine 182 uses the received GAP change specifiers 184 and generated synthetic GAP change specifiers 4984 to locate and retrieve GUI element change cost rules 5248 from the economic models 176 repository and generate the test script transformation cost report 186.

In one implementation, the accuracy of the GUI transformation costs 5248 varies due to the granularity of the information received by the economic cost engine 182. For example, the GUI transformation costs 5248 generated as a result of the economic cost engine 182 receiving GAP change specifiers 184, a current test script 164, and a GUI difference model 162 may have a higher level of accuracy than the GUI transformation costs 5248 generated based solely on received GAP change specifiers 184. The economic cost engine 182 may employ various economic models to preserve the accuracy of the GUI transformation costs 5248 and compensate for the varying granularities of information provided to the economic cost engine 182.

In one implementation, GAP change specifiers 184 and/or synthetic GAP change specifiers 4984 include a model specifier 5268, a GUI change frequency 5270, skill coefficients 5272, complexity identifier 5274, quality identifier 5276, percent of change 5278, wrong path-delete type 5280, wrong path-same type 5282 and changed element type 5284 specifiers. The model specifier 5268 specifies one or more economic models to use from among multiple economic models accessible by the economic model logic 4996. In one implementation, the model specifier 5268 specifies one or more economic models for the economic cost model logic 4996 to use corresponding to the varying granularities of information provided to the economic cost engine 182, so that the accuracy of the GUI transformation costs 5248 are preserved. For example, the model specifier 5268 may specify models corresponding to one or more of the multiple combinations of available information received by the economic cost engine 182, including: 1) model-1 for GAP change specifiers 184; 2) model-2 for GAP change specifiers 184 and a current test script 164; 3) model-3 for GAP change specifiers 184, a current test script 164 and a current GAP version 150; 4) model-4 for a current test script 164 and a GUI difference model 162 with GUI difference entries 3910; and 5) model-5 for GAP change specifiers 184, a current test script 164, and a GUI difference model 162 with GUI difference entries 3910.

The GUI change frequency 5270 indicates the number of occurrences of a particular GUI element change. In one implementation, the economic cost model logic 4996 includes a user adjustable GUI change efficiency factor 5286 that indicates whether a GUI change frequency 5270 above a particular threshold results in a lower GUI transformation cost 5248. For example, a GUI change efficiency factor 5286 of 0.50 indicates that the GUI transformation cost 5248 for each change above a threshold of 100 occurrences for a given GUI element change are adjusted by 50 percent. In other words, where a particular GUI element change is identified to have 120 occurrences, the economic cost model logic 186 applies the GUI change efficiency factor 5286 of 0.50 to the GUI transformation cost 5248 for the 20 changes above the threshold of 100. In another example, a GUI change efficiency factor 5286 of 0.00 may indicate that no efficiency is realized regardless of the GUI change frequency 5270 value.

In one implementation, the skills coefficients 5272 include one or more coefficients that are used to describe the level of experience of the testers who are expected to test the subsequent GAP version 152. The skills coefficients 5272 may include individual coefficients for specific areas of testing experience. For example, the skills coefficients 5272 may correspond to the skill and experience level of testers according to particular phases of testing such as unit, integration, system and final test phase so that each phase is represented by one or more coefficients. In another example, the skills coefficients 5272 may correspond to skills and experience corresponding to testing particular aspects of the subsequent GAP version 152, such as security and user authentication, numerical computations specific to the GAP, and network and infrastructure.

In another implementation, the skills coefficients 5272 are calibrated based on performance metrics located in a performance metrics repository 4998 and/or cost reports repository 5288. GAP change specifiers 184 and/or synthetic GAP change specifiers 4984 may be constructed and/or generated from historical performance metrics found in a performance metrics repository 4998 and/or cost reports repository 5288. The skills coefficients 5272 of the constructed GAP change specifiers 184 and/or synthetic GAP change specifiers 4984 may be adjusted over multiple iterations to obtain GUI transformation costs 5248 and test script transformation cost reports 186 that are within acceptable margins of variance to the actual costs reflected in the performance metrics repository 4998. The accuracy of the GUI transformation costs 5248 obtained by the economic cost model logic 4996 may be based on how well the skills coefficients 5272 are calibrated to reflect the testing resources available to test the subsequent GAP version 152. In one implementation, the skills coefficients 5272 influence the complexity identifier 5274, discussed in further detail below.

The economic cost model logic 4996 uses the skills coefficients 5272 to obtain the GUI transformation costs 5248. For example, a skills coefficient 5272 value of 1.0 may indicate that testers with little experience are expected to be used to test the subsequent GAP version 152 and higher GUI transformation costs 5248 may result to reflect the low experience. In another example, a skills coefficient 5272 value of 8.0 may indicate testers with higher than average testing experience and lower GUI transformation costs 5248 may result that reflect the higher than average experience. The economic cost model logic 4996 may analyze whether the skills coefficients 5272 and complexity ranking 5262 correlate, and obtain correspondingly higher or lower GUI transformation costs 5248. For example, the skills coefficients 5272 may indicate that the testers are capable of testing a GAP with a particular level of complexity, as indicated by the complexity ranking 5262, so that lower GUI transformation costs 5248 are obtained. In another example, the skills coefficients 5272 may indicate that the testers lack a skill and experience level for testing a GAP with a particular level of complexity corresponding to the complexity ranking 5262, so that higher GUI transformation costs 5248 are obtained to reflect the lack of skills and experience of the testers and the expected time and resources to test the subsequent GAP version 152.

In one implementation, the complexity identifier 5274 numerically identifies the level of complexity of a GUI element change (e.g., values 0 to 10), determined by the economic cost model logic 4996, corresponding to a generated synthetic GAP change specifier 4984. In another implementation, the complexity identifier 5274 identifies the level of complexity determined by a tester and received by the economic cost model logic 4996 with the GAP change specifier 184. Distinguishing the complexity identifier 5274 of the GAP change specifier 184 and/or synthetic GAP change specifier 4984 from the complexity ranking 5258 of the GUI element change cost rule 5246, the complexity identifier 5274 represents analysis that is external to the economic models 176 repository. The economic cost model logic 4996 may analyze the complexity ranking 5262 and complexity identifier 5274 to assess the accuracy of the GUI transformation costs 5248 obtained by applying the GUI element change cost rule 5246.

For example, the economic cost model logic 4996 may determine that the complexity ranking 5262 and complexity identifier 5274 corresponding to a particular GUI element change are within an acceptable margin of variance such that the GUI transformation cost 5248 is not adjusted as a result. In another example, the economic cost model logic 4996 may determine that the complexity ranking 5262 and complexity identifier 5274 corresponding to a particular GUI element change are outside of an acceptable margin of variance and the GUI transformation costs 5248 are adjusted upward by a multiplier. The margin of variance and the multiplier, determined by analyzing the complexity ranking 5262 and complexity identifier 5274, may be user selectable and/or adjustable. In one implementation, the complexity identifier 5274 is based on the skills coefficients 5272 such that the complexity of a GUI element change is assessed relative to the skills and experience of the available testers. The skills coefficients 5272 may be calibrated so that the complexity ranking 5262 and the complexity identifier 5274 generated by the economic cost model logic 4996 are within an acceptable margin of variance.

In one implementation, the quality identifier 5276 numerically identifies the level of quality contributed to by a GUI element change (e.g., values 0 to 10), determined by the economic cost model logic 4996, corresponding to a generated synthetic GAP change specifier 4984. In another implementation, the quality identifier 5276 identifies the level of quality determined by a tester and received by the economic cost model logic 4996 with the GAP change specifier 184. Distinguishing the quality identifier 5276 of the GAP change specifier 184 and/or synthetic GAP change specifiers 4984 from the quality ranking 5260 of the GUI element change cost rule 5246, the quality identifier 5276 represents analysis that is external to the economic models 176 repository. The economic cost model logic 4996 may analyze the quality ranking 5260 and quality identifier 5276 to assess the accuracy of the GUI transformation costs 5248 obtained by applying the GUI element change cost rule 5246. For example, the economic cost model logic 4996 may determine that the quality ranking 5260 and quality identifier 5276 corresponding to a particular GUI element change are within an acceptable margin of variance such that the GUI transformation cost 5248 is not adjusted as a result. In another example, the economic cost model logic 4996 may determine that the quality ranking 5260 and quality identifier 5276 corresponding to a particular GUI element change are outside of an acceptable margin of variance and the GUI transformation costs 5248 are adjusted upward by a multiplier. The margin of variance and the multiplier, determined by analyzing the quality ranking 5260 and quality identifier 5276, may be user selectable and/or adjustable.

In one implementation, the economic cost engine 182 receives a GAP change specifier 184 that includes a percent of change 5278 value, a current test script 5000 and a current GAP tree model corresponding to a current GAP version 150 that the economic cost engine 182 uses to generate synthetic GAP change specifiers 4984, and locate and retrieve GUI element change cost rules 5248 from the economic models 176 repository. For example, the economic cost model logic 4996 analyzes the current GAP version 150 (e.g., represented by a current GAP tree model) and generates synthetic GAP change specifiers 4984 that reflect a percentage of change to the current GAP version 150 corresponding to the percent of change 5278 value (e.g., ranging from 1 to 100). The economic cost model logic 4996 analyzes the current GAP version 150 and identifies a set of proposed GUI elements changes that correspond to the percent of change 5278 value. The economic cost model logic 4996 may identify the proposed GUI elements by analyzing the GUI elements in the GAP tree model of the current GAP version 150 in a random order, the order in which the GUI elements are presented in the tree model from top to bottom or from bottom to top.

In one implementation, the proposed GUI element changes may be determined based on the complexity identifier 5274 and/or quality identifier 5276 included in the received GAP change specifier 184. For example, the economic cost model logic 4996 receives a GAP change specifier 184 that includes a complexity identifier 5274 value of 1 and quality identifier 5276 value of 2, and for each of the proposed GUI elements to be changed, determines proposed changes corresponding to the complexity identifier 5274 value of 1 and the quality identifier 5276 value of 2. The economic cost model logic 4996 may locate, in the performance metrics repository 4998 and/or cost reports repository 5288, proposed GUI element changes corresponding to the complexity identifier 5274 values and the quality identifier 5276 values. In one implementation, the economic cost model logic 4996 generates synthetic GAP change specifiers 4984, as a result of analyzing the proposed GUI element changes. In another implementation, the economic cost model logic 4996 identifies proposed GUI element changes corresponding to the complexity identifier 5274, the quality identifier 5276 and skill coefficients 5272.

The economic cost model logic 4996 analyzes the current test script 5000 and GUI difference model 162 to generate synthetic GAP change specifiers 4984 based on validated GUI element changes (e.g., GUI element difference entries). For example, the economic cost model logic 4996 determines test script statement vectors 3916 that need modification because GUI objects that are referenced in the current test script 5000 and exist in the current GAP version 150 that do not exist in the subsequent GAP version 152, and the economic cost model logic 4996 generates synthetic GAP change specifiers 4984 that reflect the needed changes to the current test script 5000. The economic cost model logic 4996 identifies changes to test script statement vectors 3916 that set the values of GUI objects that are compatible with the class of that GUI objects, so that constraints imposed on the GUI objects as a result of a change are not violated. In one implementation, the economic cost model logic 4996 verifies that incorrect operations are not specified by GAP change specifiers 184 and/or synthetic GAP change specifiers 4984 used to obtain GUI transformation costs 5248.

The economic cost model logic 4996 may infer GUI class information regarding a GUI object that is present in a navigation path of test script statement vectors 3916, and whose presence is not explicitly defined. For example, when the test script statement vector 3916 employs expressions that identify GUI objects whose values can only be determined at runtime, the OR lookup logic 172 may use path traversal logic 3924 to identify the possible corresponding GUI object entries 3922 and GUI element difference entries 3910 in the object repository 174 and GUI difference model 162, respectively. The economic cost model logic 4996 then identifies the valid GUI object entries 3922 that may substitute for the expressions and GUI element difference entries 3910 that satisfy valid test script statement vectors 3916, and the economic cost model logic 4996 generates corresponding synthetic GAP change specifiers 4984.

For example, consider the test script statement vector 3916: VBWindow("s").VBWindow(e1).VBWindow(e2).VBWindow("d"), where the source node GUI object is named "s", the destination node GUI object is named "d", but expressions e1 and e2 compute values of intermediate nodes in the navigation path at runtime. The traversal logic 3924 determines intermediate nodes (GUI objects) that may be included in the possible navigation paths identified by the source node "s" and destination node "d". The path traversal logic 3924 analyzes the GUI difference model 162 to identify possible constant substitutions for e1 and e2, for example, "a" and "f", so that the test script statement vector 3916 formed by the substitute GUI objects in the navigation path expression "s.a.f.d" can be validated by economic cost model logic 4996. By identifying the possible navigation paths leading to the destination node d starting with the source node 's' the economic cost model logic 4996 can conclude whether to generate a synthetic GAP change specifier 4984 based on the substitute GUI objects. In the event the traversal logic 3924 does not identify at least one navigation path, then the transformed test script statement 3928 is invalid. Alternatively, in the event the traversal logic 3924 identifies navigation paths leading from 's' to 'd' by traversing two objects (e.g., e1 and e2), then the transformed test script statement 3928 may be valid provided that expressions e1 and e2 evaluate to the names of the nodes in the discovered navigation paths. The traversal logic 3924 infers the possible names computed by expressions e1 and e2 at compile time. In other words, there is a direct correlation between the complexity of test scripts and the economic cost to transform test scripts and use those test scripts to test subsequent GAP versions 152. The complexity is a function of the number of referenced GUI objects and operations on the GUI objects, as well as the amount of logic needed to process the data that is extracted and placed into those GUI objects.

Referring to FIG. 47, the economic cost model logic 4996 may infer GUI class information regarding GUI objects that are present in the navigation path of test script statement vectors 3916. The economic cost model logic 4996 identifies GAP change specifiers 184 and/or synthetic GAP change specifiers 4984 that resolve test script statement vectors 3916 that attempt to access GUI objects that do not exist in a subsequent GAP version 152 and/or attempt to set a value of a GUI object that is not compatible with the type of the GUI object. The economic cost model logic 4996 type checks test script statement vectors 3916 against the GUI difference model 162 before generating corresponding GAP change specifiers 184.

The economic cost model logic 4996 uses inheritance and sub-typing relations between classes of GUI objects to validate received GAP change specifiers 184 and generate valid synthetic GAP change specifiers 4984. The concept of class includes hierarchical containments (e.g., GUI scopes and system hierarchies). The object repository 174 and the GUI difference model 162 include GUI class information (e.g., annotating the classes of GUI objects) for each GUI object entry 3922 and GUI element difference entry 3910. For example, referring to line 1 of Table 12, the SchoolListBox is a WinObject class with properties listed at lines 3-39. In another example, referring to FIGS. 36, 45 and 46, at line 1 of each GUI difference entry (e.g., 3604, 4504 and 4604) the GUIElement Type is indicated. The class of each GUI object is indicated as shown in FIGS. 36, 45 and 46 at lines 7, 8 and 8, respectively. The class of a GUI object indicates that the GUI object includes particular attributes, properties and/or traits in common with other GUI objects of the same class that may be extended to and/or inherited by child GUI objects. For example, FIG. 36 at line 7 indicates that the StateListbox GUI object is of a WindowsForms10.ListBox.app4 class that includes values, as indicated at line 11 of FIG. 36.

Referring again to FIG. 52, in one implementation, the economic cost model logic 4996 determines whether a GUI object has changed and sets the GUI element change status 3934. For example, the GUI element change status 3934 may use a numerical indicator of 0, 1, and 2, respectively, to indicate no change, and a change with and without a particular constraint violation. The economic cost model logic 4996 may use the GUI element change status 3934 to facilitate identifying the appropriate GAP change specifiers 184 and/or synthetic GAP change specifiers 4984.

In another implementation, the GUI element change status 3934 is a message that provides a detail description of a change. The GUI element change status 3934 may also indicate with a numerical indicator (e.g., −1) that the GUI object has been deleted from the subsequent GAP version 152. When a GUI object has been deleted from the subsequent GAP version 152, the economic cost model logic 4996 generates one or more synthetic GAP change specifiers 4984 that specify corresponding changes to the current test script 5000 and the current GAP version 150. In one implementation, the economic cost model logic 4996 generates synthetic GAP change specifiers 4984 that correspond to different, but programmatically equivalent, approaches to changing the current test script 5000 and the current GAP version 150, so that a programmer may evaluate the GUI transformation costs 5248 and test script transformation cost report.

FIG. 40 shows a flow diagram 4000 for retrieving the properties of a GUI object entry 3922 from an object repository (OR) 174. The script parser logic 3912 parses the test script statement vector 3916 into an ordered sequence of nodes that represent functions and arguments that navigate to GUI objects (4002). The script parser logic 3912 evaluates the first node of the ordered sequence of nodes (4004), and identifies the first node as the source node and assigns a sequence identifier indicating the position of the source node in the ordered sequence (4006). The script parser logic 3912 evaluates the next node of the order sequence of nodes to determine whether the next node is the last node (4008), and identifies the next node as an intermediate node when the next node is not the last node (4010). The intermediate node is assigned a sequence identifier indicating the position of the intermediate node in the ordered sequence. The script parser logic 3912 may identify all intermediate nodes between the source node and the destination node.

The script parser logic 3912 identifies the last node in the ordered sequence as the destination node and assigns a sequence identifier to the destination node that indicates the position of the destination node in the ordered sequence (4012). The OR lookup logic 172 performs an object repository lookup for each GUI object corresponding to the ordered sequence of nodes to which the test script statement vector navigates so that each GUI object entry 3922 is identified (4014). In one implementation, the ordered sequence of nodes is used by the path traversal logic 3924 and economic cost model logic 4996 to validate the statements of the current test script 5000, and/or validate received GAP change specifiers 184 and generate valid synthetic GAP change specifiers 4984. In one implementation, the economic cost engine 182 uses the ordered sequence of nodes to infer GUI class and inheritance (subclass) information for GUI objects. Where at least one of the source, destination and/or the intermediate nodes are expressions that can only be identified at run-time, the path traversal logic may identify possible GUI object entries 3922, and the economic cost model logic 4996 determines the GUI object entries 3922 that satisfy the test script statement vector 3916. The OR lookup logic 172 retrieves the properties of the GUI object entries 3922 to which the test script statement vector navigates (4016).

Figure 53:
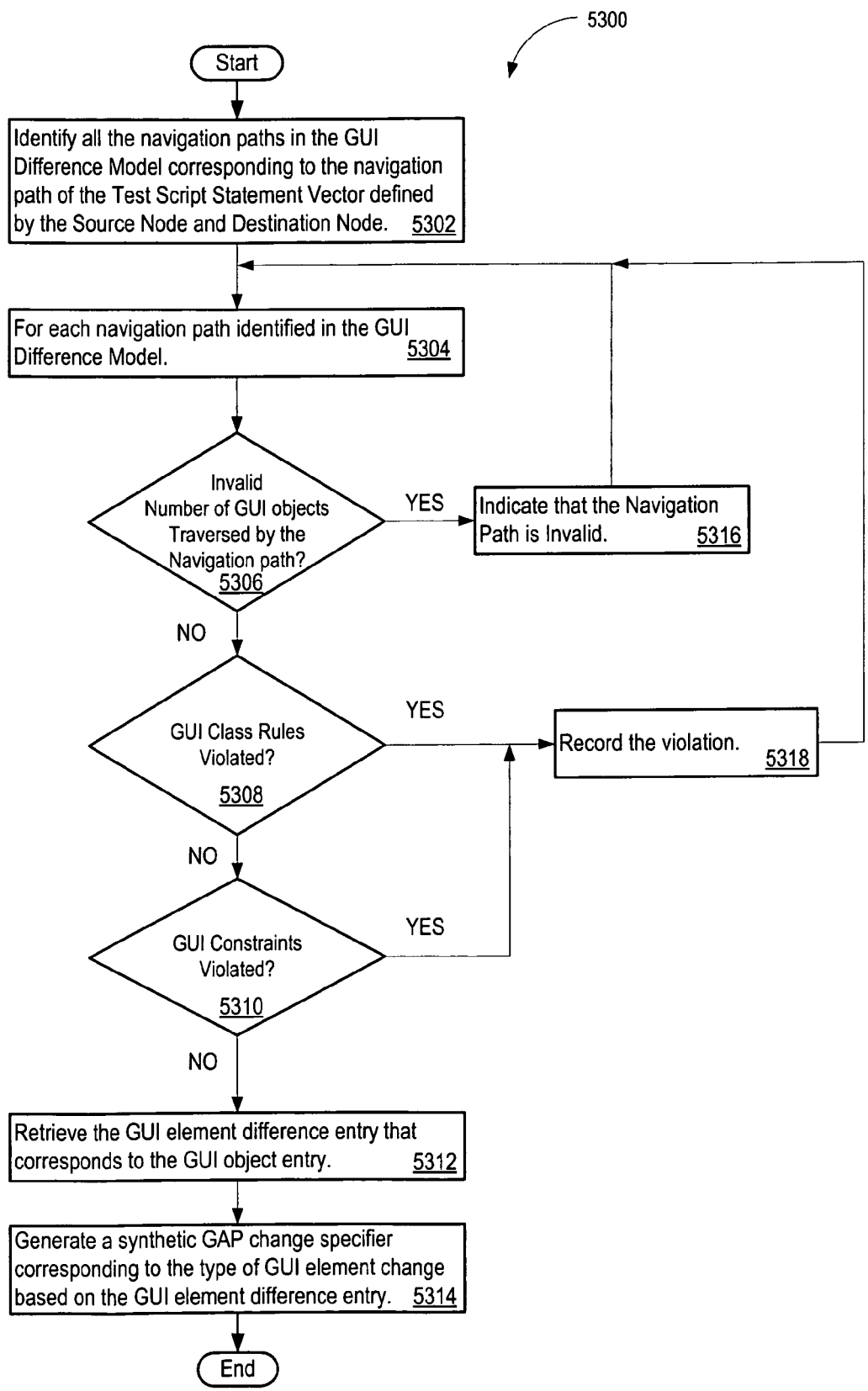
FIG. 53 shows a flow diagram for identifying a GUI difference entry corresponding to a GUI object entry.

FIG. 53 shows a flow diagram 5300 for identifying a GUI difference entry 3910 corresponding to a GUI object entry 3922. The OR lookup logic 172 receives the properties of the GUI objects corresponding to the source, destination and all intermediate nodes of the test script statement vector 3916. In one implementation, the OR lookup logic 172 employs the path traversal logic 3924 to identify possible GUI difference entries 3910 corresponding to the navigation paths identified by a source node and a destination node to which a test script statement vector navigates (5302). Where at least one of the GUI element difference entries 3910 is an expression that can only be identified at run-time, the path traversal logic 3924 identifies one or more possible GUI difference entries 3910 that form a navigation path between the source node and the destination node (5304). The path traversal logic 3924 determines whether the GUI difference entries 3910 form a valid navigation path between corresponding source and destination nodes GUI difference entries 3910 (5306). The GUI economic cost model logic 4996 determines whether the GUI difference entries 3910 that form the navigation path are valid (5308).

The economic cost model logic 4996 identifies the GUI element difference entries 3910 that correspond to each of the GUI object entries 3922 forming a valid navigation path (5310). The economic cost model logic 4996 determines the synthetic GAP change specifiers 4984 to generate and/or validates the GAP change specifiers 184 based on the type of GUI element change (e.g., 5280, 5282, 5284 and/or GUI element change status 3934), based on analyzing the GUI object entry 3922 and GUI element difference entry 3910 (5312). The economic cost model logic 4996 generates valid synthetic GAP change specifiers 4984 corresponding to the type of GUI element change identified. When the path traversal logic 3924 identifies a navigation path that traverses an invalid number of GUI element difference entries 3910 between corresponding source and destination node GUI difference entries 3910, the path traversal logic 3924 indicates that the navigation path is invalid (5314).

FIG. 54 shows a transformed test script 5400 for the subsequent GAP version 152. The economic cost model logic 4996 may generate synthetic GAP change specifiers 4984 that specify the changes needed to obtain the transformed test script 5400. For example, the economic cost model logic 4996 generates synthetic GAP change specifiers 4984 for lines 1-3 of the current test script 5000, shown in FIG. 50, corresponding to transformed test script lines 1, 5-7, shown in FIG. 54. In one implementation, the GUI difference model 162 and the GUI element metadata provide the GUI class, GUI typing and mapping information necessary for the economic cost model logic 4996 to infer lines 2-4 of the transformed test script 5400, given that the "university.data" in line 6 represents a destination in a path traversal from which valid GAP change specifiers 184 and/or synthetic GAP change specifiers 4984 may be determined. In another example, the GUI difference model 162 and/or the GUI element metadata include GUI class and mapping information that the economic cost engine 182 uses to generate one or more synthetic GAP change specifiers 4984 that specify how to transform line 16 of the current test script 5000, as shown in FIG. 50, that refers to WinObject "Save File" into lines 24-25 that refer to a "Save File" child GUI object of the WinObject "menuStrip1".

Figure 55:
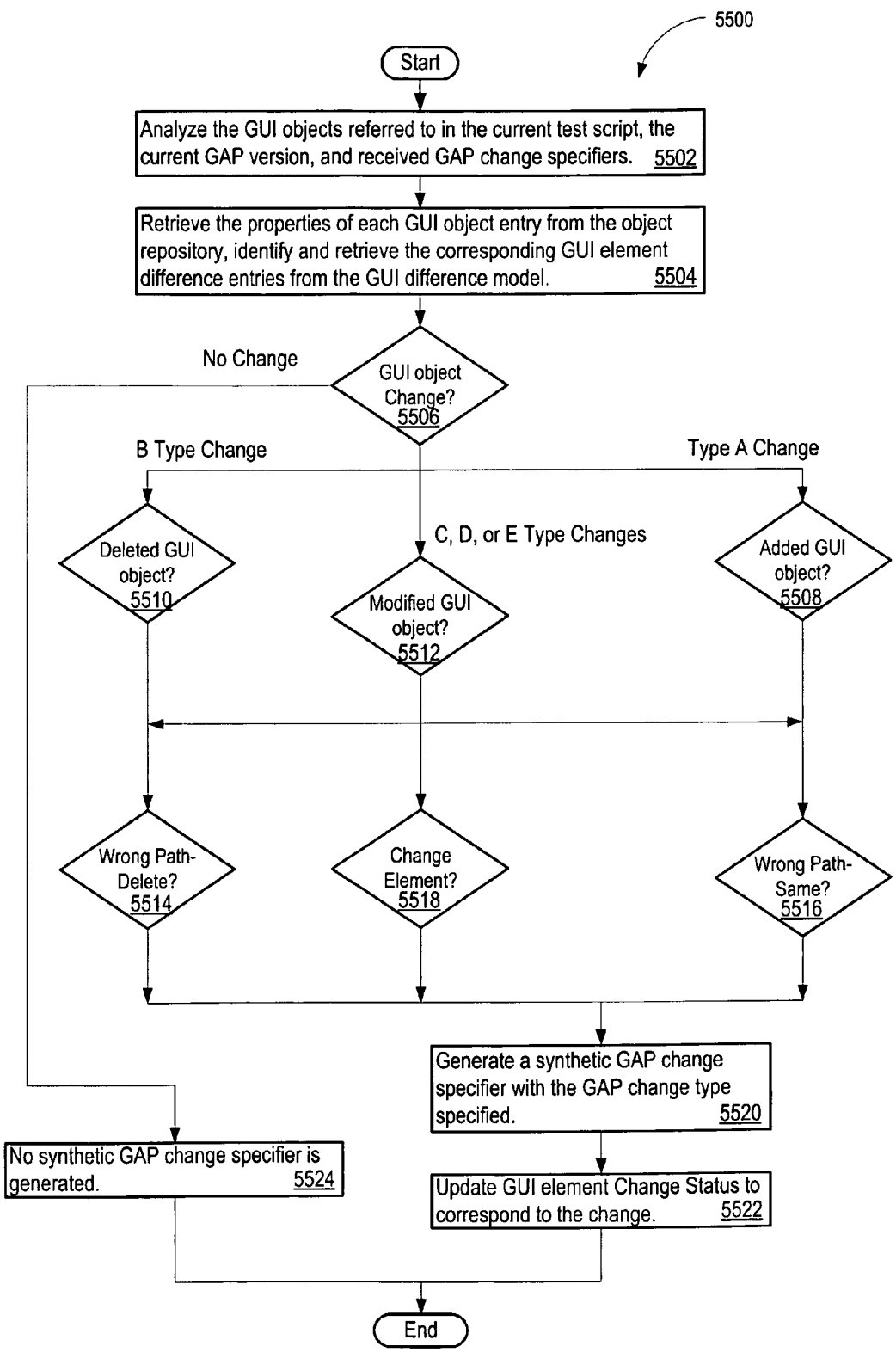
FIG. 55 shows a flow diagram for generating a synthetic GAP change specifier.

FIG. 55 shows a flow diagram 5500 for generating a synthetic GAP change specifier 4984. In one implementation, the economic cost model logic 4996 validates GAP change specifiers 184 and/or generates synthetic GAP change specifiers 4984 that specify the type of GUI object changes between successive releases of GAPs, including: (A) a new GUI object added to a subsequent GAP version 152; (B) a GUI object is deleted from a subsequent GAP version 152; (C) the values of one or more attributes of a GUI object are modified; (D) the values of a GUI object are modified between successive GAP versions; and (E) the type of a GUI object is different. The economic cost engine 182 analyzes the GUI objects referred to in the current test script 5000, the current GAP version 150 and the GAP change specifiers 184 (5502). The economic cost engine 182 retrieves the properties of each GUI object (e.g., GUI object entries 3922) from the object repository 174, and locates a corresponding GUI element difference entry 3910 in the GUI difference model 162 (5504). In one implementation, the economic cost engine 182 receives a current GAP tree model representation of a current GAP version 150 from the GUI difference model 162 and GAP change specifiers 184, and generates synthetic GAP change specifiers 4984, using GAP change specifier logic 5290. The economic cost model logic 4996 analyzes the GUI object changes (5506).

GUI object changes of types A (5508) and B (5510) occur when GUI objects are added and removed correspondingly from current GAP version 150 and subsequent GAP version 152. For example, adding the WinObject menustrip1 308 to the subsequent GAP version 152 is a type A change, while removing the WinObject "Select School" 3304 is a type B GUI object change. Referring to FIG. 35, notice that the "Select School" has been removed at 3512.

An example of a type C change (5512) is the change of the window name from StateList 3302 to School 3402. Adding or removing values from GUI objects such as list and combo boxes are examples of modifications of the type D change (5512). For example, the listbox StateListbox 3312 in current GAP version 150 is identified in the subsequent GAP version 152 as StateListbox 3404, and referring to the GUI difference entry 3604 the values for SeqNumber="8" are "District of Columbia" and "Florida" for successive GAP versions, respectively. Changing the "type" of a GUI object may include replacing a class of the window that is used to represent the object and/or changing the high-level concept that describes the values that the GUI object takes. For example, changing the type of the static label to a read-only combo box is a modification of the type E (5512). Another example of a type E change includes the change of the listbox "SchooListbox" 3316 to a combobox "SchoolCombobox" 3406.

The economic cost model logic 4996 receives GAP change specifiers 184 and generates synthetic GAP change specifiers 4984 that include wrong path-delete type 5280 wrong path-same type 5282 and changed element type 5284 specifiers. Wrong path-delete type 5280 specifies that a GUI object in the current GAP version 150 may have been deleted in the subsequent GAP version 152 (e.g., see "Select School" 3318 and 3512 as shown in FIG. 35), although the current test script 5000 refers to the GUI object (5514). Wrong path-same type 5282 specifies that a GAP change may result in a read and/or write to the wrong GUI object. For example, a method may be invoked on the wrong GUI object based on a particular GAP change. Wrong path-same type 5282 specifies that a GUI object in a current GAP version 150 has been modified and/or another GUI object has been added to the subsequent GAP version 152 that may result in the wrong GUI object being navigated to by a test script statement (5516).

For example, consider the statement in lines 2 and 6 of the current test script 5000 and transformed test script 5400, respectively:

| Window("StateList").Dialog("Open").-WinListView("SysListView32").Select "university.data". |
|---|

The statement selects "university.data" from a WinListView "SysListView32". However, lines 2-4 of the transformed test script 5400 may navigate to and invoke the Select method on the wrong GUI object "university.data", because the GUI objects referenced in lines 2-4 of the transformed test script 5400 are new GUI objects that are not referenced in the current test script 5000. Thus, when the properties of existing GUI objects are modified and/or other GUI objects are added into a subsequent GAP version 152, the result of interference of these operations is that transformed test script statements that result from applying GAP change specifiers 184 and/or synthetic GAP change specifiers 4984 to current test script statement vectors 3916 may access and read values of objects that are different from those as originally intended.

Changed-element 5284 specifies that the type, properties, and/or default values of a GUI object referenced by a test script statement vector 3916 have changed in the subsequent GAP version 152 (5518). For example, the GUI difference entry 3604 indicates that there are different values for SeqNumber="8" are "District of Columbia" and "Florida" for successive GAP versions, and the economic cost model logic 4996 may generate a synthetic GAP specifier 4984 that includes a change-element 5284 correspondingly. Change-element 5284 may also specify that new constraints have been imposed on a GUI object that conflict with test script statement vectors 3916, for example, attempting to write data to a previously writable text box that has been changed to a read-only text box.

Referring to the GUI element difference entry shown in Table 13, the WinObject "AcadScale" referred to in the current test script 5000 at line 8 is an editable object that has been transformed into the WinObject "Academics (1-5)" in the subsequent GAP version 152 where the object is read-only. The economic cost model logic 4996 validates GAP change specifiers 184 and/or generates the synthetic GAP change specifier 4984 with the GAP change type specified (5520), and the GUI element change status 3934 is updated (5522). In one implementation, the economic cost model logic 4996 does not generate synthetic GAP change specifiers 4984 for GUI objects that have not changed between successive GAP versions (5524).

Knowing the modification type for a GUI object facilitates the economic cost model logic 4996 to determine the appropriate synthetic GAP change specifiers 4984 to generate and/or validate received GAP change specifiers 184. For example, the economic cost model logic 4996 may validate GAP change specifiers 184 and/or generate one or more synthetic GAP change specifiers 4984 that specify changes to test script statement vectors 3916 that attempt to set values in a text box object that has been changed to a read-only combo box. GAP change specifiers 184 and/or synthetic GAP change specifiers 4984 may specify that the test script statement vector 3916 be modified (transformed) to select values in the combo box using appropriate interfaces rather than attempting to set values in the text box.

The economic cost model logic 4996 determines whether GUI objects have been removed from a current GAP version 150 and locates the test script statement vectors 3916 that reference these removed objects in the current test script 5000. The economic cost engine 182 refers to these statements as first-reference statements (FRS). The variables used in these statements are obtained, and the statements that use the variables whose values are defined in the FRSs are referred to as secondary reference statements (SRS). The economic cost model logic 4996 determines whether GUI objects may have been deleted in the subsequent GAP version 152, and validates received GAP change specifiers 184 and generates one or more corresponding synthetic GAP change specifiers 4984 with a wrong path-delete 5284. When a statement of the current test script 5000 refers to a variable whose value points to a removed GUI object, the statement of the current test script 3926 is considered an SRS. In one implementation, the economic cost engine 182 generates one or more synthetic GAP change specifiers 4984 and/or validates received GAP change specifiers 184 corresponding to the identified SRSs.

When the values of one or more attributes of a GUI object are modified, a type C modification is performed. FRSs and SRSs are identified for the GUI object with the modified attributes, and corresponding synthetic GAP change specifiers 4984 are generated and/or received GAP change specifiers 184 are validated. When the values of GUI objects are added or removed, modifications of the type D occur. After locating FRSs that reference GUI objects whose values have been changed, SRSs are found and the economic engine 182 determines the impact due to the SRSs. When the type of a GUI object is modified then a modification of the type E occurs that involves locating FRSs, checking the new types of the GUI object, invoking corresponding type sub-sumption rules. The economic cost model logic 4996 may analyze the modified GUI objects to determine whether to generate synthetic GAP change specifiers 4984 with change-element type 5284 where GUI objects whose types, properties, or default values are changed in a subsequent GAP version 152, and/or attempting an operation on a GUI object that does not take into consideration new constraints imposed on the elements of the GUI object.

The economic cost model logic 4996 analyzes each GUI object referred to in the current test script 164 and/or current test script 5000, the current GAP version 150, received GAP change specifiers 184, generated synthetic GAP change specifier 4984, and/or GUI element change status 3934. The economic cost model logic 4996 locates, in the economic models 176 repository, the economic model specified by the model specifier 5268, and retrieves a GUI element change cost rule 5246 with a change specifier identifier 5250 corresponding to the GAP change specifier 184 and/or synthetic GAP change specifier 4984. In one implementation, the economic cost model logic 4996 combines one or more attributes of a GUI object (e.g., type and/or class) with the GUI element change status 3934, the model specifier 5268, the wrong path-delete type 5280, wrong path-same type 5282 and/or changed element type 5284 to form a unique identifier used to locate a corresponding change specifier identifier 5250 in the economic model specified by the model specifier 5268.

The economic model logic 4996 analyzes the GUI element change cost rule 5246 components, GAP change specifier 184 and/or synthetic GAP change specifier 4984 components, preference identifiers 5266 and GUI change efficiency factor 5286 to determine whether to adjust the GUI change cost estimate 5254. For example, the economic cost model logic 4996 adjusts the GUI change cost estimate 5254 based on whether the skills coefficients 5272, complexity identify 5274, quality identifier 5276, system resource utilization identifiers 5252, quality ranking 5260, and/or complexity ranking 5262 are within an acceptable variance as specified by the preference identifiers 5266. The economic cost model logic 4996 obtains the GUI transformation cost 5248 based on the adjusted GUI change cost estimate 5254. In other words, the GUI change cost estimate 5254 is adjusted to obtain the GUI transformation cost for the GAP change specifier 184 and/or synthetic GAP change specifier 4984. The economic cost model logic 4996 processes each received GAP change specifier 184 and/or generated synthetic GAP change specifier 4984 to obtain the corresponding GUI transformation costs 5248 and generates the test script transformation cost report 186 with the GUI transformation costs 5248.

Figure 56:
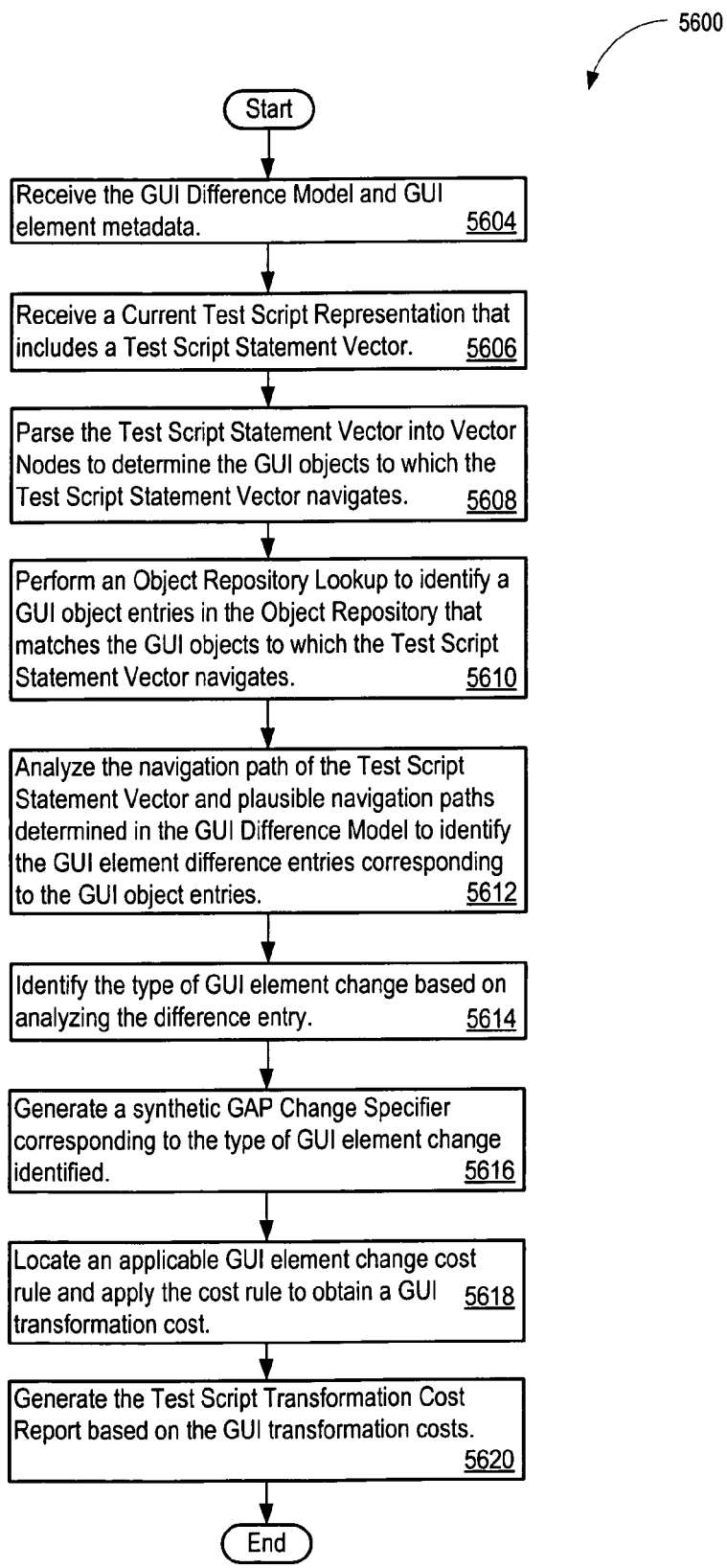
FIG. 56 shows a flow diagram for outputting a test script transformation cost report based on a GUI difference model.

FIG. 56 shows a flow diagram for outputting a test script transformation cost report 186 based on a GUI difference model 162. The economic cost engine 182 receives the GUI difference model 162 and GUI element metadata 140 (5604). The economic cost engine 182 receives a current test script representation 3914 that includes a test script statement vector 3916 (5606). The script parser logic 3912 parses the test script statement vector 3916 into vector nodes to determine the GUI objects to which the test script statement vector 3916 navigates (5608). The economic cost engine 182 invokes the OR lookup logic 172 for each GUI object identified by the test script statement vector 3916 to retrieve the properties of the GUI objects from the object repository 174 (5610). The path traversal logic 3924 analyzes the navigation path of the GUI element difference entries 3910 that correspond to the GUI objects identified by the test script statement vector 3916 (5612). The economic cost model logic 4996 validates a GAP change specifier 184 and/or determines the type of synthetic GAP change specifier 4984 to generate (5614). The economic cost model logic 4996 generates a synthetic GAP change specifier 4984 corresponding to the type of GUI element change identified by analyzing the current test script 164, current GAP version 150 (e.g., current GAP tree model) and GUI difference model 162 (5616). The economic cost model logic 4996 locates, in the economic model specified by the model specifier 5268, the GUI element change cost rule 5246 corresponding to the GAP change specifier 184 and/or synthetic GAP change specifier 4984 and applies the GUI element change cost rule 5246 to obtain the GUI transformation cost 5248 (5618). The economic cost model logic 4996 generates the test script transformation cost report 186 based on the GUI transformation cost 5248 (5620).

In one implementation, the economic cost engine architecture 110 uses adaptive programming including class and object graphs and an abstraction that treats all objects uniformly. The path traversal logic 3924 and the economic cost model logic 4996 may distinguish complex and simple types of GUI objects. Given a GUI object of some type, the traversal logic 3924 and the economic cost model logic 4996 work together to identify one or more reachable objects that satisfy certain criteria. The task performed is equivalent to determining whether test script statement vectors 3916 that describe navigation paths are valid. The task of static checking of test scripts (e.g., transformed test scripts 5400) is greatly simplified when the names of foreign components names are defined as string constants. When the names of GUI objects are specified using expressions, the values of these expressions may not be determined until run-time. Type graphs facilitate the economic engine system 5200 to infer types of expressions and variables that hold the names of GUI objects. The economic engine system 5200 applies concepts based on the Traversal Graph Analysis (TGA) defined in adaptive programming to infer types of expressions and variables.

When the values of string expressions in test scripts statements cannot be computed until run-time, the string expressions may be inferred. The path traversal logic 3924 and the economic cost model logic 4996 work together to analyze test script statements vectors 3916, using type graphs by transforming test script statements vectors 3916 into an adaptive strategy with variables replacing string expressions. The economic cost model logic 4996 computes possible values for each variable and generates traversal paths for each strategy. Where at least one path is identified, then a corresponding GAP change specifier 184 is validated and/or a synthetic GAP change specifier 4984 is generated, since values of expressions that compute names of objects may not be in the computed paths. The path traversal logic 3924 identifies one or more possible paths, while the economic cost model logic 4996 validates paths for the expressions and statements.

The economic engine system 5200 provides modularization integrity as a mechanism for ensuring the validity of GAP change specifiers 184 and/or synthetic GAP change specifiers 4984. Modularization integrity specifies that each current test script statement identified by a GAP change specifier 184 and/or a synthetic GAP change specifier 4984 to be changed may only communicate directly with the objects that belong to GUIs for which the current test script statement, as changed by the GAP change specifier 184 and/or a synthetic GAP change specifier 4984, is created. Compositions of current test script statements changed as specified by GAP change specifiers 184 and/or synthetic GAP change specifiers 4984, in which GUI objects are accessed by calling functions exported by the current test script statements changed as specified, should not violate modularization integrity. The economic engine system 5200 ensures the modularization integrity of GAP change specifiers 184 and/or synthetic GAP change specifiers 4984 by analyzing compositions of current test script statements changed as specified by GAP change specifiers 184 and/or synthetic GAP change specifiers 4984 to build the transitive relations between the current test script 164 and the current test script 164 changed as specified by the GAP change specifiers 184 and/or synthetic GAP change specifiers 4984 (e.g., transformed test script 178 and 5400).

For example, a statement Func("y", "z"), found in a suite of related test scripts, navigates to the field z of foreign GUI object y in some test scripts that export function Func. Thus, the some test scripts in the suite of related test scripts may violate the modularization integrity by implicitly interoperating the test scripts via the function Func even though this communication may be prohibited by the constraints of a given test suite. In one implementation, the economic engine system 5200 encodes modularization constraints when defining test scripts using the keyword constraints as part of a global comment in each test script. These constraints define GAPs and their GUI screens as well as other test scripts with which a given test script may communicate. An example is a statement that specifies a constraint is constraints screen ("Q") test_scripts("P, S"). This constraint effectively prohibits a given test script from communicating with other GAPs, GUI screens, and test scripts, except the screen Q and test scripts P and S, explicitly or implicitly.

The time complexity of the path traversal logic 3924 and the economic cost model logic 4996 is exponential to the size of the type graph for each test script 164. Because the path traversal logic 3924 and the economic cost model logic 4996 involve the search of one or more nodes and edges in the type graph that contains cycles for each node in the strategy, the time complexity is $O((V+E)^{max(|\pi|)})$ where V is the number of nodes, E is the number of edges in the type graph, and max ($|\pi|$) is the maximum number of nodes in strategies. The operations of storing successors in the table of variables take $O(1)$. In general, the number of nodes max($|\pi|$) in strategies is much smaller than the number of nodes in type graphs. All graph nodes may not need to be explored for each node in a strategy.

The systems may be implemented in many different ways. For example, although some features are shown stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A test script transformation system comprising:
 a memory;
 a processor coupled to the memory;
 a graphical user interface (GUI) element mapping system adapted to:
 generate a GUI element mapping specification message comprising a GUI element version mapping comprising a GUI element mapping specification message header and a GUI element mapping specification message terminator;
 a metadata repository adapted to: receive the GUI element mapping specification message and responsively maintain GUI element metadata;
 GUI comparator logic stored in the memory and executable by the processor that when executed by the processor cause the processor to:
 accept as input: a current GUI application (GAP) GUI model for a current GAP version; a subsequent GAP GUI model for a subsequent GAP version; and the GUI element version mapping; and
 generate as output: a GUI difference model comprising a first GUI element difference entry that identifies a specific GUI element that matches between the current GAP version and the subsequent GAP version, but that differs in character between the current GAP version and the subsequent GAP version;
 a script analyzer stored in the memory and executable by the processor that when executed by the processor cause the processor to:
 accept as input: the GUI difference model; and an abstract syntax tree representation of a current test script;
 generate as output a change guide comprising script transformation information for functionally transforming the current test script that includes navigation statements, and performs read, write, or other actions or functions on GUI objects, and the arguments of these functions to test the functionality of the subsequent GAP version; and
 an economic engine operable to analyze the change guide.

2. The system of claim 1, the economic engine further operable to produce a cost report comprising test script transformation cost information.

3. The system of claim 1, further comprising:
   a pre-defined economic model of test script transformation cost relationships; and
   where: the economic engine is further operable to produce the cost report based on the test script transformation cost relationships.

4. The system of claim 1, where the GUI element version mapping comprises:
   a source GUI element identifier; and
   a destination GUI element identifier; and
   where: the GUI element difference entry comprises:
   a first GUI element specification drawn from the current GAP GUI model corresponding to the source element GUI identifier; and
   a second GUI element specification drawn from the subsequent GAP GUI model corresponding to the destination element GUI identifier.

5. The system of claim 1, where the GUI comparator logic further causes the processor to: execute a weighted comparison analysis between GUI elements in the current GAP GUI model and the subsequent GAP GUI model.

6. The system of claim 5, where the GUI comparator logic further causes the processor to: apply a threshold analysis to determine whether the weighted comparison analysis results in a cross model GUI element match.

7. The system of claim 1, where the GUI element version mapping comprises: a source GUI element identifier; and a destination GUI element identifier.

8. The system of claim 7, where the GUI element version mapping further comprises: a source GAP alias for the current GAP version; and a destination GAP alias for the subsequent GAP version.

9. The system of claim 1,
   where the script analyzer further comprises: object repository lookup logic; and
   where the script analyzer further causes the processor to:
      generate as output a functionally transformed test script comprising functionally transformed script entries generated from current test script entries in the current test script, wherein the transformed test script is used by the processor against the subsequent GAP version to test the subsequent GAP version.

10. The system of claim 1, further comprising:
    a GUI typing system adapted to generate a GUI element type mapping comprising a GUI element type and a GUI element identifier; and
    a constraint satisfaction engine operable to perform a compatibility analysis on the GUI element type with respect to a script statement in the current test script.

11. A test script analysis method comprising:
    generating a graphical user interface (GUI) element mapping specification message comprising a GUI element version mapping comprising a GUI element mapping specification message header and a GUI element mapping specification message terminator;
    receiving the GUI element mapping specification message at a metadata repository and responsively maintaining GUI element metadata;
    initiating execution of GUI comparator logic operable to:
       accept as input: a current GUI application (GAP) GUI model for a current GAP version; a subsequent GAP GUI model for a subsequent GAP version; and the GUI element version mapping; and
       generate as output: a GUI difference model comprising a first GUI element difference entry that identifies a specific GUI element that matches between the current GAP version and the subsequent GAP version, but that differs in character between the current GAP version and the subsequent GAP version; and
    initiating execution of a script analyzer operable to:
       accept as input: the GUI difference model; and an abstract syntax tree representation of a current test script;
       generate as output a change guide comprising script transformation information for functionally transforming the current test script that includes navigation statements, and performs read, write, or other actions or functions on GUI objects, and the arguments of these functions to test the functionality of the subsequent GAP version; and
    initiating execution of an economic engine operable to analyze the change guide.

12. The method of claim 11, further comprising: initiating execution of the economic engine further operable to produce a cost report comprising test script transformation cost information.

13. The method of claim 11, further comprising:
    producing the cost report based on test script transformation cost relationships in a pre-defined economic model.

14. The method of claim 11, where generating a GUI element mapping specification message comprises: specifying a source GUI element identifier; and specifying a destination GUI element identifier.

15. The method of claim 11, further comprising:
    executing a weighted comparison analysis between GUI elements in the current GAP GUI model and the subsequent GAP GUI model.

16. The method of claim 15, further comprising: applying a threshold analysis to determine whether the weighted comparison analysis results in a cross model GUI element match.

17. The method of claim 11, further comprising:
    generating a GUI element type mapping comprising a GUI element type and a GUI element identifier; and initiating execution of a constraint satisfaction engine operable to perform a compatibility analysis on the GUI element type with respect to a script statement in the current test script; and
    initiating execution of the script analyzer further operable to:
       generate as output a functionally transformed test script for use against the subsequent GAP version and comprising functionally transformed script entries generated from current test script entries in the current test script.

18. A product comprising:
    a non-transitory memory; and
    test script analysis logic stored in the non-transitory memory, executable by a processor coupled to the non-transitory memory that when executed causes the processor to:
       generate a graphical user interface (GUI) element mapping specification message comprising a GUI element version mapping comprising a GUI element mapping specification message header and a GUI element mapping specification message terminator;
       receive the GUI element mapping specification message at a metadata repository and responsively maintaining GUI element metadata;

initiate execution of GUI comparator logic operable to:
    accept as input: a current GUI application (GAP) GUI model for a current GAP version; a subsequent GAP GUI mode for a subsequent GAP version; and the GUI element version mapping; and
    generate as output: a GUI difference model comprising a first GUI element difference entry that identifies a specific GUI element that matches between the current GAP version and the subsequent GAP version, but that differs in character between the current GAP version and the subsequent GAP version; and
initiate execution of a script analyzer operable to:
    accept as input: the GUI difference model; and an abstract syntax tree representation of a current test script;
    generate as output a change guide comprising script transformation information for functionally transforming the current test script that includes navigation statements, and performs read, write, or other actions or functions on GUI objects, and the arguments of these functions to test the functionality of the subsequent GAP version; and
    initiate execution of an economic engine operable to analyze the change guide.

19. The product of claim 18, where the test script analysis logic further causes the processor to: initiate execution of the economic engine further operable to produce a cost report comprising test script transformation cost information.

20. The product of claim 18, where the test script analysis logic further causes the processor to: initiate execution of an economic engine operable to analyze the change guide and produce a cost report comprising test script transformation cost information based on test script transformation cost relationships in a pre-defined economic model.

21. The product of claim 18, where the test script analysis logic further causes the processor to: execute a weighted comparison analysis between GUI elements in the current GAP GUI model and the subsequent GAP GUI model.

22. The product of claim 21, where the test script analysis logic further causes the processor to: apply a threshold analysis to determine whether the weighted comparison analysis results in a cross model GUI element match.

23. The product of claim 18, where the test script analysis logic further causes the processor to:
    generate a GUI element type mapping comprising a GUI element type and a GUI element identifier; and initiate execution of a constraint satisfaction engine operable to perform a compatibility analysis on the GUI element type with respect to a script statement in the current test script; and
    initiate execution of the script analyzer further operable to:
        generate as output a functionally transformed test script for use against the subsequent GAP version and comprising functionally transformed script entries generated from current test script entries in the current test script.

24. The product of claim 18, where the GUI element mapping specification message comprises: specifying a source GUI element identifier; and specifying a destination GUI element identifier.

* * * * *